United States Patent [19]
Lenihan et al.

[11] Patent Number: 5,127,004
[45] Date of Patent: Jun. 30, 1992

[54] TONE AND ANNOUNCEMENT MESSAGE CODE GENERATOR FOR A TELEPHONIC SWITCHING SYSTEM AND METHOD

[75] Inventors: John P. Lenihan, Wheaton; Mai T. Nguyen, Glenview, both of Ill.

[73] Assignee: Rockwell International Corporation, El Segundo, Calif.

[21] Appl. No.: 408,165

[22] Filed: Sep. 15, 1989

[51] Int. Cl.5 .............................................. H04J 3/12
[52] U.S. Cl. ............................... 370/110.2; 370/85.1; 370/110.1; 379/67; 379/418
[58] Field of Search ............... 370/110.1, 110.2, 110.3, 370/62, 58.1, 58.2, 58.3, 85.1; 379/156, 157, 158, 202, 258, 268, 269, 284, 286, 418, 67, 68, 76, 88, 89

[56] References Cited

U.S. PATENT DOCUMENTS

| | | | |
|---|---|---|---|
| 4,205,203 | 5/1980 | Mehta et al. | 370/110.2 |
| 4,475,189 | 10/1984 | Herr et al. | 370/62 |
| 4,498,171 | 2/1985 | Munter et al. | 370/110.2 |
| 4,541,088 | 9/1985 | Sarson | 370/110.2 |
| 4,571,723 | 2/1986 | Lusignan et al. | 370/110.2 |
| 4,597,074 | 6/1986 | Demichelis et al. | 370/85.2 |
| 4,805,172 | 2/1989 | Barbe et al. | 370/110.1 |
| 4,849,966 | 7/1989 | Willis et al. | 370/85.1 |
| 4,908,825 | 3/1990 | Vea | 370/110.3 |
| 4,979,171 | 12/1990 | Ashley | 370/110.2 |

FOREIGN PATENT DOCUMENTS 2134752 8/1984 United Kingdom ............... 379/418

*Primary Examiner*—Douglas W. Olms
*Assistant Examiner*—Alpus H. Hsu
*Attorney, Agent, or Firm*—C. B. Patti; V. L. Sewell; H. F. Hamann

[57] ABSTRACT

A tone and announcement PCM code generator (10) outputs to selected multiple channels of a TDM telephonic switching system (12) selected tones and voice announcements stored in a message memory (16) according to command signals from a telephonic switching system central controller (12A) through a share memory (20) to a state machine, or sequencer, (22). The sequencer controls the message memory (16) to provide selected tones and voice announcements through a serial interface (24) on the selected TDM channels. The entire repertoire of tones and announcements can be down loaded from a central memory (12B) of the telephonic switching system (12), and customer designed voice messages from any channel of the telephonic switching system can be stored in the message memory (16) for later local playback or for up loading to the central memory (12B). All tones and announcements are processed uniformly and any tone or announcement can be preselected to any or all channels simultaneously for maximum system flexibility. The entire period of periodic tone signals including the silent segment are stored to enable processing in the same way as continuous tones.

41 Claims, 27 Drawing Sheets

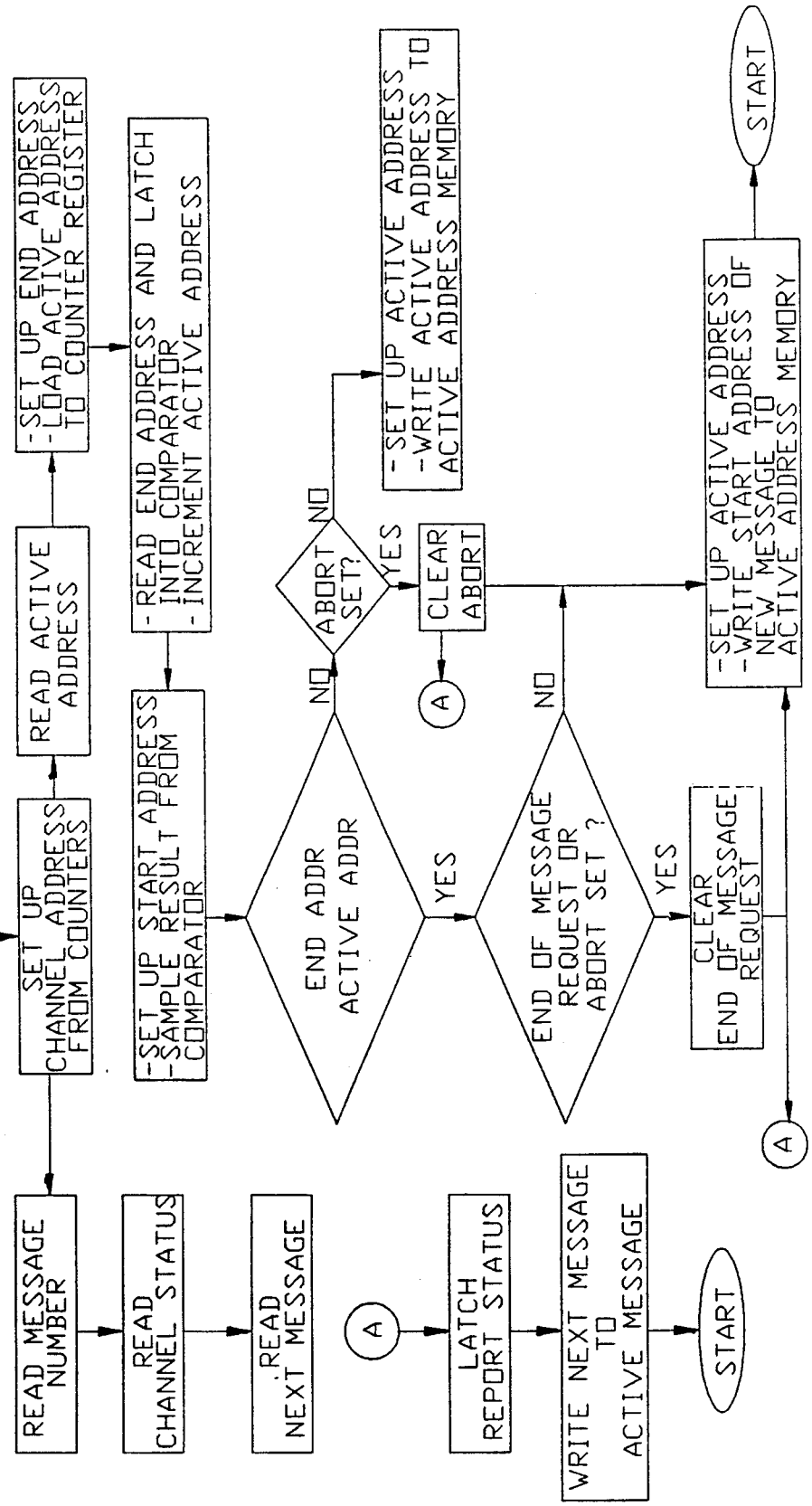
Fig. 4 SEQUENCER FLOW DIAGRAM

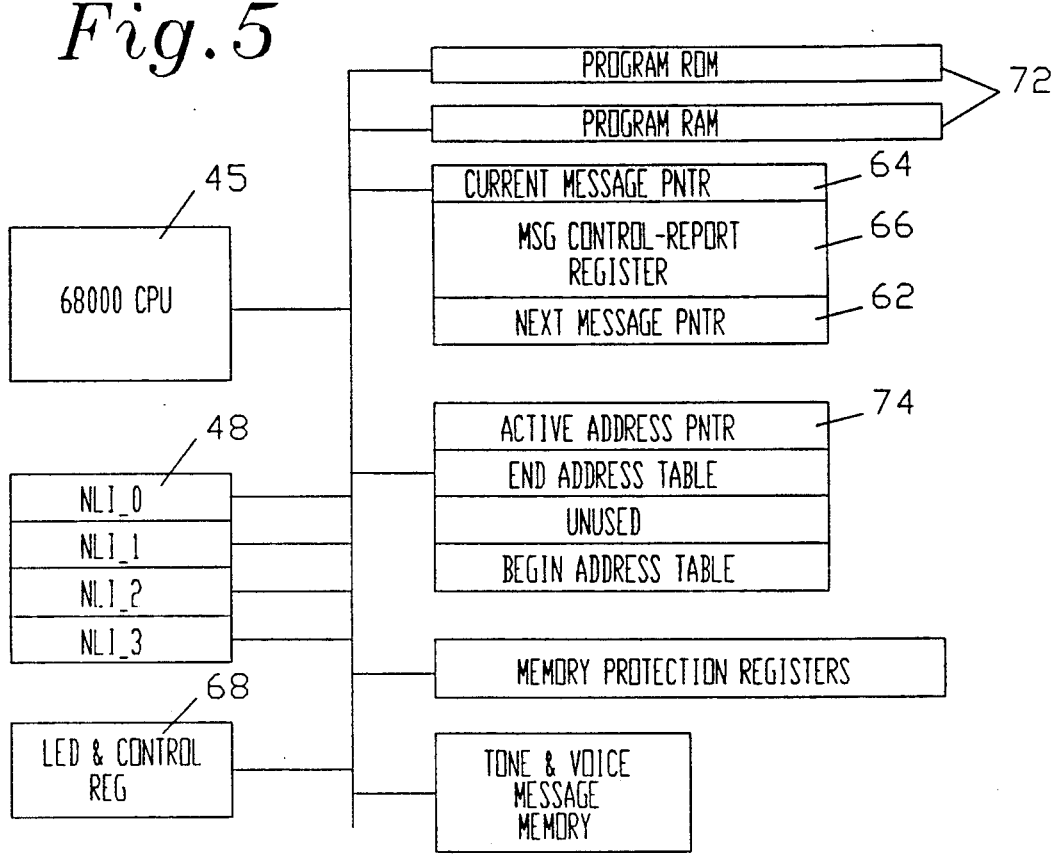

| | | |
|---|---|---|
| MSBIT | D7 | TRANSMIT MODE: REPEAT = 0; SEQUENTIAL = 1 |
| | D6 | ABORT REQUEST- PLACE NEXT MESSAGE POINTER IN CURRENT MESSAGE POINTER WHEN SET HIGH. |
| | D5 | PLAY/RECORD-- WHEN SET HIGH, MESSAGE IS READ FROM DRAM TO NLI-IC (PLAYBACK MODE). WHEN SET LOW, MESSAGE IS WRITTEN TO DRAM FROM NLI-IC (RECORD MODE). |
| | D4 | UNUSED |
| | D3 | UNUSED |
| | D2 | UNUSED |
| | D1 | ERROR REPORT- SET HIGH WHEN ACTIVE ADDRESS >ENDING ADDRESS. |
| LSBIT | D0 | EOM REPORT- SET HIGH WHEN MOVING NEXT MESSAGE TO CURRENT MESSAGE OR A REPORT REQUEST HAD BEEN SET HIGH. |

Fig. 7A

BEGINNING SDDRESS TABLE
24 BITS WIDE

| BEGIN ADDR. OF MESS 1 |
| BEGIN ADDR. OF MESS 2 |
| BEGIN ADDR. OF MESS 3 |
| BEGIN ADDR. OF MESS 4 |

•••

| BEGIN ADDR. OF MESS 256 |

Fig. 7B

ENDING ADDRESS TABLE
24 BITS WIDE

| END ADDR. OF MESS 1 |
| END ADDR. OF MESS 2 |
| END ADDR. OF MESS 3 |
| END ADDR. OF MESS 4 |

•••

| END ADDR. OF MESS 256 |

Fig. 7C

MESSAGE TABLE
8 BITS WIDE

| MESS 1 |
| MESS 2 |
| MESS 3 |
| MESS 4 |
| MESS 5 |
| MESS 6 |
| MESS 7 |

•••

| MESS 256 |

Fig. 9A

BYTES OF TRANSMISSION FOR ONE COMMAND FROM THE CONTROLLER.

| FUNCTION CODE 0-255 | CHANNEL 0-96 | # BYTES FOLLOWING 0-255 | A NUMBER OF BYTES BETWEEN 0 AND 255 |
|---|---|---|---|

- CHANNEL 0 INDICATES A FUNCTION THAT IS INDEPENDANT OF ANY PARTICULAR CHANNEL.
- A CONTROL INSTRUCTION LIKE ONE OF THE ONES ILLUSTRATED BELOW.

Fig. 9B

CARD CONTROL

- ☐ SELF TEST CARD
- ☐ INITIALIZE CARD

MESSAGE CONTROL

- ☐ MAKE THIS MESSAGE NUMBER HAVE THE BEGIN AND END ADDRESS FOLLOWING
- ☐ WHAT IS THE BEGIN AND ENDING ADDRESS OF THE FOLLOWING MESSAGE NUMBER?
- ☐ DOWNLOAD THE FOLLOWING MESSAGE AND CALL IT THIS MESSAGE NUMBER.
- ☐ UPLOAD THE FOLLOWING MESSAGE.

CHANNEL CONTROL

- ☐ TURN ON SIGNALING BIT INSERTION TO THIS CHANNEL.
- ☐ TURN OFF SIGNALING BIT INSERTION TO THIS CHANNEL.
- ☐ ABORT CURRENT MESSAGE ON THIS CHANNEL, AND REPLACE IT WITH THIS MESSAGE, AND REPORT END OF MESSAGE STRING.
- ☐ ABORT CURRENT MESSAGE ON THIS CHANNEL AND REPLACE IT WITH THIS MESSAGE. DO NOT REPORT END OF MESSAGE STRING.
- ☐ CONCATENATE THIS MESSAGE TO THE QUEUE FOR THIS CAHNNEL NUMBER AND REPORT END OF MESSAGE STRING.
- ☐ CONCATENATE THIS MESSAGE TO THE QUEUE FOR THIS CHANNEL NUMBER, BUT DO NOT REPORT END OF MESSAGE STRING

Fig. 9C

RECORDING CONTROL

- ☐ CHANGE THIS CHANNEL TO A READ FROM PCM BUS.
- ☐ CHANGE THIS CHANNEL TO A WRITE TO PCM BUS.

Fig. 10A

BYTES OF TRANSMISSION FOR ONE REPORT TO THE CONTROLLER.

| FUNCTION CODE 0-255 | CHANNEL 0-96 | # BYTES FOLLOWING 0-255 | A NUMBER OF BYTES BETWEEN 0 AND 255 |
|---|---|---|---|

CHANNEL 0 INDICATES A FUNCTION THAT IS INDEPENDANT OF ANY PARTICULAR CHANNEL.

A SINGLE BYTE RETURN CODE OF 1 WILL MEAN FUNCTION SUCCESSFUL.

A SINGLE BYTE RETURN CODE OF 0 MEANS FUNCTION UNSUCCESSFUL.

Fig. 10B

TRANSMISSION

☐ RETURN FUNCTION CODE AND CHANNEL NUMBER WITH EITHER A 1 FOR SUCCESSFUL OR 0 FOR FAILED.

☐ GIVES A FUNCTION TO INITIATE ACTION LIKE REPORTING READY FOR SERVICE OR FAILURE DETECTED.

☐ GIVES A FUNCTION CODE AND CHANNEL NUMBER INDICATING THIS TRANSMISSION IS PART OF AN UPLOAD OF DATA.

1K X 16 ADDRESS POINTER LOW WORD

1K X 8 ADDRESS POINTER HIGH BYTE

| PROCESSOR ADDRESSES | | SEQUENCER ADDRESSES |
|---|---|---|
| 0A0140H - 0A01FEH | ACTIVE MESSAGE | 0A0H - 0FFH |
| 0A0340H - 0A03FEH | CHANNEL CONTROL | 1A0H - 1FFH |
| 0A0740H - 0A07FEH | NEXT MESSAGE | 3A0H - 3FFH |

1K X 8 DUAL PORT RAM.

| 82C55 ADDRESS | | DATA BIT | MEMORY PROTECT RANGE |
|---|---|---|---|
| 0E0103H(Port B) | | | |
| | | D0 | 020000H - 021FFFH |
| | | D1 | 022000H - 023FFFH |
| | | D2 | 024000H - 025FFFH |
| | | D3 | 026000H - 027FFFH |
| | | D4 | 028000H - 029FFFH |
| | | D5 | 02A000H - 02BFFFH |
| | | D6 | 02C000H - 02DFFFH |
| | | D7 | 02E000H - 02FFFFH |
| 0E0105H(Port C) *STATIC RAM EXPANSION | | | |
| | | D0 | 030000H - 031FFFH |
| | | D1 | 032000H - 033FFFH |
| | | D2 | 034000H - 035FFFH |
| | | D3 | 036000H - 037FFFFH |
| | | D4 | 038000H - 039FFFH |
| | | D5 | 03A000H - 03BFFFH |
| | | D6 | 03C000H - 03DFFFH |
| | | D7 | 03E000H - 03FFFFH |

Fig. 18

8255 CONTROL REGISTER

| | |
|---|---|
| 0E0105 H | PORTC — UPPER 32KW MEMORY PROTECTION |
| 0E0103 H | PORTB — LOWER 32KW MEMORY PROTECTION |
| 0E0101 H | PORTA — LED AND CONTROL REGISTER |
| 0E0080 H – 0E00BE H | NLICS3~ |
| 0E00C0 H – 0E00FE H | NLICS2~ |
| 0E0040 H – 0E007E H | NLICS1~ |
| 0E0000 H – 0E003E H | NLICS0~ |

\* EACH NLI DECODES 32 INTERNAL REGISTERS VALID DATA AT LOWER BYTE ONLY

Fig. 19

| | |
|---|---|
| FFFFFF H | DRAM BANK 3 |
| E00000 H | DRAM BANK 2 |
| C00000 H | DRAM BANK 1 |
| A00000 H | DRAM BANK 0 |
| 800000 H | |

FOUR BANKS OF DYNAMIC RAMS.
EACH BANK IS 2 MEGABYTES
FOR A TOTAL OF 8 MEGABYTES.

Fig. 22

| | READ CYCLE | WRITE CYCLE |
|---|---|---|
| EPROM | 400NS/-/500NS | N.A. |
| RAM1,2 | -/400NS/500NS | -/400NS/500NS |
| ADPL~ | -500NS/600NS | -/500NS/800NS |
| ADPH~ | -500NS/600NS | -/500NS/800NS |
| CNDP~ | -500NS/600NS | -/500NS/800NS |
| 82C55CS~ | -500NS/600NS | -/500NS/- |
| NLI_REG | -/-/600NS | -/-/600NS |
| NLI FIFO | -/-/600NS | -/-/600NS |
| DRAM~ | -/400NS/500NS | -400NS/500NS |

TIMER & CLOCK SPECS

| | |
|---|---|
| POR | 110.48MS/-/362.7MS N.A. |
| NLIRST | 80MS/-/290MS |
| 12 MHz (PLL) | 12.00MHZ +/- 1800 HZ (FREE RUN) |
| | 12.352MHZ +/- 50 PPM (LOCKED) |
| 10 MHz | 10.00 MHZ +/- 500 PPM |

Fig.23

| NLI-IC0 | NLI-IC1 | NLI-IC2 | NLI-IC3 | DATA |
|---|---|---|---|---|
| 0E000B H | 0E004B H | 0E008B H | 0E00CB H | 02H, 0AH, 12H, 18H * |
| 0E000D H | 0E004D H | 0E008D H | 0E00CD H | 08 H |
| 0E000F H | 0E004F H | 0E008F H | 0E00CF H | DA H |
| 0E0011 H | 0E0051 H | 0E0091 H | 0E00D1 H | BD H |
| 0E0013 H | 0E0053 H | 0E0093 H | 0E00D3 H | C8 H |

Fig.24

| ADDRESS | DATA | COMMENTS |
|---|---|---|
| 0E0107 H | 080 H | CONFIGURE DEVICE TO MODE 0 OR THREE EIGHT-BIT OUTPUT PORT. |
| 0E0101 H | 0C5 H | TURN GREEN LED ON, ENABLE SEQUENCER AND UNLOCK DRAM SECTION. |
| 0E0103 H | 0FF H | ENABLE THE FIRST 32 K WORDS OF MEMORY RAMS. |
| 0E0105 H | 0FF H | ENABLE THE SECOND 32 K WORDS OF MEMORY RAMS. |

Fig.25

| ADDRESS | PROM1 | PROM2 | PROM3 | PROM4 |
|---|---|---|---|---|
| 00 H | A8 H | 81 H | 84 H | 13 H |
| 01 H | A8 H | 85 H | 84 H | 1B H |
| 02 H | B8 H | 85 H | A7 H | 13 H |
| 03 H | 8A H | AD H | 82 H | 13 H |
| 04 H | 8A H | AD H | 86 H | 02 H |
| 05 H | 8B H | AD H | 8E H | 02 H |
| 06 H | 8A H | BD H | C6 H | 02 H |
| 07 H | CA H | FD H | 86 H | 07 H |
| 08 H | 8E H | FD H | 04 H | 11 H |
| 09 H | 0A H | EE H | 06 H | 11 H |
| 0A H | 28 H | EF H | 02 H | 13 H |
| 0B H | A0 H | 06 H | 16 H | 13 H |
| 0C H | A0 H | 07 H | 16 H | 1B H |
| 0D H | A8 H | 87 H | 06 H | 13 H |
| 0E H | A8 H | 87 H | 06 H | 13 H |
| 0F H | A8 H | 85 H | 84 H | 13 H |
| 10 H | A8 H | 85 H | 84 H | 13 H |
| ...... | ...... | ...... | ...... | ...... |
| 1F H | A8 H | 85 H | 84 H | 13 H |

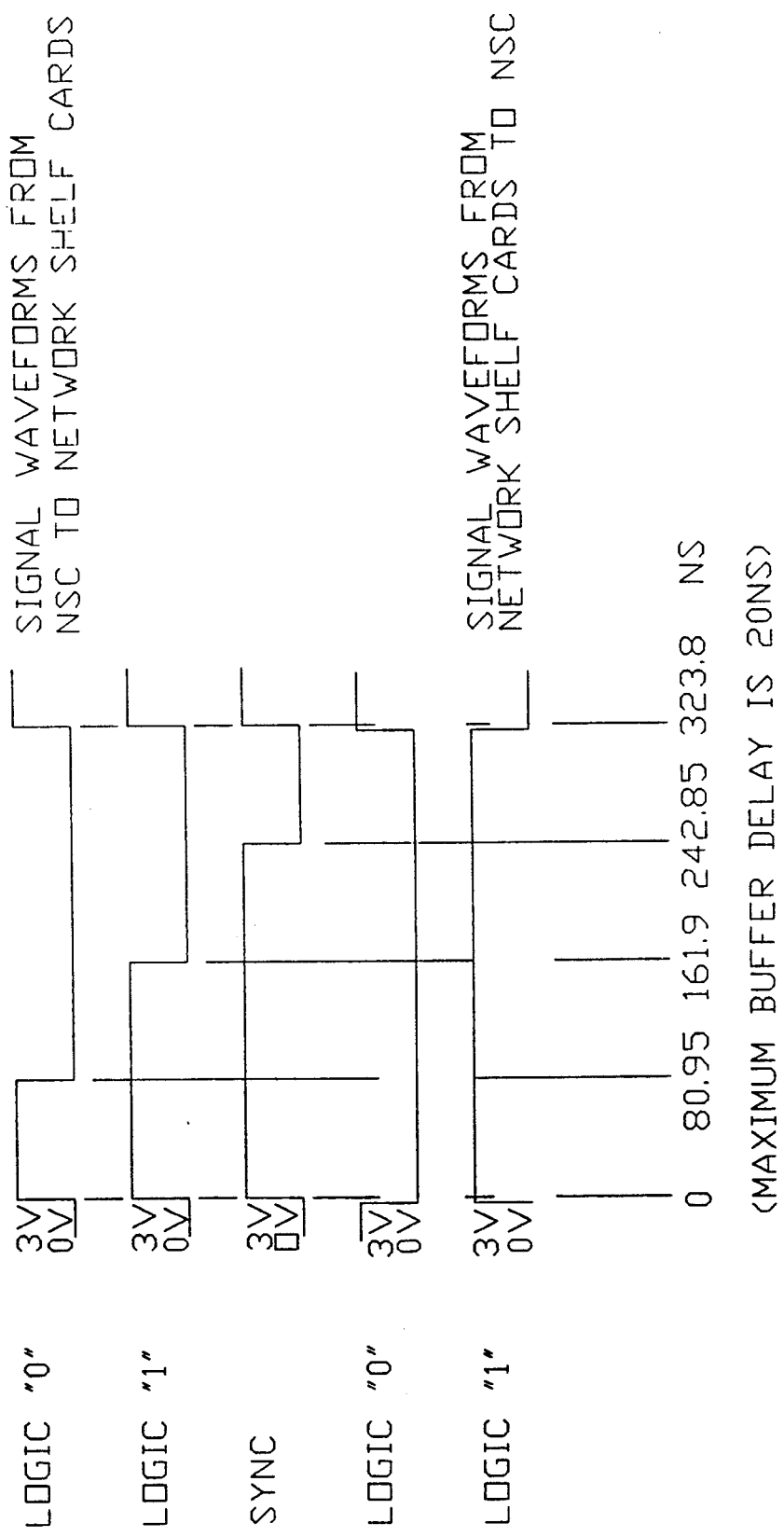

Fig.27

| | | |
|---|---|---|
| S0 | -SEQUENCER SET UP | SQA8 = 0<br>SQA9 = 0<br>SQRST_= 0<br>MRW_= 1<br>MEOC_= 0 |
| S1 | -DISABLE RESET | SQRST_= 1 |
| S2 | -LOAD MSG# TO MSG LATCH | MSG_CK = 1 |
| S3 | -SET CHNL_STS_ADDR | SQA8 = 1 |
| S4 | -CLEAR MSG CLOCK | MSG_CK = 0 |
| S5 | -LOAD CHNL_STS TO LATCH | CHNL_STS_CK = 1 |
| S6 | -SET NEXT_MSG_ADDR | QA9 = 1 |
| S7 | -LATCH STS_RPT TO LATCH | STS_RP_CK = 1 |
| S8 | -LOAD NEXT_MSG TO LATCH<br>-LOAD NEXT_MSG TO CRNT_MSG LATCH | NEXT_MSG_CK = 1<br>LMSG_CK = 1 **<br>(CONDITIONED SIGNAL) |
| S9 | -SET STS_RPT_ADDR<br>-ENABLE STS_RPT LATCH OUTPUT<br>-SET UP WRITE CYCLE<br>-ENABLE MESSAGE MEMORY | SQA9 = 0<br>STS_RP_OE_= 0<br>MR/W_= 0<br>MEOC_= 1 |
| S10 | -END WRITE CYCLE | MR/W_= 1 |
| S11 | -SET CMT_MSG_ADDR<br>-ENABLE NEXT_MSG LATCH OUTPUT<br>-DISABLE STS_RPT LATCH OUTPUT<br>-START NEXT_MSG WRITE CYCLE | SQA8 = 0<br>NEXT_MSG_OE_= 0<br>STS_RP_OE_= 1<br>MR/W_= 0 |
| S12 | -END WRITE CYCLE | MR/W_= 1 |
| S13 | -DISABLE NEXT_MSG LATCH OUTPUT | NEXT_MSG_OE_= 1 |
| S14 | | |
| S15 | -DISABLE MESSAGE MEMORY | MEOC_= 1 |

Fig.28

| | | |
|---|---|---|
| S0 | -SEQUENCER SET UP.<br>-SET RAMS TO READ MODE<br>-DISABLE ACTIVE MESSAGE LATCH<br>-SET ADDRESS COUNTER TO INPUT MODE. | ADP8 = ADP9 = 0<br>DPRW/= 1<br>MSG_OE/= 1<br>CNTR_G = 0 |
| S1 | | |
| S2 | -LOAD ACTIVE_ADDR TO COUNTERS REGISTERS<br>-LOAD ACTIVE_ADDR TO COMPARATOR | RCK = 1<br><br>PLE = 1 |
| S3 | -TURN OFF CHNL_ADDR.<br>-ENABLE MSG LATCH.<br>-LOAD ACTIVE_ADDR TO COUNTERS<br>-SET END_ADDR | CHNL_CTR_OE/= 1<br>MSG_OE/= 0<br>CLD1/= 0<br>ADP8 = 1 |
| S4 | -END COUNTERS LOAD CYCLE. | CLD1/= 1 |
| S5 | -INCREMENT COUNTERS BY 1. | CCK = 1 |
| S6 | -SAMPLE RESULT OF COMPARATOR.<br>-DISABLE COUNTER CLOCK. | RPT_CK = 1<br>CCK = 1 |
| S7 | -SET START ADDR | ADP9 = 1 |
| S8 | -SET UP COUNTER REGISTER CLOCK. | RCK = 0 |
| S9 | -LOAD START_ADDR TO COUNTERS REGISTERS. | RCK = 1 |
| S10 | -SET ACTIVE_ADDR<br>-TURN ON CHNL_ADDR<br>-TURN OFF MSG_LATCH<br>-LOAD START_ADDR<br><br>-SET WRITE CYCLE. | ADP8 = ADP9 = 0<br>CHNL_CTR_OE/= 0<br>MSG_OE/= 0<br>CLD1/= 0<br>**(CONDITIONED SIGNAL)<br>DPRW/= 0 |
| S11 | -SET COUNTERS TO OUTPUT MODE.<br>-DISABLE COUNTER LOAD SIGNAL. | CNTR_G = 1<br>CLD!/= 1 |
| S12 | -END THE WRITE CYCLE. D | PRW/= 1 |
| S13 | -SET COUNTER TO INPUT MODE. | CNTR_G = 0 |
| S14 | | |
| S15 | -SET CLOCK COUNTER TO 0 | RCK = 0 |

Fig.29

| State | Description | Signals |
|---|---|---|
| S0 | –SEQUENCER ACCESS ENABLE | SQCEN = 1 |
| S1 | –LATCH RECEIVE PCM TO THE 1ST LATCH | RXCK = 1 |
| S2 | –DISABLE RECEIVE CLOCK | RXCK = 0 |
| S3 | –LOAD ACTIVE_ADDR TO LATCH<br>–DISABLE DRAM CLOCK<br>–GENERATE SEQUENCER ACCESS STROBE | DR_ADDR_CK = 1<br>DR_ADDR_CK = 0<br>SQC_STB_/= 0 |
| S4 | | |
| S5 | | |
| S6 | | |
| S7 | –LATCH PCM TO NLI TRANSMIT LATCH<br>–END SEQUENCER ACCESS CYCLE | TXCK = 1<br>SQC_STB_/= 1 |
| S8 | –DISABLE TRANSMIT CLOCK<br>–SEQUENCER RELEASES BUS.<br>–ENABLE ARBITRATION PULSE BETWEEN.<br>CPU AND REFRESH COUNTER | TXCK = 0<br>SQCEN = 0<br>ARB_PULSE = 0 |
| S9 | | |
| S10 | –DISABLE ARBITRATION PULSE | ARB_PULSE = 1 |

Fig.30A

| SQA9 | SQA8 | SQA(7:0) | DATA OUTPUT |
|---|---|---|---|
| 0 | 0 | 0A0H-0FFH | ACTIVE MESSAGE ADDRESS. |
| 0 | 1 | 0A0H-0FFH | CHANNEL STATUS ADDRESS. |
| 1 | 1 | 0A0H-0FFH | NEXT MESSAGE ADDRESS. |

Fig.30B

| ADP9 | ADP8 | ADP(7:0) | DATA OUTPUT |
|---|---|---|---|
| 0 | 0 | 0A0H-0FFH | CHNL ACTIVE ADDRESS. |
| 0 | 1 | 00H-0FFH | MSG END ADDRESS. |
| 1 | 1 | 00H-0FFH | MSG START ADDRESS. |

TONE AND ANNOUNCEMENT MESSAGE CODE GENERATOR FOR A TELEPHONIC SWITCHING SYSTEM AND METHOD

BACKGROUND OF THE INVENTION

This invention relates to an apparatus and a method of selectively providing tone and announcement message PCM codes to different channels of a telephonic network and, more particularly, to such a tone and announcement generating apparatus and method in which different preselected sequences of tones and announcement codes are selectivley provided to, and selectively received from, a plurality of time division multiplexed channels associated with the generating apparatus.

In telephonic switching networks, there is a need for automatic communication between the network control and the individual telephonic transceiving units. This communication takes two different forms of messages: tones and announcements. Tones are single, multiple, or alternating frequencies, and are continuous or intermittent. Familiar examples of such tones include the busy tone, ring back tone, dial tone, and touch tones. The announcements are voice communications such as "Your call cannot be completed," and "Calls are now being taken at . . . ". These tone and announcement messages have been stored in memory in the form of binary, pulse code modulated, or PCM, signals which may be referred to generically as message codes. The message codes comprise a series of binary words representing the amplitudes of a corresponding series of samples or segments of the tone or announcement. When these message codes are converted to analog form, they produce an audio signal convertible to sound by means of an electromagnetic speaker.

In a time division multiplexing system, it is necessary to selectively provide these message codes to a plurality of different telephonic transceiving units respectively associated with a plurality of time slots or channels which compose a multi-channel time division multiplexing frame. In the past, a separate ROM (Read Only Memory) has been provided for each multifrequency tone code, and the sample words have been read out simultaneously from all the ROM's, one word per frame per tone being read out and available during essentially the entire frame. To switch a tone to a desired destination in a switching network, the output of the tone of that ROM was sent into the switching network in the network time slot, or channel, associated with the desired destination requiring such a tone.

In U.S. Pat. No. 4,205,203 of Mehta et al., issued May 27, 1980, to the predecessor in title of the assignee of this application, instead of the tone codes being made available during essentially the entire time interval, each multi-channel cycle, or frame, and switching each tone code sample into a channel time slot, or channel, the individual tone codes samples are made available only during the relatively short time slot, or channel, of each frame when the tone code is needed. Command signals received asynchronously from a central control unit results in the outputing of any desired one of many tones in any desired one of the several time slots within the recurring cycles, or frames. In addition, a predetermined selection of certain "fixed tones" is provided. These are always outputed in preassigned time slots of every frame, while other tones are selectively switched into the remainder of the time slots or channels. Operational sound samples held in a main memory at successive address locations are selected by applying, during one time slot of one cycle, address signals read out of a certain location of a next-sample read/write memory and, thereafter, inserting into that certain location, new signals which are incremented or decremented by one in relation to those previously existing, and writing out the new address signals during the same time slot of the ensuing cycle.

While this tone generator operated satisfactorily, there were some disadvantages. No provision was made for handling any message codes other than tone codes. There was no capability of providing announcement message codes for voice communications. Flexibility was limited because all message codes of a given sequence had to be stored in consecutive address locations because only identification codes were stored. The remaining addresses had to be derived from the address for the first sample of the tone sequence.

Limitations were also present. Since the tone codes were preferably stored in read only memories, there was no ability of reprogramming the tone code memory via the telephonic network, and of course, there was no message recording capability. Moreover, the tone codes could not be down loaded into the tone code memory from a central tone code memory, and thus, a change of tones required a change read only memories. In addition, periodic tone signals were generated by storing only the tone portion and then periodically gating the PCM codes of the tone in accordance with a preselected duty cycle memory. Accordingly, the stored PCM signals had to be given special treatment as compared to the PCM codes of other tones which also reduced system flexibility.

SUMMARY OF THE INVENTION

It is therefore the principal objective of the present invention to provide an apparatus for generating tone and announcement message codes for a telephone switching network and method which overcomes the aforementioned disadvantages and limitations of known tone and announcement generators and generating methods.

This objective is achieved in part through provision of an apparatus and method of selectively providing tone and announcement message PCM codes to the different channels of a multichannel telephonic switching network in which a large repertoire of preselected tones and announcements is stored and available upon request for playback to any one of the transceiving units of the network, such as handsets, facsimile machines and computer interface modems. Selectively, in accordance with asynchronous control signals from a controller, the controller is responsive to the status or condition of the multiple channels to automatically select the appropriate tones and announcements to be provided to each of the channels. Advantageously, in order to obtain maximum storage efficiency, the various tones and announcements are stored in the same memory, and in any selective order, and each tone or announcement can be of any selected duration within limits and can be combined in any selected combination for playback. The same tone or announcement may be provided simultaneously to any combination of channels or even all channels on a time division multiplexing basis without limitation, so maximum utility is achieved. Periodic tone signals are stored in their entirety along with duty cycle information to eliminate separate storing of duty cycle information and special treatment of periodic tone signals as compared to other tones and announcements to increase flexibility.

Another advantageous aspect of the invention is provision of means and a method for enabling a tone and announcement message code memory to receive and record PCM code formatted audio signals from selected ones of the plurality of channels for later playback.

In addition, provision is also made to enable down loading of PCM message codes from a central memory unit of the telephone switching network. Likewise, means and a method are provided for up loading messages stored in the tone and announcement message code generating apparatus to the central memory unit.

These advantageous features are achieved in the tone and message announcement message code generating apparatus of the present invention by providing it with means for storing the message codes in a message memory at addressable memory locations therein, means for temporarily storing a sequence of addresses of selected ones of the addressable memory locations for each channel of said multichanneled telephonic switching network and means for selectively, sequentially writing out the message codes at the addressable locations of said sequence of addresses of each of said channels to the telephonic network during a succession of time slots of said channels, respectively, and a method of utilizing these elements of the apparatus to generate andy combination of tone and message codes on any or all of the plurality of time division multiplexing channels.

In a preferred embodiment of the invention, the tone and announcement message code generating apparatus comprises a message memory, a multichanneled interface circuit, a share memory, a controller and a sequencer, or state machine. The message memory stores a repertoire of PCM encoded tone and announcement messages, respectively, at a plurality of addressable message memory locations. The multichanneled interface circuit interconnects the message memory with the telephonic switching system, and a share memory stores identification codes for selected ones of said plurality of message memory locations for each of a plurality of time slot channels. The controller issues command signals with respect to each of the time slot channels in response to a central computer of the telephonic network. The sequencer is responsive to the controller for selectively causing the message memory to successively read out through the multichanneled interface circuit the plurality of messages at said selected ones of the plurality of addressable memory locations for each of said time slot channels in accordance with a command signal directing it to do so.

One of the objects of the invention is also achieved through provision of a tone and announcement message code generating apparatus comprising a message memory, a multichanneled interface circuit and means for controlling the message memory for storing messages form a selected channel of the telephonic switching network. The message memory stores a plurality of PCM encoded announcement messages at a plurality of addressable memory locations, and the multichanneled interface circuit interconnects the message memory with a plurality of channels of the telephonic network. The controlling means controls the message memory to store a selected PCM encoded announcement received through the telephonic interface circuit from a selected channel of the telephonic network at selected ones of the plurality of memory locations.

A further object of the invention is achieved through provision of an apparatus for generating tone message codes for a telephonic switching network comprising a local tone message memory, a multichanneled interface circuit and means for controlling the tone message memory for down loading PCM encoded messages from a central memory of the telephonic switching network. The local tone message memory stores a plurality of PCM encoded tone messages at a plurality of addressable memory locations, and the multichanneled interface circuit interconnects the message memory with a central tone memory of the telephonic switching network. The controlling means controls the tone message memory for sown loading PCM encoded tone messages from the central tone memory of the telephonic switching network at selected addressable memory locations of the tone message memory.

The objective is also obtained by provision of a method of selectively providing PCM codes for a plurality of tones and announcements to a plurality of different time division multiplexing channels of a multichannel telephonic switching network having a central control computer. The steps of the method first include the step of storing the message memory to plurality of tones and announcements in a message memory to addressable memory locations therein. A representation of a sequence of addresses of selected ones of the addressable memory locations for each channel of said multichannel telephonic switching network is temporarily stored in a reprogrammable memory in response to asynchronous command signals form said central control computer. Different command signals cause temporary storage of representations of different tones and announcements. The message codes at the addressable memory locations of said sequence of addresses are then selectively seqentially written out to each of the channels of the telephonic network during a succession of time slots of said channels, respectively.

The objective of the invention is also achieved in part through provision of a method of generating a periodic tone signal for a telephonic switching network in which both the tone portion and the silent, or nontone, portion of the periodic signal are stored at the same addressable memory location to facilitate flexibility. This method includes the steps of storing in PCM code a plural number of cycles of the tone corresponding to a preselected time period of periodic tone generation of the periodic tone signal at a preselected periodic tone memory location of a memory, storing a plural number of PCM codes representative of substantially zero amplitude corresponding to a preselected time period of periodic silence of the periodic tone signal adjacent to the PCM codes of the plural number of cycles of tone at the preselected periodic tone memory location, said PCM codes of plural cycles of tone together with the PCM codes of substantially zero amplitude forming at least one complete period of the periodic tone signal, and selectively reading the PCM codes of the periodic tone signal in response to a command signal from the telephonic switching network for producing an audible period tone signal.

BRIEF DESCRIPTION OF THE DRAWINGS

The foregoing objects, features and advantages will be described in greater detail and other advantageous features of the invention will be made apparent from the following detailed description of the preferred embodiment which is given with reference to the several figures of the drawing, in which:

FIG. 4 is a logic flow diagram of the memory sequence of FIG. 2;

FIG. 5 is a block diagram of a software interface programming model for the microprocessor of the controller in which blocks of relatively small size communicate in eight bit word format while the relative larger functional boxes communicate in a sixteen bit word format;

FIG. 6 shows the bitwise control information of each byte of control information prescribed for each channel in the message control-report register of FIG. 5;

FIG. 7 is a table showing the order of down loading of message address data into the share memory from which messages of different length are assembled;

FIG. 9A illustrates the form of each command signal from the Controller of FIG. 1;

FIG. 9B is a table showing the different type of control commands from the Controller of FIG. 1;

FIG. 9C is a table showing a minimum set of recording commands from the Controller of FIG. 1;

FIG. 10A shows the form of the status report signals sent by the message code generating apparatus to the central controller of the network;

FIG. 10B is a table showing the different kinds of status reports which are provided;

FIG. 18 is a memory map for the NLI and control register memory;

FIG. 19 is a map of the DRAM memory;

FIG. 22 is a table showing the timing specifications and limits for various elements of the message code generating apparatus of FIG. 2;

FIG. 23 is a table listing initialization procedures for the NLI of FIG. 2;

FIG. 24 is a table of the initialization procedures of an 82C55 peripheral device;

FIG. 25 is a table of the addreses of the various PROMS of the sequencer of FIG. 2;

FIG. 26 shows the specification for the timing of the NLI of FIG. 2;

FIG. 27 is a list of the sequencer PROM control signals of the message DPRAM sequencer of FIG. 2;

FIG. 28 is a list of the sequencer PROM control signals of the address DPRAM sequencer;

FIG. 29 is a listing of the control signals of the DRAM Controller of FIG. 2; and FIG. 30 is a listing of the control signals of the NLI of FIG. 2.

DETAILED DESCRIPTION

Figure 1:
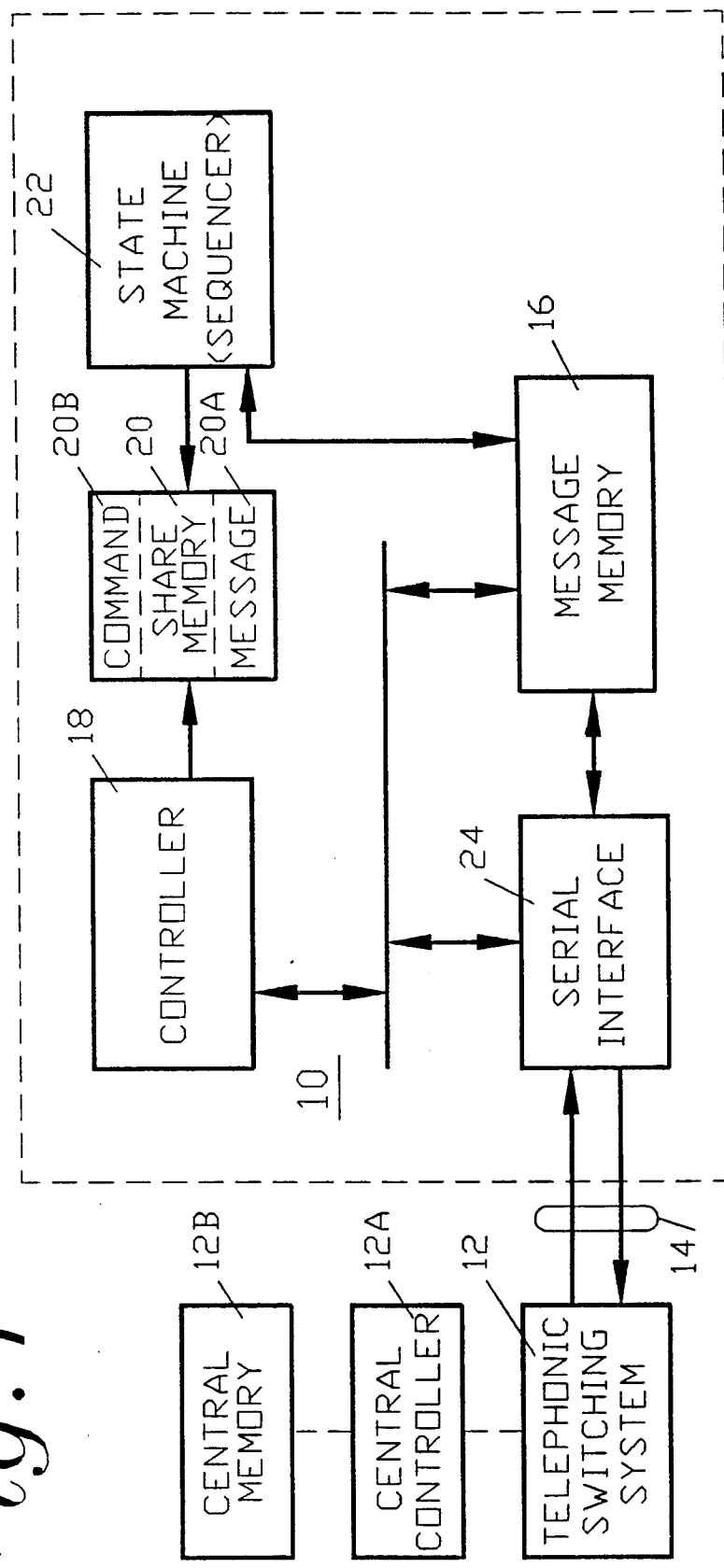
FIG. 1 is a general functional block diagram of the preferred embodiment of the tone and announcement message code generating apparatus, or message code generator, of the present invention shown as connected with a telephonic switching network.

Referring now to the drawing, particularly FIG. 1, the preferred embodiment of the tone and announcement message code generating apparatus, or message code generator 10 is seen as connected with multiple channels of a telephonic switching system 12 through means of asynchronous, time division multiplexing, serial, two-way link 14. The message code generator 10 has a message memory 16 which contains a repertoire of PCM encoded tone and PCM encoded announcement messages located at a plurality of addressable message memory locations. The repertoire preferably provides all the tones and announcement needs for an automatic call distribution by the telephonic switching network 12 and includes all multifrequency, or MF, tones; all dual tone, multiplexing, or DTMF, tones; call progress and signaling tones and all origin, delay and intercept announcements. In addition, in keeping with one of the objectives of the invention, customer created messages can be directly recorded into the message memory for use by the telephonic switching system 12.

In keeping with another important aspect of the invention, all the tones, customer messages and announcements can be stored in any of the addressable memory locations of the message memory 16 in any order desired to optimize flexibility. Although certain tones or announcements can be assigned to preselected memory locations, dedication of particular locations for certain tones or announcements is not required. Advantageously, stored tones, customer messages and announcements are processed using a uniform process for both inputting and outputting.

Accordingly, the PCM codes whether causing tone, customer message or announcements are generally referred to herein simply as message codes. As an extension of this general approach, this flexiblity is enhanced and one of the objectives of the invention is achieved by storing both the tone generation period and the silent period together at a single memory location to form the full period of a periodic tone signal.

Generally, the message memory can store and operate up to a preselected number of messages (i.e. tones, customer messages or announcements) onto another plural number of time division multiplexing channels. Each of the message units can be concatenated in any order at any multiple time length on any channel and can be transmitted to any one or all channels at once, as desired, under program control. In the other direction, customers voice messages can be recorded by the message memory 16 for later use or for up loading to a central memory 12B associated with a higher order, central controller 12A of the telephonic switching system 12. On the other hand, the entire repertoire can be down loaded from the central memory 12B.

The remaining elements of the message code generator 10 includes a unique combination of a controller 18, share memory 20 and sequencer, or state machine 22 for controlling communication between the message memory 16 and the telephonic switching system 12 through a serial interface 24 in response to command signals from the central controller 12A.

The controller 18 includes a microprocessor and its associated memories for on board self diagnostics and communications with the higher level controller 12A of the system 12. This controller interfaces directly with the dual port, or share memory 20 for setting up a message pointer table with each address representing a message ID. These message pointers control the actual address of each digital tone in PCM form stored in the message memory 16. A command share memory 20B of share memory block 20 is also accessed by the controller 18 issuing commands and reading back the processing status from the state machine 22. The controller 18 also down loads PCM tones data to the message memory 16 section using the commands from, and reports all message status to, the central controller 12A through the interface 24.

The state machine, or sequencer, 22 is a dedicated hardware logic circuit including a ROM, an address comparitor, an address incrementing and interface circuits and circuits ancillary thereto. It generates the appropriate control signals to the message memory 16 to process a message. The state machine 22 interfaces directly with the share memory 20, with which also interfaces the controller 18, and executes the commands sent by the controller through the share memory 20. During each cycle of the state machine, the state machine increments the channel counts, monitors the message ending point and reports any success or failure during a message processing to the controller 18. If a message is within a specified range of locations, a PCM tone associated with that pointer location is transmitted to a selected channel in the serial interface 24. In addition to interfacing with the message pointer table, the state machine 22 also periodically monitors requests from the controller 18 in the command portion of share memory block 20, immediately updates the tone requests and reports the message processing status to the controller 18.

The dual port, or share, memory block 20 includes two dual port memories that can be asynchronously assessed by both the controller 18 and the state machine 22: a message share memory 20A and a command share memory 20B. An arbitration logic is preferably built into these devices to resolve contention if it should occur. The message share memory 20A contains the addresses of the PCM message data, while the addresses of share memory 20A preferably comprise the message IDs, themselves. The command share memory 20B contains the status from each channel and the commands issued by the controller 18 and the addresses of the command memory 20B correspond to the channels to which the commands for each channel are directed.

Figure 2:
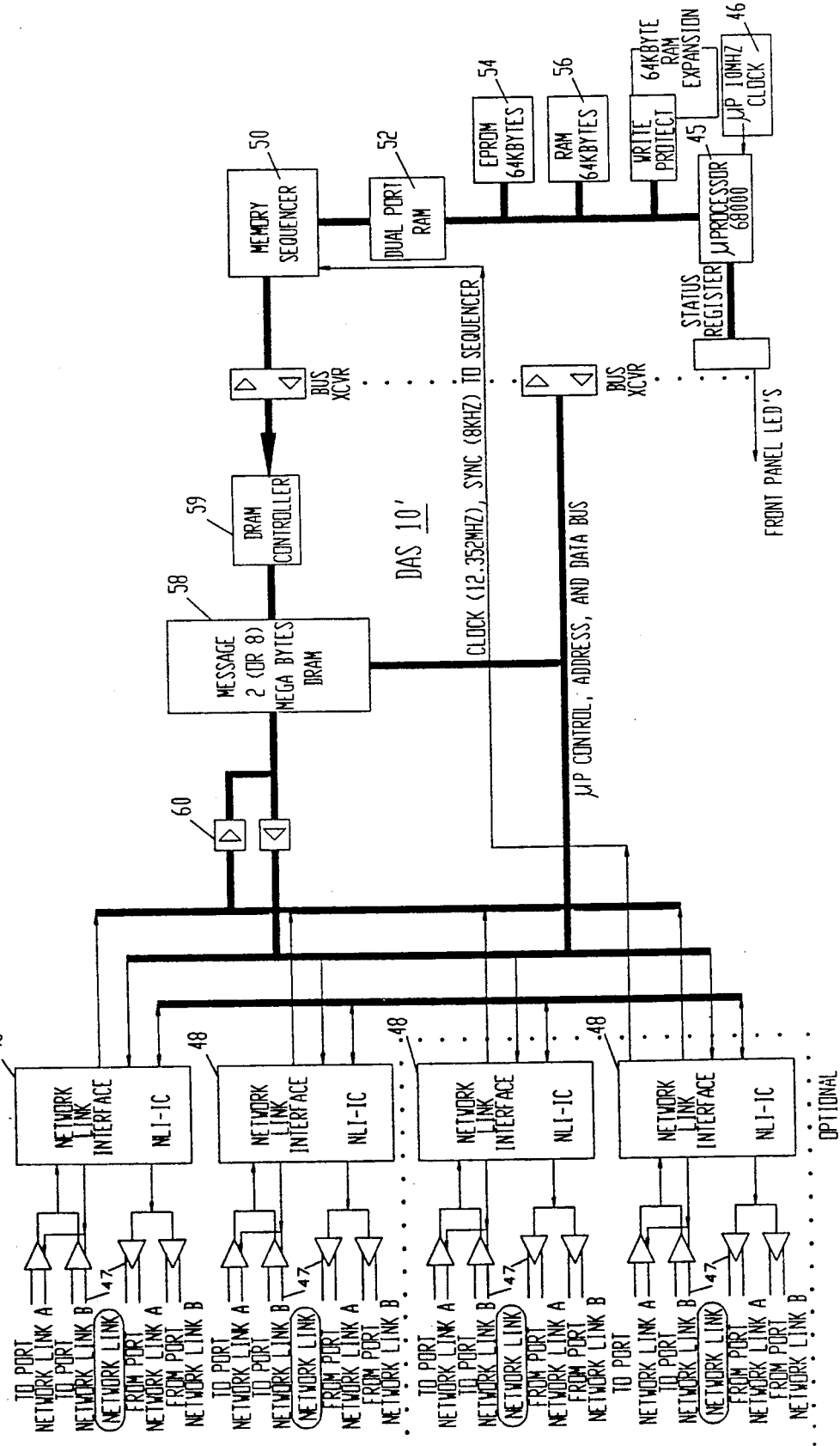
FIG. 2 is a partially schematic diagram of a digital auto source, or DAS, circuit which is a preferred implementation of the message code generator shown in functional block form in FIG. 1.

Referring now to FIG. 2, the functional block diagram of message code generator 10 of FIG. 1 is implemented as digital audio source circuit, or DAS, 10'. The DAS 10' is preferably located in a network termination subsystem 26 of a network subsystem 28 which, in turn, is connected with an SBX bus 30 of a control subsystem, shown in FIG. 3. Communication of the DAS 10' with the central controller 12A and central memory 12B (not shown) of the telephonic switching system 12 is through means of the SBX bus 30. Still referring to FIG. 3, the control subsystem of bus 30 is preferably a 68020/68030 microprocessor based multiprocessor, distributed processing system which is capable of either simplex or duplex operation. The network subsystem 28 consists of a system clock, or CLK, 32 and four interactive switching/control modes, each comprising a single stage, nonblocking, 772 channel time slot interchanger, or TSI, 34. 768 of these channels are broken down into 32 groups of 24 channels for interface over high speed serial interfaces known as network links to circuits including the DAS 10' of the network termination subsystem 26. A network shelf controller, or NSC, circuit 36 connected to the TSI 34 has a 6800 microprocessor with two Mbytes of DRAM to provide processing capability of signaling activity on the 768 channels of each switch mode. Within the NSC circuit 36, the 768 channel parallel time division multiplexing, or TDM, bus to and from the TSI circuit (not shown) is multiplexed into the thirty-two 24 channel 3.088 MHz serial links, or network links, to and from the network termination subsystem 26. The TSI circuit provides access to higher level processing for itself and the NSC circuit via an SBX interface 30 to an SBX circuit residing on a control subsystem secondry bus. The control memory 12B and central controller 12A are loaded via this secondary bus.

The other circuits which form the network termination subsystem 26 in addition to the DAS circuit 10' include a basic rate line, or BRL, circuit 38; a primary rate interface, or PRI, 40; one or more DS1 port circuits 42; and a digital signal processing, or DSP, circuit 44. The BRL circuit provides system access to agent and supervisor consoles which the PRI circuit 40 provides termination of the twenty-fourth 64 Kbit channel of the TI digital trunk and also has all the fetures of a DS1 Port Circuit 42. The DSa Port circuit 42 provides digital T1 trunk access into the system. PCM channels are appropriately formatted and delivered to a DS1 transmit line 46. Incoming information from the DS1 link 46 are recovered, buffered and delivered to network links for access to the network. The digital signal processing circuit 44 provides three separate TMS 320C25 digital signal processor based circuits for each accessing eight of the twenty-four system channels that the DSP circuit 44 accesses over its link into the network. The DSP 44 processor receives functions for MF and DTMF and can also be used for tone metering functions in system diagnostics.

Referring now particularly to FIG. 2, the DAS circuit embodiment of the message code generator of FIGS. 1 and 2 includes as the controller 18 a 68000 microprocessor 18' operating from a 10 MHz clock 46 and provides the overall controlling functions of the DAS circuit 10'. The microprocessor communicates with higher level call processors over one of two, links or, optionally, from network links interface circuits 48 which perform the function of serial interface 24 of FIG. 1. The microprocessor 45 interprets commands for message number, channel assignment, single message or repeat, concatenation with other messages, etc. and provides corresponding control information to a memory sequencer 50 through a dual port RAM, or DPRAM, 52 interface to accomplish the command. The DPRAM 52 performs the functions of the share memory 20 of FIG. 1.

An EPROM 54 of 64 Kbytes provides basic start up diagnostic capability and a boot loader. Functional code for the DAS 10' is down loaded into a static RAM 56 for execution having 64 Kbytes of memory expandable to 128 Kbytes to allow flexible function upgrades. Memory protection logic is preferably provided for write protection of the RAM code space and allows diagnostic software to monitor for unwarranted writes to protected memory. A single network link interface 48 provides 24 PCM channels, a 768 Kbit communication link, and a system clock and sync signals to the DAS circuit 10' from the NSC circuit 36 of FIG. 2.

The message memory 16 of FIG. 1 is implemented with a two or eight Mbyte message DRAM 58 representing four or sixteen minutes of memory. Preferably, the message DRAM 58 is preferably comprised of a plurality of single 1 Mbit DRAM devices for maximum density and employs conventional DRAM control and refresh logic from DRAM controller 59. The message DRAM 58 is controlled by the memory sequencer 50 in order to provide its information over parallel TDM buses 60 into the network link interface circuits 48. In keeping with an important aspect of the invention, the contents of the message DRAM 58 can be loaded by the microprocessor 45 from down loaded files or input directly from the network link interface PCM channels for user defined messages.

As noted above, the message memory sequencer 50 receives its asynchronous command inputs from the microprocessor 45 through the buffered interface provided by DPRAM 52. The memory sequencer 50 accesses the DPRAM for control information that tells it logically what to do next. Information for each sequenced channel, such as "beginning address", and "ending address", is written by the microprocessor 45 into the DPRAM 52, and the memory sequencer 50 maintains its own "active address" pointer in the DPRAM 52. "Current" and "next" message pointers are given to the sequencer 50 as well as control information for repeat functions and read/write for recording. The memory sequencer 50 preferably operates in accordance with the logic flow diagram of FIG. 4. The microprocessor 45, FIG. 2, operates in accordance with primatives, pseudocodes and program listing of Appendix A.

Referring now to the remaining drawings, the operation of DAS circuit 10' of FIG. 2 in its various modes of operation will be described in detail.

Preferably, DAS 10' is designed to source up to 256 messages of random length to up to 96 time slot channels. The messages can be repetitive or not, but the total message storage time is 240 seconds. Optional additional memory will allow up to approximately another twelve minutes of recording time to be accessed.

The command from the central controller, or control complex, 12A as it arrives at the 68000 microprocessor 45 contains a channel number and a sequence of announcement numbers. The DAS 10' will automatically begin each digit when the preceding one is through. The microprocessor 45 can respond to a request to automatically repeat an announcement until a computer command is received or to a request to switch from one announcement to another. Since all messages are treated the same, origin, delay, and intercept announcements are handled identically. Software in the central controller 12A is free to set up a special configuration for each separate application and installation environment, but a few examples will be provided. For illustration however, typical scenarios are described below for the three types of announcements.

In a typical automatic call distribution (ACD) application the DAS 10' will output up to thirty simultaneous city origin announcements into 30 dedicated time slots. The origin announcements can be any length, but might be exactly one second long. A particular call can then be connected to the origin announcement asynchronously for two seconds. As an alternative, each origin announcement can be provided on a demand basis with connection of the announcement to an outbound time slot only when needed.

The announcement repertoire is down loaded into the message DRAM 58 during initialization, subject only to the size of the DRAM 58 and a limit of 256 announcements. A typical ACD system might have five, simultaneous, double phase, delay announcements output on ten different channels. In such a case, each call is connected by the microprocessor 45 to the correct announcement during successive cycles. Alternatively, certain announcements to certain channels are provided on demand.

In a typical PBX application (even for an ACD), the DAS 10' would store thirty 5-second intercept announcements or fragments. Advantageously, the microprocessor 45 can cause these to be concatenated with other fragments or tones in any order. For example, a tritone, then a series of fragments and then a postscript called, to produce a very personal and specific intercept announcement. Some fragments that could be stored would include the voice reciting of digits 1 through 0, and a pause. For example, the following intercept announcement could be assembled by the central controller 12A and output by the DAS 10': tri-tone, "The number you have dialed", "960", pause, "8653", "is not in service." pause, "Calls are being taken by", "8686". Alternatively, while a caller is waiting, he could be presented with a choice of information announcements by dialing or punching in the correct digit on his phone and thereby define his own intercept announcement.

The DAS 10' is able to be programmed to provide voice recording and editing for message composition. If the source is a telephone, an editing session could be as follows: The user dials a certain phone number which tells the central controller 12A that a request for editing is being made. The user must then key in a password on the phone keypad or from a control console terminal. The central controller 12A then directs the time slot interchanger 34 to route the message from the phone to the a DAS 10' which has been appropriately programmed and will also attach a DTMF detector to the phone line and monitor it for control information. Software in the central controller 12A will interpret the received digits as functions; such as record, stop, rewind, playback, and end session. The central controller 12A will convert these functions into commands and send them to the DAS 10' to perform these functions. The DAS 10' will respond to these commands such as record, stop, rewind, playback. The user can re-record all or part of the message several times and thereby edit the message until the user is satisfied.

A recording session is concluded when the user signals the central controller, or control complex 12A, that the message is complete and should be remembered. The control complex 12A then sends a control code to the DAS 10' to begin up loading the new message to the control memory 12B. The DAS 10' begins up loading the complete message via the serial bus 14. The user then tells the control complex 12A an assigned message number and the complex asks the user if the current message should overwrite a previous message stored under that message number, if one exists. The messages could also be identified and stored by names for the users in the hard disk of the control complex 12A. Thus, a much larger repertoire could be stored on the hard disk at any given time than would be down loaded to the DAS 10'. As a user came to the system, the various segments or messages could be listened to before deciding which one she really wants to update.

Once a user finally decides to install a certain message, an instruction is provided to the control complex 12A to install the selected message number into the system. The central controller 12A then prompts the user for various necessary information. The central controller then rearranges a new repertoire and header information such as location and length. This new file is then down loaded to a selected DAS 10'.

If a second, or backup, DAS 10' was chosen for the new repertoire, it can be gradually turned on as the DAS 10' with the old repertoire is deactivated. Since any individual channel can be trisated, the switchover can proceed without interruption to the customer. Once the switch over is complete, the central controller 12A can either treat the original as the backup DAS 10' or also down load the repertoire to the original DAS 10' and then switch in as the main unit.

Thus, the DAS 10' has functional features, as follows: (1) Continuous tone plant generation, (2) switched tone generation, (3) delay announcements, (4) origin announcements, (5) easy recording of new announcements, (6) concatenation of message segments, (7) entire function and message repertoire is system down loadable, (8) up to four minutes of message time on the main DAS 10' with up to sixteen minutes with optional add on memory, and (9) connectable to 48 or 96 channels. These will be described in greater detail below.

The entire repertorire is down loaded during initialization along with a logical/tone conversion table. The tones are treated exactly like messages to the DAS 10'. Each tone segment contains the entire period of the wave, including quiet time, if any. If a tone has no quiet time associated with it, it is at least sixteen milliseconds long, which is the minimum time to describe the tone. The entire repertoire can be changed, increased, or decreased by down loading from the control complex 12A. The down loading process fills the entire card with tones and/or messages in any combination up to a maximum of 256 messages.

The DAS 10' communicates with the network shelf controller (NSC) 36 through a maximum of four serial links interface circuits 48. PCM samples are sourced by the DAS card, transmitted on the serial links 48 at the network shelf controller 36 and distributed via the time slot interchanger 34, where they may be sent to a single channel or broadcast to many. The software interface referred to herein refers to the interface that the 68000 microprocessor 45 sees when it looks at the hardware on the card. Where appropriate, some of the actual algorithms are illustrated.

The 68000 microprocessor 45 is connected to all the resources of the DAS 10' as shown in the software interface programming model of FIG. 5 which shows by relative size which are the eight bit wide locations and which are sixteen bit wide locations, so that the appropriate read/write access can be coded.

Upon initialization, the NLI circuits 48 will clear all of their registers and the 68000 microprocessor 45 will reset its peripherals and begin executing from its reset vector address. The 68000 microprocessor 45 must then program the desired channel numbers into the position registers of the NLI circuits 48 and reports to the NSC circuit 36 via the serial links. The NSC circuit 36 constantly polls the serial links, receives the message from the DAS 10; and starts establishing communication.

A quiet tone function code should be loaded into both the next message pointer table 62 and the current message pointer table 64 for each of the 96 channels. The sequential-read status should be set up in the message control-report register table 66 for all 96 channels. A loop is begun which assures that all 96 channels of the message control report register 66 will be looked at at least once every twelve milliseconds. The select registers of the NLI circuits 48 should initially be set to tri-state all the channels for now.

The 68000 microprocessor 45 then performs self diagnostic tests and when completed, sets the LED status indication (not shown) by writing to the appropriate LED port via the LED'ed control register 68. The 68000 microprocessor 45 then tells the control complex 12A that it is available and awaits instructions.

The message control report register table 66 is made up of 96 bytes of control information corresponding to the 96 channels. Each byte contains bit wise control information of the form shown in FIG. 6.

The abort request bit D6 causes the sequencer 50 to advance the next message pointer 62 to the current message pointer table 64 the next time that it services that particular channel. This is necessary at the beginning to initialize all channels with desired messages. If this is not set, then the next message pointer 62 will be advanced when the next end of message is detected by the address comparator. The abort request signal will then be cleared by the sequencer.

The end of message report bit reports to the 68000 microprocessor 45 when the end of message is detected by the address comparator. EOM report, when set high, indicates that the end of a current message has been reached and the message in the queue or next message pointer 62 has been transferred to the current message pointer 64 and is being processed by the sequencer 50. Since the hardware will have advanced the next message pointer 62 to the current message pointer table 64, it means that the hardward is working on the last message. The 68000 microprocessor 45 must then supply the next message pointer 62 with the next message from its queue or put a quiet tone to end the message. Since the shortest message is about thirteen milliseconds, the 68000 microprocessor 45 has about thirteen milliseconds to update that next pointer in the message DRAM 58.

The play/read NOT bit D5 tells the sequencer 50 whether the channel is set for reading from the NLI 48 to the message DRAM 58 or writing from the message DRAM 58 to the NLI 48. For almost all channels this bit 70 will be set for writing to the NLI 48, except for the channel (or channels) selected for recording.

The error report bit D1 is set high when an address comparator detects that the active address is greater than the end address of this particular channel which could be due to an error in the message number, the address pointer or the end address for that message number. The sequencer 50 will take no other action and will continue possibly outputing incorrect PCM message data out on this channel. It is up to the 68000 microprocessor to check the message pointer ram and address pointer ram to pinpoint the problem and turn off that channel's output, if necessary.

Bit D2 to D7 are always at high logic when read back from the message control-report register 66.

An LED port of the control register 66 contains latches and drivers which remain in the state that was last written to them. This port is readable to check the current register status. The LED bits, red, green, yellow, when set low will turn a corresponding LED (not shown) on. Upon power up, all three LEDs should be lit. A test bit of the LED port is reserved for factory frame tests, and a bus error disable bit, when set low, will override write protection bus error circuitry, so means that the processor can write to protected memory areas without causing bus error. However, a bus error timer is still activated for incomplete memory cycles. Upon power up, this bit is cleared. A TL23EN bit is used to enable the two optional network link circuits 48, FIG. 2. This bit when set will allow a full 96 channels capability. Upon power up this bit is cleared and defaulted to only two primary link 0 and 1. A sequencer on bit when set high, will allow the sequencer 50 to access the message DRAMs 58 interleaving with the processor. Upon power up, this bit is cleared. A DRAM lock bit, when set high, will disable the microprocessor 45 to access all message DRAMs 58. An access violation would result in incomplete memory cycle and a bus error cycle will be asserted. Upon power up, this bit is cleared.

The front panel has three LEDs 70, FIG. 2, which indicate status of the DAS 10' for diagnostic purposes. A greeN in service light indicates that the card has established contact with the NSC 36, FIG. 2, on the serial link and that at least one channel time slot is being written to or read from on the serial interface chip. A red LED indicates an error occurred that affects the card function and the 68000 microprocessor 45 is unable to recover from the error. A yellow light indicates a fault of the DAS 10' has been detected and the 68000 microprocessor 45 is in the process of recovering from the fault.

The software program ROMs 72, FIG. 5, of the DAS 10' performs overall control and communications and maintenance functions. The software section referred to herein is the section that the 68000 microprocessor 45 must operate, and is viewed from the perspective of the microprocessor 45. It communicates with the central controller 12A through the network link and sets registers inside the NLI 48 to select which time slots will be connected. The software also performs the queuing function of each channel by adding to it from the central control and popping from it to the hadware section of the card. It monitors the status reports from the hardward and either pops from the queue and/or reports the information up to the central controller 12A. The software also interprets commands from the central controller 12A and sets the correct codes to the sequencer 50. It is also used during message recording to keep track of available space and pointer locations. During all up loads and down loads, the software also interprets the data and correctly parcels it out to the sequencer 50. The sequencer 50 accepts down loaded data from the 68000 microprocessor 45 and stores it in a data RAM and the address pointer RAM 74, FIG. 5. The sequencer 50 also accepts commands and message numbers. The preferred form of the software is shown in the program listing and list of primatives and pseudocode of the preferred program attached hereto as Appendix A and hereby made a part of this application.

The sequencer 50 automatically sequences through all 96 channels and fetches the message pointer number, points to the correct message, points to the correct data ram location and then outputs it to the corresponding NLI 48 within its channel timeslot. Since each NLI 48 only supports 24 channels, the sequence 50 has to provide data sequentially to each NLI 48 until all 96 channels of data transfer is complete.

The software scheduler is provided in EPROM 54 (32K words) to handle communication between the microprocessor 45 and the NLI circuits 48. In addition to this EPROM scheduler, application software, message data and PCM data must be down-line loaded at initialization time from the control complex into various on-board RAMs 56. The tables below identify different types of memory contents:

1) The DAS software is loaded into the 64K words of static RAMs (organized in two banks of 32K words). This software involves executing a loop for task for assigning messages to all 96 channels and report the status of each channel to the processor.

2) The PCM samples will be downloaded to the message DRAM 58. Up to eight megabytes of memory, or sixteen minutes of messages, can be stored on this card. These PCM data include samples of the followings:

The PCM samples for each of the call progression tones.

The PCM samples for each of the DTMF/MF tone digits.

The PCM samples for each of the voice messages.

3) A file containing a concatenated form of all the messages destined for a particular DAS 10' will contain a header that contains the address of each message beginning and ending. This is the file that will actually be down loaded during initialization to two sets of the dual port static RAM 52, FIG. 2. The first set corresponding to the message share memory 20A contains the address table for each message which include three sections of 256 locations each for storing a start address, an end address and an active address of each message in DRAM 58. This memory section is organized as 24 bit wide data. The second set of dual port memory corresponding to the command share memory 20B contains four sections of 96 memory locations. These four sections are used for 1) storing message to be processed, 2) processing type requested, 3) channel status report, 4) next message to be concatenated to the on process message.

Figure 8:
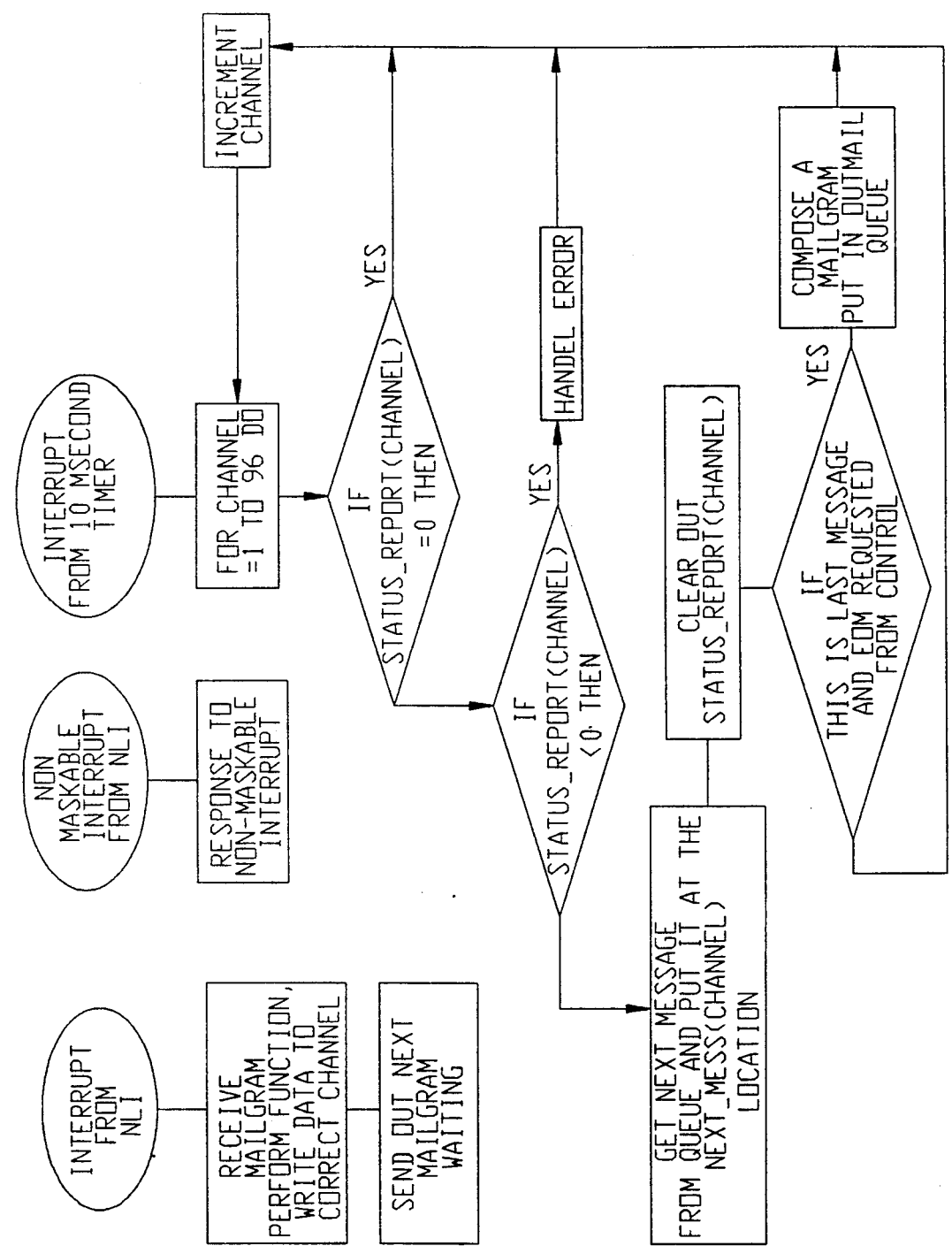
FIG. 8 is a simplified flow chart of the main computer program routines required in the microprocessor of FIG. 5.

The preferred down load table for the DAS 10' is shown in FIG. 7. The microprocessor will perform a main function of keeping the sequencer 50 queued up and handling inbound and outbound mail via the network serial link. The flow diagram of FIG. 8 illustrates a simplified flow chart indicating the main routines required. The status of all 96 channels should be checked every thirteen milliseconds, popping a new message number to the ones which are ready. A secondary loop operates on the network serial control data, receiving the distributing mail as well as queueing and transmitting mail.

The software must response to a nonmaskable interupt generated by the NLI 48 as a form of watchdog timer to prevent a reset of the microprocessor 45. In addition, the interrupt from the NLI 48 to the microprocessor 45 is used to alert the microprocessor 45 of an incoming command message from the control complex 12A, and finally a ten msec interrupt provides a real time clock for the processor to process message and stay in synchronization with the rest of the system.

The single byte codes of FIG. 9B are examples of instructions required to control the DAS 10'. They are sent to the DAS 10' from the shelf controller 36 on the serial line and are received and interpreted by the microprocessor 45. The microprocessor 45 translates these functions into the proper subroutines necessary to control the sequencer 50 in the desired fashion.

In addition, there are controls that help the card record announcements. FIG. 9C shows a minimum set of recording commands. They assume that the pointer controls are all being maintained on the central controller 12A. Alternatively, more intelligent commands are given with the interpretation being performed on the DAS 10', itself. These higher level commands are play recording, rewind recording, stop, fast forward and record.

The codes of FIG. 10A that the DAS 10' sends up the line to report certain status events. The status report will contain an echo of the function being reported as well as the channel number reporting. A status code of successful or unsuccessful would follow, or if there is an up load, a number of bytes of PCM data would be contained. Some other function codes that are sent are different than just echoing the function are shown in FIG. 10B.

Figure 12:
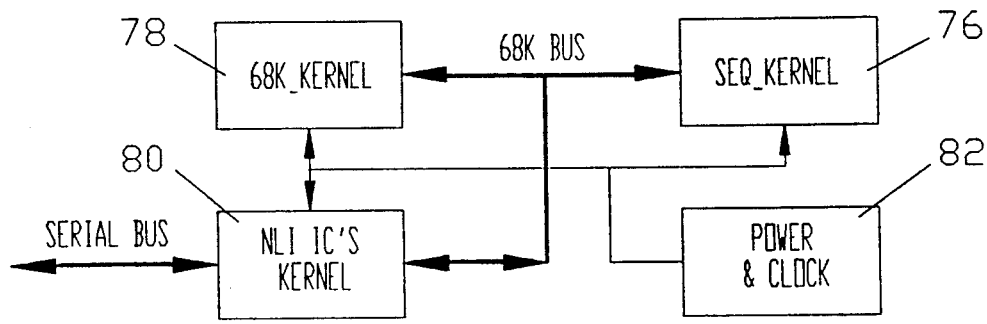
FIG. 12 is a functional block diagram of the DAS 10'.

Referring to FIG. 12, the DAS 10' is divided into four main subsections plus the power supply: the Seq_kernel 76, 68k_kernel 78, NLI_kernel 80, and the power and clock section 82. The microprocessor 45 performs intelligent queuing of messages and communicating with the control system via the serial link. It controls the input to the sequencer section.

Figure 11A:
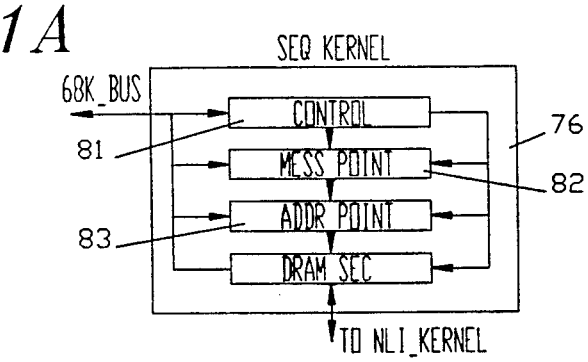
FIG. 11A is a functional block diagram of the sequencer block of FIG. 2.

Referring to FIG. 11A, the sequencer kernel 76 is designed to process the 96 channel messages and efficiently interface with the microprocessor 45 and the NLI 48. The sequencer 50 receives a control message from the message dual port RAM 52 as a control code. The control code pertaining to each message channel is then processed by a control section 81 in the sequencer 50. The 32 bit PROM-based state machine in the control section 81 generates a sequence of control signals to various hardware nodes for message processing.

For each channel, the process involves updating the message pointer 82, checking for the message ending and conducting appropriate action for message concatenation. In parallel with this process, the message pointer addresses 82 the message memory DRAM 58 and depending on the request, PCM data from the NLI 48 is written into memory (message recording) or transferred from memory to the NLI 48 (message sourcing).

Figure 11B:
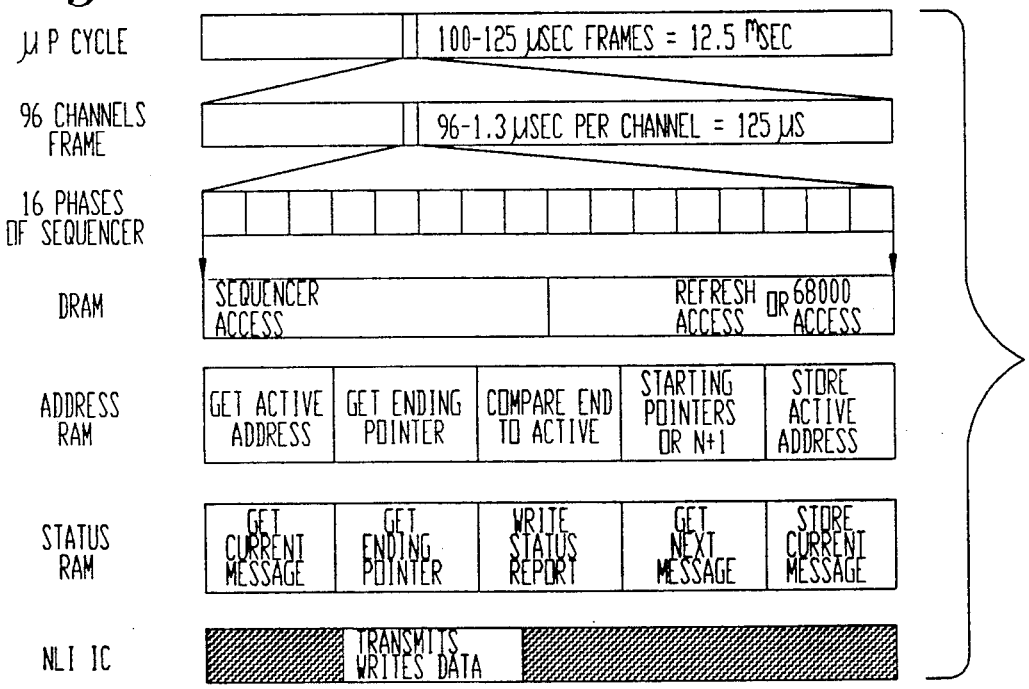
FIG. 11B is a timing chart for the operation of the sequencer kernel of FIG. 11A.

Referring to FIG. 11B, the operational functions of the sequencer 50 and its relative time reference of different tasks is illustrated. As seen, the first operation is an access to the message pointer RAM which points to the address pointer RAM. This, in turn, points to the on going message loction of the DRAM section 84, FIG. 11A. The PCM data retrieved from this location is then written into the corresponding NLI 48. Because of this parallelism, all 96 channels can be accessed within 125 milliseconds.

Figure 11C:
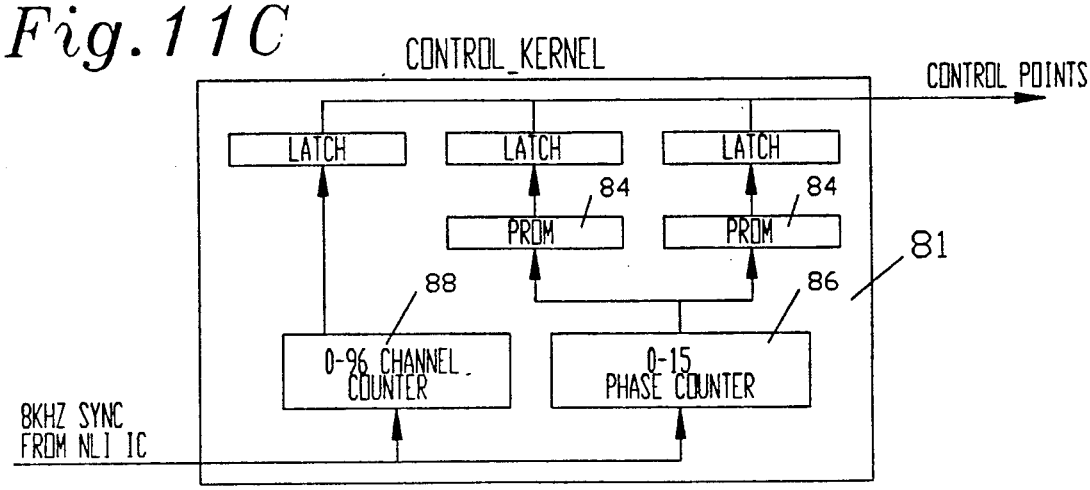
FIG. 11C is a functional block diagram of the control kernel block of FIG. 11A.

Referring to FIG. 11C, the control section 81 consists of a set of PROMS 84 whose addresses are selected by a state counter 86. There is also an output consisting of the channel number for a counter 88. These two sigals each go to latches to be broadcast throughout the sequencer kernel 76.

The messge pointer section 82 is a connection RAM for the sequencer kernel 76. It contains a list of what message numbers should be put out onto each of the 96 channels. It also contains other handshaking registers for each channel that are used during normal operation.

Figure 11D:
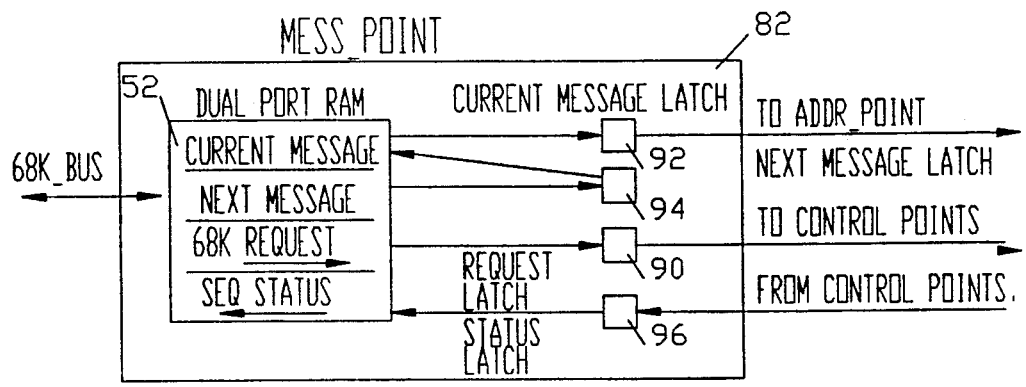
FIG. 11D is a functional block diagram of the message pointer block of FIG. 11A.

The dual port RAM 52 is used as the message pointer and is partitioned in four sections associated with latches 90, 92, 94 and 96 as shown in FIG. 11D. The first 96 locations in each section store the corresponding information for each channel. The processor 45 communicates with the sequencer 50 through this dual port memory 52. During normal operation, the processor 45 periodically checks status of all 96 channels by reading and interpreting the data in the channel status section. If a new message is requested for a particular channel, the processor 45 writes that message number into the corresponding channel in the next message section of latch 94. Then, it also requests an appropriate action to that channel by setting up the abort code or sequencing code in the channel status section of latch 96.

The sequencer 50 operates on the other side of the dual port RAM 52, constantly processing all the messages requested by the processor and reports all channel status and message errors to the processor. The next message section of latch 94 is normally accessed by the sequencer 50. But the processor 45 can also monitor the on going message for each channel in this section of the dual port RAM 52.

The current message number is an address that points to the ADDR_POINT ram 83, FIG. 11A. The message number tells the address pointer 83 which of the messages has been selected for this channel. The next message latch 94 is used to allow the sequencer 50 control the ability to move the next message number to the current message number when it is time to do so.

The status latch 96 allows the sequencer 50 to store each channel status temporarily after each channel message processing. The request latch 90 allows the sequencer 50 to store the requests made by the microprocessor 45 for each channel processing. The contents of the two latches are combined and are written into the message control-report section of the dual port RAM 52. The definition of the register contents shown in FIG. 6.

The dual port RAM 52 is a 1K×8 device but its access is preferably partitioned to make it look like three separate devices to the sequencer 50 side by time multiplexing its access. Although the microprocessor 45 can access any location at any time, it will only be writing new connections to the next message location associated with latch 94, requests and checking status in the channel status location associated with latch 96. The sequencer 50, meanwhile, checks requests, obtains the current message and, if an abort request or an end of message is detected, move the next message to the current message location. Also, it will report end of message to the microprocessor 45 in the status location, if there is a request from the microprocessor 45.

Figure 11E:
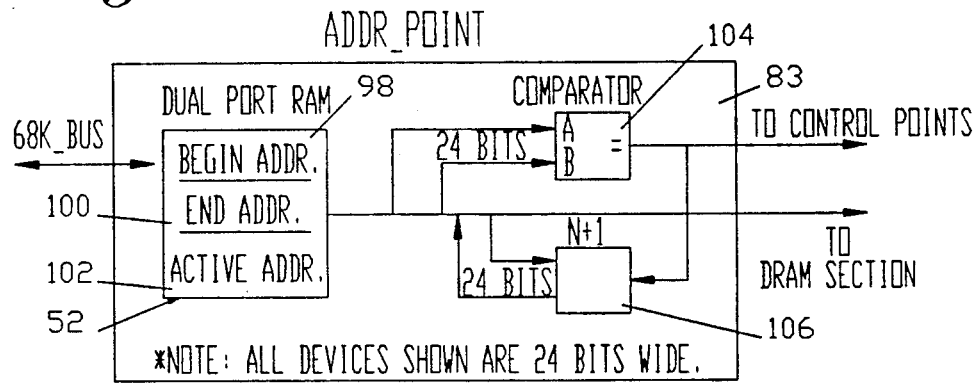
FIG. 11E is a functional block diagram of the Address Pointer block of FIG. 11A.

Referring also to FIG. 11E, the address pointer section associated with latch 92 contains the 24 bit address for the location of the message stored in the message DRAM 58. There are three dual port RAMs which are made to look like one 24 bit wide RAM to the sequencer 50 side, whereas the microprocessor 45 accesses these dual port RAMs in two cycles (either 2 words, or 1 word and 1 byte).

The dual ported RAMs are partitioned to contain three sections as viewed from the sequencer 50; one is the beginning address section 98 for the given message. This is stored in locations 0 through 256 and corresponds to that message number. An end address section 100 similarly contains the ending address for the given message. Slightly different, the third segment 102 contains the current address that a certain channel is pointing to. Thus, there are only 96 locations in this memory segment 102, and they are referenced by the channel counter rather than the message number like the first two.

The dual port RAM 52 is accessed by the sequencer 50 via time multiplexing to address all the segments it contains. First, the active address is moved to the A section of a comparator 104, the N+1 counter 106, and output to the DRAM section 52 for use. Next the end address section 100 is loaded into the comparator 104 B side and they are compared. If they are equal a signal is given to the control side as well as telling the N+1 counter 106 to load the begin address section 98. If they are not equal then the N+1 counter 106 is told instead to increment. Finally, the address in the N+1 counter 106 is loaded back into the active address section 102. Thus, the active location will either be given an increment or reset to the beginning of the correct message.

Figure 11F:
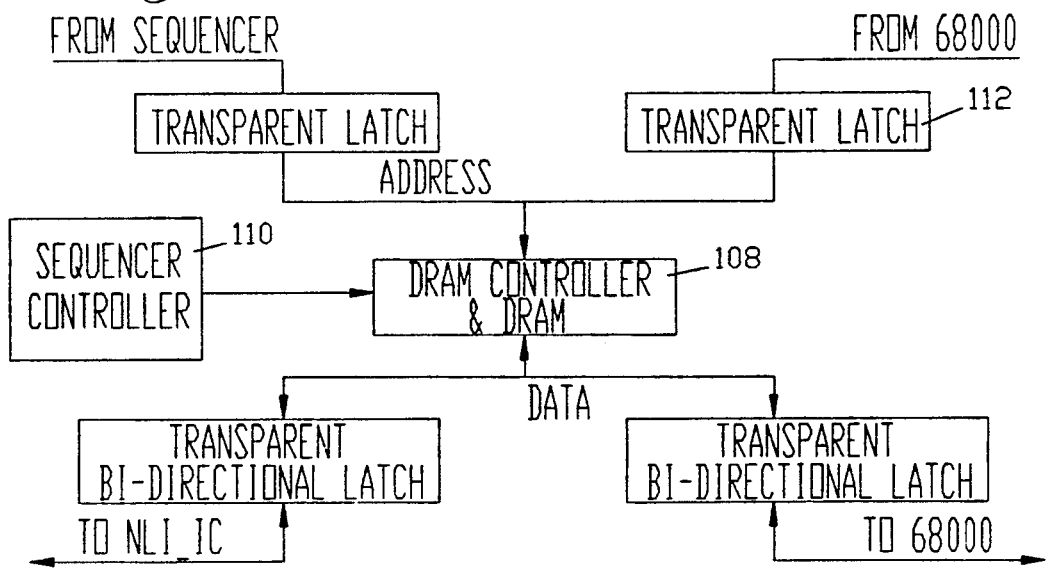
FIG. 11F is a functional block diagram of the DRAM sequencer block of FIG. 11A.

Referring to FIG. 11F, the DRAM 58 is accessed at most two times per 1.3 microsecond cycle and is completely controlled by the sequencer 50. Arbitration is handled by the fact that the sequencer maintains control of the DRAM 58 and allocates a certain time for the microprocessor 45 to access the DRAM 58.

Normal operation, every 1.3 microsecond, the sequencer 50 accesses the DRAM 58 using the current address from the address pointer section 83, FIG. 11A, and the control signals from the control section 110, FIG. 11F. The sequencer 50 only accesses the DRAM 58 in the first half of the 1.3 usec interval. The last half of the period is allocated for memory refreshing or microprocessor memory access. Every ten sequencer periods (~13 microseconds), the refresh request will be asserted from the refresh timer circuitry. The memory refresh will be given higher priority than the microprocessor access if both of them happen to request for memory access at the same. The arbitration circuitry will resolve this priority during the sequencer access period and allow the refresh cycle to start immediately after the access cycle of the sequencer 50. The microprocessor 45 can then be delayed two and a half sequencer cycles or 3.4 usec at most (worst case) before it can access the memory.

The sequencer control section 81 is run on a twelve Mhz clock, and uses sixteen phases per 1.3 microsecond cycle. The 80.1 nanosecond clock is referred to simply as the clock. The sequencer controller section 81 first allows the sequencer 50 to access the DRAM 58. Then it releases the DRAM port to either the microprocessor or a refresh cycle, if it happens to occur. Since the refresh request only occurs at the end of every tenth channel frame (1.3 uSec per channel frame), the sequencer control section 108, FIG. 11F, will always sample for this refresh signal at the end of each frame as part of the sequencing routine. In normal operation, the microprocessor 45 is granted the DRAM access immediately after the sequencer access. But if a refresh request signal is activated and recognized by the sequencer controller 110, FIG. 11F, it will be allowed to refresh the DRAM and put the microprocessor on hold. In this case, the microprocessor will be held on wait states until the refresh cycle completes, follows by another sequencer access before it can complete its pending cycle.

The sequencer controller is always active and transfers data to the NLI 48, even when the data it is producing is nonsensical simply to provide a complete sequencer routine to all 96 channels. Even the nonsensical data does go to the NLI 48 but the netowrk shelf controller 36, FIG. 3, only requests data on the assigned active channels on the NLI 48 and ignores the rest of the channels.

The sequencer control provides the address strobe signal, and decodes the upper or lower bytes control signals to the DRAM controller 108, FIG. 11F. The address strobe is brought low one clock cycle after the address is available to the DRAM controller 108, initiating the read or write cycle. The DRAM controller 108 automatically generates the row and column strobes to multiplex the addresses and present them to the DRAMs along with CAS signals. Three clock cycles after the address strobe is asserted, the data is assumed to be valid on the data bus, the sequencer 50 then generates a write clock signal to clock the data into the appropriate NLI 48. One clock cycle after the write clock is activated, the address strobe is de-asserted which signals the dram controller to terminate the bus cycle.

The sequencer access begins by enabling the output of the DRAM address latch 112, FIG. 11F. This contains the next address to access, and was loaded up one clock cycle previously. One clock cycle later, which allows the address to set up in the DRAM controller 108, the typical read/write cycle is performed. The read/write signal itself is supplied by read/write registers which tells the DRAM whether this is a write to the NLI 48 or a read from the NLI 48.

The read/write function is set by the microprocessor 45 as part of the instruction in the status RAM associated with the latch 96, FIG. 11D to program the sequencer per channel basis whether reading PCM data into memory or writing PCM data out from memory to the PCM bus.

Because the microprocessor 45 writes the beginning and ending locations into the address RAM, a buffer is reserved for each message, whether reading or writing. Since the microprocessor 45 also specifies whether or not the hardware reprots when it is at the end of the buffer, during reading, the buffer can either be circular, and overwrite itself, or a one shot, after which the microprocessor 45 warns the user that his recording is truncated. The DRAM controller 108 used in the DAS 10' is preferably designed with discrete MSI devices to control up to eight megabytes of memory. The front end of this controller 108 preferably has a 3-way arbitration circuit of multiplexing the access cycle between the sequencer, the microprocessor 45 and the memory refresh cycles. This controller circuit is designed to operate in two different modes: the microprocessor control mode and the sequencer mode.

In the microprocessor control mode, the processor 45 first has to disable the sequencer 50 from the memory port completely by setting a logic "0" to the sequencer control bit (SQCON bit) of the control register. In this mode, the arbitration circuit is set to become a two way automatic arbitration between the microprocessor 45 and the memory refresh circuitry.

In the sequencer mode, the processor 45 has to enable the sequencer operation by setting a logic "1" to the sequencer control bit (SQCON bit) of the control register. This operation would activate the three way arbitration circuitry to accommodate the sequencer, the microprocessor and the memory refresh access cycles to the DRAMs.

A refresh control signal is generated by the sequencer controller and occurs every ten channels frames (~10 microseconds). This refresh signal is generated at the end of a channel frame from the carry output of the state machine counter. At the beginning of the next cycle, the refresh is generated at the end of a channel frame from the carry output of the machine counter of the sequencer 50. At the beginning of the next cycle, the refresh request signal is recognized by the arbitration circuit and is allowed to take over the DRAM bus immediately after the sequencer access.

Figure 11G:
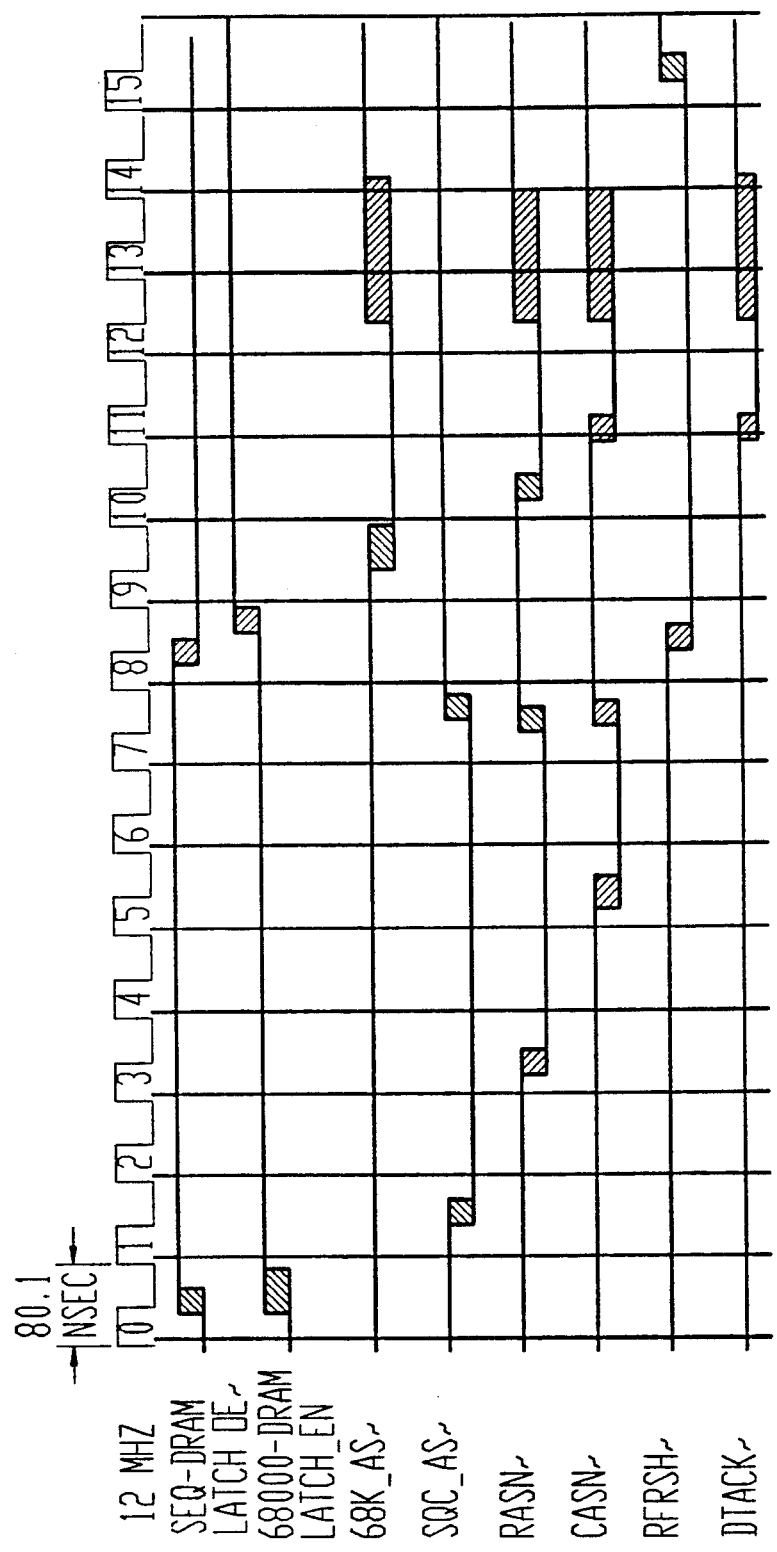
FIG. 11G is a comparative timing chart for access to the DRAM SEC of FIG. 11F.

The refresh cycle is initiated by the sequencer controller by asserting the RFSH~line, FIG. 11G. The DRAM controller uses a staggering CAS (Column Address Strobe) before RAS (Row Address Strobe) refresh scheme to accommodate for all four banks of memory within the last half of the 1.3 microsecond period, as illustrated in FIG. 11G.

Still referring to FIG. 11G, after the RFSH~line is held low, the next synchronous clock edge of the controller will generate RAS refresh cycle and the refresh counter addresses appear on the addresses of the DRAMs. The ~RAS0 goes low first and one clock cycle later the ~RAS1 goes low. At the next clock cycle, as RAS0 goes back high, RAS2 starts to go low and so on. In other words, each RAS signal goes low sequentially, each one stays low for two clock cycles and throughout the refresh period results in only two strobes lines being asserted low at most. This refresh scheme is chosen to prevent high power surge if all eight megabytes of memory are refreshed simultaneously.

The microprocessor access segment begins, normally right after a sequencer access if refresh request signal is not activated. At the beginning of an access cycle, the microprocessor address and control signals like AS~, UDS~, LDS~ are selected through a multiplexer. The upper three address lines of the processor are used to decode the four blocks of two megabytes of DRAMs.

The AS~ is gated with the sequencer control signal to initiate the access cycle, and the data strobes are used to decode which byte of DRAMs is being accessed. As soon as the sequencer allows the microprocessor to access, the dram controller starts generating the appropriate control signals (such RAS and CAS), and in addition, a DTACK~ from the controller is generated. This DTACK~ signal is currently generated at one clock cycle after RAS goes low and goes high immediately with the AS~ at the end of the cycle. Right after the microprocessor access cycle ends, the sequencer controller disables the microprocessor address and controls latches, the arbitration circuitry then sets the priority for the next access to the sequencer.

The microprocessor access control signals generated by the sequencer:

a) Latch in the address to the 68000-Dram address latch b) Disable the Sequencer-DRAM address latch c) Enable the 68000-DRAM address latch d) Enable the 68000-DRAM control latch e) Enable the output of the 68000-DRAM data transceiver f) Enable the DTACK signal to the 68000

The read/write signal also sets the direction of the microprocessor DRAM data receiver.

During a PCM down load process in which megabytes of data are to be transferred to DRAMs, the 68000 has the option to terminate the sequencer access priority in order to fully access the DRAM. This option takes the sequencer access priority out of the arbitrabtion circuit; therefore, the processor and the refresh timer arbitrate between themselves. Even though the sequencer access to the drams is blocked, the sequencer controller logic still functions and cycles through its sequence. This DRAM lock feature is part of the control register and is under processor control.

The microprocessor kernel consists of a communication interface with the four NLI circuits 48 on board, program memories, data memories, write protect memory and a control register for general control and maintenance.

Figure 13:
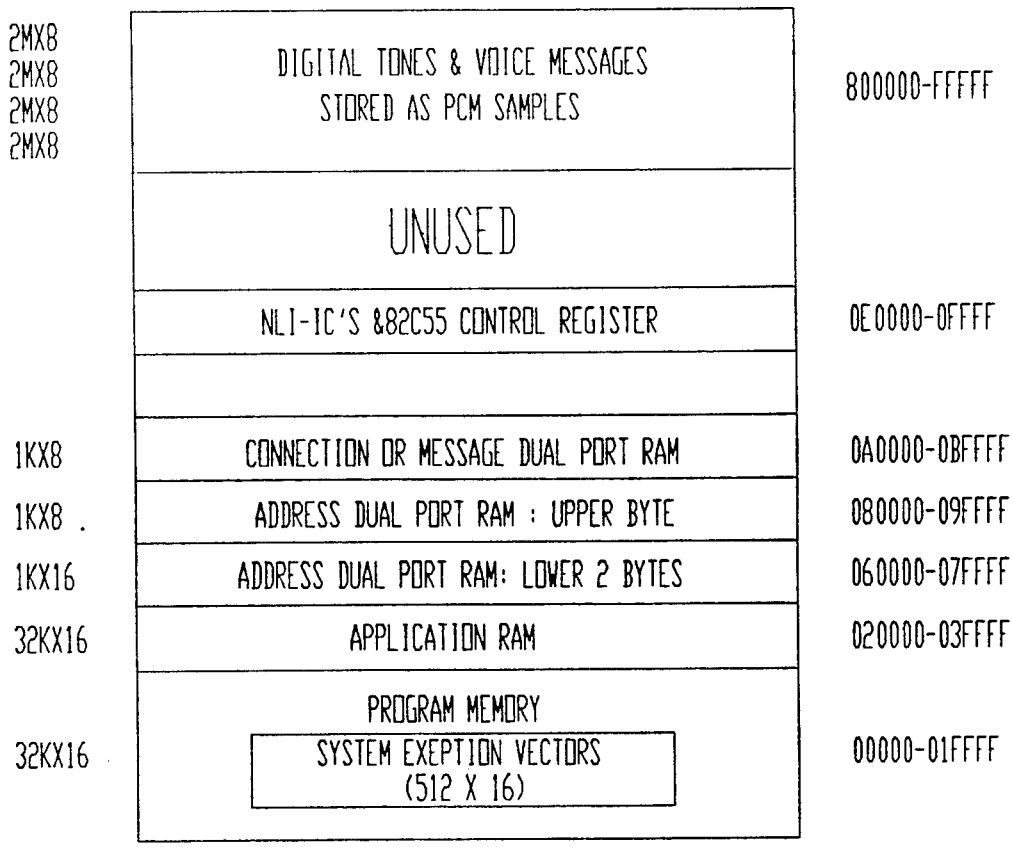
FIG. 13 is a functional memory map of the 68000 microprocessor of FIG. 2.
Figure 14:
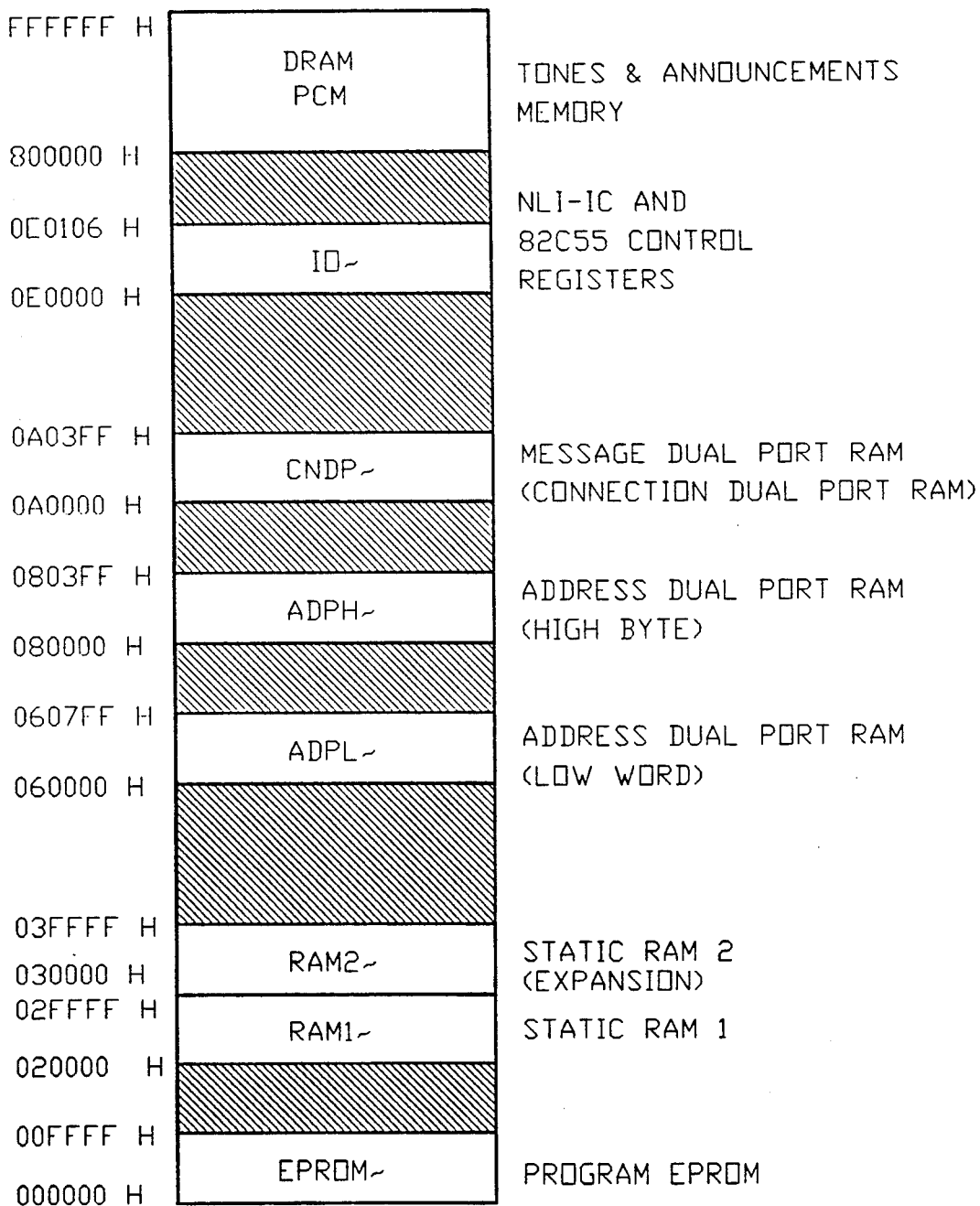
FIG. 14 is a memory map for the EPROM's SRAM's and control register of the DAS of FIG. 2.

The functional memory map allocating different memories and interface devices with the microprocessor is shown in FIG. 13. This map also shows the device sizes and memory space allocated for each device. The physical device memory map as illustrated in FIG. 14, shows the actual limit of the microprocessor address decoder for EPROM 54, static rams and control register in the microprocessor address space. These total of eight devices occupy the first megabyte of the microprocessor address space at 128k bytes each. All memories and IO port address decode are contained in two address decoder PALs in this section.

The microprocessor's program memory space consists of permanent EPROM 54, and a static RAM 56, FIG. 2. The EPROM section contains the scheduler software which the microprocessor requires for establishing an intelligent down loading link with the central controller 12A via the Serial link. The RAM 56 contains the actual application software for the card which is down loaded from the control.

The EPROM memory is designated for supervisor exception vector table, program booting, mail transfer, handler with the NLI 48 and the scheduler software. This portion of memory will reside in two 32k×8 EPROM's and occupy the first page on the 128K boundaries map as shown in FIG. 14.

The microprocessor program RAM 56 is assigned to the next 128K bytes on the memory map. This particular memory contains the application program for the microprocessor to communicate with the NLI 48 and the sequencer for message processing. This RAM 56 is write-protectable in each 4K word boundary, so that software can be partitioned in either program or data memory in sixteen distinct blocks. If a write protect violations occurs, a bus error input signal to the microprocessor will be asserted to initiate a bus error cycle routine.

All of these four static rams are fully decoded and organized in word size but can be accessed in either byte or word mode. The primary 32K words of static RAM 56 ranges from 020000H to 02FFFFH in the memory map whereas the upper 32K words are optional for future expansion and located from 030000H to 03FFFFH.

The dual port address table RAMS allow the processor to write new message addresses to replace unused message addresses on-line without interfering with the sequencer operation on the other port. This portion of memory is partitioned as three different dual port RAM's to contain the starting, ending and current message addresses.

These three memories are organized as 1K×24 bits wide. This organization allows the sequencer to bring out the whole 24 data lines with one read cycle. The processor has to perform two write cycles at two different memory locations. The first write cycle is a word write at one memory location to the first two RAMS and the second one is a byte write to the third RAM at even locations and offset by +020000H from the first word write. These three dual port RAMs occupy two pages of 128K of memory right above the program RAM and are labelled address dual port RAM low word (ADPL) and address dual port ram high byte (ASPH), respectively. The ADPL rams are organized in word size and can be accessed in both word and byte boundary whereas the ADPH rams is mapped into the odd byte of the memory map but can also be accessed in either word or byte mode but only the lower byte contains valid data.

Figure 15A:
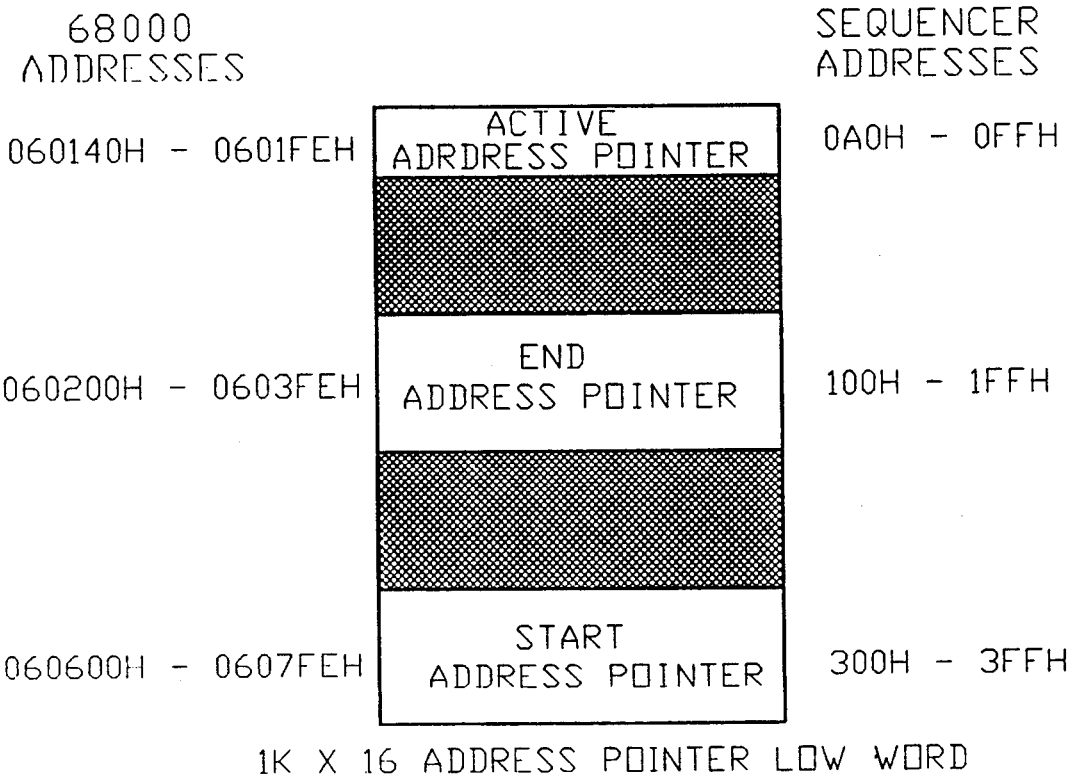
FIG. 15 is a memory map for the address pointer dual port RAM of FIG. 2.
Figure 15B:
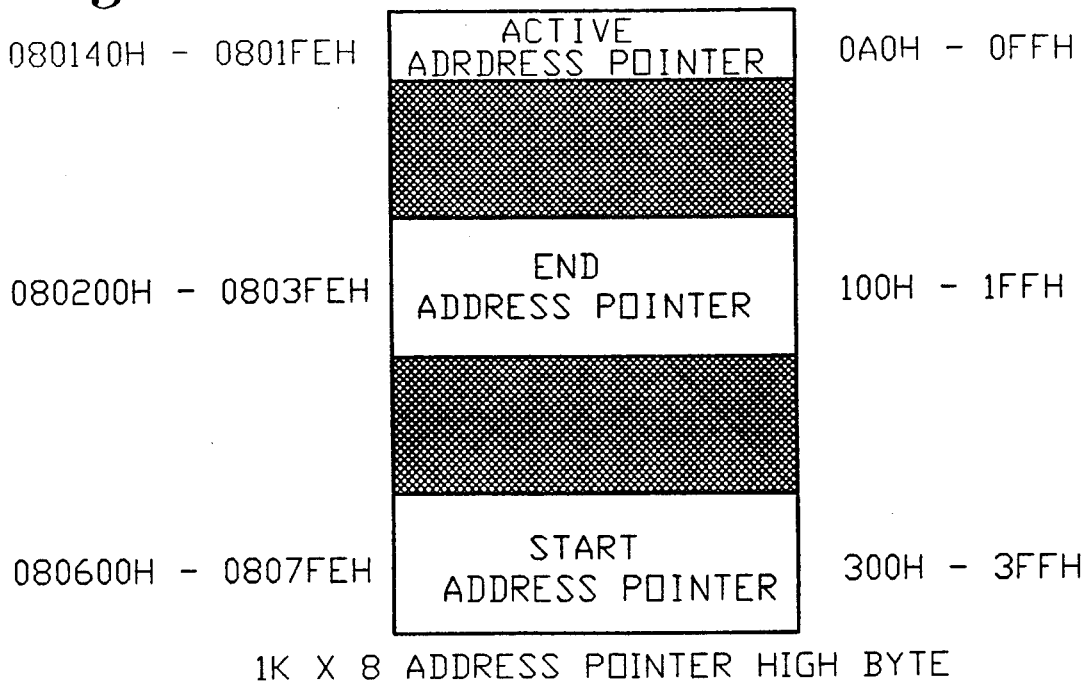

The memory map of these three dual port RAMs for the address pointer tables are shown in FIG. 15.

The microprocessor 45 communicates with the sequencer 50 through a set of four dual port RAMs 52. The microprocessor 45 has access from one side while the sequencer operates on the other side of these dual prot RAMs.

Since the sequencer 50 only reads data out of the three address dual port RAMs 52, it should not present any contention with the processor access on the other port. If new message addresses need to be written into these RAMs 52, the processor 45 will first abort all channels from using that message and proceed with new message down load. When the new message is installed, the processor will then assign channels to that message if it is requested.

Figures 16, 17:
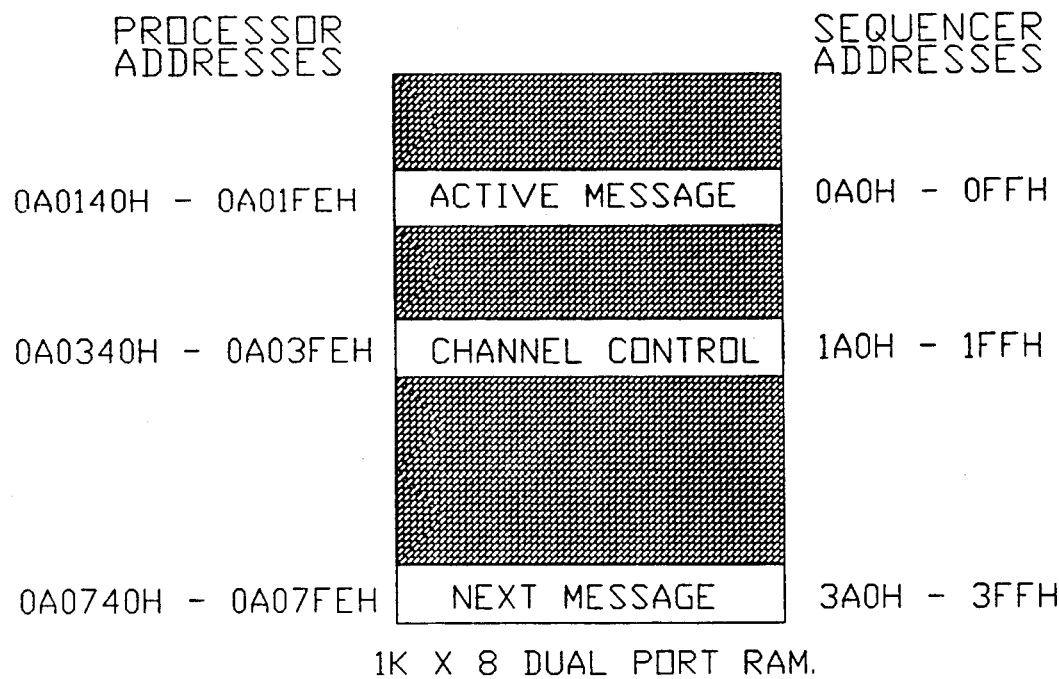
FIG. 16 is a memory map for the control dual port RAM, or command share memory, of FIG. 2.
FIG. 17 is a memory table for the write protection memory.

The dual port control circuitry generates the appropriate control signals to the message pointer section and the address pointer·section in the sequencer kernel 76. The microprocessor hardware interfaces to the dual port RAMs 52 using lower order byte format for the message pointer section and long word format for the address pointer section. The preferred memory map for the dual port RAM 52 is shown in FIG. 16.

Port B and C of an 82C55 peripheral interface device are preferably used for setting protection to the 64K words static RAMs 56. At power up reset, all outputs of the two ports B and C are pulled down which disables access to the entire static RAM memories. The eight output bits of port B provides write protection to the first set of 32K words static ram address ranging from 020000H to 02FFFFH, as seen in FIG. 17. Each bit protects a block of 4K words of memory.

The upper 32K words of static RAM expansion is write protected in the same manner using port C for address ranging from 030000H to 03FFFFH. Since the stack pointer and the main program will reside in RAM, the power up routine should include setting memory write protection through ports B and C of the 82C55 before any attempt to access static ram memory.

All these protection bits are combined with the processor addresses in a PAL device (Write Protection PAL) to enable or disable the Ram selection during a RAM access cycle. When a write cycle attempts to access a protected memory location, the chip select to the RAM is not asserted. This will cause the bus cycle timer to time out, generate a bus error to inform the processor of the violation.

Writing a "0" to port B or C will set the write protection for the corresponding memory locations and writing a "1" will disable it. FIG. 17 shows the address protection for each bit of port B and C of the 82C55.

The four NLI's 48 of the DAS 10' are fully decoded and memory mapped into the 68000 address range as shown in FIG. 19. Each NLI 48 contains thirty two registers and can be acessed in either word or byte mode. The eight bit data of the NLI 48 are connected to the lower byte of the processor data bus.

As seen in FIG. 14, the PCM data for voice and tone messages are stored in DRAMs which start from address 800000h thru FFFFFFh. To be compatible with the sequencer access, all DRAMs can only be accessed in bytye mode in continuous memory spectrum. Its memory map is shown in FIG. 19. All eight megabytes of DRAMs are organized in four banks of two megabytes.

The basic DAS will have two megabytes or eight megabytes of DRAM memory for PCM storage which provide up to four minutes of voice message and tones. An additional six megabytes of memory can be added in to the DAS 10' for a total of eight megabytes or sixteen minutes of tones/message storage.

The processor 45 is reset by the power-on-reset (POR~) circuitry. The power-on-reset delay from the power supply will provide an active low reset signal of at least 100 ms after VCC reaches 5 V. This signal will drive both a reset and a halt inputs of the processor 45 to assure proper start up mode.

In normal operation, the serial links from the DAS 10' are periodically polled by the NSC 36 to determine which link is active. If a link does not respond, the NSC 36 will generate a soft reset on the DAS 10' through a nonmaskable interrupt (interrupt level 7). If again, no response is received by the NSC 36, it will generate a hard reset through POR circuitry to reset the whole card. The microprocessor can also be reset by the NSC if it fails to respond to a 10 millisecond interupt, or the interrupt generated by the NLI 48 itself. Whenever the reset line goes low, the status LED's will all light up to provide a visual diagnostic of card failure. The healthy circuit should be able to turn off the Red and Yellow LEDs to indicate normal operation during its start up initialization routine.

Interrupt sources for the DAs 10' are identified as follows: 10 millisecond interrupt, NLI or communication interrupt and a non-maskable interrupt (or watchdog software reset). These interrupt signals are generated by the NLI 48 to provide communication handshaking or diagnostic check on the processor status by the central controller 12A. Autovector interrupts are preferably used in the DAS 10' to accommodate all of the above interrupt signals. The interrupt priority levels are preferably assigned as followed:

an interrupt level 7 (NMI) is assigned to soft reset (watchdog timer), generated from the network link through the NLI 48.

an interrupt level 5 is assigned to all four NLI 48 on the DAS 10'. Upon interrupted by this level, the processor will poll all four status registers inside the four NLI 48 to determine the interrupt source. All four interrupt lines from the NLI 48 are stored together to provide one single interrupt signal to the processor.

an interrupt level two to four are unused.

interrupt level one is assigned for the ten millisecond timer. As this timer runs out, an interrupt is generated. This interrupt is used for keeping track of real time on the DAS 10' and remaining in synchronization with the rest of the system.

All seven sources are input to a priority encoder whose outputs are connected to an interrupt priority level inputs of the microprocessor 45. The function control outputs of the processor are decoded for the interrupt aknowledge signal and inputs it to a VAP pin of the processor 45 to initiate the exception process.

The bus error is used to detect an attempt to access a write protected areas like the program RAM, EPROM or unused memory spaces. When this sitution occurs, the bus error signal is generated and input to a BERR pin of the processor. This BERR signal is also used to complete the on going bus cycle and initiate a bus error exception routine.

The bus error signal can be disabled by asserting the BERR_disable bit in the control register. This would allow the processor to write to the protected memory without causing a bus error. However, the memory access timer is always active and could cause a bus error if an invalid memory cycle is detected even with the BERR_disable bit asserted.

Each external memory or I/O access of the processor requires an asynchronous DTACK signal to complete a cycle. The processor has to support four different types of device speeds: 200 ns for EPROMs, 120 ns for RAMs, up to 1.3 us for DRAMs, and about 80 ns for I/O devices.

The address strobe and address decode signals for all devices are combined in a PAL (DTACK generator PAL) to generate a DTACK signal to the processor. At the beginning of each processor cycle, a 6.4 microsecond timer is cleared and counting up during the processor cycle. This 6.4 microseconds takes into account the worst case waiting period for the processor to access the DRAMs memory. If a DTACK signal is not available when the timer runs out, a bus is generated to indicate a faulty cycle.

As a means of checking for faulty PCM in the DRAM 58, the processor 45 will provide background diagnostics by auditing messages in the DRAM 58. If errors occur, the software will require repeat of down load of that particular message or select the standby card to become the main card.

The DAS 10' can support up to 96 channels of voice and tone, therefore requires a maximum of four NLIs. These four are memory mapped into the I/O space of the microprocessor 45 memory. The NLIs 48 communicate with the microprocessor at an interrupt level 5.

Data is transferred between the processor and the NLIs 48 through their internal FIFO's. It is possible for all four to interrupt the processor simultaneously. Upon receiving an interrupt from the NLI 45, the microprocessor 45 will read the status registers of these NLI circuits to determine which one is the interrupt source and reads data from its FIFO (currently 16 bytes deep). The status register of the interrupting device will be cleared and leave the other interrupts pending. Upon emptying the incoming data from the FIFO, the microprocessor 45 then writes its outbound data to the transmit FIFO for transmission to the network link.

There are thirty-two internal registers inside the chip that can be accessed by the processor 45. The NLIs 48 of the DAS 10' are hard wired in the DAS mode so that there is no need to initialize its operation mode during initialization process. However, the transmit and receive channels of the DAS should be stored in the EPROM 54 and should be used to set the four NLIs 48 during initialization. The optimized set of channels group should be assigned to these four NLIs are: channel two for NLI #0, channel ten for NLI #1, channel eighteen for NLI #2 and channel twenty-six for NLI #3.

Figure 20:
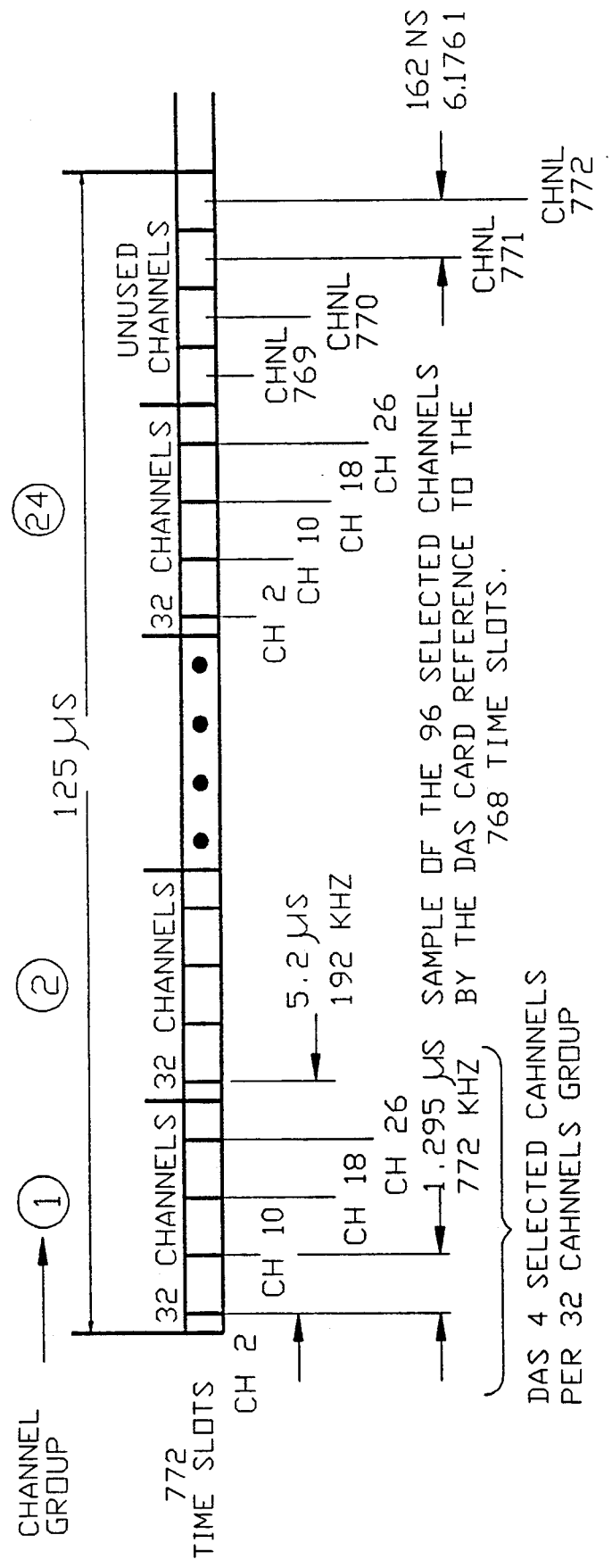
FIG. 20 shows the timing for the NLI interface of FIG. 2.

There are two versions of the DAS 10' contemplated. This standard DAS 10' is designed to interface the entire card with the network serial link. The time channels inside the EPROM are written into the chip during initialization. With the above channel assignment, each time slot is 1.3 microseconds apart. Each channel data can be written into the chip asynchronously as long as all twenty-four channels are written during one time frame. Since the DAS 10' is designed for ninety-six channels, four NLIs 48 are needed and have to be time multiplexed with each other. The optimum time interval between 96 channels is approximately 1.3 microseconds. The detail timing for this mode is shown in FIG. 20.

Figure 21:
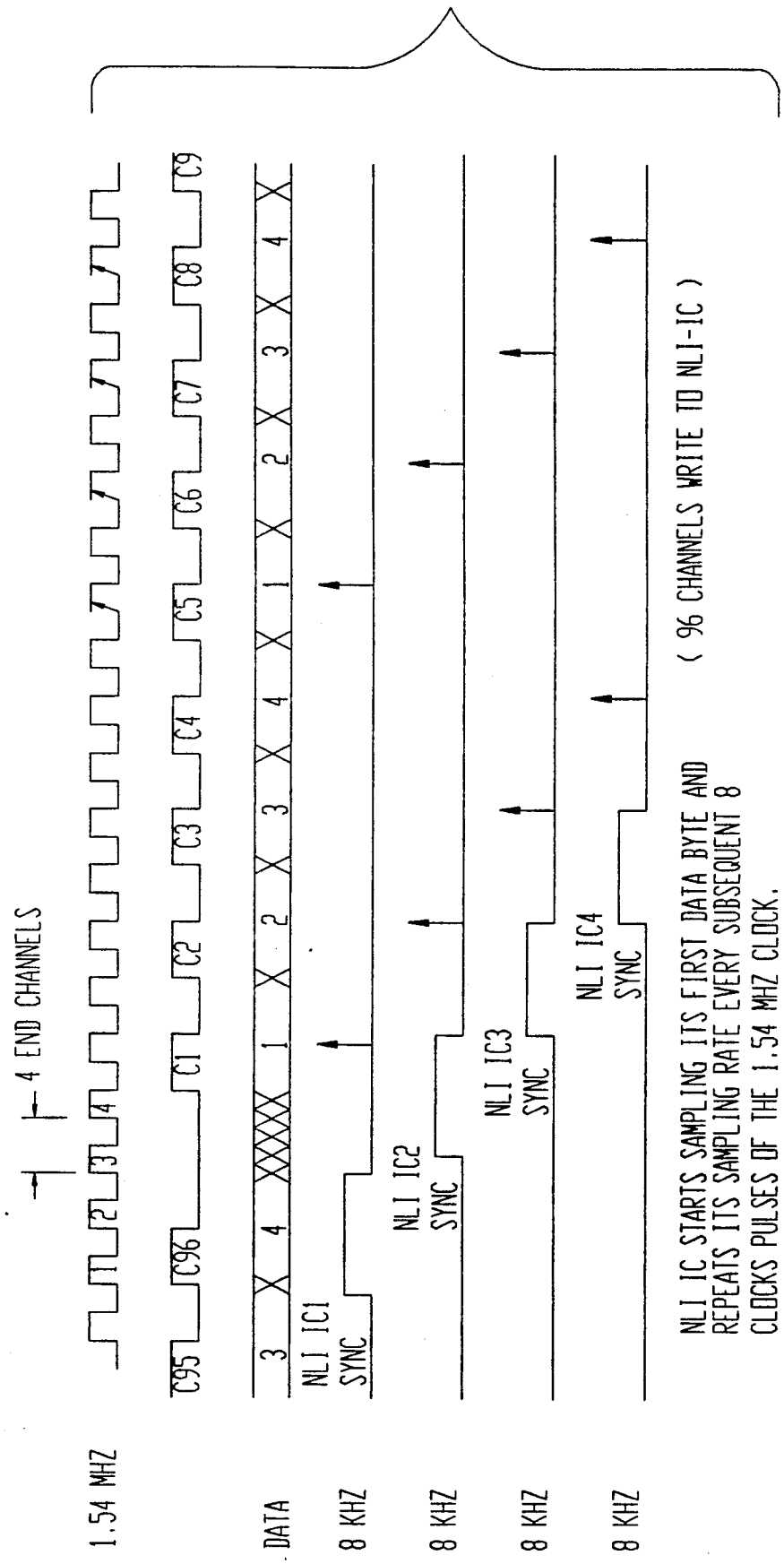
FIG. 21 shows the interlace timing for the NLI of FIG. 2.

The NLI 48 requires a 12 MHZ input clock to function. Three 12 MHZ PLL's are preferably used to generate this required clock from the 3.308 MHZ clock coming out from this chip. This clock is buffered and also used for the processor clock and sequencer clocking requirement. The NLIs interlace timing is shown in FIG. 21.

Read/write timing from AS~active to each device (min/nom/max), timer and clock specifications are shown in the FIG. 22.

The four NLIs 48 require initialization in order to communicate with the companion ICs on the NSC cards. The basic initialization procedure consists of writing five bytes of data to each NLI according to FIG. 23. Each NLI has a unique data pattern for this particular address location i.e. the first data pattern goes to NLI-IC0, the second pattern goes to NLI-IC1, and so on.

The above procedure allows all NLI-ICs to be initialized and synchronized with the NSC links if they are available within 3 msec maximum.

The 82C55 peripheral device should be initialized immediately at power up reset. At power up, this device are reset to inputs and all outputs are cleared. Address 0E107 H of the 82C55 device is then initialized with data bytes 080 H to configure the 82C55 to a three eight-bit output control ports. FIG. 24 illustrates a sample initialization of the 82C55 peripheral device.

Four PAL's are preferably used in the DEX cards. Two of them are for address decoders, two others for DTACK generator and memory write protection generator.

The data at each PMOM location is shown in FIG. 25.

The connectors pins PA 96 (TESTOUT) and PA 32 (TESTIN or PBHALT) are reserved for system test. These signals are static logic signals. The duty cycle varies with the test clock. Pin JA33 to pin JA64 are transmit and receive serial links to and from the NLIs 48. These back plane signals are pulse width modulated (PWM) signals from the NSC to the network termination cards and are in NRZ form from the network card to the NSC card direction. FIG. 26 shows the waveforms for these signals at positive differential drive outputs.

The message DPRAM sequencer control signals, the address DPRAM sequencer control signals and the DRAM controller and NLI control signals are respectively shown in FIGS. 27, 28, 29 and 30.

While a detailed description has been provided, it should be appreciated that many variations may be made thereto without departing from the scope of the invention as defined in the appended claims.

APPENDIX A

Part 1

DAS Primitives - Detailed Level Design

R. A. Kellogg

December 4, 1987

ABSTRACT

This document describes the primitives required to access the hardware on the DAS card.

Company Proprietary Technical Information
© 1989 Rockwell International

DAS Primitives - Detailed Level Design
December 4, 1987

1. Introduction

Contained in this document is a description of the primitives required to access the hardware on the DAS card. This includes the 16 bit card control register and all of the tables which are accessed by the sequencer. These tables are at very specific places in the memory spectrum and are used to control the hardware sequencer which writes the PCM data samples to the NLI IC.

LIST OF FIGURES

Figure 1. Low Byte of the DAS Control Register
Figure 2. High byte of the DAS Control Register
Figure 3. Write Leds Primitive
Figure 4. Lock/Unlock Write Protection Memory Primitive
Figure 5. Enable/Disable Bus Error Primitive
Figure 6. Enable/Disable Sequencer Primitive
Figure 7. DRAM Lock Primitive
Figure 8. Transmit Link Enable Primitive
Figure 9. Read the DAS Control Register Primitive
Figure 10. Memory Map for DAS
Figure 11. Set Write Protection Primitive
Figure 12. Read Write Protection Primitive
Figure 13. Message Address Pointer Table Layout
Figure 14. Add a Message Primitive
Figure 15. Delete a Message Primitive
Figure 16. Channel Control Table Layout
Figure 17. Channel Control Table Entry
Figure 18. Channel Control Primitive
Figure 19. Abort Message Primitive
Figure 20. Set Next Message Primitive
Figure 21. Set Transmit Mode Primitive
Figure 22. Record / Play Message Primitive
Figure 23. Read channel status Primitive

3. Glossary

DAS
    Digital Audio Source

NLI IC
    Network Link Interface ASIC

4. Primitive Descriptions

The primitives can be separated into two groups. One group consists of card level control functions such as LED control, bus error disable, sequencer control, DRAM lock, write protect lock, and NLI link enables. The second group of primitives are used to control the sequencer and includes functions such as add a message, delete a message, record a message, abort a channel, write the next message number for a channel, check for error on a channel, and check for end of message on a channel. This second group of functions manipulate tables in memory which are fixed in the address spectrum, due to the hardware sequencer, and thus need to be hidden from the application with primitive functions.

4.1 Card Control Register Primitives

Currently the card control register is write only, but will be changed to read/write before release to the test bed. Figure 1 and Figure 2 show the layout of the card control register. This register is at address 0e0100 hex in the address spectrum.

| D7 | | | | | | | D0 |
|---|---|---|---|---|---|---|---|
| DRAM lock | sequencer enable | unused | bus error disable | write protect lock | Yellow LED | Green LED | Red LED |

With the following definitions:

Yellow LED - controls the yellow LED on the card (active low)

Green LED - controls the green LED on the card (active low)

Red LED - controls the red LED on the card (active low)

write protect lock - write protects the write protect ram active high* bus error disable - disables bus error (active low)

sequencer enable - turns the hardware sequencer on active high*

DRAM lock - removes access to the DRAM from the M68000 side (active low)

Figure 1. Low Byte of the DAS Control Register

| D15 | | | | | | | D8 |
|---|---|---|---|---|---|---|---|
| unused | unused | unused | unused | unused | TL23EN | TEST | unused |

With the following definitions:

TEST - this bit is reserved for test engineering

TL23EN - enables the transmit link for NLI 2 and 3, 0 = DISABLED

Figure 2. High byte of the DAS Control Register

4.1.1 Card Status LEDs

The red, green, and yellow LED control reside in the card control register bits 0 through 2. The function das_led will control these LED status indicators.

4.1.1.1 das_led

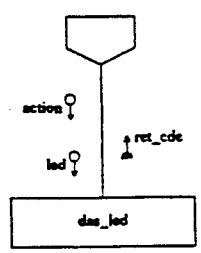

Figure 3:
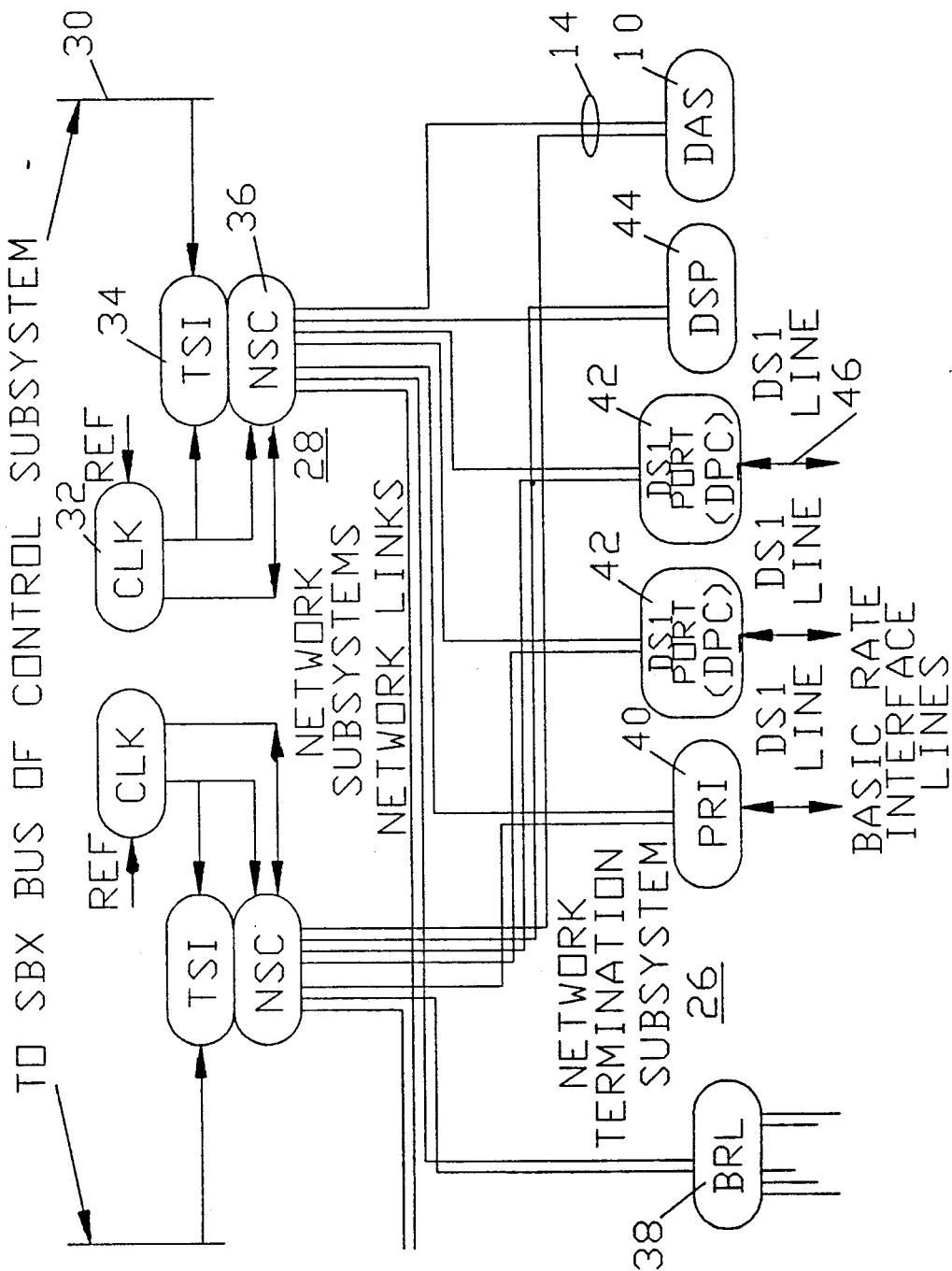
FIG. 3 is a block diagram, showing the positional interface between the DAS circuit or message code generator circuit of FIG. 2, and a subsystem of a telephonic switching network in which it is preferably employed.

Figure 3. Write Leds Primitive

MODULE: das_led

INPUT:
    TYPE  NAME
    int  action  /* turn light ON or OFF */
    int  led  /* indicates which light */

OUTPUT:
    None

RETURN CODE:

ret_cde

TYPE  VALUE  CONDITION
    int  SUCCESS operation was successful
          FAILURE operation failed DESCRIPTION: This primitive will turn the card LEDs ON or OFF.

PSEUDOCODE:
    validate led (YELLOW,RED,GREEN) if invalid return FAILURE
    validate action (ON,OFF) if invalid return FAILURE
    map action to the position required within the word based on led
    mask the result into card control register
    write the DAS control register
    return SUCCESS
END

4.1.2 Write Protect Lock

This bit allows the write protection memory to be locked to protect the protection memory from unauthorized writes and accesses. This lock has the same affect as the DRAM lock in which any access is inhibited and generates a bus error. The write protect memory is write protected when the bit is SET. When the card is powered up this bit is RESET.

4.1.2.1 das_wpl

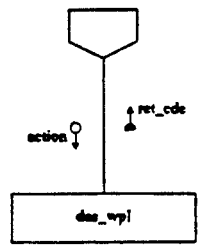

Figure 4. Lock/Unlock Write Protection Memory Primitive

MODULE: das_wpl

INPUT:
    TYPE  NAME
    int   action  /* LOCK or UNLOCK write protection memory */

OUTPUT:
    None

RETURN CODE:

ret_cde

TYPE  VALUE  CONDITION
    int   SUCCESS operation was successful
           FAILURE operation failed DESCRIPTION: This primitive will lock and unlock the write protection memory.

PSEUDOCODE:
    validate action (LOCK,UNLOCK) if invalid return FAILURE
    map action to the position required within the word
    mask the result into card control register
    write the DAS control register
    return SUCCESS
END

4.1.3 Bus Error Disable

This bit will inhibit bus error when the bit is RESET. When the card is powered up this bit is RESET i.e. bus error is inhibited.

4.1.3.1 das_berr

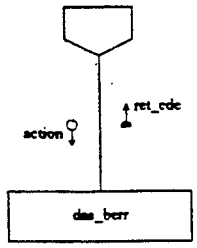

Figure 5. Enable/Disable Bus Error Primitive

MODULE: das_berr

INPUT:
    TYPE  NAME
    int   action   /* ENABLE or DISABLE bus error */

OUTPUT:
    None

RETURN CODE:

ret_cde

TYPE  VALUE  CONDITION
    int   SUCCESS operation was successful
         FAILURE operation failed DESCRIPTION: This primitive will enable or disable bus error. Used by initialization, recovery, and diagnostics.

PSEUDOCODE:
    validate action (ENABLE,DISABLE) if invalid return FAILURE
    map action to the position required within the word
    mask the result into card control register
    write the DAS control register
    return SUCCESS
END

4.1.4 Sequencer Control

The sequencer enable bit controls the hardware sequencer which writes/reads the PCM samples to/from the NLI IC. The sequencer is ENABLED when the bit is SET. When the card is powered up is DISABLED.

4.1.4.1 das_seq

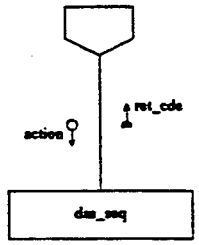

Figure 6. Enable/Disable Sequencer Primitive

MODULE: das_seq

INPUT:
    TYPE  NAME
    int   action   /* ENABLE or DISABLE hardware sequencer */

OUTPUT:
    None

RETURN CODE:

ret_cde

```
TYPE  VALUE      CONDITION
int   SUCCESS    operation was successful
      FAILURE    operation failed
```

DESCRIPTION: This primitive will enable or disable the hardware sequencer.

PSEUDOCODE:
```
    validate action (ENABLE,DISABLE) if invalid return FAILURE
    map action to the position required within the word
    mask the result into card control register
    write the DAS control register
    return SUCCESS
END
```

4.1.5 DRAM Lock

This bit is used to inhibit accesses from the M68000 processor side to the 8MB of PCM sample memory. If the M68000 processor accesses this memory when it is locked then a bus error will be generated. The M68000 is locked out when this bit is RESET. When the card is powered up this bit is RESET.

4.1.5.1 das_dlck

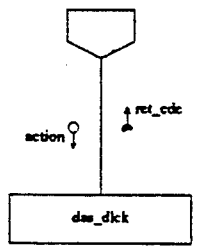

Figure 7. DRAM Lock Primitive

MODULE: das_dlck

INPUT:
```
    TYPE  NAME
    int   action    /* LOCK or UNLOCK message RAM */
```

OUTPUT:
    None

RETURN CODE:

ret_cde

```
   TYPE  VALUE      CONDITION
   int   SUCCESS    operation was successful
         FAILURE    operation failed
```

DESCRIPTION: This primitive will lock and unlock the message RAM.

PSEUDOCODE:
```
    validate action (LOCK,UNLOCK) if invalid return FAILURE
    map action to the position required within the word
    mask the result into card control register
    write the DAS control register
    return SUCCESS
END
```

4.1.6 Transmit Link Enable

There will be two issues of the DAS card, one with two NLIs and one with four NLIs. Therefore this bit is SET when there are four NLIs on the card. The bit enables the transmit link for NLI 2 and NLI 3. When the card is powered up this bit is RESET.

4.1.6.1 das_tlen

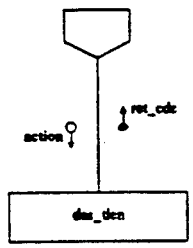

Figure 8. Transmit Link Enable Primitive

MODULE: das_tlen

INPUT:
   TYPE  NAME
   int   action   /* ENABLE or DISABLE transmit link NLI 2 & 3 */

OUTPUT:
   None

RETURN CODE:

ret_cde

TYPE  VALUE  CONDITION
   int   SUCCESS operation was successful
        FAILURE operation failed DESCRIPTION: This primitive will enable or disable the transmit link for NLI 2 and 3. This is card equipment specific and is determined by the equipment tables.

PSEUDOCODE:
   validate action (ENABLE,DISABLE) if invalid return FAILURE
   map action to the position required within the word
   mask the result into card control register
   write the DAS control register
   return SUCCESS
END

4.1.7 Read the Card Control Register

This function will return in a structure the state of all of the bits within the control register.

4.1.7.1 das_rd_ctrl

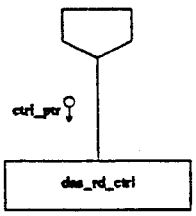

Figure 9. Read the DAS Control Register Primitive

MODULE: das_rd_ctrl

INPUT:
   TYPE  NAME
   ptr   ctrl_ptr   /* structure of fields within control reg */

OUTPUT:
   None

RETURN CODE:
   None

DESCRIPTION: This function reads the card control register and marks the structure passed in to reflect the state of all fields.

PSEUDOCODE:
    read the card control register
    map the attributes into the structure
END

4.2 Write Protection

Write protection is provided for the 32K words of program RAM. The write protection includes the PROM address spectrum and the gaps between the two banks of 16K words of memory. Figure 10 shows the memory spectrum and the areas that are write protectable. The write protection should be set up for the PROM and for the gaps. The advantage of setting up protection for the PROM and gaps is that for any writes to these areas an error (protection violation) will be returned on the bus cycle as opposed to waiting for the DTACK timeout which would eventually occur on the write to PROM or the memory gaps. The write protection memory consists of 256 locations with the protection granularity being 2k bytes. Of these 256 locations only 192 of them are active to provide write protection for the memory range 000000b to 05ffffh. Only the least significant bit of the write protection locations is used with the value of the other bits within the byte undetermined. The function das_apm will set the write protection for the selected memory range.

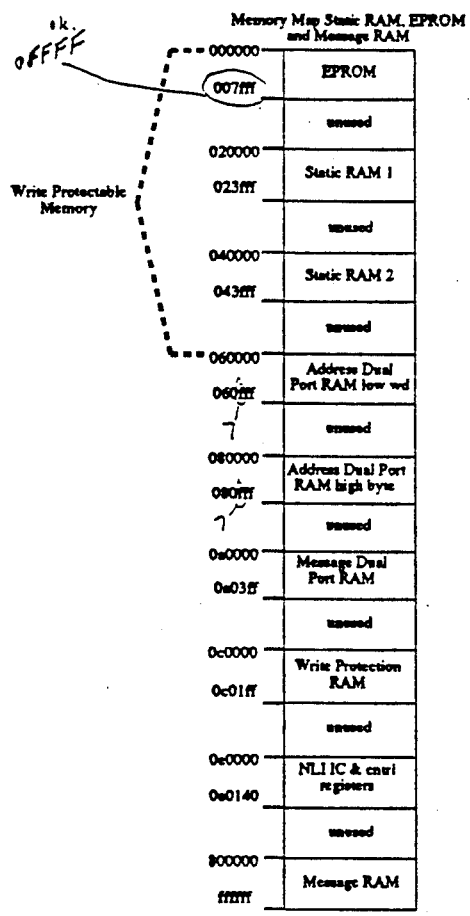

Figure 10. Memory Map for DAS

4.2.1 Write Write Protection

Figure 11 shows the primitive for writing the APM on the DAS card. Writing a zero to the write protection memory protects the corresponding block from any writes.

4.2.1.1 das_wt_apm

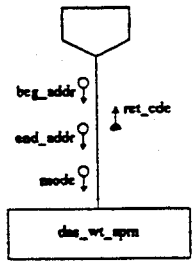

Figure 11. Set Write Protection Primitive

MODULE: das_wt_apm

INPUT:
    TYPE   NAME
    int    beg_addr  /* beginning ddress to protect/unprotect */
    int    end_addr  /* ending address to protect/unprotect to */
    int    mode      /* protect or unprotect mem range */

OUTPUT:
    None

RETURN CODE:

ret_cde

TYPE   VALUE CONDITION
    int    SUCCESS operation was successful
           FAILURE operation failed DESCRIPTION: This function set the requested protection for the selected ddress range.

PSEUDOCODE:
    validate mode (PROTECT,UNPROTECT) if invalid return FAILURE
    validate beg_addr (0h - 5fffh) if invalid return FAILURE
    validate end_addr (0h - 5fffh) if invalid return FAILURE
    beg_addr must be less than end_addr if not then return FAILURE
    mask both addresses to a 2K byte granularity and shift to be 0 based
    wrt_pro_mem_ptr = start of the write protect memory
    strt_ptr = masked start address + wrt_pro_mem_ptr
    end_ptr = masked end address + wrt_pro_mem_ptr
    if PROTECT
      pro_type = 0
    else
      pro_type = 1
    loop from strt_ptr thruogh end_ptr
      write pro_type to what strt_ptr points to
      increment strt_ptr
    end
END

4.2.2 Read Write Protection

The function das_rd_apm is used to read the protection of a particular memory location. The data read from the write protection memory is inverted i.e. when a memory block is protected its protection will read zero. If it is desired to know the protection of a memory range then multiple calls to this function is required with the memory location incremented in 2K byte steps.

4.2.2.1 das_rd_apm

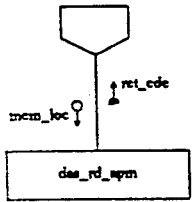

Figure 12. Read Write Protection Primitive

MODULE: das_rd_apm

INPUT:
   TYPE   NAME
   int   mem_loc   /* determine protection of this address */

OUTPUT:
   None

RETURN CODE:

ret_cde

TYPE   VALUE           CONDITION
   int   PROTECT/UNPROTECT   protection type of the requested addr
        FAILURE          operation failed DESCRIPTION: This function deterimes the protection type of the requested memory location.

PSEUDOCODE:
   validate mem_loc (0h - 5fffh) if invalid return FAILURE
   mask the address to a 2K byte granularity and shift to be 0 based
   read the APM using the masked address from above to index into the
    APM memory
   if PROTECT
    return PROTECT
   else
    return UNPROTECT
   end
END

4.3 Message Primitives

The message primitives are used to manipulate the message pointers and message numbers. Figure 13 shows the layout of the message pointer tables. All three tables contain 24 bit pointers to messages within the message RAM. Notice that the low word and high byte of the 24 bit address tables reside in two different memory blocks. Also note that the high byte of the address is offset from the low word of the address by 20000 hex. The hardware sequencer requires that these tables reside at the indicated locations.

The "Active Address" table is used by the sequencer and points to the next PCM sample to access. There are 96 of these pointers allocated (one for each channel). This table is indexed by channel number and should never be accessed by the processor. The "End Address" table contains the end address of all messages which is indexed by the message number which has a range of 256 messages. The "Start Address" table contains the start address of all messages which is indexed by the message number which has a range of 256 messages.

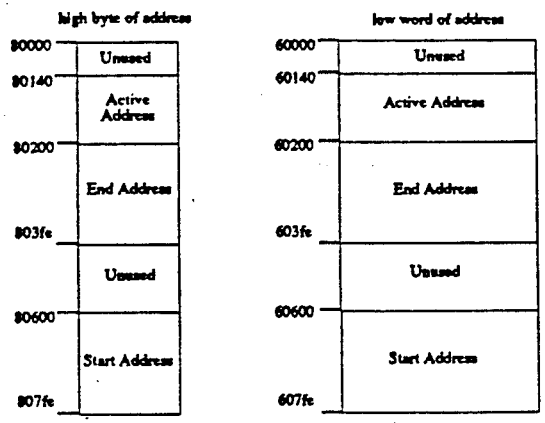

Figure 13. Message Address Pointer Table Layout

4.3.1 Add A Message

This primitive will update the end address and start address tables with new addresses. The primitive would be called after a message is loaded into the message RAM and is available for use.

4.3.1.1 das_add_mes

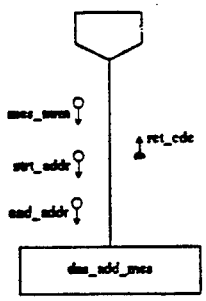

Figure 14. Add a Message Primitive

MODULE: das_add_mes

INPUT:
    TYPE  NAME
    int   mes_num   /* message number */
    int   strt_addr   /* starting address of message */
    int   end_addr   /* end address of message */

OUTPUT:
    None

RETURN CODE:

ret_cde

TYPE  VALUE  CONDITION
    int   SUCCESS operation was successful
           FAILURE operation failed DESCRIPTION: This primitive adds a new message to the message address pointer tables.

PSEUDOCODE:
    validate mes_num (1-256) if invalid return FAILURE
    validate strt_addr (message RAM address) if invalid return FAILURE
    validate end_addr (message RAM address) if invalid return FAILURE
    write the strt_addr to the start address table offset by mes_num - 1
    write the end_addr to the end address table offset by mes_num - 1
    return SUCCESS
END

4.3.2 Delete a Message

This primitive given a message number will delete the message by setting the start address to a one and the end address to zero. Setting the start and end addresses in this manner has the desirable effect of causing an error report for any channel using this invalid message. All messages that are not in use will be initialized in this manner.

4.3.2.1 das_del_mes

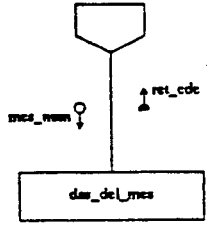

Figure 15. Delete a Message Primitive

MODULE: das_del_mes

INPUT:
    TYPE  NAME
    int   mes_num   /* message number */

OUTPUT:
   None

RETURN CODE:

ret_cde

TYPE  VALUE     CONDITION
   int   SUCCESS   operation was successful
         FAILURE   operation failed DESCRIPTION: This primitive deletes the selected message by setting the start address to one and the end address to a zero. By doing this an error will be generated if the message is used inadvertantly.

PSEUDOCODE:
   validate mes_num (1-256) if invalid return FAILURE
   write the start address table offset by mes_num - 1 to a one (1)
   write the end address table offset by mes_num - 1 to a zero (0)
   return SUCCESS
END

4.4 Channel Primitives

This group of primitives control the sequencer on a per channel basis. Figure 16 shows the layout of the channel control tables with each table containing 96 entries. The hardware sequencer requires that these tables reside at the locations shown. The "Active Message Number" table is written only by the sequencer except at initialization. The "Channel Control" table has three control bits per channel which have the functions of abort message, transmit mode (repeat or sequential), and record/play mode. Figure 17 shows the layout of an entry in the channel control table. In addition to the three control bits there are 2 status bits within the control word, one which indicates an error and the second indicating the end of a message. The "Next Message Number" table contains the index (message number) to the message address pointer table (see Figure 13) of the next message to output on the channel.

```
Channel Control Tables
s0000 ┌──────────────────┐
      │      unused      │
s0140 ├──────────────────┤
      │  Active Message  │
      │      Number      │
s01fe ├──────────────────┤
      │      unused      │
s0340 ├──────────────────┤
      │  Channel Control │
s03fe ├──────────────────┤
      │      unused      │
s0740 ├──────────────────┤
      │  Next Message    │
      │      Number      │
s07fe └──────────────────┘
```

Figure 16. Channel Control Table Layout

| D7 | | | | | | | D0 |
|---|---|---|---|---|---|---|---|
| transmit mode | abort request | record /play | unused | unused | unused | error | EOM |

With the following definitions:

transmit mode - 0 = repeat message mode, 1 = sequential message mode abort request - place the next message number into active message number record/play - IF SET then read PCM sample from NLI IC to the message RAM (record) otherwise write PCM sample to the NLI from the message RAM error - SET when detecting an active address greater than ending address EOM - end of message, SET when moving next message to active message Figure 17. Channel Control Table Entry

4.4.1 Channel Control

This primitive function requires all three atributes for a channel. It allows the selection of multiple atributes which are required to occur at the same time. An example of this is to select abort a message and also put the channel in repeat mode. Another example is to select abort, record, and sequential mode which is required to record a message.

4.4.1.1 das_chn_ctrl

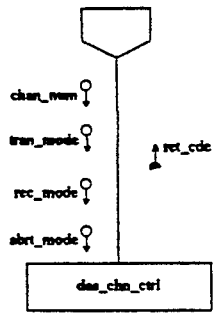

Figure 18. Channel Control Primitive

MODULE: das_chn_ctrl

INPUT:
    TYPE  NAME
    int   chan_num   /* channel number to operate on */
    int   tran_mode  /* transmit mode */
    int   rec_mode   /* record/play mode */
    int   abrt_mode  /* abort message */

OUTPUT:
    None

RETURN CODE:

ret_cde

TYPE  VALUE  CONDITION
    int   SUCCESS operation was successful
           FAILURE operation failed DESCRIPTION: This function will write the requested channel control byte with the parameters passed in. This function is used to select atributes which must occur together.

PSEUDOCODE:
    validate chan_num (1-96) if invalid return FAILURE
    validate tran_mode (REPEAT,SEQUENTIAL) if invalid return FAILURE
    validate rec_mode (RECORD,PLAY) if invalid return FAILURE
    validate abrt_mode (ABORT,NO_ABORT) if invalid return FAILURE
    format tran_mode, rec_mode and abrt_mode into the proper bit
      positions within the channel control byte
    write the control byte to the channel control table offset by chan_num - 1
    return SUCCESS

END

4.4.2 Abort a Message

The primitive will abort the current message by writing the abort bit of the channel control table for the requested channel. This will cause the next message number entry for the channel to move to the current message number table and thus start the next message. If the aborted message consists of multiple message numbers and it is desired to stop the entire message then the set next message primitive must be called before calling abort message.

4.4.2.1 das_abrt_mes

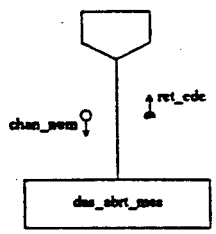

Figure 19. Abort Message Primitive

MODULE: das_abrt_mes

INPUT:
    TYPE  NAME
    int   chan_num   /* channel number */

OUTPUT:
    None

RETURN CODE:

ret_cde

TYPE  VALUE  CONDITION
    int   SUCCESS operation was successful
          FAILURE operation failed DESCRIPTION: This primitive aborts the current message on the selected channel by writing the channel control table abort bit.

PSEUDOCODE:
    validate chan_num (1-96) if invalid return FAILURE
    SET the abort bit in the channel control table offset by chan_num - 1
    return SUCCESS
END

4.4.3 Set Next Message

This primitive updates the next message number for the selected channel.

4.4.3.1 das_nxt_mes

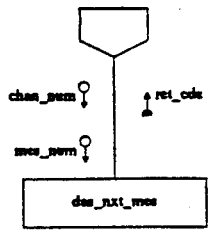

Figure 20. Set Next Message Primitive

MODULE: das_nxt_mes

INPUT:
    TYPE  NAME
    int   chan_num   /* channel number */
    int   mes_num    /* message number */

OUTPUT:
    None

RETURN CODE:

ret_cde

TYPE  VALUE  CONDITION
    int   SUCCESS operation was successful
          FAILURE operation failed DESCRIPTION: This primitive writes the next message number to the next message table for the selected channel.

PSEUDOCODE:
    validate chan_num (1-96) if invalid return FAILURE
    validate mes_num (1-256) if invalid return FAILURE
    write mes_num - 1 to next message table offset by chan_num - 1
    return SUCCESS
END

4.4.4 Message Transmit Mode

This primitive sets up the transmit mode for the selected channel.

4.4.4.1 das_tmode

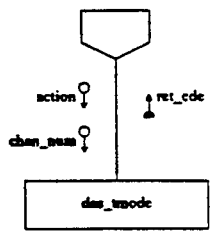

Figure 21. Set Transmit Mode Primitive

MODULE: das_tmode

INPUT:
    TYPE  NAME
    int   action   /* function to perform */
    int   chan_num  /* channel number */

OUTPUT:
    None

RETURN CODE:

ret_cde

TYPE  VALUE  CONDITION
    int   SUCCESS operation was successful
          FAILURE operation failed DESCRIPTION: This primitive sets a channel to either a repeat or a sequential message mode.

PSEUDOCODE:
    validate chan_num (1-96) if invalid return FAILURE
    if action = REPEAT
      RESET the transmit mode bit in the channel control table offset
        by chan_num - 1
    else if action = SEQUENTIAL
      SET the transmit mode bit in the channel control table offset
        by chan_num - 1
    else
      return FAILURE return SUCCESS
END

4.4.5 Set Record / Play Message

This primitive is used to set up a channel to record or play a message. In the case of record a message the start and end address message pointers must be set up before setting the record bit.

4.4.5.1 das_rec_ply

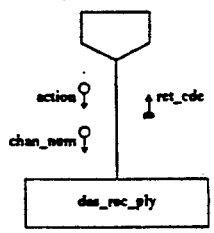

Figure 22. Record / Play Message Primitive

MODULE: das_rec_ply

INPUT:
```
TYPE   NAME
int    action    /* function to perform */
int    chan_num  /* channel number */
```

OUTPUT:
None

RETURN CODE:

ret_cde

```
TYPE  VALUE     CONDITION
int   SUCCESS   operation was successful
      FAILURE   operation failed
```

DESCRIPTION: This primitive sets a channel to either record or play message mode.

PSEUDOCODE:
```
    validate chan_num (1-96) if invalid return FAILURE
    if action = RECORD
      CLEAR the record/play bit in the channel control table offset by chan_num - 1
    else if action = PLAY
      SET the record/play bit in the channel control table offset by chan_num - 1
    else
      return FAILURE return SUCCESS
END
```

4.4.6 Channel Status

There are two status indicators in the channel status table for each channel. The first bit is an error bit which is set whenever the active address is greater than the ending address. The other status bit is SET when the end of a message is encountered. The primitive function das_rd_chn_stat will return the status of both bits when called.

4.4.6.1 das_rd_chn_stat

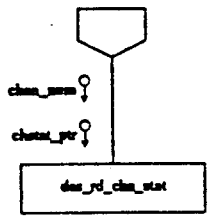

Figure 23. Read channel status Primitive

MODULE: das_rd_chn_stat

INPUT:
```
TYPE  NAME
int   chan_num    /* channel number */
ptr   chstat_ptr  /* structure of fields within channel
                     status entry table */
```

OUTPUT:
None

RETURN CODE:
None

DESCRIPTION: This function reads the channel status table and marks the structure passed in to reflect the state of all fields.

PSEUDOCODE:
```
    validate chan_num (1 - 96) if invalid return FAILURE
    read the channel status table indexed by chan_num - 1
    map the attributes into the structure
END
```

4.5 DATA requirements

At initialization time the card needs to know if there are two or four NLI ICs and how much message memory is present.

4.6 Test Plan

All of the presented primitives will be tested with the aide of an emulator and monitor. They will be used to help do the initial hardware test of the card.

APPENDIX A

Part 2

```
0000000  0002 2000 0000 1538 0000 04d8 0000 04e6
0000020  0000 1814 0000 04f4 0002 0100 0002 010a
0000040  0000 0502 0000 1840 0000 0510 0002 0114
0000060  0000 053a 0000 053a 0002 011e
0000100  0000 053a 0000 053a 0000 053a 0000 053a 0000140  0000 052c 0002 0128 0002 0132 0002 013c
0000160  0002 0146 0002 0150 0002 015a 0000 1668
0000200  0002 0164 0002 016e 0002 0178 0002 0182
0000220  0002 018c 0002 0196 0002 01a0 0002 01aa
0000240  0002 01b4 0002 01be 0002 01c8 0002 01d2
0000260  0002 01dc 0002 01e6 0002 01f0 0002 01fa
0000300  0000 053a 0000 053a 0000 053a 0000 053a 0002000  aaaa aaaa 5555 5555 0607 0000 0000 0008
0002020  0000 0000 0000 0000 0000 0000 0000 0000
0002040  0002 0100 0000 1f00 0002 2000 0000 df00
0002060  0000 0000 0000 0000 0000 0000 0000 0000
0002100  7e00 88c0 0000 ffff 0000 0000 0000 0000
0002120  0000 0000 0000 0000 0000 0000 0000 0000
0002140  0000 0000 0000 000c 0002 0000 0007 0000
0002160  0001 c00c 0001 0002 0007 0000 0000 0000
0002200  0000 0000 0000 0000 0000 0000 0000 0000
0002220  0000 0000 16a2 0098 3680 0000 000a 6000
0002240  0001 0000 7704 0000 765a 0000 7334 0000
0002260  7726 0000 769a 0000 76cc 0000 0000 0000
0002300  02a0 0002 0002 0100 0002 0000 0002 0010
0002320  0002 0020 0002 0030 23fc 0000 0008 0002
0002340  02f4 6000 005c 23fc 0000 000c 0002 02f4
0002360  6000 004e 23fc 0000 0014 0002 02f4 6000
0002400  0040 23fc 0000 0020 0002 02f4 6000 0032
0002420  23fc 0000 0028 0002 02f4 6000 0024 23fc
0002440  0000 002c 0002 02f4 6000 0016 23fc 0000
0002460  0060 0002 02f4 6000 0008 23df 0002 02f4
0002500  46fc 2700 23cf 0002 02f8 bff9 0000 0000
0002520  6e00 0010 bff9 0000 0420 6300 0000 6000
0002540  0008 2e79 0000 0000 48e7 fffe 2e7a fab2
0002560  284f 4e6d 2f0d 2f0c 2239 0002 02e8 2039
0002600  0002 02f4 e488 6100 06ce 2239 0002 02f8
0002620  2039 0002 02f4 e488 6100 0026 6000 0f9a
0002640  0002 4000 0002 ffff 0002 4000 0002 ffff
0002660  0000 0000 0000 0000 0000 0000 0000 0000
0002700  4e55 0000 48e7 c8b0 4faf ff48 45d7 203c
0002720  0000 8000 6100 095a 34bc 000a 157c 0001
0002740  0002 4678 003c 200a 5880 2200 202f 00dc
0002760  6100 0dea 588f 256f 00dc 0040 156f 00bb
0003000  0003 7002 b02f 00bb 6700 000c 7003 b02f
0003020  00bb 6600 0030 206f 00bc 3568 0008 0048
0003040  206f 00bc 2568 0002 004e 206f 00bc 2568
0003060  000a 004a 202f 00bc 720e 4981 2540 0044
0003100  6000 0026 206f 00bc 3550 0048 206f 00bc
0003120  2568 0002 004a 257c 0bad 0bad 004e 202f
0003140  00bc 5c80 2540 0044 7000 302a 0048 0800
0003160  000d 6700 000a 266a 0044 6000 0006 266a
0003200  0040 34bc 000a 486a 00a8 486a 00a2 486a
0003220  0052 22bb 7000 102a 0003 6100 0046 4faf
0003240  006c 6100 014a 6100 059a 2f00 4878 000a
0003260  223c 0000 00b8 200a 6100 64da 508f 6100
0003300  088a 6000 fffa 7000 6100 0866 200a 4faf
0003320  00b8 6000 0004 4e71 4ced 0d10 fff0 4e5d
0003340  4e75 4e55 0000 48e7 c0c0 4faf fff0 2abc
0003360  000e 0100 42af 0004 603a 0caf 0002 fff2
0003400  0014 621e 0caf 0002 0000 0014 6514 206f
0003420  0014 58af 0014 226f 0028 58af 0028 2290
0003440  600e 206f 0028 58af 0028 20bc 0bad 0bad
0003460  52af 0004 7014 b0af 0004 62be 2057 5497
0003500  226f 0030 3290 2057 5497 226f 0030 3350
0003520  9002 2057 226f 0030 3350 0004 206f 002c
0003540  30bc 0008 206f 002c 4268 0004 2f7c 0000
0003560  0420 000c 206f 000c 2f50 0008 206f 0008
0003600  226f 002c 3368 03ac 0002 4faf 0010 4cdd
0003620  0300 fff8 4e5d 4e75 4e55 0000 48e7 c030
0003640  2440 2641 202a 0002 0800 0007 6600 000a
0003660  4aab 0004 6700 0014 277c 0000 0002 0004
0003700  377c 0034 0002 6000 0008 377c 00c8 0002
0003720  4ced 0c00 fff8 4e5d 4e75 4e55 0000 48e7
0003740  8000 7006 6000 0004 4e71 4e5d 4e75 4e55
0003760  0000 48e7 8000 7000 6100 50a8 4e5d 4e75
0004000  4e55 0000 48e7 c080 206f 0004 4290 7000
0004020  6000 0004 4e71 4ced 0100 fffc 4e5d 4e75
0004040  4e55 0000 48e7 cab8 2441 266f 002c 4faf 0004060  fff6 222f 000a 203a 74be 6100 75b8 6100
0004100  0402 2c00 7005 b0ab 0004 6500 000a 52ab
0004120  0004 6000 000a 277c 0000 0002 0004 6100
0004140  4efa 200a 5c80 2840 2206 200c 6100 0066
0004160  49ee 024c 7800 6000 0012 2296 200c 6100
0004200  0054 5284 d9fc 0000 002c 7001 b084 6200
0004220  ffea 3ebc 0006 2f6f 000a 0002 2f06 4878
0004240  0006 7202 41ef 0008 2008 6100 62e8 508f
0004260  4878 ffff 41ef 000a 2208 41ef 0004 2008
0004300  6100 6130 588f 4faf 000a 4ced 1470 ffe4
0004320  4e5d 4e75 4e55 0000 48e7 cca0 2440 2801
0004340  4faf .ffd2 70ff b092 6600 0034 3ebc 0007
0004360  7a00 6000 000e 41ef 0002 11b2 5800 5800
0004400  5285 702c b085 6200 ffee 2f04 4878 0006
0004420  722d 41ef 0008 2008 6100 627a 508f 4faf
0004440  002e 4ced 0530 fff0 4e5d 4e75 4e55 0000
0004460  48e7 c000 70ff 6000 0004 4e71 4e5d 4e75
0004500  4e55 0000 48e7 cfb8 4faf ffda 41fa fad2
0004520  2e88 2057 2650 45fa faa8 7c00 7800 6000
0004540  003c 2e1a 7a00 6000 0026 7001 eba8 c087
0004560  6700 001a 36fc 4878 2006 4085 e588 36c0
0004600  36fc 4ef9 41fa fbb4 2608 588b 5285 7020
0004620  b085 6200 ffd6 5284 7020 dc80 7008 b084
0004640  6200 ffc0 7000 6100 0588 7003 2d40 0280
0004660  6100 0d4c 701e 2d40 0278 6100 4da2 6100
0004700  fa2e 203a 7326 6100 742c 49ee 01fc 41ee
0004720  022e 2f48 000c 200c 5c80 2f40 0008 0c6f
0004740  00c8 0028 6700 000e 200c 5480 6100 0528
0004760  6000 000e 42ac 0002 206f 0008 4290 222f
0005000  000c 200c 6100 fd92 6100 f5d0 2f40 0012
0005020  206f 000c 0c68 00c8 0002 6700 002a 41fa
0005040  fa00 2208 202f 0008 6100 04c0 206f 0008
0005060  70ff b090 6600 0010 2f2f 000c 220e 70fe
0005100  6100 fdde 588f 222c 0002 203a 72a2 6100
0005120  73a4 6100 01ee 2f40 0022 4254 2f2f 0022
0005140  2f2f 0016 7232 200c 6100 612a 508f 2f2f
0005160  0022 41ef 0022 2208 202f 0010 6100 5f74
0005200  588f 2f40 0016 206f 000c 7001 b050 6600
0005220  000c 701e b0af 001e 6700 001a 2f2f 0022
0005240  41ef 0022 2208 202f 0010 6100 5f46 588f
0005260  2f40 0016 70ff b0af 0016 6600 001c 206f
0005300  000c 317c 0008 206f 000c 217c 0000
0005320  001e 0014 6000 0026 206f 000c 7001 b050
0005340  6600 000c 701e b0af 001e 6700 0010 2f2f
0005360  000c 220e 70fd 6100 fd28 588f 206f 000c
0005400  2d68 0014 0278 6100 4c56 206f 000c 7000
0005420  fa00 2208 0002 2200 203a 71da 6100 72d8 206f
0005440  000c 7034 b068 0002 6700 001e 206f 000c
0005460  7035 b068 0002 6700 0010 2f2f 000c 7036
0005500  b068 0002 6600 002c 41ef 0004 22b8 202f
0005520  000c 6100 fcac 2f40 001a 6700 0012 2f2f
0005540  000c 220c 2f2f 001e 6100 fcb6 588f 6000
0005560  0040 206f 000c 0c68 0080 0002 6600 0032
0005600  41ee 024c 2f48 0008 41fa f896 2208 202f
0005620  0008 6100 036c 206f 0008 70ff b090 4600
0005640  0010 2f2f 000c 220c 70f7 6100 fc74 588f
0005660  5097 206f 000c 7035 b068 0002 6700 0010
0005700  206f 000c 7036 b068 0002 6600 0012 2f6f
0005720  000c 3f68 0012 0010 6000 000c 206f 000c
0005740  3f68 000c 0010 6000 0028 41ef 0004 2208
0005760  202f 000c 6100 fd36 2f40 001a 6700 0012
0006000  2f2f 000c 220c 202f 001e 6100 fc14 588f
0006020  2f17 7000 302f 0014 2f00 222f 000c 206f
0006040  0014 7000 3028 0002 6100 0dd8 508f 4e80
0006060  6600 ffb8 4faf 0026 4ced 1df2 ffdc 4e5d
0006100  4e75 4e55 0000 48e7 8000 70ff 6000 0004
0006120  4e71 4e5d 4e75 4e55 0000 48e7 c8b8 2800
0006140  2441 266f 0024 286f 0028 7022 b06e 0740
0006160  6600 01e8 6100 4f96 41fa 01ee 2008 6100
0006200  0c82 7000 3004 6100 087e 41fa 01e4 2008
0006220  6100 0c70 201b 6100 0862 41fa 01dd 2008
0006240  6100 0c60 201b 6100 0852 41fa 01cf 2008
0006260  6100 0c50 201b 6100 0842 41fa 01c1 2008
0006300  6100 0c40 201b 6100 0832 41fa 01b3 2008
0006320  6100 0c30 201b 6100 0822 41fa 01ac 2008
0006340  6100 0c20 201b 6100 0812 41fa 019e 2008
0006360  6100 0c10 201b 6100 0802 41fa 0190 2008
0006400  6100 0c00 201b 6100 07f2 41fa 0182 2008
0006420  6100 0bf0 201b 6100 07e2 41fa 017b 2008
0006440  6100 0be0 201b 6100 07d2 41fa 016d 2008
0006460  6100 0bd0 201b 6100 07c2 41fa 015f 2008
```

Company Proprietary Technical Information
©1989 Rockwell International

```
0006500  6100 0bc0 201b 6100 07b2 41fa 0151 2008
0006520  6100 0bb0 201b 6100 07a2 41fa 014a 2008
0006540  6100 0ba0 201b 6100 0792 41fa 013c 2008
0006560  6100 0b90 201b 6100 0782 41fa 012e 2008
0006600  6100 0b80 41fa 0126 2008 6100 0b76 200c
0006620  6100 0768 41fa 011f 2008 6100 0b66 7002
0006640  b044 6700 000a 7003 b044 6600 0010 200a
0006660  720e d081 6100 0744 6000 000a 200a 5c80
0006700  6100 0738 41fa 00f1 2008 6100 0b36 7002
0006720  b044 6700 000a 7003 b044 6600 0048 41fa
0006740  00d9 2008 6100 0b1c 7000 3012 721f c081
0006760  6100 070e 548a 41fa 00d1 2008 6100 0b04
0007000  201a 6100 06f6 41fa 00c8 2008 6100 0af4
0007020  7000 3012 6100 06ea 548a 41fa 00bb 2008
0007040  6100 0ae0 41fa 00b4 2008 6100 0ad6 7000
0007060  3012 6100 06cc 548a 41fa 00a6 2008 6100
0007100  0ac2 2012 6100 06b4 41fa 009d 2008 6100
0007120  0ab2 6100 49ca 7000 302f 0016 4d86 4ced 1d10 ffec
0007140  4e5d 4e75 4efb 0082 0d0d 4556 203d 2000
0007160  0d44 302d 4433 3a20 0020 0020 0020 000d
0007200  4434 2d44 373a 2000 2000 2000 2000 0d41
0007220  302d 4133 3a20 0020 0020 0020 000d 4134
0007240  2d41 363a 2000 2000 2000 2000 6600 009a
0007260  5350 3a20 0020 000d 0052 2f57 2c20 492f
0007300  4e2c 2046 4320 3d20 000d 4141 203d 2000
0007320  0d49 5220 3d20 002c 2000 5352 203d 2000
0007340  0d50 4320 3a20 000d 0d00 4e55 0000 48e7
0007360  c080 2057 4290 6c04 0100 fffc 4e5d 4e75
0007400  4e55 0000 48e7 c080 2057 4290 4ced 0100
0007420  fffc 4e5d 4e75 4e55 0000 48e7 8080 2057
0007440  20bc 0000 0080 4ced 0100 fffc 4e5d 4e75
0007460  4e55 0000 48e7 8000 4a97 6704 7009 6002
0007500  7008 6100 576e 4e5d 4e75 4e55 0000 48e7
0007520  8000 598f 7001 6100 6b28 2e80 0280 0000
0007540  0200 0c80 0000 0200 6700 0008 7001 6100
0007560  0022 2017 0800 0008 6700 0008 7001 5100
0007600  6978 203c 0000 03e8 6100 004e 588f 4e5d
0007620  4e75 4e55 0000 48e7 c000 2017 6100 67f2
0007640  6020 72ff 2017 6100 6c36 7006 6100 002a
0007660  2017 6100 6acc 727f c081 6666 2017 6100
0007700  6fec 2017 6100 6aba 0800 0009 67dc 4ced
0007720  0002 fffc 4e5d 4e75 4e55 0000 48e7 c080
0007740  0144 0096 6100 0014 223c 0000 2ee0 80c1
0007760  c0ef 0008 51c8 fffe 4cdf 0103 7000 4e5d
0010000  4e75 4e55 0000 48e7 c000 4fef ffec 203a
0010020  6cea 6100 6de0 0c6f 00c8 0016 6726 4aaf
0010040  0018 6712 7000 302f 002a 2200 202f 0018
0010060  6100 0bbc 6004 6100 00c2 2f40 0010 4aaf
0010100  0010 6674 0c6f 00c8 0016 670c 2064 027c
0010120  216f 0018 0800 6030 7001 b0b9 0000 040c
0010140  6726 4878 ffff 41ef 0004 2208 41ef 0008
0010160  2008 6100 597e 588f 4a97 670c 2217 41fa
0010200  0048 2008 6100 6dda 206e 027c 2010 d0ae
0010220  027c 2f40 000c 222f 000c 203a 6c62 6100
0010240  6d54 6100 46ba 7000 302f 0016 2200 202e
0010260  027c 206f 000c 4e90 70ff 4fef 0014 4ced
0010300  0100 fffc 4e5d 4e75 5265 6365 6976 6564
0010320  206e 6f6e 2d7a 6572 6f20 6c65 6e67 7468
0010340  206d 6573 7361 6765 3a20 2578 0000 4e55
0010360  0000 48e7 8000 4e5d 4e75 4e55 0000 48e7
0010400  c080 4fef fef8 1f7c 0001 0009 41ef 0070
0010420  2f48 0104 3f7c 0004 00aa 3f7c 0002 000c
0010440  705e 2f40 006c 4878 ffff 4878 0005 222f
0010460  0074 41ef 0012 2008 6100 5a5a 508f 2f40
0010500  0068 4aaf 0068 6706 41fa 00c0 605c 4878
0010520  ffff 41ef 0070 2208 202f 0108 6100 5894
0010540  588f 2f40 0068 670c 5706 4aaf 0068
0010560  671a 4aaf 0068 6706 41fa 00b6 602c 7001
0010600  b02f 0009 6656 41fa 00c6 601e 7001 b02f
0010620  0009 663c 202f 0104 6100 0100 2f40 0068
0010640  4aaf 0068 670e 41fa 00a3 2008 6100 6cb2
0010660  70ff 6048 2f2f 006c 222e 027c 202f 0108
0010700  6100 021a 588f 2f6e 027c 0104 422f 0009
0010720  202f 006c d1af 0104 6000 ff74 202e 027c
0010740  720c d081 2f40 0004 2eaf 0004 202f 0104
0010760  90ae 027c 2057 2140 001e 7000 4fef 0108
0011000  4ced 0102 fff8 4e5d 4e75 696c 685f 6c6f
0011020  6164 3a20 636f 756c 646e 2774 2073 656e
0011040  6420 424f 4f54 4649 4c45 5f52 5153 5400
0011060  696c 685f 6c6f 6164 3a20 696c 685f 696d
0011100  725f 7265 6376 2066 6169 6c65 6400 696c
0011120  685f 6c6f 6164 3a20 6865 6164 6572 2025
0011140  656e 6774 6820 7a65 726f 0069 6e3d 5f6c
0011160  6f61 643a 2063 6f75 6c64 6e27 7420 6765
0011200  7420 626f 6f74 5f73 7461 7274 0000 4e55
0011220  0000 48e7 8000 4e5d 4e75 4e55 0000 48e7
0011240  c0c0 4fef ffea 42af 0004 202f 0016 720c
0011260  d081 2f40 0010 2f6f 0010 000c 202f 0010
0011300  7224 d081 2f40 0008 41fa 0156 226f 002f
0011320  2348 0060 206f 0010 50a8 0060 2ea8 0060
0011340  422f 0015 602e 206f 0008 226f 000c 1029
0011360  0022 b010 672d 206f 0008 2028 0002 d1af
0011400  0004 06af 0000 000a 0008 522f 0015 7006
0011420  b02f 0015 62d0 206f 0008 226f 000c 1029
0011440  0022 b010 6714 206f 000c 1028 0022 4880
0011460  48c0 2200 41fa 0046 601c 2057 226f 0008
0011500  2029 0002 d0af 0004 b0a8 0004 6312 222f
0011520  0004 41fa 0060 2008 6100 6b06 70ff 600e
0011540  2057 2010 d0af 0008 2240 027c 7000 4fef
0011560  0016 4ced 0302 fff4 4e5d 4e75 626f 6f74
0011600  5f73 7461 7274 3a20 636f 756c 646e 2774
0011620  206d 6174 6368 2061 706d 2e2e 2e20 6c6f
0011640  6f6b 696e 6720 666f 7220 6d6f 7265 205b
0011660  2564 5d00 626f 6f74 5f73 7461 7274 3a20
0011700  7261 6e20 6f75 7420 6f66 2072 616d 2e2e
0011720  6666 6673 6574 3d5b 2564 5d00 4e55 0000
0011740  48e7 38c0 2040 2241 242d 0008 6700 0104
0011760  2608 0803 0000 6700 000e 12d8 94bc 0000
```

```
0012000  0001 6700 00ee 2609 0803 0000 6600 0080
0012020  263c 0000 0003 c682 e48a 4a82 6700 0062
0012040  0c82 0000 0020 6b0a 0482 0000 0020 6000
0012060  000e 7820 9882 4282 e30c 4efb 4002 22d8
0012100  22d8 22d8 22d8 22d8 22d8 22d8 22d8 22d8

0012160  22d8 22d8 22d8 22d8 22d8 22d8 22d8 609a
0012200  263c 0000 0001 c403 e20b 6702 32d8 4a02
0012220  6760 0c82 0000 0020 6b0a 0482 0000 0020
0012240  6000 000e 7820 9882 4282 e30c 4efb 4002
0012260  12d8 12d8 12d8 12d8 12d8 12d8 12d8 12d8

0012360  609c 4cdf 031c 4e5d 4e75 4840 6102 4840
0012400  e098 6102 e198 e898 6102 e998 2f00 0200
0012420  000f 0c00 0009 6302 5e00 0600 0030 6100
0012440  47c6 201f 4e75 610a 700d 6000 47ba 6100
0012460  47b6 1018 66f8 4e75 207c 000e 0106 30bc
0012500  0080 207c 000e 0100 7086 3080 207c 000e
0012520  0102 303c ffff 3080 207c 0000 05a0 2258
0012540  2458 2858 2c58 b5c9 6700 00ca 4281 4681
0012560  7400 7800 7600 264c 2a0b 07c5 1e14 4214
0012600  2645 b7ca 6c00 002a b7cc 6700 0024 1c13
0012620  1681 b213 6600 00a2 0c14 6000 6600 009a
0012640  1696 0785 d6bc 0000 0001 07c5 6000 ffd2
0012660  1887 264e 2a0b 7600 0785 1e16 4216 2645
0012700  b7c9 6f00 002a bdcb 6700 0024 1c13 1681
0012720  b213 6600 0064 0c16 0000 6600 005c 1686
0012740  07c5 d6bc 0000 0001 0785 6000 ffd2 1e87
0012760  d4bc 0000 0001 0c84 0000 0000 6600 001c
0013000  4286 05c6 4686 2206 0c82 0000 0008 6600
0013020  0006 7801 7400 6000 ff5c 4281 05c1 0c82
0013040  0000 0008 6600 ff4e 2258 2458 2858 2c58
0013060  6000 ff34 6000 0006 6600 0000 fffe 207c 000e
0013100  0100 7000 3080 2c7a edd8 2e79 0000 0000
0013120  4eb9 0000 5b72 7001 4eb9 0000 7790 203c
0013140  0000 0034 6000 f2da 2c7a edb6 2e79 0000
0013160  0000 207c 000e 0106 30bc 0080 207c 000e
0013200  0102 303c ffff 3080 7001 4eb9 0000 7c86
0013220  7001 4eb9 0000 7790 203c 0000 00c8 6000
0013240  f2a0 6000 0056 6000 4476 6000 463a 6000
0013260  004a 6000 40aa 6000 fe54 6000 fe4a 6000
0013300  fe40 6000 fe36 6000 44aa 6000 4512 6000
0013320  0144 6000 6720 6000 6800 6000 6784 6000
0013340  40b2 6000 57a2 6000 5808 6000 5880 6000
0013360  5bb2 6000 5c16 6000 ff70 6000 fe3c 2c7a
0013400  ed20 41ee 03c0 7000 720f 20c0 30c0 51c9
0013420  fffa 3d40 0426 2d40 0470 2d40 0474 2d40
0013440  0478 1d40 047e 4eb9 0000 57c0 6000 204c
0013460  203a 3e3e 2061 6464 7265 7373 2074 7261
0013500  7020 3c3c 3c0d 0020 203a 3e3e 3a20 6275 7320
0013520  7472 6170 203c 3c3c 0d00 203a 3e3e 2069
0013540  6c6c 6567 616c 2069 6e73 7472 7563 7469
0013560  6f6e 2074 7261 7020 3c3c 3c0d 0020 3e3e
0013600  3a20 7472 6163 6520 7472 6170 203c 3c3c
0013620  0d00 203a 3e3e 3a20 7574 7574 6f74 6563
0013640  7220 6c65 7665 6c20 3720 7472 6170 203c
0013660  3c3c 0d00 6361 6c6c 6564 2064 6567 7567
0013700  6765 720d 0000 4879 0000 000a 487e ff62
0013720  600a 4879 0000 0000 487a ff6d 2f0e 2c7a
0013740  ec40 2f00 200e d1af 000c 201f 4a2e 047e
0013760  6606 4cdf c000 4e75 2d5f 0468 2d5f 0480
0014000  2f08 41fa ec5c 4a19 5606 c05f 508f 602c
0014020  205f 6028 4879 0000 0014 487a ff3e 2f0e
0014040  2c7a ebfe 2f00 200e d1af 000c 201f 4a2e
0014060  047e 67be 2d5f 0468 2d5f 0480 588f 6054
0014100  4879 0000 0046 487a ff35 60d2 40e7 487a
0014120  ff64 2f0e 2c7a eb:a 2f08 41fa ec04 4a10
0014140  671c 205f 3f17 2f6f 0004 0002 2f6f 0008
0014160  0006 2f6f 000c 000a 426f 000e 600e 205f
0014200  600a 487a ffde 2f0e 2c7a eb96 2d5f 0468
0014220  2d5f 0480 3d5f 0426 2d5f 0420 48ee 3fff
0014240  ffec 0010 4a70 670a 41f0 003c f000
0014260  e958 103b 001a dec0 2d4f 0428 4e68 2d48
0014300  042c 4fee 0740 007c 0700 6000 0042 0000
0014320  0400 0000 0000 320c 1854 0000 0000 2e6e
0014340  0428 41fa eb7c 4a10 6702 4267 2f2e 0420
0014360  3f2a 0426 206e 62ac 4e60 4cee 7fff 0030
0014400  4e73 2f08 2040 6100 fc2a 205f 4e75 4e55
0014420  0000 48e7 c0c0 598f 6100 422f 95ca 4aae
0014440  0470 670a 202e 0488 6100 17f0 601e 6100
0014460  09b4 6100 14f8 6016 41fa 0298 2008 6100
0014500  ffc2 41ee 048c 2008 6100 1982 2440 200a
0014520  67e6 4a12 67e2 200a 6100 0808 2440 6000
0014540  01aa 200a 6100 0856 6000 00aa 200a 6100
0014560  0a48 6000 00a0 200a 6100 0d54 6000 0096
0014600  102e 047e 4880 48c0 0a80 0000 0001 1d40
0014620  047e 670e 41fa 0244 6000 0138 41fa 0245
0014640  6000 0130 200a 6100 171c 6068 200a 6100
0014660  0ba4 6060 200a 6100 10fa 6058 200a 6100
0014700  12e6 6050 200a 6100 19d8 6048 704d b012
0014720  660a 200a 5280 6100 1c9a 6038 200a 6100
0014740  0782 2440 2040 4a10 6716 41ee 0474 2208
0014760  200a 6100 027e 2440 4a80 660a 6000 ff50
0015000  7001 2d40 0474 200a 6100 1710 6006 200a
0015020  6100 139c 2440 6000 ff36 2eb9 0000 040c
0015040  603c 41fa 01c9 602e 41fa 01c9 6028 41fa
0015060  01c9 6022 41fa 01c9 601c 41fa 01c9 6016
0015100  41fa 01c9 6010 41fa 01c9 600a 41fa 01c9
0015120  6004 41fa 01c9 2008 6100 fea8 6034 2017
0015140  5380 0c80 0000 000e 6228 d040 303b 0006
0015160  4efb 0002 ffc6 ffc0 001e ffc0 ffd2 ffaa
0015200  ffb4 ffba 001e 001e ffde 001e 001e 001e
0015220  ffd8 41fa 018f 2008 6100 fe68 2eb9 0000
0015240  0410 41ee 0792 2d48 078a 2017 6100 3b06
0015260  206e 078a 52ae 078a 10bc 000d 206e 078a
0015300  52ae 078a 10bc 000d 206e 078a 4210 41ee
0015320  0792 2008 6100 fe2c 6000 fe74 7053 b012
0015340  660c 7054 b02a 0001 6604 6100 00be 41fa
```

```
0015360  0140 2008 6100 fe0c 2004 6100 41ea 700d
0015400  6100 41e4 95ca 6000 fe46 101a 4880 48c0
0015420  2800 0480 0000 0020 0c80 0000 0037 62ce
0015440  d040 303b 0006 4efb 0002 ffdc ffc4 ffc4
0015460  ffc4 ffc4 ffc4 ffc4 ffc4 ffc4 ffc4 ffc4
0015500  ffc4 ffc4 ffc4 ffc4 feed ffc4 ffc4 ffc4
0015520  ffc4 ffc4 ffc4 ffc4 ffc4 ffc4 ffc4 ffc4
0015540  ffc4 ffc4 ffc4 ffc4 ffc4 ffc4 ffc4 fe38
0015560  fe42 fe4c fe56 fe8a fe7a ffc4 ffc4 fe92
0015600  fe82 fe9a ffc4 ffc4 ffc4 ffc4 ffc4 ffb2
0015620  ffc4 fea2 ffc4 ffc4 fef0 6000 fdb2 588f
0015640  4ced 0d32 ffe8 4e5d 4e75 4e55 0000 48e7
0015660  8020 95ca 2d7c 0000 2700 0424 2d5a 0428
0015700  2d52 0420 6100 fd18 4ced 0400 fffc 4e5d
0015720  4e75 6465 6275 7320 673a 2000 656e 6162
0015740  6c65 640d 0064 6973 6162 6c65 640d 000a
0015760  4320 000d 4453 5020 000d 4441 5320 000d
0016000  4e53 4320 000d 424d 5520 000d 5350 5520
0016020  000d 5044 4920 000d 5444 4320 000d 434c
0016040  4b20 000d 6966 6620 4e75 6d62 6572 2000
0016060  756e 6b6e 6f77 6e20 636d 643a 2000 4e55 ,
0016100  0000 48e7 c030 2440 2641 426e 047c 220b
0016120  200a 61fe 2440 4a80 670c 4a5e 047c 6606
0016140  202e 0478 d193 200a 4ced 0c00 fff8 4e5d
0016160  4e75 4e55 0000 48e7 c030 2440 2641 200a
0016200  8100 4e40 6116 2440 4a80 6704 26ae 0742
0016220  200a 4ced 0c00 fff8 4e5d 4e75 4e55 0000
0016240  48e7 8830 2440 200a 2074 0162 6c65 2066 756e 632a 0d00
0016260  6700 00ca 6000 00b6 47fa 03da 6000 008c
0016300  47fa 03e4 6000 0084 47fa 03ee 6000 007c
0016320  47fa 0402 6000 0074 47fa 0416 6000 006c
0016340  47fa 0428 6000 0000 47fa 043a 605c 47fa
0016360  0446 6056 47fa 0452 6050 97cb 604c 1012
0016400  4880 0c40 002f 67c6 6220 0c00 002b 67a8
0016420  6210 0c40 002a 67b0 6250 0c00 0026 67c8
0016440  6048 0c00 002d 6798 6040 0c40 005e 67c4
0016460  6210 0c00 003e 67a0 62c0 0c00 003c 67a0
0016500  60b8 0c40 007c 67a6 60b0 200b 672e 282e
0016520  0742 3d7c 0001 047c 528a 200a 612a 2440
0016540  4880 6708 2004 4e93 2d40 0742 200a 670c
0016560  4a12 6708 7020 b012 6600 ff84 200a 4ced
0016600  0c10 fff4 4e5d 4e75 4e55 0000 48e7 cfa0
0016620  598f 6000 016a 528a 200a 6100 ff00 2440
0016640  4880 6700 01a0 7029 b012 6606 528a 6000
0016660  0194 41fa 03d2 606a 528a 200a 6100 fede
0016700  2440 4880 6700 017a 705d b012 6650 528a
0016720  602e 206e 0742 1010 4880 48c0 2d40 0742
0016740  600a 206e 0742 3050 2d48 0742 528a 6000
0016760  6150 528a 206e 0742 2d50 0742 6000 0146
0017000  1012 4880 0c40 00ff 62ae 0c00 0042 67c2
0017020  0c00 004c 67dc 0c00 0057 67c6 60d6 41fa
0017040  037c 2008 10d8 95ca 6000 0118 528a
0017060  200a 6100 ff54 2440 4880 6700 0108 202e
0017100  0742 4880 6016 528a 200a 6100 ff3c 2440
0017120  4880 6700 00f0 202e 0742 4680 2d40 0742
0017140  6000 00e2 41d7 2208 528a 200a 6100 00a4
0017160  2440 4880 6700 00ce 2057 2d50 0742 6000
0017200  00c4 7a00 7c10 7023 b012 6618 7c9a 528a
0017220  2f4a 0004 600a 2005 b100 66ee d087
0017240  2a00 528a 1012 1800 7230 b200 6e11 7932
0017260  b004 6d0e 1004 4880 48c0 0480 0000 0030
0017300  6020 7041 b004 6e18 7046 b004 6d12 1004
0017320  4880 48c0 0480 0000 0041 720a d081 6002
0017340  70ff 2e00 6cb0 b5ef 0004 660c 41fa 02c0
0017360  2008 6100 fa00 95ca 2d45 0742 6046 202f
0017400  0004 2440 2010 4880 0c40 002e 6700
0017420  ff54 6218 0c40 002d 6700 ff14 6200 ff64
0017440  6700 ff14 6200 fe70 6000 ff58 0c40 007a
0017460  6700 ff14 6200 ff4c 0c00 005b 6700 fe7a
0017500  6000 ff40 200a 588f 4ced 05c2 ffe4 4e5d
0017520  4e75 4e55 0000 48e7 c0b8 2440 2641 598f
0017540  6000 00d2 7041 b097 6606 41ee 0450 6004
0017560  41ee 0430 2148 101a 4880 48c0 0480 0000
0017600  0030 2e80 4a97 6d00 00a6 7007 b097 6d00
0017620  009e 41ee 046c 2017 e588 d9c0 b1cc 6600
0017640  00de 202e 0424 4880 48c0 672e 41ee 0428
0017660  602c 7043 b01a 6600 0076 49ee 0420 6000
0017700  00be 49ee 0478 6000 00b6 202e 0424 0800
0017720  000d 6706 41ee 0428 6004 41ee 042c 2848
0017740  6000 009c 49ee 0424 6000 0094 7050 b012H
0017760  6602 528a 49ee 0428 6000 0084 101a 4880
0020000  0c40 00ff 6228 0c00 0050 67be 0c00 0052
0020020  67d2 0c00 0053 67d4 6014 7053 b01a 660e
0020040  7050 b012 6602 528a 49ee 042c 6050 6100
0020060  1202 6054 101a 4880 48c0 2e80 0480 0000
0020100  0041 0c80 0000 0014 62e4 d040 303b 0006
0020120  4efb 0002 ff10 ffda ffda ff10 ffda ffda
0020140  ffda ffda ffda ffda ffda ffda ffda ffda
0020160  ffda ff5e ffda ff6e ffa8 ffda ffc6 3d7c
0020200  0001 047c 268c 200a 588f 4ced 1d00 fff0
0020220  4e5d 4e75 4e55 0000 48e7 8000 2017 d0ae
0020240  0742 4e5d 4e75 4e55 0000 48e7 8000 2017
0020260  90ae 0742 4e5d 4e75 4e55 0000 48e7 c000
0020300  2017 222e 0742 6100 64c2 4ced 0002 fffc
0020320  4e5d 4e75 4e55 0000 48e7 c000 2017 222e
0020340  0742 6100 64de 4ced 0002 fffc 4e5d 4e75
0020360  4e55 0000 48e7 c000 2017 222e 0742 e2a0
0020400  4ced 0002 fffc 4e5d 4e75 4e55 0000 48e7
0020420  c000 2017 222e 0742 e3a8 4ced 0002 fffc
0020440  4e5d 4e75 4e55 0000 48e7 8000 2017 c0ae
0020460  0742 4e5d 4e75 4e55 0000 48e7 8000 2017
0020500  80ae 0742 4e5d 4e75 4e55 0000 48e7 c000
0020520  2017 222e 0742 b380 4ced 0002 fffc 4e5d
0020540  4e75 4e55 0000 48e7 8020 2440 6002 528a
0020560  4a12 6706 7020 b012 67f4 6000 4ced 0400
0020600  fffc 4e5d 4e75 7061 7265 6e74 6865 7369
0020620  7320 6d69 7373 696e 6720 0000 6272 6163
0020640  6b65 7420 6d69 7373 696e 672e 0d00 6261
0020660  6420 6e75 6d62 6572 2e0d 0000 4e55 0000
```

```
0020700  48e7 c8b0 2440 598f 4297 200a 6100 ff94
0020720  2440 2040 4a10 670c 41d7 2208 200a 6100
0020740  fa5a 2440 200a 675e 2817 41fa 017e 2008
0020760  6100 f710 2004 0800 0000 6705 6100 1052
0021000  6046 47ee 03c0 6028 4a84 6712 4a93 6704
0021020  b893 660a 2684 377c 4afc 0004 7800 4a93
0021040  670c 2013 6100 1066 700d 6100 3aba 5c8b
0021060  41ee 0420 b7c8 65d0 4a84 670a 41fa 013a
0021100  2008 6100 f6be 200a 588f 4ced 0d12 ffec
0021120  4e5d 4e75 4e55 0000 48e7 c8b0 2440 598f
0021140  4297 200a 6100 fefc 2440 2040 4a10 6626
0021160  41fa 011e 2008 6100 f68a 41ee 048c 2008
0021200  41fa 4100 6100 fedc 2440 2040 7059 b010
0021220  661c 14bc 002b 702a b01a 6714 41d7 2208
0021240  200a 5380 6100 f998 2440 4a80 6604 7000
0021260  6026 2817 47ee 03c0 6014 4a84 6708 b893
0021300  6604 4293 6010 4a84 6602 4293 5c8b 41ee
0021320  0420 b7c8 65e4 200a 588f 4ced 0d12 ffec
0021340  4e5d 4e75 4e55 0000 48e7 cca0 558f 45ee
0021360  03c0 6062 4a92 675c 41ef 0001 2208 2012
0021400  6100 4320 2a00 6612 4878 0002 2012 5880
0021420  2200 2012 6100 4358 588f 2052 3810 2052
0021440  30aa 0004 3544 0004 4a85 6616 102f 0001
0021460  4880 48c0 2f00 2012 5880 2200 2012 6100
0021500  432a 588f 2012 b0ae 0420 6608 41fa 005b
0021520  2d48 0480 5c8a 41ee 0420 b5c8 6596 548f
0021540  4ced 0532 ffec 4e5d 4e75 6272 6561 6b70
0021560  6f69 6e74 733a 0d00 6272 6561 6b70 6f69
0021600  6e74 2074 6162 6c65 2066 756c 6c2a 0d00
0021620  636c 6561 7220 616c 6c2a 6272 6561 6b70
0021640  6f69 6e74 7320 3f20 0061 7420 6272 6561
0021660  6b70 6f69 6e74 0d00 4e5d 4e55 0000 48e7 cfa0
0021700  2440 4fef ffe4 7e01 422f 0095 7000 3f40
0021720  0012 3f40 0014 3f40 0018 3f40 0016 001a 3c00
0021740  3a00 4a12 6700 0070 602a 5245 1f7c 0001
0021760  0005 605a 5246 1f7c 0003 0005 6050 526f
0022000  0014 526f 0012 6046 526f 001a 6040 526f
0022020  0018 603a 200a 6100 fd4a 2440 2040 1010
0022040  4880 0440 004c 0c40 000b 6226 d040 303b
0022060  0006 4efb 0002 ffbe ffcc ff28 ffd2 001c
0022100  001c 001c 001c 001c 001c ff38 ffb4 528a
0022120  60c2 4fef ffcc 41ef 000a 2208 200a 6100
0022140  f812 2440 4a80 6700 0256 282f 000a 4a6f
0022160  001a 6606 4a6f 0018 671a 4a6f 0018 6704
0022200  70fe c880 4a6f 001a 6704 7001 8880 7000
0022220  3c00 3a00 4a45 6604 4a46 6710 2004 0800
0022240  0000 6708 6100 0daa 6000 0216 200a 6100
0022260  fcb2 2440 2040 4a10 6602 95ca 4a46 6704
0022300  7004 6016 4a45 6604 4a6f 001a 6606 4a6f
0022320  0018 6704 7002 6002 7001 3f40 0016 200a
0022340  6600 019e 4a47 6708 2004 6100 f0ae 7e00
0022360  4a6f 0014 6634 41fa 0772 2008 6100 f404
0022400  4a46 670a 2044 2010 6100 efff 6012 4a45
0022420  670c 2044 3050 2008 6100 efe6 6002 2044
0022440  1010 4880 48c0 6100 efde 41fa 0741 2008
0022460  6100 f3d0 41ee 048c 2008 6100 0d90 2440
0022500  6000 013e 302f 0016 48c0 9880 528a 6000
0022520  011a 41ef 0006 2208 200a 6100 f715 2440
0022540  4a80 6700 015a 4a47 670c 2004 6100 ef8c
0022560  700d 6100 3772 5247 41ef 0004 2208 2004
0022600  6100 40a0 2a80 6618 4878 0002 102f 0009
0022620  4880 48c0 d084 2200 2004 6100 40d2 588f
0022640  4a46 670a 2044 0006 6012 4a45 6708
0022660  2044 30af 0008 6006 2044 10af 0009 4a6f
0022700  0012 666a 4a46 6706 2044 2010 6020 4a45
0022720  670e 2044 3010 48c0 0280 0000 ffff 600e
0022740  2044 1010 4880 48c0 0280 0000 00ff 2f40
0022760  000e 202f 000e b0af 0006 6732 41fa 0673
0023000  2008 6100 f2fa 95ca 4a97 661e 102f 0004
0023020  4880 48c0 2f00 102f 0009 4880 48c0 d084
0023040  2200 2004 6100 4048 588f 6000 feb2 4a97
0023060  661e 102f 0004 4880 48c0 2f00 102f 0009
0023100  4880 48c0 d084 2200 2004 6100 4022 588f
0023120  302f 0016 48c0 d880 6000 fe84 95ca 4a47
0023140  660a 302f 0016 48c0 d880 5247 6000 fe70
0023160  302f 0016 48c0 d880 5247 528a 6000 fe60
0023200  200a 6100 fada 2440 2040 1010 4880 0c40
0023220  002d 6700 feb0 6212 0c00 002b 67d2 6200
0023240  feb2 4a00 67b6 6000 feaa 0c40 003d 6700
0023260  fe9c 6200 fe9e 0c00 002e 6600 fe96 7000
0023300  4fef 001c'4ced 05f2 ffe4 4e5d 4e75 4e55
0023320  0000 48e7 efa0 2440 4fef ffe6 7c00 7000
0023340  3f40 0002 3f40 0004 7049 b012 6606 528a
0023360  5286 604e 4a12 6732 670e 526f 0004 6022
0023400  526f 0002 601c 200a 6100 fa58 2440 2040
0023420  1010 4880 0c40 004c 67e6 0c40 0057 67da
0023440  4a00 528a 60e0 4fed ffc2 4a6f 0002 6704
0023460  7004 600c 4a6f 0004 6704 7002 6002 7001
0023500  3e80 200a 6100 fa1c 2440 2040 4a10 6612
0023520  4a86 6706 202e 0420 6004 202e 0478 2800
0023540  6026 41ef 0016 2208 200a 2400 4a86 6706
0023560  41fa f4cc 6004 41fa f4fa 2002 4e90 2440
0023600  4a80 6738 282f 0016 200a 6100 f9d6 2440
0023620  2040 4a10 6614 4a86 6704 7014 6006 203c
0023640  0000 0100 2f40 0012 6018 41ef 0012 2208
0023660  200a 6100 f4be 2440 4a80 6606 7000 6000
0023700  2fe4 2e2f 0012 6000 0276 4a86 6700 0080
0023720  2d44 075a 4aee 0478 6712 b8ae 0478 650c
0023740  2004 90ae 0478 2d40 0786 6004 2d44 0786
0023760  6100 0f12 2004 6100 0a94 41fa 0482 2008
0024000  6100 f100 7a05 6026 202e 075a b0ae 075a
0024020  6412 206e 075a 54ae 075a 3050 2008 6100
0024040  e2a0 600a 41fa 045c 2008 6100 f0d6 2005
0024060  5385 4a80 66d2 41ee 0792 2008 6100 f0c4
0024100  202e 0786 90ae 078a d880 6000 01e6 4a6f
0024120  0004 6606 4a6f 0002 6710 2004 6000 0000
0024140  6788 6100 09ec 6000 023c 2004 6100 ecbc .
0024160  41fa 0415 2008 6100 f08a 2f44 000e 7010
0024200  b087 6604 7a10 6058 2a07 6054 4a6f 0002
```

```
0024220  670c 206f 000e 2010 6100 ec60 602e 4a6f
0024240  0004 6714 206f 000e 3010 48c0 0280 0000
0024260  ffff 6100 ec4c 6014 206f 000e 1010 4880
0024300  48c0 0280 0000 00ff 6100 ec3c 7020 6100
0024320  3416 3017 48c0 d1af 000e 3017 48c0 0050
0024340  4a85 6ae8 41fa 03a5 2008 6100 f016 2f44
0024360  000e 7010 b087 6e06 7a10 6000 011c 2a07
0024400  6000 0116 4a6f 0002 6708 206f 000e 2010
0024420  6026 4a6f 0004 6710 206f 000e 3010 48c0
0024440  0280 0000 ffff 6010 206f 000e 1010 4880
0024460  48c0 0280 0000 00ff 2f40 000a 6000 00ae
0024500  202f 000a 7218 e2a0 727f c081 2f40 0006
0024520  7020 b0af 0006 6e0e 707f b0af 0006 6f06
0024540  202f 0006 6002 702e 6100 337c 202f 000a
0024560  7210 e2a0 727f c081 2f40 0006 7020 b0af
0024600  0006 6e0e 707f b0af 0006 6f06 202f 0006
0024620  6002 702e 6100 3350 202f 000a e080 727f
0024640  c081 2f40 0006 7020 b0af 0006 6e0e 707f
0024660  b0af 0006 6f06 202f 0006 6002 702e 6100
0024700  3326 202f 000a 727f c081 2f40 0006 7020
0024720  b0af 0006 6e0e 707f b0af 0006 6f06 202f
0024740  0006 6002 702e 6100 32fe 601e 3017 0c40
0024760  00ff 62ce 0c00 0001 67c8 0c00 0002 6798
0025000  0c00 0004 6700 ff3a 60b8 3017 48c0 d1af
0025020  000e 3017 48c0 9a80 4a85 6e00 fee8 700d
0025040  6100 32c4 7010 b087 6e06 7010 6000 fe1a
0025060  d887 4a86 6704 7001 6002 7010 9e80 4a87
0025100  6e00 fd88 200a 6100 f71a 2440 2040 4a10
0025120  664a 41fa 023a 2008 6100 eea8 41ee 048c
0025140  2008 6100 0868 6100 f6fa 2440 6012 98af
0025160  0012 6008 202f 0010 e388 9880 4212 601c
0025200  1012 4880 0c40 00ff 6212 0c00 002b 67ec
0025220  0c00 002d 67de 0c00 0031 6732 4a12 6700
0025240  fd22 200a 4fef 001a 4ced 05f6 ffe0 4a5d
0025260  4a75 4a55 0000 48e7 cfa0 2440 4fef ffe8
0025300  3f7c 0001 0016 7000 3f40 000c 3f40 000e
0025320  3f40 0012 3f40 0014 3e00 3e00 4a12 675e
0025340  601a 5246 6050 5247 404c 526f 000c 6046
0025360  526f 0014 6040 526f 0012 603a 200a 6100
0025400  f662 2440 2040 1010 4880 0440 004c 0c40
0025420  000b 6226 d040 303b 0006 4efb 0002 ffc8
0025440  ffcc 001c ffd2 001c 001c 001c 001c 001c
0025460  001c ffd8 ffcc 523a 60c2 4fef ffc8 41ef
0025500  0004 2208 200a 6100 f12a 2440 4a80 6700
0025520  010a 282f 0004 4a6f 0014 6606 4a6f 0012
0025540  671a 4a6f 0012 6704 70fe c080 4a6f 0014
0025560  6704 7001 8880 7000 3e00 3e00 41af 0004
0025600  2208 200a 6100 f0ec 2440 4a80 6750 2a2f
0025620  0004 4a46 6604 4a47 6710 2004 0800 0000
0025640  6708 6100 06ac 6000 00b4 4a47 6704 7004
0025660  4a46 660c 4a6f 0014 4606 4a6f 0012
0025700  6704 7002 6002 7001 3f40 0010 41d7 2208
0025720  200a 6100 f09e 2440 4a80 6600 0078 6100
0025740  06be 6000 0078 4a47 6706 2044 2097 6012
0025760  4a46 6708 2044 30af 0002 6006 2044 10af
0026000  0003 4a6f 000c 6644 4a47 6706 2044 2010
0026020  6020 4a46 670e 2044 3010 48c0 0280 0000
0026040  ffff 600e 2044 1010 4880 48c0 0280 0000
0026060  00ff 2f40 0008 202f 0008 b097 670e 41fa
0026100  0058 2008 6100 ebc 95ca 600e 302f 0010
0026120  48c0 d880 b885 6f00 ff8a 7000 4fef 0018
0026140  4ced 05f2 ffe4 4a5d 4a75 2020 0029 3a20
0026160  0073 746f 7265 2065 7272 6f72 0d00 202d
0026200  2000 2020 2020 0020 2d20 0020 2000 6469
0026220  7370 6c61 793a 0070 7374 6f72 6520 6572
0026240  726f 720d 0000 4e55 0000 48e7 c0a0 2440
0026260  4fef ffc0 4a12 6700 00ce 41ef 0038 2208
0026300  200a 6100 f49e 6100 efaa 2440 4a80 6700
0026320  00b6 2f6f 0038 003c 42af 0004 6024 41ef
0026340  000c 2008 222f 0004 e589 d081 2200 200a
0026360  6100 f470 6100 ef7c 2440 4a80 6710 52af
0026400  0004 700a b0af 0004 6f04 4a12 66d0 6100
0026420  f5d4 7001 b0af 000c 6606 6100 2a86 2e80
0026440  2f2f 0034 2f2f 0034 2f2f 0034 2f2f 0034

0026500  222f 0034 202f 0030 206f 005c 4a90 4fef
0026520  0020 2f40 0008 7001 b0af 000c 6606 2017
0026540  6100 2a5a 41fa 0036 2008 6100 eb96 202f
0026560  0008 6100 e78c 41fa 0033 2008 6100 eb84
0026600  6100 f562 6006 6100 04e6 6002 7000 4fef
0026620  0040 4ced 0502 fff4 4a5d 4a75 7265 7475
0026640  726e 2063 644 6520 3d20 000d 0000 4e55
0026660  0000 48e7 e0a0 2440 518f 7020 b012 6704
0026700  4a12 6604 6166 6056 41ef 0004 2208 200a
0026720  6100 f1b0 2440 4a80 6604 7000 6042 41d7
0026740  2208 200a 2400 41ee 0420 b1ef 0004 6606
0026760  41fa ee4c 6004 41fa ee7a 2002 4e90 2440
0027000  41ee 0420 b1ef 0004 660e 2017 0800 0000
0027020  6706 6100 043c 6008 206f 0004 2097 200a
0027040  508f 4ced 000e 6506 fff0 4a5d 4a75 4e55
0027060  48e7 ceu0 45fa 0232 4aae 0480 6712 41fa
0027100  0231 2008 6100 ebbc 202e 0480 6100 eab4
0027120  42ae 0480 202e 0424 0800 000d 6706 202e
0027140  0428 6004 202e 042c 2d40 046c 41fa 0295
0027160  2008 6100 ea0e 202e 0478 4100 467e 790d
0027200  2008 6100 2e64 41fa 01f4 2008 6100 ea76 41ee
0027220  0430 2008 6100 017c 41fa 01e4 2008 6100
0027240  ea62 41ee 0450 2008 6100 016a 41fa 01d5
0027260  2008 6100 ea4a 202e 0424 6100 ea44 41fa
0027300  01c9 2008 6100 ea3c 3a2e 0426 3005 48c0
0027320  0800 000f 6704 7054 6002 702d 6100 2a08
0027340  3005 48c0 0800 000e 6704 703f 6002 702d
0027360  6100 2df4 3005 48c0 0800 000d 6704 7053
0027400  6002 702d 6100 2de0 3005 48c0 0800 000c
0027420  6704 703f 6002 702d 6100 2dcc 3005 48c0
0027440  0800 000b 6704 703f 6002 702d 6100 2db8
0027460  3005 48c0 0280 0000 0700 e080 6100 e5ce
0027500  383c 0080 601e 3005 48c0 3204 48c1 c081
0027520  6708 1012 4880 48c0 6002 702d 6100 2d88
```

```
0027540  528a e244 4a44 66de 41fa 0123 2008 6100
0027560  e992 202e 0428 6100 e582 41fa 012d 2008
0027600  6100 e980 202e 042c 6100 e570 41fa 0127
0027620  2008 6100 e96e 202e 0420 6100 e560 02f0 41fa
0027640  011b 2008 6100 e95c 2d6e 0420 075a 2c2e
0027660  075a 4aae 0478 6712 bcae 0478 650c 2006
0027700  90ae 0478 2d40 0786 6004 2d46 0786 6100
0027720  0734 7806 6026 202e 075a b0ae 075a 6412
0027740  206e 075a 54ae 075a 3050 2008 6100 0512
0027760  600e 41fa 00cb 2008 6100 e908 5344 6ed6
0030000  41ee 0792 2008 6100 e8fa 4ced 0572 ffe8
0030020  4a5d 4a75 4a55 0000 48e7 8080 7800 6038
0030040  4a84 6f06 7020 6100 2cbe 7004 b084 6606
0030060  7020 6100 2cb2 5480 2a00 5016 7020
0030100  6100 2cm4 2004 e588 2057 2030 0800 6100
0030120  e4aa 5284 b885 6de6 7008 b084 6ec2 4ced
0030140  0130 fff4 4e5d 4a75 3f3f 3f58 4a5a 5643
0030160  000d 000d 5265 6c3a 2000 446e 3a00 0041
0030200  6e3a 000d 5352 3a20 0020 0020 0029 2020
0030220  2020 2020 2020 2020 2020 2020 2020 2020
0030240  2020 2020 2053 5350 3a20 0020 2020 2055
0030260  5350 3a20 000d 5043 3a20 0020 2d20 0020
0030300  2020 2000 4a55 0000 48e7 c0b0 2440 598f
0030320  200a 6100 f08e 2440 2040 4a10 6716 41ee
0030340  0420 2208 200a 6100 eb56 2440 4a80 6604
0030360  7000 601a 6100 f1ee 4297 5002 5297 0c97
0030400  0000 0100 6df6 6100 2ad6 6100 e742 588f
0030420  4ced 0d02 fff0 4e5d 4a55 0000 48e7
0030440  8ea0 2440 202e 0474 4aae 0470 6700 008e
0030460  02ae ffff 7fff 0424 7001 b0ae 0470 6c00
0030500  0078 202e 0420 6100 0144 41fa 00d4 2008
0030520  6100 e7b0 2d6e 0420 075a 2a2e 075a 4aae
0030540  0478 6712 6e0c 6000 2005 90ae 0478
0030560  2d40 0786 6004 2d45 0786 6100 0588 7206
0030600  6026 202e 075a b0ae 075a 6412 206e 075a
0030620  54ae 075a 3050 2008 6100 0366 600a 41fa
0030640  0084 2008 6100 e7ec 5346 6ed6 41ee 0792
0030660  2008 6100 e74e 6004 6100 fc72 53ae 0470
0030700  6f14 2d4a 0488 2344 0474 00ae 0000 8000
0030720  0424 6100 e70a 200a 6524 41fa 00d4 2008
0030740  6100 e720 41ee 048c 2008 6100 00e0 2440
0030760  600c 2004 5280 2d40 0470 95ca 50be 200a
0031000  6100 ef60 2440 2040 1010 4880 4a40 67e2
0031020  4fef ffe8 200a 4ced 0570 ffec 4a5d 4a75
0031040  202d 2000 2020 2020 0074 7261 6365 3a20
0031060  0000 4e55 000 48e7 8080 41fa 012e 2008
0031100  6100 e6c0 7000 4ced 0100 fffc 4a5d 4a75
0031120  4a55 0000 48e7 8080 41fa 0119 2008 6100
0031140  e6c2 7000 4ced 0100 fffc 4a5d 4a75 4a55
0031160  0000 48e7 8080 41fa 0105 2008 6100 e6b4
0031200  7000 4ced 0100 fffc 4a5d 4a75 4a55 0000
0031220  48e7 8080 2800 0aae 0478 675b 6ae6 0478
0031240  6510 2004 90ae 0478 6100 e250 41fa 00e6
0031260  600a 2004 6100 e244 41fa 00dd 2008 6100
0031300  e642 4ced 0110 fff8 4a5d 4a75 4a55 0000
0031320  48e7 ccb0 2440 264a 7a00 6000 0072 707f
0031340  c800 7061 b004 6e40 707a b004 6d3a 7020
0031360  9800 6034 101b 4880 48c0 6100 29ea 4a13
0031400  66f2 604a b7ca 6346 41fa 0090 2008 6100
0031420  e5f2 538b 6038 41fa 0085 2008 6100 e5e4
0031440  264a 602a 16c4 6026 0c04 0011 6720 6210
0031460  0c04 0008 67ce 62ec 0c04 0001 67c0 60e4
0031500  0c04 0018 67d0 62dc 0c04 0013 66d6 6100
0031520  27ce 1800 720d b200 6600 ff84 4213 200a
0031540  4ced 0d32 ffe8 4a5d 4a75 6261 6420 7265
0031560  670d 006f 6464 2061 6464 720d 006e ff74
0031600  2065 6e6f 7567 6820 7061 7261 6d65 7465
0031620  7273 0d00 2b72 0029 2000 2008 000d 3a00
0031640  4e55 0000 48e7 ccb8 2440 4fef ff98 7a00
0031660  7044 b012 6604 7a01 528a 6100 2a1c 200a
0031700  6100 eda0 2440 2040 4a10 6708 200a 6100
0031720  01aa 2440 41ef 0004 2e88 2017 6100 011c
0031740  4a80 6700 00a0 4a85 671c 600e 2057 5297
0031760  1010 4880 48c0 6100 2424 2057 4a10 66ec
0032000  700d 6100 2418 41ef 0004 2008 6100 01da
0032020  2e80 67cf 49ee 058c 97cb 101c 4880 48c0
0032040  0280 0000 00ff 2800 0062 101c 4880 48c0
0032060  0280 0000 00ff 7218 e3a8 d7c0 5384 101c
0032100  4880 48c0 0280 0000 00ff 7210 e3a8 d7c0
0032120  5384 101c 4880 48c0 0280 0000 00ff e188
0032140  d7c0 101c 4880 48c0 0280 0000 00ff d7c0
0032160  5584 6046 41fa 0266 2008 6100 e486 7011
0032200  6100 28e2 7000 6064 7801 602e 2057 1010
0032220  4880 0440 0030 0c40 0009 62ec d040 303b
0032240  0006 4efb 0002 ffe2 ffac ff98 ff84 ffe2
0032260  ffe2 ffe2 ffce ffce 202e 0478 d7c0
0032300  200a 4a85 6616 200b 0280 0000 01ff 660c
0032320  200b 6100 e026 700d 6100 280c 16dc 5384
0032340  6ee0 6000 fef0 6100 294e 200a 4fef 0068
0032360  4ced 1d32 ffe4 4a5d 4a75 4a55 0000 48e7
0032400  cc30 2440 598f 47ee 0746 6004 14d3 421b
0032420  4a13 66f8 7011 6100 284c 6100 271e 7205
0032440  b280 660a 7005 6100 283c 7000 6040 6100
0032460  2804 1800 72ff b200 6702 14c4 700d b004
0032500  66d8 7013 6100 281a 47ae 0746 600e 6100
0032520  27e4 1800 72ff b200 6606 16c4 2a2e 0430
0032540  5385 6eea 7000 1680 1540 ffff 7001 598f
0032560  4ced 0c32 ffec 4a5d 4a75 4a55 0000 48e7
0032600  8020 2440 600a 101a 4880 48c0 6100 27d6
0032620  4a12 66f2 700d 6100 27cc 200a 4ced 0400
0032640  fffc 4a5d 4a75 4a55 0000 48e7 c820 2440
0032660  7800 101a 4880 48c0 0480 0000 0030 2800
0032700  7209 b200 6c02 5f84 4a6f 0006 670e 7200
0032720  200a 61d2 2204 e989 d081 6002 2004 4ced
0032740  0410 ffff 4a5d 4a75 4a55 0000 48e7 ccb8
0032760  2440 47ae 058c 99ec 4a12 6706 7053 b01a
0033000  66f6 7030 b012 6a5e 7039 b01a 6458 200a
0033020  5380 2840 7201 200a 6100 ff8c 2a00 16c0
0033040  2005 5280 2800 601c 7201 200a 5480 2440
```

```
0033060  6100 ff74 1680 101b 4880 48c0 0280 0000
0033100  00ff da80 5384 6ee0 2005 0280 0000 00ff
0033120  0c80 0000 00ff 670e 41fa 008d 2008 6100
0033140  e2a2 7000 6002 200c 4ced 1d32 ffe4 4e5d
0033160  4e75 4e55 0000 48e7 cca0 2440 200a 6100
0033200  eea2 2440 2040 4a10 6738 1812 6100 274a
0033220  6100 25a8 1a00 72ff b200 670e ba04 672c
0033240  1005 4880 48c0 6100 26bc 6100 2688 1a00
0033260  72ff b200 67da 1005 4880 48c0 6100 215e
0033300  60ce 41fa 0031 2008 6100 e238 6100 2768
0033320  7000 4ced 0532 ffec 4e5d 4e75 6c6f 6164
0033340  2064 6f6e 650d 0064 0000 48e7 c8a0 2d6e 075a
0033360  7375 600d 006e 6f20 6272 6561 6b20 6368
0033400  6172 0d00 4e55 0000 48e7 cec0 2d6e 075a
0033420  075a 2d6e 0786 078a 41ee 0792 2d48 078e
0033440  206e 075a 54ae 075a 3010 48c0 0280 0000
0033460  ffff 2800 2004 720c e2a0 720f c081 e588
0033500  20be 0762 2030 0800 d0ae 0782 2440 2004
0033520  4e92 206e 075a 52ae 078e 10bc 000d 206e
0033540  078e 4210 202e 075a 90ae 075e d1ae 0786
0033560  4ced 0512 fff0 4e5d 4e75 4e55 0000 48e7
0033600  8080 41fa c87c 2d48 0782 41fa 0122 2d48
0033620  076a 41fa 012a 2d48 076e 41fa 0132 2d48
0033640  0772 41fa 00ca 2d48 0766 41fa 013e 2d48
0033660  0776 41fa 007a 2d48 0762 4ced 0100 fffc
0033700  4e5d 4e75 4e55 0000 48e7 c000 2017 7209
0033720  e2a0 7207 c081 4ced 0002 fffc 4e5d 4e75
0033740  4e55 0000 48e7 c000 2017 ec80 7207 c081
0033760  4ced 0002 fffc 4e5d 4e75 4e55 0000 48e7
0034000  c000 2017 e680 7207 c081 4ced 0002 fffc
0034020  4e5d 4e75 4e55 0000 48e7 c000 2017 ec80
0034040  7203 c081 4ced 0002 fffc 4e5d 4e75 0000
0034060  39b6 0000 3ee8 0000 3ee8 0000 3ee8 0000
0034100  4156 0000 486e 0000 4a00 0000 4a2e 0000
0034120  4b14 0000 4dce 0000 4f38 0000 3dc6 0000
0034140  4bf2 0000 4dea 0000 3f88 0000 4f38 0000
0034160  390a 0000 390c 0000 390f 0000 3912 0000
0034200  3915 0000 3918 0000 391b 0000 391e 0000
0034220  3921 0000 3924 0000 3927 0000 392a 0000
0034240  392d 0000 3930 0000 3933 0000 3936 0000
0034260  3939 0000 393c 0000 393f 0000 3943 0000
0034300  3946 0000 394c 0000 3952 0000 3958 0000
0034320  395e 0000 3962 0000 3967 0000 396c 0000
0034340  0000 0000 3971 0000 3976 0000 397b 0000
0034360  3982 0000 398a 0000 3991 0000 3999 0000
0034400  39a0 0000 39a7 0000 39ae 7400 7261 0068
0034420  6900 6c73 0063 6300 6373 006e 6500 6571
0034440  0076 6300 7673 0070 6e00 0067 6500
0034460  6c74 0067 7400 6c65 0061 7300 6c73 0072
0034500  6f78 0072 6f00 6274 7374 2000 6263 6867
0034520  6263 6273 6c72 6c00 6273 6574 2000 6f72
0034540  6900 61ee 6469 0073 7562 6900 6164 6469
0034560  0065 6f72 6900 616e 7069 0062 6674 7374
0034600  2000 6266 6570 7475 2000 626e 6368 6720
0034620  0062 6665 7074 7320 6c00 6c72 2000
0034640  626e 6666 6f20 0062 6673 6574 2000 6266
0034660  696e 7320 0000 4e55 0000 48e7 ce80 2800
0034700  2004 0800 0008 6700 00b2 2004 6100 fe2c
0034720  7201 b280 672c 2004 6100 fe3a e588 206e
0034740  076e 2030 0800 d0ae 0782 6100 1c90 2004
0034760  6100 158a 6100 1cac 7200 2004 6100 185a
0035000  6074 41fa 0380 2008 6100 1c72 2004 0800
0035020  0006 6706 41fa 0374 6004 41fa 0372 2008
0035040  6100 1c5a 2004 0800 0007 6726 2004 6100
0035060  154c 6100 1c6a 206e 075a 54ae 075a 3050
0035100  2008 6100 1b70 2004 7207 c081 6100 159c
0035120  6024 206e 075a 54ae 075a 3050 2008 6100
0035140  1b54 2004 7207 c081 6100 1580 6100 1c34
0035160  2004 6100 1508 6000 0302 2004 7209 e2a0
0035200  2a00 7204 b280 6628 2004 6100 fd88 e588
0035220  206e 076e 2030 0800 d0ae 0782 6100 1bde
0035240  7201 7001 6100 1bf8 7200 6066
0035260  2004 ec80 7203 c081 7203 b280 6700 00e2
0035300  7007 b085 675a 2005 e588 206e 0772 2030
0035320  0800 d0ae 0782 6100 1ba4 7201 2004 6100
0035340  15fc 2a00 6100 16a8 6100 1bb8 2004 723f
0035360  c081 723c b280 661c 2008 0800 0006 6706
0035400  41fa 0290 6004 41fa 028d 2008 6100 1b6e
0035420  6000 0268 2205 2004 6100 15a0 6000 025c
0035440  41fa 0277 2008 6100 1b54 2004 6100 15ae
0035460  2c00 206e 075a 54ae 075a 3050 2008 2a00
0035500  0800 000b 6706 2005 0800 000f 6710 2004
0035520  720c e2a0 7207 c081 6100 145a 600e 2004
0035540  720c e2a0 7207 c081 6100 1426 6100 1b34
0035560  2206 60a2 2206 2004 6100 16de 6100 1b24
0035600  2005 0800 000f 6712 2004 720c e2a0 7207
0035620  c081 6100 1420 6000 01e2 2004 60e0 01d0
0035640  2004 0800 000b 6700 011c 2004 723f c081
0035660  723c b280 6742 41fa 01e7 2008 6100 1abe
0035700  2004 6100 156e 2c00 206e 075a 54ae 075a
0035720  3050 2004 7207 c081 6100 13b4 6100
0035740  1ac2 2005 ec80 7207 c081 6100 13a4 6100
0035760  1ab2 2206 6000 ff20 206e 075a 54ae 075a
0036000  3c08 206e 075a 54ae 075a 3050 2a08
0036020  41fa 0191 2008 6100 1a64 2004 6100 1514
0036040  2006 7207 c081 6100 1368 41fa 017c 2008
0036060  6100 1a4a 2005 7207 c081 6100 1354 6100
0036100  1a62 2006 ec80 7207 c081 6100 1344 41fa
0036120  015a 2008 6100 1a26 2005 ec80 7207 c081
0036140  6100 132e 6100 1a3c 2006 0800 000f 6710
0036160  2006 720c e2a0 7207 c081 6100 136e 600e
0036200  2006 720c e2a0 7207 c081 6100 138c 41fa
0036220  011c 2008 6100 19e6 2005 0800 000f 6712
0036240  2005 720c e2a0 7207 c081 6100 133e 6000
0036260  00ca 2005 720c e2a0 7207 c081 6100 135a
0036300  6000 00b8 2004 0800 0280 6000 0c80 6000
0036320  0600 6650 2004 e880 0800 0000 672a 41fa
0036340  00ce 2008 6100 1996 206e 075a 54ae 075a
0036360  3010 48c0 0280 0000 00ff 4100 18b8 6100

0036400  19a2 7201 6000 fe10 41fa 00ac 2008 6100
0036420  196c 2004 0800 0003 6706 2004 6000 fe70
0036440  2004 604e 206e 075a 54ae 075a 3050 2008
0036460  2a00 0800 000b 6706 41fa 0081 6004 41fa
0036500  0080 2008 6100 1936 2004 e680 6100 138e
0036520  2c00 2206 2004 6100 1500 6100 1946 2005
0036540  0800 000f 6706 2005 6000 fe20 2005 7202
0036560  e2a0 7207 c081 6100 1216 4ced 0172 ffec
0036600  4e5d 4e75 6d6f 7665 7000 2e6c 2000 2e77
0036620  2000 7372 0063 6372 006d 6f76 6573 0063
0036640  6173 0063 6173 3200 3a00 3a00 3a00 6361
0036660  6c6c 6d20 2300 7274 6d20 0063 6867 3200
0036700  636d 7032 0000 4e55 0000 48e7 cc80 2800
0036720  2004 0800 0008 6700 0086 2004 6100 fa36
0036740  7203 b280 6778 2004 6100 fa19 7201 b280
0036760  6644 41fa 00e5 2008 6100 1882 2004 6100
0037000  12dc 2004 7207 c081 6100 11e0 206e 078e
0037020  52ae 078e 10bc 002b 6100 1888 2004 6100
0037040  f9a4 6100 11c6 206e 078e 52ae 078e 10bc
0037060  002b 6000 009c 41fa 00a7 2008 6100 183e
0037100  2004 6100 1298 2a00 2004 6100 1130 6100
0037120  1852 2205 2004 6100 1400 6000 0074 41fa
0037140  0083 2008 6100 1816 604e 206e 078e 52ae
0037160  078e 10bc 0061 0223: 0000 0100 2004 6100
0037200  130e 2a00 2205 2004 6100 13ce 6100 1814
0037220  2004 6100 1930 411c 6034 2004 6100
0037240  123c 2a00 2205 2004 6100 13ae 6100 17f4
0037260  2004 6100 10c8 6d18 2004 6100 f924 0c80
0037300  0000 0003 67a4 0c80 0000 0007 679c 60cc
0037320  4ced 0132 fff0 4e5d 4e75 636f 706d 0065
0037340  6f72 0063 6d70 0000 41fa 0000 48e7 ec80
0037360  2800 41fa 008e 2008 6100 1782 6030 206e
0037400  078e 52ae 078e 10bc 0062 7a00 6040 206e
0037420  078e 52ae 078e 10bc 006c 7a02 6030 206e
0037440  078e 52ae 078e 10bc 0077 7a01 6020 2004
0037460  720c e2a0 0c80 00ff 6212 0c00 0001
0037500  67bc 0c00 0002 67c6 0c00 0003 67d0 6100
0037520  1770 2205 2004 6100 1300 6100 1746 2205
0037540  2004 6100 f87c f788 2400 2004 6100 f856
0037560  8480 2002 6100 12e2 4ced 0136 ffec 4e5d
0037600  4e75 6d6f 7665 2e00 4e55 0000 48e7 ce80
0037620  2800 3044 2008 6100 f87c 3a00 7203 b240
0037640  6600 0116 3004 0800 000b 6652 3004
0037660  48c0 7209 e2a0 7203 c081 e588 206e 076a
0037700  2030 0800 d0ae 0782 6100 16b2 3004 48c0
0037720  0800 0008 6704 706c 6002 7072 206e 078e
0037740  52ae 078e 1080 41fa 0164 2008 6100 168e
0037760  3045 2208 3044 2008 6100 125e 6000 0144
0040000  3004 48c0 e080 7207 c081 e588 206e 0776
0040020  2030 0800 d0ae 0782 6100 1662 206e 075a
0040040  54ae 075a 3c10 3004 48c0 e080 7207 c081
0040060  7207 b280 6614 3006 48c0 720c e2a0 7207
0040100  c081 6100 0f4c 6100 165a 3045 2208 3044
0040120  2008 6100 1204 41fa 00f8 2008 6100 161e
0040140  3006 48c0 ec80 6100 14dc 41fa 00a6 2008
0040160  6100 160a 3046 2008 6100 14ca 41fa 0036
0040200  2008 6100 15f8 3004 48c0 e080 0800 0000
0040220  6700 00b0 3004 48c0 7209 e2a0 7207 c081
0040240  7207 b280 6700 009c 6100 15f8 3006 48c0
0040260  720c e2a0 6000 0084 3004 48c0 e680 7203
0040300  c081 e588 206e 076a 2030 0800 d0ae 0782
0040320  6100 15aa 3004 48c0 0800 0008 6704 706c
0040340  6002 7072 206e 078e 52ae 078e 1080 3044
0040360  2008 6100 0fa8 3004 48c0 0800 0005 670a
0040400  3044 2008 6100 0a76 6028 206e 078e 52ae
0040420  078e 10bc 0023 3044 2008 6100 f6a8 4a80
0040440  673a 3044 2008 6100 f69c 6002 7008 6100
0040460  1484 6100 156e 3004 48c0 7207 c081 6100
0040500  0e50 4ced 0172 ffec 4e5d 4e75 2e62 2000
0040520  7b00 3a00 7d00 4e55 0000 48e7 ee80 2800
0040540  2004 0800 0008 676a 2004 0800 0006 6742
0040560  2004 6100 f686 4a80 6616 41fa 05dc 2008
0040600  6100 14fa 2004 7207 c081 6100 00e4 603e
0040620  41fa 05ca 2008 6100 14e4 7202 2004 6100
0040640  10b8 6100 14fe 2004 6100 f61a 6100 0e06
0040660  601c 41fa 05b3 2008 6100 14c2 7201 2004
0040700  6100 1096 41fa 14dc 2004 6100 0db0 6000
0040720  057e 6090 0552 2004 6100 f63a 2e00 7203
0040740  b280 6610 41fa 0588 2008 6100 1490 7201
0040760  6000 0220 41fa 0583 6000 020a 2004 6100
0041000  f614 2c00 7203 b280 6610 41fa 0572 2008
0041020  6100 146a 7201 6000 01fa 41fa 056e 2008
0041040  6100 145a 2004 6100 0ab4 2c00 6000 01e2
0041060  2004 6100 f5e0 2c00 7203 b280 6624 41fa
0041100  054e 2008 6100 1436 7201 2004 6100 100a
0041120  6100 1450 41fa 0540 2008 6100 1420 6000
0041140  01b8 41fa 0536 6000 019c 2004 6100 f5a6
0041160  2c00 7203 b280 6624 41fa 0524 2008 6100
0041200  13fc 7201 2004 6100 0fd0 6100 141e 41fa
0041220  0516 2008 6100 13e6 6000 017e 41fa 050b
0041240  6000 0162 2004 6100 f552 7201 b280 6622
0041260  41fa 04fb 2008 6100 13c4 2004 7207 c081
0041300  6100 0cf2 6100 13dc 7201 7002 6100 0f00
0041320  6010 41fa 04df 2008 6100 13a2 7200 6000
0041340  00b4 2004 6100 f514 4a80 6618 41fa 04cb
0041360  2008 6100 1388 2004 7207 c081 6100 0c92
0041400  6000 00ba 2004 6100 f4f2 7201 b280 6618
0041420  41fa 04ad 2008 6100 1364 2004 7207 c081
0041440  6100 1292 6000 0096 41fa 049c 2008 6100
0041460  134c 7202 605a 2004 6100 f4c0 4a80 6614
0041500  41fa 048b 2008 6100 1334 7240 2004 6100
0041520  0e3e 60a2 41fa 047b 2008 6100 1320 7240
0041540  2004 6100 00a2 2c00 206e 075a 54ae 075a
0041560  3050 2a08 2004 6100 f482 7204 b280 6608
0041600  2005 6100 118e 6002 7070 2005 6100 108a 6100
0041620  1312 2206 2004 6100 0ec0 6020 2004 6100
0041640  f474 0c80 0000 0003 6212 d040 303b 0006
0041660  4efb 0002 fef0 ff2e ff82 ff82 6000 0390
0041700  2004 6100 f450 2c00 7203 b280 6632 2004
```

```
0041720  6100 f428 7207 b280 6618 2004 6100 f402
0041740  7206 b280 660c 41fa 03ef 2008 6100 128e
0041760  6026 41fa 03eb 2008 6100 1282 7201 6012
0042000  41fa 03e4 2008 6100 1274 2004 6100 0cce
0042020  2206 2004 6100 0e42 6000 0334 2004 0800
0042040  0007 6736 41fa 03c4 2008 6100 1250 7240
0042060  2004 6100 0d5a 2c00 206e 075a 54ae 075a
0042100  3050 2a08 2206 2004 6100 0e0e 6100 1254
0042120  2005 6100 0fc6 6000 02f6 206e 075a 54ae
0042140  075a 3050 2a08 2004 0800 0006 6706 41fa
0042160  0380 6004 41fa 037e 2008 6100 1200 2005
0042200  0800 000b 6706 41fa 0370 6004 41fa 036c
0042220  2008 6100 11e8 2004 0800 0006 6726 2005
0042240  7207 c081 2205 740c e4a1 7407 c282 b081
0042260  6712 2005 720a e2a0 0800 0000 6606 41fa
0042300  033c 6004 41fa 033b 2008 6100 11b0 7202
0042320  2004 6100 0d84 6100 11ca 2004 0800 0006
0042340  6726 2005 7207 c081 2205 740c e4a1 7407
0042360  c2a2 b081 4700 01ba 2005 7207 c081 6100
0042400  0a90 41fa 0301 6018 2005 0800 000a 6700
0042420  01a0 2005 7207 c081 6100 0a76 41fa 02e9
0042440  2008 6100 1158 6000 0188 2004 0800 0005
0042460  6600 0190 2004 0800 0004 6618 41fa 02cb
0042500  2008 6100 1138 2004 720f c081 6100 1066
0042520  6000 01fc 2004 0800 0003 6718 41fa 02b2
0042540  2008 6100 1118 2004 7207 c081 6100 0b46
0042560  6000 01dc 41fa 02a0 2008 6100 1100 2004
0042600  7207 c081 6100 0a2e 6100 1118 7201 7001
0042620  6100 0c3c 6000 01b8 41fa 0282 60c2 41fa
0042640  0288 2008 6100 10d6 2004 7207 c081 6100
0042660  0a04 6100 10ee 41fa 0278 6042 41fa 0276
0042700  603c 41fa 0276 6036 41fa 0274 600a 41fa
0042720  0275 602a 41fa 0273 2008 6100 10a0 206e
0042740  075a 54ae 075a 3050 2008 6000 ff60 41fa
0042760  025f 600a 41fa 025d 6004 41fa 025d 2008
0043000  6100 107a 6000 0148 2004 7207 c081 0c80
0043020  0000 0007 6200 0138 d040 303b 0006 4efb
0043040  0002 ff9a ffa0 ffa6 ffac ffb2 ffcc ffd2
0043060  ffd8 6000 011a 41fa 0225 2008 6100 103e
0043100  206e 075a 54ae 075a 3050 2a08 2004 0800
0043120  0000 673a 2005 0800 000f 6710 2005 720c
0043140  e2a0 7207 c081 6100 094c 600e 2005 720c
0043160  e2a0 7207 c081 6100 0918 6100 1026 2005
0043200  0280 0000 0fff 6100 09c0 6000 00c2 2005
0043220  0280 0000 0fff 6100 09b0 6100 1006 2005
0043240  0800 000f 670a 2005 720c e2a0 6000 feba
0043260  2005 720c e2a0 7207 c081 6100 08d4 6000
0043300  008e 2004 6100 f134 5980 0c80 0000 0003
0043320  6200 007c d040 303b 0006 4efb 0002 feba
0043340  fec0 ff2a ff58 6066 41fa 017a 6004 41fa
0043360  0179 2008 6100 0f86 7200 2004 6100 0b5a
0043400  604c 2004 6100 f0da 0c80 0000 00ff 623e
0043420  0c00 0001 6700 fe14 0c00 0002 67ca 0c00
0043440  0003 67ca 6028 2004 6100 f09a 0c80 0000
0043460  0007 621a d040 303b 0006 4eff 0002 fa98
0043500  fabe faf2 fb2c fc5e fc82 fcde ffc4 4ced
0043520  0176 ffa8 4e5d 4e75 6578 7462 2e6c 2000
0043540  6c65 612e 6c20 0063 686b 2e77 2000 6d6f
0043560  7665 2e77 2073 722c 006e 6567 7800 6d6f
0043600  7665 2e77 2063 6372 2c00 636c 7200 6d6f
0043620  7665 2e77 2063 6363 7200 6e65 6700 6d6f
0043640  7665 2e77 2000 7372 006e 6f74 006c 696e
0043660  6b20 006e 6263 6420 0073 7761 7020 0062
0043700  6b70 7420 2300 7065 612e 6c20 0065 7874
0043720  006d 6f76 656d 0069 6c6c 6567 616c 0074
0043740  6173 2e62 2020 7473 7400 6d6f 7665 6d00
0043760  6469 7600 6d75 6c00 7300 7500 6c20 6c20
0044000  002e 6c20 003a 003a 0074 7261 7020 2300
0044020  756e 6c6b 2000 6c69 6e6b 2000 6d6f 7665
0044040  2e6c 2073 7370 2c00 6d6f 7665 2e6c 2000
0044060  7573 7000 7265 7365 7400 6e6f 7000 7374
0044100  6f70 2023 0072 7465 0072 7464 2023 0072
0044120  7473 0074 7261 7076 0072 7472 006d 6f76
0044140  6563 2000 6a73 7220 006a 6d70 2000 4e55
0044160  0000 48e7 cc80 2800 2004 6100 ef98 2a00
0044200  7203 b280 6600 0102 2004 6100 efde 7201
0044220  b280 6606 41fa 014c 6022 2004 6100 ef5c
0044240  7207 b280 6612 2004 720f c081 7201 b280
0044260  6c06 41fa 0131 6004 41fa 0130 2008 6100
0044300  0dbc 2004 e080 720f c081 e588 206e 0766
0044320  2030 0800 d0ae 0782 4ced 012c 2004 6100
0044340  ef1a 7201 b280 662c 6100 0dd6 2004 7207
0044360  c081 6100 069c 6100 0daa 206e 075a 54ae
0044400  075a 3010 48c0 d0ae 0786 5480 6100 0d18
0044420  6000 00c6 2004 6100 eee2 7207 b280 6662
0044440  2004 7207 c081 7201 b280 6c56 2004 7207
0044460  c081 7202 b280 661e 41fa 00b2 2008 6100
0044500  0d3c 206e 075a 54ae 075a 3050 2008 6100
0044520  0c64 6000 0084 2004 7207 c081 7203 b280
0044540  6600 00f6 41fa 00b 2008 6100 0410 206e
0044560  075a 54ae 075a 2010 6100 0c3a 54ae 075a
0044600  6056 6100 0d3c 6048 2004 0800 0008 6706
0044620  41fa 0064 6004 41fa 0063 2008 6100 0cde
0044640  2004 6100 0738 2a00 206e 078e 52ae 078e
0044660  10bc 0023 2004 6100 ee0c 4a80 6708 2004
0044700  6100 ee02 6002 7008 6100 0bea 6100 0cd4
0044720  7200 2004 6100 0882 4ced 0132 fff0 4e5d
0044740  4e75 6462 0074 7261 7000 7300 2e77 2023
0044760  002e 6c20 2300 7375 6271 0061 6464 7100
0045000  4e55 0000 48e7 ce80 2800 4680 6030 41fa
0045020  6004 41fa 00aa 2008 601c 206e 078e 52ae
0045040  078e 10bc 002d 2005 e588 206e 0766 2030
0045060  0800 d0ae 0782 6100 d0ae 6018 2004 e080
0045100  720f c081 2a00 4a80 67c8 0c80 0000 0001
0045120  67ba 60c6 1004 1200 6736 70ff b006 6620
0045140  41fa 0060 2008 6100 0c14 206e 075a 2010
0045160  d0ae 0786 5480 6100 0bae 58ae 075a 6030
0045200  41fa 0044 2008 6100 0bf4 1006 4880 6014
```

```
0045220  41fa 0038 2008 6100 0be4 206e 075a 54ae
0045240  075a 3010 48c0 d0ae 0786 5480 6100 0b78
0045260  4ced 0172 ffec 4e5d 4e75 6273 7200 6272
0045300  6100 2e6c 2000 2e73 2000 2e77 2000 4e55
0045320  0000 48e7 8c80 2800 41fa 0030 2008 6100
0045340  0b9c 3004 48c0 0280 0000 00ff 4880 48c0
0045360  6100 0ac2 6100 0bac 3044 2008 6100 047e
0045400  4ced 0130 fff4 4e5d 4e75 6d6f 7665 712e
0045420  6c20 2300 4e55 0000 48e7 c080 2017 6100
0045440  ecc0 7205 b280 670e b017 6100 ecb4 7206
0045460  b280 6600 009c 2017 e880 7203 c081 6600
0045500  0090 2017 6100 ec9a 7205 b280 6606 41fa
0045520  023c 6004 41fa 023c 2008 6100 0b20 2017
0045540  6100 ec98 4a80 6732 206e 078e 52ae 078e
0045560  10bc 002d 2017 7207 c081 6100 046e 6100
0045600  0b22 206e 078e 52ae 078e 10bc 002d 2017
0045620  6e32 6100 0454 6014 2017 7207 c08f
0045640  6100 03ee 6100 0afc 2017 6100 03d0 41fa
0045660  01e8 2008 6100 0ac6 206e 075a 54ae 075a
0045700  3010 48c0 0240 0000 ffff 6100 09a8 6018
0045720  487a 01c9 487a 01c7 41fa 01c7 2208 202f
0045740  0008 6100 00a8 508f 4ced 0102 fff8 4e5d
0045760  4e75 4e55 0000 48e7 cc80 2800 2004 e680
0046000  723f c081 2a00 7228 b280 6620 41fa 0196
0046020  2008 6100 0a68 2004 6100 0362 6100 0a84
0046040  2004 7207 c081 6100 0368 6056 7029 b085
0046060  6624 41fa 0175 2008 6100 0a42 2004 6100
0046100  eb84 6100 0370 6100 0a5a 2004 7207 c081
0046120  6100 0362 602e 7031 b085 6612 41fa 0150
0046140  2008 6100 0a18 2004 6100 0312 60d8 487a
0046160  0143 487a 0141 41fa 0141 2208 2004 6100 0c
0046200  508f 4ced 0132 fff0 4e5d 4e75 4e55 0000
0046220  48e7 cc80 2800 2004 6100 eb46 7203 b280
0046240  6618 202f 001c 6100 09d4 41fa 0111 2008
0046260  6100 09ca 7201 6000 00ba 2004 6100 eb22
0046300  7207 b280 660e 202f 001c 6100 09b0 41fa
0046320  00f2 60da 2004 6100 eb08 7204 b280 6664
0046340  2004 e880 7203 c081 665a 202f 0020 6100
0046360  098c 41fa 00d3 2008 6100 0982 2004 6100
0046400  eafa 4a80 6732 206e 078e 52ae 078e 10bc
0046420  002d 2004 7207 c081 6100 02d0 6100 0984
0046440  206e 078e 52ae 078e 10bc 002d 2004 6100
0046460  ea94 6100 02b6 604a 2004 7207 c081 6100
0046500  0250 6034 202f 0004 6100 0932 2004 6100
0046520  038c 2a00 2004 0800 0008 6714 2004 6100
0046540  021c 6100 093e 2205 2004 6100 04ec 6012
0046560  2205 2004 6100 04e2 6100 0928 2004 6100
0046600  01fc 4ced 0130 fff4 4e5d 4e75 7061 636b
0046620  2000 756e 706b 2000 2c23 0073 0064 6976
0046640  006f 7200 6578 6720 0065 7867 2000 6578
0046660  6720 0061 006d 756c 0061 6464 0075 2e77
0046700  2000 732e 7720 0062 6364 2e62 2000 4e55
0046720  0000 48e7 c080 41fa 0158 2208 2017 6126
0046740  4ced 0102 fff8 4e5d 4e75 4e55 0000 48e7
0046760  c080 41fa 0140 2208 2017 610a 4ced 0102
0047000  fff8 4e5d 4e75 4e55 0000 48e7 8c80 2800
0047020  202f 0004 6100 0866 2004 0800 0008 6700
0047040  00ec 2004 6100 e9ee 7203 b280 6700 00de
0047060  2004 e880 7203 c081 6600 00d2 206e 078e
0047100  52ae 078e 10bc 0078 2004 6100 0290 2004
0047120  0800 0003 6734 206e 078e 52ae 078e 10bc
0047140  002d 2004 7207 c081 6100 0180 6100 0834
0047160  206e 078e 52ae 078e 10bc 002d 2004 6100
0047200  e944 6100 0166 6000 009e 2004 7207 c081
0047220  6100 00fe 6100 080c 2004 6100 00a0 6000
0047240  0086 206e 078e 52ae 078e 10bc 0061 223c
0047260  0000 0100 2004 6100 02d6 2a00 2205 2004
0047300  6100 0396 6100 07dc 206e 078e 52ae 078e
0047320  0064 6052 2004 6100 0204 2a00 2004 0800
0047340  0008 6714 2004 6100 0094 6100 07b6 2205
0047360  2004 6100 0364 602e 2205 2004 6100 035a
0047400  6100 07a0 2004 6100 0074 601a 2004 6100
0047420  e8d0 0c80 0000 0003 6708 0c80 0000 0007
0047440  6700 ff80 60ae 4ced 0130 fff4 4e5d 4e75
0047460  7375 6200 6164 6400 0000 48e7 8080
0047500  41fa 0634 2008 6100 0734 2017 6100 06de
0047520  4ced 0100 fff8 4e5d 4e75 4e55 0000 48e7
0047540  8080 41fa 0619 2008 6100 0712 2017 6100
0047560  06b6 4ced 0100 fffc 4e5d 4e75 4e55 0000
0047600  48e7 8000 2017 6100 e83c 4104 4e5d 4e75
0047620  4e55 0000 48e7 8080 206e 078e 52ae 078e
0047640  10bc 0064 2017 6100 060c 4ced 0100 fffc
0047660  4e5d 4e75 4e55 0000 48e7 8080 7008 b097
0047700  660c 41fa 05c0 2008 6100 06b2 6012 206e
0047720  078e 52ae 078e 10bc 0061 2017 6100 05d6
0047740  4ced 0100 fffc 4e5d 4e75 4e55 0000 48e7
0047760  8080 206e 078e 52ae 078e 10bc 0028 2017
0050000  61b2 206e 078e 52ae 078e 10bc 0029 4ced
0050020  0100 fffc 4e5d 4e75 4e55 0000 48e7 8080
0050040  206e 078e 52ae 078e 10bc 0028 2017 6100
0050060  ff60 206e 078e 52ae 078e 10bc 0029 4ced
0050100  0100 fffc 4e5d 4e75 4e55 0000 48e7 8080
0050120  6036 41fa 0533 6028 41fa 0531 6022 41fa
0050140  052f 601c 41fa 052e 6016 41fa 052c 6010
0050160  41fa 052a 600a 41fa 0529 6004 41fa 0527
0050200  2008 6100 05f8 604a 2017 0c80 0000 0801
0050220  67d8 6222 0c40 0002 67c4 6210 0c80 0000
0050240  0001 67b4 622c 4a80 67a8 4026 0c80 0000
0050260  0000 67b0 601c 0c80 0000 0803 67b8 620a
0050300  0c80 0000 0802 67a8 6008 0c80 0000 0804
0050320  67aa 4ced 0100 fffc 4e5d 4e75 4e55 0000
0050340  48e7 8c80 2800 2004 6100 e72a 2a00 206e
0050360  078e 52ae 078e 10bc 002c 7002 b085 6604
0050400  706c 6014 7001 b085 6604 7077 600a 4a85
0050420  6604 7062 6002 703f 206e 078e 52ae 078e
0050440  1080 6100 059c 2005 4ced 0130 fff4 4e5d
0050460  4e75 4e55 0000 48e7 cc80 2800 2004 7209
0050500  e2a0 7203 c081 2a00 206e 078e 52ae 078e
```

```
0050520  10bc 002e 7003 b085 6604 706c 5016 7002
0050540  b085 6604 7077 600c 7001 b085 6604 7062
0050560  6002 703f 206e 078e 52ae 078e 1080 6100
0050600  0540 2005 4ced 0132 fff0 4e5d 4e75 4e55
0050620  0000 48e7 cc20 2800 2a01 246e 078e 56ae
0050640  078e 14fc 002e 2004 c085 6704 706c 6002
0050660  7077 14c0 14fc 0020 2004 c085 6704 7002
0050700  6002 7001 4ced 0430 fff4 4e5d 4e75 4e55
0050720  0000 48e7 c880 2800 4aaf 0004 670c 206e
0050740  078e 52ae 078e 10bc 0023 206e 078e 52ae
0050760  078e 10bc 0024 603e 206e 075a 58ae 075a
0051000  2010 6100 0422 6046 206e 075a 54ae 075a
0051020  3050 2008 6100 0416 6034 206e 075a 54ae
0051040  075a 3010 48c0 0280 0000 00ff 4880 48c0
0051060  6100 0416 6018 0c84 0000 00ff 6210 4a04
0051100  67d8 0c04 0001 67c0 0c04 0002 67aa 4ced
0051120  0110 fff8 4e5d 4e75 4e55 0000 48e7 cf80
0051140  2800 2a01 5d8f 2004 7207 c081 2c00 6000
0051160  0174 2006 6100 fd1a 6000 0194 2006 6100
0051200  fd34 6000 018a 206e 078e 52ae 078e 10bc
0051220  002d 6036 2006 6100 fd52 206e 078e 52ae
0051240  078e 10bc 002b 6000 0166 4fef ffde 206e
0051260  078e 52ae 078e 10bc 0024 206e 075a 54ae
0051300  075a 3050 2008 5100 0344 2006 6100 fd1c
0051320  6000 013c 4fef ffde 206e 075a 54ae 075a
0051340  3050 2e08 1f47 0001 206e 078e 52ae 078e
0051360  10bc 0024 102f 0001 4880 48c0 6100 032e
0051400  206e 078e 52ae 078e 10bc 0028 2006 6100
0051420  fca4 6100 038e 2007 720c e2a0 7207 c081
0051440  2f40 0002 2007 0800 000f 670a 202f 0002
0051460  6100 fc82 6008 202f 0002 6100 f254 2007
0051500  0800 000b 6706 41fa 0261 6004 41fa 025e
0051520  2008 6100 0328 206e 078e 52ae 078e 10bc
0051540  0029 6000 00aa 206e 078e 52ae 078e 10bc
0051560  0024 206e 075a 54ae 075a 3050 2008 6100
0051600  02ac 6000 008a 206e 078e 52ae 078e 10bc
0051620  0024 206e 075a 58ae 075a 2010 6100 0288
0051640  606c 7c08 6000 ff04 7c08 6000 ff28 7201
0051660  2005 6100 fe1a 6056 41fa 01f5 2008 6100
0051700  02bc 604a 2006 0c80 0000 0004 62ea 4040
0051720  303b 0006 4efb 0002 ff8e ffae ffca ffd0
0051740  ffd6 602a 2004 e680 7207 c081 0c80 0000
0051760  0007 621a 4040 0006 4efb 0002 fe74
0052000  fe7e fecc fe96 fe88 feac fed6 ffc6 5c8f
0052020  4ced 01f0 ffac 4e5d 4e75 4e55 0000 48e7
0052040  8c00 2800 20ff 6126 7a00 600e 7001 eba8
0052060  c084 6704 2005 6116 5285 7010 b085 6eec
0052100  70ff 610a 4ced 0030 fff8 4e5d 4e75 4e55
0052120  0000 48e7 8880 2800 70ff b084 6620 4aae
0052140  07ea 6708 202e 07e6 6100 0086 7000 2d40
0052160  07ea 2d40 07e2 7014 2d40 07e6 6068 202e
0052200  07e6 5280 b880 6628 7008 b084 6722 4aae
0052220  07e2 670c 206e 078e 52ae 078e 10bc 002d
0052240  42ae 07e2 7001 2d40 07ea 2d44 07e6 6036
-0052260  4aae 07ea 6710 202e 07e6 6134 42ae 07ea
0052300  7001 2d40 07e2 4aae 07e2 670c 206e 078e
0052320  52ae 078e 10bc 002c 2004 6114 2d44 07e6
0052340  7001 2d40 07e2 4ced 0110 fff8 4e5d 4e75
0052360  4e55 0000 48e7 8000 7008 b097 6f08 2017
0052400  6100 fa8e 6008 2017 5180 5100 faa8 4e5d
0052420  4e75 4e55 0000 48e7 ee00 2800 7e00 7a10
0052440  6012 2006 e388 2204 7401 c282 8081 2c00
0052460  e284 5385 4a85 6eea 2006 4ced 0076 ffec
0052500  4e5d 4e75 4e55 0000 48e7 c800 2800 2004
0052520  0800 0005 670c 2004 7207 c081 6100 fa32
0052540  600a 2004 721f c081 6100 004a 4ced 0012
0052560  fff8 4e5d 4e75 4e55 0000 48e7 8080 2800
0052600  6c20 2400 7063 0073 6663 0064 6663 0063
0052620  6163 7200 7573 7000 7662 7200 6361 6172
0052640  006d 7370 0069 7370 002e 6c00 2e77 003f
0052660  3f3f 0000 4a80 6a12 2f08 206e 078e 10fc
0052700  002d 2d48 078e 205f 4a80 48e7 7080 76ff
0052720  0c80 0001 0000 6522 3200 4240 4840 80fc
0052740  000a 3400 3001 80fc 000a 4840 0600 0030
0052760  1f00 5283 3002 4840 60d6 80fc 000a 2200
0053000  4841 0601 0030 1f01 5283 c0bc 0000 ffff
0053020  66e8 206e 078e 10df 51c6 fffc 2d48 078e
0053040  4cdf 010e 4e75 4840 6102 4840 48e7 80c0
0053060  41ef 0002 226e 078e 6a2e 5289 6122 2d49
0053100  078e 4cdf 0301 4e75 48e7 80c0 41ef 0003
0053120  226e 078e 610a 2d49 078e 4cdf 0301 4e75
0053140  1010 e808 6102 1010 c03c 000f 0600 0030
0053160  0c00 0039 6302 5e00 12c0 4e75 4e55 0000
0053200  48e7 88a0 2404 600a 206e 078e 52ae 078e
0053220  1084 101a 1800 66f0 4ced 0510 fff4 4e5d
0053240  4e75 4e55 0000 48e7 8080 206e 078e 52ae
0053260  078e 10bc 002c 4ced 0100 fffc 4e5d 4e75
0053300  4e55 0000 48e7 8080 206e 078e 52ae 078e
0053320  10bc 0020 4ced 0100 fffc 4e5d 4e75 4e55
0053340  0000 48e7 ce00 2800 2a01 7c00 701e b084
0053360  6632 7022 b0fc 0740 662a 6100 0510 5016
0053400  6100 0538 721d b280 6604 7020 601c 7001
0053420  b085 6702 611e 2006 5286 b085 6de2 6100
0053440  04b6 6006 701f b084 7021 4ced 0070 fff4
0053460  4e5d 4e75 4e55 0000 48e7 8000 518f 4297
0053500  42af 0004 6008 2017 d197 52af 0004 0caf
0053520  0000 0100 0004 6dee 508f 4e5d 4e75 48e7
0053540  c000 2f0e 2c7a acba 3004 0278 223c 0000
0053550  4e75 48e7 c000 ff6a 0c80 0000 0020 6600 000c
0053600  2c5f 4cdf 0003 6000 c0c4 2c5f 4cdf 0003
0053620  4e75 48e7 c000 2f0e 2c7a a:86 4af0 0000
0053640  5772 4e55 0000 48e7 8800 202e 0468 200e
0053660  2c44 4ced 0010 fffc 4e5d 4e75 2c40 4e75
0053700  4e55 0000 48e7 c000 3d7c 0023 0740 6100
0053720  03a2 203a ac8e 6100 0b76 0800 0002 6722
0053740  223c 6100 1005 203a ac7a 5100 0ce0 203a
0053760  ac72 6100 0b5a 0800 0002 6606 3d7c 0022
0054000  0740 6100 03da 4ced 0002 fffc 4e5d 4e75
0054020  4e55 0000 48e7 8000 4e5d 4e75 4e55 0000
```

```
0054040  48e7 c880 5d8f 383a ac3c 1f6f 0009 0005
0054060  41ef 0005 2e88 6014 486f 0006 41ef 0004
0054100  2208 7000 3004 6100 0b76 588f 41ef 0005
0054120  b1d7 67e4 5c8f 4ced 0112 fff4 4e5d 4e75
0054140  4e55 0000 48e7 c0a0 2441 5d8f 6000 0162
0054160  7000 302f 0024 6100 018a 1f40 0001 102f
0054200  0001 4880 48c0 7000 0112 fff4 c081 7211 b280 663a
0054220  206f 001e 7014 b010 660a 206f 001e 10bc
0054240  0012 6008 206f 001e 10bc 0011 102f 0009
0054260  4880 48c0 2f00 7000 302f 0028 2200 202f
0054300  002a 6100 0186 588f 6020 102f 0001 4880
0054320  48c0 727f c081 7213 b280 670e 156f 0001
0054340  0001 206f 001e 10bc 0014 206f 001e 7013
0054360  b010 6700 ff7c 206f 001e 7014 b010 6f00
0054400  ff70 6000 00f2 206f 001e 10bc 0011 41ef
0054420  0001 2f48 0002 486f 0002 41ef 0006 2208
0054440  7000 302f 0024 6100 0652 588f 41ef 0001
0054460  53af 0002 b1ef 0002 6640 206f 0002 1010
0054500  48c0 727f c081 7213 b280 661e 206f
0054520  001e 7012 b010 660a 206f 001e 10bc 0014
0054540  6018 206f 001e 10bc 0013 600e 156f 0001
0054560  0001 206f 001e 10bc 0012 206f 001e 7013
0054600  b010 670a 206f 001e 7014 b010 6624 2f2f
0054620  0026 7000 302f 2f00 2f2f 0026 220a
0054640  102f 0015 4880 48c0 6100 feb6 4fef 000c
0054660  6044 102f 0009 4880 48c0 2f00 7000 302f
0054700  0028 2200 202f 002a 6100 0080 588f 6026
0054720  206f 001e 1010 4880 0440 0011 0c40 0003
0054740  6200 ff24 d040 303b 0006 4efb 0002 ffc0
0054760  ff20 fefc fef: 5c8f 4ced 0500 fff8 4e5d
0055000  4e75 4e55 0000 48e7 c080 5d8f 41ef 0005
0055020  2e88 601a 6100 fdfa 486f 0006 41ef 0004
0055040  2208 7000 302f 000c 6100 0550 588f 41ef
0055060  0005 b1d7 67de 102f 0005 4880 48c0 5c8f
0055100  4ced 0102 fff8 4e5d 4e75 4e55 0000 48e7
0055120  c080 5d8f 41ef 0005 2e88 1f6f 001d 0005
0055140  601c 6100 fdac 486f 0006 41ef 0004 2208
0055160  7000 302f 0010 206f 000a 4e90 588f 41ef
0055200  0005 b1d7 67dc 5c8f 4ced 0100 fffc 4e5d
0055220  4e75 4e55 0000 48e7 c830 2441 266f 001c
0055240  604c 16bc 0011 6004 16bc 0013 182a 0001
0055260  605c 16bc 0011 7000 302f 0002 6100 f444
0055300  1800 1004 4880 48c0 727f c081 7213 b280
0055320  6606 16bc 0013 6036 1004 4880 48c0 727f
0055340  c081 7211 b280 6626 16bc 0011 6020 1013
0055360  4880 0440 0011 0c40 0003 62b6 d040 303b
0055400  0006 4efb 0002 ffb0 ff90 ff10 ffa2 1004
0055420  4880 48c0 4ced 0c1f fff4 4e5d 4e75 4e55
0055440  0000 48e7 cc80 558f 3e8a a93a 486e 07f2
0055460  41ee 07ee 2208 7000 302f 0004 6100 ff54
0055500  588f 1a00 1800 707f ca00 7011 b005 6710
0055520  7013 b005 670a 1004 4880 48c0 6100 0188
0055540  1004 4880 48c0 548f 4ced 0132 fff0 4e5d
0055560  4e75 4e55 0000 48e7 c800 383a a8e8 7000
0055600  3004 6100 02d2 7000 303a a83c 2200 7000
0055620  3004 6100 059c 7000 303a a8d2 2f00 7000
0055640  303a a8c8 2f00 7000 303a a8be 2200 7000
0055660  303a a8d0 0684 508f 223c 0000 1006 7000
0055700  3004 6100 044a 223c 0000 1004 7000 3004
0055720  6100 08fa 4ced 0012 fff8 4e5d 4e75 4e55
0055740  0000 48e7 c000 223c 0000 1005 203a a874
0055760  6100 08da 223c 0000 1002 203a a866 6100
0056000  08cc 4ced 0002 fffc 4e5d 4e75 4e55 0000
0056020  48e7 c000 223c 0000 1003 203a a846 6100
0056040  08ac 223c 0000 1004 203a a838 6100 089e
0056060  4ced 0002 fffc 4e5d 4e75 4e55 0000 48e7
0056100  c880 383a a820 486e 07f2 41ee 07ee 2208
0056120  7000 3004 610c 588f 4ced 0112 fff4 4e5d
0056140  4e75 4e55 0000 48e7 c0b0 2441 266f 001c
0056160  598f 2e8a 6032 16bc 0011 486a 0001 41ef
0056200  0004 2208 7000 302f 000a 6100 02ea 588f
0056220  6036 16bc 0013 7012 b013 6604 16bc 0011
0056240  5297 14aa 0001 6020 1013 4880 0440 0011
0056260  0c40 0003 62c0 d040 303b 0006 4efb 0002
0056300  ffba ffd6 ffba ffd2 200a 5280 b097 6304
0056320  70ff 6006 1012 4880 48c0 588f 4ced 0d00
0056340  fff4 4e5d 4e75 4e55 0000 48e7 c880 598f
0056360  383a a772 41fa 06c8 2e88 2f17 7000 3004
0056400  6100 086e 07ee 2208 102f 0013 4880
0056420  48c0 48c0 6100 fb4a 4fef 000c 7006 b02f
0056440  0007 6604 700a 61be 588f 4ced 0112 fff4
0056460  4e5d 4e75 4e55 0000 48e7 c080 558f 3e8a
0056500  a730 486e 07f3 41ee 07f0 2208 7000 302f
0056520  0004 6100 ff0a 588f 548f 4ced 0102 fff8
0056540  4e5d 4e75 4e55 0000 48e7 c880 598f 383a
0056560  a700 41fa 06ba 2e88 2f17 7000 3004 2f00
0056600  486e 07f3 41ee 07f0 2208 102f 0013 4880
0056620  48c0 6100 facc 4fef 000c 588f 4ced 0112
0056640  fff4 4e5d 4e75 4e55 0000 48e7 cc80 3a3a
0056660  a6c0 486e 07f3 41ee 07f0 2208 7000 3005
0056700  6100 fcd0 588f 1800 1004 4880 48c0 4ced
0056720  0132 fff0 4e5d 4e75 4e55 0000 48e7 c800
0056740  383a a68e 7000 3004 6100 066c 7000 303a
0056760  a682 2200 7000 3004 6100 0336 7000 303a
0057000  a678 2f00 7000 303a a66e 2f00 7000 303a
0057020  a664 2200 7000 3004 6100 041e 508f 223c
0057040  0000 1006 7000 3004 6100 01e4 4ced 0012
0057060  fff8 4e5d 4e75 4e55 0000 48e7 c000 223c
0057100  0000 1002 203a a628 6100 0682 4ced 0002
0057120  fffc 4e5d 4e75 4e55 0000 48e7 f8b8 4fef
0057140  ffec 78ff 7004 b06f 0016 6f00 00fe 302f
0057160  0016 48c0 c588 41fa a650 2470 0800 302f
0057200  0016 48c0 7202 c081 c588 41fa a63c 2670
0057220  0800 302f 0016 48c0 7202 c081 c588 41fa
0057240  a630 2870 0800 357c 0020 0004 357c 0030
0057260  0004 357c 0040 0004 357c 0010 0004 42af
0057300  0006 022f ffe3 0008 022f 0010 0008 022f
0057320  fffc 0008 022f 0003 0008 022f 003f 0009
0057340  022f fff0 0009 022f 0007 0009 202f 0006
```

```
0057360 e088 3480 34af 0008 022f fff0 000d 002f
0057400 0009 000d 022f 000f 000d 002f 0090 000d
0057420 356f 000c 0002 1f6c 001b 0005 7000 102f
0057440 0005 7205 342f 0016 48c2 7601 c483 588f
0057460 e5a9 4681 c081 1f40 0005 7000 102f 0005
0057500 3740 001a 7000 102f 0005 3940 001a 426b
0057520 000a 426b 0018 426b 0008 7800 4297 6002
0057540 5297 0c97 0000 0400 65f6 2004 4fef 0014
0057560 4ced 1d1e ffa0 4a5d 4e75 4e55 0000 48e7
0057600 ceae 518f 78ff 7004 b06f 000a 6372 7800
0057620 7000 302f 000a e588 41fa a52e 2470 0800
0057640 603c 206f 000c 2250 5290 12aa 0007 202f
0057660 0004 0280 0000 00f0 6724 282f 0004 357c
0057700 0020 0004 357c 0030 0004 357c 0040 0004
0057720 357c 0001 0004 357c 0004 0004 6022 1000
0057740 302a 0002 2f40 0004 102f 0007 0200 0001
0057760 4a00 670c 206f 000c 2010 b0af 0028 65a2
0060000 2004 508f 4ced 0710 fff0 4a5d 4e75 4e55
0060020 0000 48e7 efb8 2800 4fef fff6 70ff 2e80
0060040 7004 b044 6300 00fa 4297 7000 3004 7202
0060060 c081 e588 41fa a492 2470 0800 7000 3004
0060100 7202 c081 e588 41fa a488 2670 0800 7000
0060120 3004 e588 41fa a472 2870 0800 7001 7200
0060140 3204 7401 c282 5881 e3a8 2c00 7001 7200
0060160 3204 7401 c282 e589 5281 e3a8 2f40 0006
0060200 6028 7e00 7a00 397c 0001 0004 6044 7e00
0060220 7a00 397c 0002 0004 6038 2a06 2e2f 0006
0060240 6030 7000 2e00 2a00 6028 302f 0010 0440
0060260 1000 0c40 0007 621a d040 303b 0006 4efb
0060300 0002 ffd8 ffe0 0010 0010 0010 0010 ffc0
0060320 ffcc 7000 302b 001a 2206 4681 c081 8085
0060340 1f40 0005 7000 302b 000a 222f 0006 4681
0060360 c081 8087 1f40 0004 7000 102f 0005 3540
0060400 001a 7000 102f 0004 3540 000a 7000 102f
0060420 0005 3740 001a 7000 102f 0004 3740 000a
0060440 2017 4fef 000a 4ced 1df4 ffdc 4a5d 4e75
0060460 4e55 0000 48e7 c0a0 4fef fff6 70ff 2f40
0060500 0006 7004 b06f 000c 6300 00dc 42af 0006
0060520 7000 302f 000c e588 41fa a36e 2470 0800
0060540 4297 605e 426f 0004 6000 008a 3f7c 0001
0060560 0004 6000 0080 3f7c 0002 0004 6000 0076
0060600 3f7c 0004 0004 6000 006c 3f7c 0005 0004 6064
0060620 3f7c 0006 0004 605c 3f7c 0008 0004 6054
0060640 3f7c 0009 0004 604c 3f7c 000b 0004 6044
0060660 3f7c 000c 0004 603c 70ff 2f40 0006 6034
0060700 302f 0010 0c40 000f 62ee d040 303b 0006
0060720 4efb 0002 ff90 ff04 ff98 ffa2 ffa4 ffac
0060740 ffb4 ffbc ffc4 ffc4 ffc4 ffc4 ffcc ffe4
0060760 ffd4 ffdc 4aaf 0006 662c 022f fff0 0003
0061000 102f 0005 720f c001 812f 0003 022f 000f
0061020 0003 102f 0005 720f c001 e908 812f 0003
0061040 356f 0002 0002 202f 0006 4fef 000a 4ced
0061060 0500 fff8 4a5d 4e75 4e55 0000 48e7 c0a0
0061100 70ff 2f40 2f40 0004 7004 b06f 000a 6300
0061120 00ee 7000 302f 000a e588 41fa a24e 2470
0061140 0800 4297 6036 022f fffc 0002 002f 0001
0061160 0002 6000 0086 022f fffc 0002 002f 0002
0061200 0002 6000 0076 022f fffc 0002 606c 022f
0061220 fffc 0002 022f 0003 0002 605e 302f 000e
0061240 0c40 0003 62e8 d040 303b 0006 4efb 0002
0061260 ffb6 ffc6 ffde ffd6 6040 022f ffe3 0002
0061300 002f 0004 0002 6050 022f ffe3 0002 6048
0061320 022f ffe3 0002 002f 000c 0002 603a 022f
0061340 ffe3 0002 002f 000a 0002 602c 022f ffe3
0061360 0002 022f 0010 0002 601e 302f 0022 0c40
0061400 6208 d040 303b 0006 4efb 0002 ffde
0061420 ffbc ffba ffcc ffa0 022f fff0 0003 102f
0061440 0027 720f c001 812f 0003 357c 0010 0004
0061460 2017 e088 3480 34af 0004 02af 0004 022f
0061500 0004 508f 4ced 0500 fff8 4a5d 4e75 4e55
0061520 0000 48e7 c0b0 4fef fff0 70ff 2f40 000c
0061540 7004 b06f 0012 6344 7000 302f 0012 e588
0061560 41fa a156 2470 0800 7000 302f 0012 7202
0061600 c081 e588 41fa a142 2670 0800 7000 302a
0061620 0002 2f40 0008 2f40 000c 7000 302b 0008
0061640 2f40 0004 7000 302b 000a 2e80 202f 000c
0061660 4fef 0010 4ced 0d02 fff0 4a5d 4e75 4e55
0061700 0000 48e7 c0a0 518f 70ff 2f40 0004 7004
0061720 b06f 000a 6348 42af 0004 7000 302f 000a
0061740 e588 41fa a0a4 2470 0800 6010 206f 000c
0061760 2250 5290 7011 3540 0006 7000 302a
0062000 0002 2e80 102f 0003 e408 0200 0001 4a00
0062020 670e 206f 000c 2010 b0af 0024 65ca 202f
0062040 0004 508f 4ced 0700 fff4 4a5d 4e75 4e55
0062060 0000 48e7 c0e0 518f 70ff 2f40 0004 7004
0062100 b06f 000a 6300 00f6 42af 0004 7000 302f
0062120 000a e588 41fa a072 2470 0800 223c 0000
0062140 1004 7000 302f 000a 6162 6010 206f 000c
0062160 2250 5290 7000 1011 3540 0006 7000 302a
0062200 0002 2e80 102f 0003 e408 0200 0001 4a00
0062220 670c 206f 000c 2010 b0af 0024 65ca 7000
0062240 302f 000a 6100 feaa 0800 0002 67f8 223c
0062260 0000 1005 7000 302f 000a 6110 202f 0004
0062300 508f 4ced 0700 fff4 4a5d 4e75 4e55 0000
0062320 48e7 efb8 2800 4fef fff6 70ff 2e80 7004
0062340 b044 6300 00f0 4297 7000 3004 7202 c081
0062360 e588 41fa 9fd4 2470 0800 7000 3004 7202
0062400 c081 e588 41fa 9fca 2670 0800 7000 3004
0062420 e588 41fa 9fb4 2870 0800 7001 7200 3204
0062440 7401 c282 5c81 e3a8 2c00 7001 7200 3204
0062460 7401 c282 e589 e3a8 2f40 0006 6028 7e00
0062500 7a00 397c 0004 0004 603c 7e00 7a00 397c
0062520 0008 0004 6030 2a06 2e2f 0006 6028 7000
0062540 2e00 2a00 6020 202f 0010 0440 1002 0c40
0062560 0003 6212 d040 303b 0006 4efb 0002 ffd8
0062600 ffe0 ffc0 ffcc 7000 302b 001a 2206 4681
0062620 c081 8085 1f40 0005 7000 302b 000a 222f
0062640 0006 4681 c081 8087 1f40 0004 7000 102f
0062660 0005 3540 001a 7000 102f 0004 3540 000a
```

```
0062700 7000 102f 0005 3740 001a 7000 102f 0004
0062720 3740 000a 2017 4fef 000a 4ced 1df4 ffdc
0062740 4a5d 4e75 4e55 0000 48e7 8000 4e5d 4e75
0062760 4e55 0000 48e7 c080 598f 4297 7001 b02f
0063000 0007 660c 206f 0008 20bc 0000 2000 6004
0063020 70ff 2e80 2017 588f 4ced 0190 fffc 4e5d
0063040 4e75 4e55 0000 48e7 c880 2800 518f 42af
0063060 0004 2004 6100 0204 2e80 7002 b097 6608
0063100 206f 000c 4210 6016 7001 b097 660a 206f
0063120 000c 10bc 0002 206f 0004 2e80 202f
0063140 0004 508f 4ced 0110 fff8 4e5d 4e75 4e55
0063160 0000 48e7 cc00 2800 2a01 598f 4a2f 001f
0063200 6610 4878 0002 2205 2004 6100 0076 588f
0063220 6010 7002 b02f 001f 6606 4878 0001 60e6
0063240 70ff 2e80 2017 588f 4ced 0030 fff8 4e5d
0063260 4e75 4e55 0000 48e7 ce20 2800 7a00 600c
0063300 7c10 601a 7c00 6016 70ff 602c 0c84 0010
0063320 .0008 67ac 0c84 0000 0009 67e8 60aa 247c
0063340 000e 0100 7000 3012 0280 0000 00cf 7200
0063360 3206 8081 3480 2005 4ced 0472 ffec 4e5d
0063400 4e75 4e55 0000 48e7 cf20 2800 2a01 2c2f
0063420 0024 4fef ffee 426f 0008 2800 518f
0063440 0000 6500 0102 0c85 0002 ffff 6200 00f8
0063460 b885 6400 00f2 7002 b086 6708 7001 b086
0063500 6600 00e4 2004 0280 0001 e000 720d e2a8
0063520 2e00 2005 0280 0001 e000 720d e2a8 2f40
0063540 000e 3f7c 0001 0004 7008 b087 6f5c 247c
0063560 000e 0102 7000 302f 0004 efa8 816f 0008
0063600 5287 beaf 000e 6e06 7008 b087 6ee6 3f52
0063620 0006 7002 b086 6710 7000 302f 0008 7200
0063640 322f 0006 8081 6010 7000 302f 0008 4680
0063660 7200 322f 0006 c081 3f40 0006 34af 0006
0063700 426f 0008 3f7c 0001 0004 7007 b0af 000e
0063720 6c58 5187 51af 000e 7000 302f 0004 efa8
0063740 816f 0008 5287 beaf 000e 6fec 247c 000e
0063760 0104 3f52 0006 7002 b086 6710 7000 302f
0064000 0008 7200 322f 0006 8081 6010 7000 302f
0064020 0008 4680 7200 322f 0006 c081 3f40 0006
0064040 34af 0006 6004 70ff 2e80 2017 4fef 0012
0064060 4ced 04f0 ffe6 4a5d 4e75 4e55 0000 48e7
0064100 cf20 2800 7c01 0c84 0002 0000 6508 0c84
0064120 0002 ffff 6304 7aff 603c 2004 0280 0001
0064140 e000 720d e2a8 3e00 7008 b047 6308 247c
0064160 000e 0102 0008 247c 000e 0104 5147 7000
0064200 3007 e1ae 7000 3012 7200 3206 c081 6604
0064220 7a02 6002 7a01 2005 4ced 04f2 ffe8 4e5d
0064240 4e75 4e55 0000 48e7 e8b8 4fef fff4 41fa
0064260 9bf2 2008 2400 202f 000c 7226 6100 1ccc
0064300 d480 2842 202f 000c 720a 9b84 6512 222c
0064320 0018 203a 06fe 6100 1588 70ff 6000 0106
0064340 41ee 02a0 2008 2400 202f 000c 7230 6100
0064360 1c9a d480 2442 41ee 02d0 2008 2400 202f
0064400 000c 721a 6100 1c84 d480 2e82 264c 7800
0064420 6006 4213 5284 528b 7030 b084 62f4 2657
0064440 7800 6006 4213 5284 528b 701a b084 62f4
0064460 4ee 0294 42ae 0298 2f54 0004 41ef 0008
0064500 2008 296f 0004 4e90 7000 302f 000a 222f
0064520 000c 6100 1c36 41ee 02ea d088 2640 7800
0064540 6006 4213 5284 528b 7000 302f 000a b880
0064560 65f0 7000 102c 0024 3480 7000 102c 0025
0064600 3540 0002 357c 0008 356f 0008 000c
0064620 356f 000a 000e 41ee 0294 2548 0010 254c
0064640 0014 2557 0018 7000 302f 000a 222f 000c
0064660 6100 1bd8 41ee 02ea d088 2540 001c 356c
0064700 0020 0006 356c 0022 0008 2f6c 0004 0004
0064720 222c 0018 200a 206f 0004 4e90 2d6f 0004
0064740 029c 7000 4fef 000c 4ced 1d16 ffe4 4e5d
0064760 4e75 4e55 0000 48e7 282f 0038 598f
0065000 202e 029c 7230 61f0 1b82 41ee 02a9 2470
0065020 0818 202f 0004 2540 0010 2540 0014 7eff
0065040 b084 6704 d8ae 0294 7e00 7c10 202e 029c
0065060 7230 6100 1b56 41ee 02a0 2870 0814 7003
0065100 b086 6700 00aa 266c 0010 4137 2208 41ee
0065120 02a0 2008 2400 2601 202e 029c 7230 6100
0065140 1b2a d480 2002 2203 2a00 7001 b085
0065160 6706 7005 b085 6646 2217 41ee 02a0 2008
0065200 2400 2601 202e 029c 7230 6100 1afe d480
0065220 2002 2203 6100 02a2 2c00 202e 029c 7230
0065240 6100 1ae8 41ee 02a0 2070 081c 4210 7010
0065260 b086 663a 70ff b084 6600 0088 6030 7010
0065300 b085 672a 42a7 2205 41ee 02a0 2008 2400
0065320 2601 202e 029c 7230 6100 1ab0 d480 2002
0065340 2203 6100 03a2 588f 70ff b084 6654 256c
0065360 0008 41ee 02a0 2008 2400 202e 029c 7230
0065400 6100 1a88 d480 2002 4e93 2a00 7001 b085
0065420 6734 7010 b085 672e 42a7 2205 41ee 02a0
0065440 2008 2400 2601 202e 029c 7230 6100 1a5c
0065460 d480 2002 2203 6100 4e93 588f 70ff b084
0065500 6704 7cfe 6032 7003 b086 660a 7001 b085
0065520 6604 7c00 6022 2007 b0ba 993e 6306
0065540 7a00 52ae 0294 70ff b084 6700 fed2 b8ae
0065560 0294 6400 feca 7cff 202a 0014 90aa 0010
0065600 206f 0008 2080 2006 588f 4ced 1dfc ffd8
0065620 4a5d 4e75 4e55 0000 48e7 ffb8 282f 003c
0065640 598f 3eaf 000a 3f6f 003e 0002 202e 029c
0065660 7230 6100 19d6 41ee 02a0 2470 0818 41d7
0065700 2548 0004 157c 0007 000a 157c 000f 000d
0065720 70ff b084 6704 d8ae 0294 7e00 7c10 202e
0065740 029c 7230 6100 19a4 41ee 02a0 2670 0814
0065760 7005 b086 6700 00aa 286b 000c 486a 000c
0066000 222a 0004 41ee 02a0 2008 2400 2601 202e
0066020 029c 7230 6100 1974 d480 2002 2203 4e94
0066040 588f 2a00 7001 b085 6706 7003 b085 6640
0066060 41d7 b1ea 6600 661a 24af 0004 202f 0004
0066100 5980 2540 0004 7000 302f 000a 5880 3540
0066120 0008 41ee 02a0 2008 2400 202e 029c 7230
0066140 6100 1928 d480 2002 6100 01a8 2c00 6030
0066160 7010 b085 672a 42a7 2205 41ee 02a0 2008
0066200 2400 2601 202e 029c 7230 6100 18fe d480
```

```
0066220  2002 2203 6100 01f0 588f 70ff b084 6654
0066240  286b 0008 41ee 02a0 2008 2400 202e 029c
0066260  7230 6100 18d6 d480 2002 4e94 2a00 7001
0066300  b085 6734 7010 b085 672e 42a7 2205 41ee
0066320  02a0 2008 2400 2601 202e 029c 7230 6100
0066340  18aa d480 2002 2203 6100 019c 588f 70ff
0066360  b084 6704 7cfe 6032 7001 b085 660a 7005
0066400  b086 6604 7c00 6022 2007 5287 b0ba 978c
0066420  6306 7e00 52ae 0294 70ff b084 6700 fad2
0066440  b8ae 0294 6400 feca 7cff 2006 588f 4ced
0066460  1dfc ffd8 4e5d 4e75 4e55 0000 48e7 ceb8
0066500  2440 598f 206f 0008 3e90 7000 102f 0001
0066520  2a00 7000 1017 5980 5280 2800 202f 0008
0066540  5080 2840 266a 0018 2005 0800 0003 660a
0066560  2f2f 0008 7201 6000 0080 2005 0800 0002
0066600  660a 2f2f 0008 7202 6000 006e 2005 0800
0066620  0001 6716 4a6b 0018 6708 2f2f 0006 7202
0066640  6056 5984 3754 0018 588c 7000 302b 0018
0066660  b880 6308 2f2f 0008 7204 603c 2f04 222b
0066700  0014 200c 6100 0544 588f d9ab 0014 996b
0066720  0018 2005 0800 0000 6712 4a6b 0018 6608
0066740  2f2f 0008 7205 6010 7001 601a 4a6b 0018
0066760  6712 2f2f 0008 7206 200a 6100 008a 588f
0067000  7010 6002 7003 588f 4ced 1d70 ffe4 4e5d
0067020  4e75 4e55 0000 48e7 c838 2440 286a 0018
0067040  200c 720c d081 2640 7000 1013 5980 5280
0067060  2800 d9ac 0004 99ac 0008 4a6c 0008 6604
0067100  7005 6038 7000 302a 000c 5980 7200 322c
0067120  0008 b081 6c12 177c 000d 0001 7000 302a
0067140  000c 5980 5280 6010 177c 000c 0001 7000
0067160  302c 0008 5880 5380 1680 7001 4ced 1c12
0067200  ffec 4e5d 4e75 4e55 0000 48e7 c080 4fef
0067220  fff0 7022 b06e 0740 6648 6100 ed70 700c
0067240  b0af 0054 6514 202f 0054 e588 41fa 0140
0067260  2230 0800 223a 0120 6008 2f2f 0054 223a
0067300  011a 41ef 0004 2008 6100 10a6 588f 41d7
0067320  2008 6100 aa2e 6100 ed06 202f 0050 6100
0067340  008c 4fef 0050 4ced 0100 fffc 4e5d 4e75
0067360  4e55 0000 48e7 fffe ffa2 7022 b06e 0740
0067400  0740 665a 6100 ed06 206f 0054 7000 3028
0067420  0002 2f00 206f 0058 7000 3010 2f00 223a
0067440  00ca 41ef 0008 2008 6100 1046 508f 41d7
0067460  2008 6100 a9ce 6100 ecae 206f 0058 3f50
0067500  0050 7000 102f 0050 5280 2800 7004 b084
0067520  6302 7804 2204 202f 0058 6100 0346 4fef
0067540  0054 4ced 0110 fff8 4e5d 4e75 4e55 0000
0067560  48e7 c080 7022 b06e 0740 664c 6100 ec8e
0067600  203f 005c 6100 a97c 7230 2017 6100 0314
0067620  203a 0050 6100 a96c 721a 2057 2028 0018
0067640  6100 0300 203a 0040 6100 a958 2057 7000
0067660  3028 000e 2200 2057 2028 001c 6100 02e4
0067700  6100 ec1c 6100 e798 4ced 0102 fff8 4e5d
0067720  4e75 0000 702a 0000 7053 0000 7078 0000
0067740  709f 0000 70ae 0000 70bd 0000 7036 0000
0067760  70fc 0000 711b 0000 712e 0000 714c 0000
0070000  7164 0000 7178 0000 718f 0000 71a2 0000
0070020  71b5 0000 71d4 0000 71f3 0000 7211 0000
0070040  722a 0000 7242 0000 7262 0000 728c 4c69
0070060  6e6b 2064 7269 7665 7273 206e 6f74 2066
0070100  6f75 6e64 2066 6f72 206c 696e 6b20 2530
0070120  3878 000d 2424 2424 2424 2424 204b 6572
0070140  6e65 6c20 6465 7465 6374 6564 2065 7272
0070160  6f72 3a20 2573 0400 0d24 2424 2424 2424
0070200  2420 4472 6976 6572 2064 6574 6563 7465
0070220  6420 6572 723a 2025 2030 7804 0d0d 004c
0070240  4353 2073 7472 7563 7475 7265 0300 5043
0070260  5320 7374 7275 6374 7572 650d 0044 7269
0070300  7665 7220 7374 6174 6963 2073 7472 7563
0070320  7475 7265 0d00 2a2a 2a50 6163 6b65 7420
0070340  6475 6d70 2066 7072 206b 7566 775f 7479 7065
0070360  2025 6420 756e 6974 2025 6400 2424 2424
0070400  2049 6e76 616c 6964 2065 7272 6f72 2063
0070420  6f64 6520 3020 2424 2424 0053 616e 6974
0070440  7920 6269 7420 666f 7220 7365 7400 4d61
0070460  696c 206d 6573 7361 6765 2073 656e 6420
0070500  696e 2049 4d52 206d 6f64 6500 5354 4152
0070520  5420 666c 6167 6174 2064 6574 6563 7465
0070540  7465 6400 5354 4152 5420 6c6f 6167 2065
0070560  7870 6563 7465 6400 4d4d 5245 2066 6c61
0070600  6720 6e6f 7420 6578 7065 6374 6564 004d
0070620  4f52 4520 666c 6167 2065 7870 6563 7465
0070640  6400 4c6f 6e6b 2074 696d 656f 7574 2065
0070660  7272 6f72 0024 2424 2420 496e 7661 6c69
0070700  6420 6572 7226 7220 636f 6465 2038 2024
0070720  2424 2400 2424 2424 2049 6e76 616c 6964
0070740  2065 7272 2063 6f64 6520 3920 2424 2424
0070760  2424 0053 616e 6974 7920 6574 206d 6169
0071000  6c20 7365 7276 6963 6520 6275 6666 6572
0071020  0043 616e 2774 2073 6574 2064 6573 7465
0071040  6765 2068 6561 6465 7200 4361 6e27 7420
0071060  7365 6e64 206d 6169 6c20 6d65 7373 6567
0071100  6500 2424 2424 2049 6e76 616c 6964 2065
0071120  7272 2063 6f64 6520 3133 3320 2024 2424
0071140  2400 2424 2424 2049 6e76 616c 6964 2065
0071160  7272 2063 6f64 6520 3134 2024 2424 2424
0071200  2400 2424 2424 2049 6e76 616c 6964 2065
0071220  7272 2063 6f64 6520 3135 2024 2424 2424
0071240  2400 4e55 0000 48e7 cc20 2440 2801 7022
0071260  b06e 0740 664a 6100 e954 e284 7a00 6032
0071300  2005 7207 c081 6618 700d 6100 ea1a 200a
0071320  0228 4128 7020 6100 ea0e 7020 6100 ea08
0071340  7020 6100 ea02 7000 3012 6100 a214 5285
0071360  548a ba84 6dca 700d 60ae 6100 a8e0
0071400  4ced 0430 fff4 4e5d 4e75 4e55 0000 48e7
0071420  c830 2440 2641 206f 0012 001c 5280 e288 2800
0071440  6004 36da 5384 4a84 66f8 4ced 0c10 fff4
0071460  4e5d 4e75 4e55 0000 48e7 ceu0 518f 7001
0071500  2f40 0004 206f 0008 2468 001c 206f 0008
0071520  2ea8 0024 6000 02b2 2017 6100 0434 2800
```

```
0071540  206f 0008 2068 0010 2550 0008 7000 1540
0071560  0003 1540 0002 157c 0002 0004 157c 0080
0071600  0005 422a 0006 157c 0002 0001 4212 156a
0071620  0005 004e 156a 0006 004f 157c 0003 004c
0071640  6000 0286 206f 0008 2068 0010 2010 90aa
0071660  0008 7201 b280 6400 0270 2017 6100 06c2
0071700  2800 727f c081 6622 206f 0008 4a28 0028
0071720  6604 7003 6002 7004 1540 0004 2017 6100
0071740  04cc 2017 6100 0512 6008 2204 2017 6100
0071760  085e 206f 0008 2068 0010 2550 0008 6000
0072000  0228 4a12 6600 015e 2017 6100 0674 2800
0072020  0000 0009 6700 0140 2004 0280 0000 00ff
0072040  6700 0100 2004 727f c081 6720 522a 0003
0072060  0c2a 00c8 0003 6300 0124 157c 0001 0004
0072100  2f7c 0000 dead 0004 6000 0112 200a 720c
0072120  d081 2200 2017 6100 0594 2c00 6600 0106
0072140  7003 b02a 000c 6200 00f2 7000 102a 000a
0072160  0800 0007 672a 206f 0008 4a28 0028 661a
0072200  156a 000f 0005 7000 102a 000a 5380 0280
0072220  ffff ff7f 1540 0006 6006 002a 0080 0005
0072240  156a 000f 0007 102a 000f b02a 0005 6614
0072260  157c 0003 004c 422a 0001 422a 0002 022a
0072300  ff7f 0005 7000 102a 0006 5280 0280 ffff
0072320  ff7f 7200 122a 0006 0281 ffff ff7f b081
0072340  6612 7004 b02a 000c 6204 14bc 0001 422a
0072360  0003 6014 522a 0003 0c2a 00c8 0003 6308
0072400  2f7c 0000 dead 0004 156a 000e 0006 157c
0072420  0004 0004 206f 0008 2068 0010 2550 0008
0072440  6042 206f 0008 2068 0010 2010 90aa 0008
0072460  7232 b280 642a 206f 0008 7001 b028 0028
0072500  6622 506f 0008 2068 0010 2550 0008 157c
0072520  0004 0004 606e 2017 6100 0352 2204 2017
0072540  6100 06ec 2004 0800 0008 6700 00bc 2017
0072560  6100 0386 6000 00b2 522a 0002 0c2a 00c8
0072600  0002 6276 7000 102a 0005 0280 ffff ff7f
0072620  7200 122a 0006 5280 0280 ffff ff7f b081
0072640  7200 122a 0006 7010 2f40 0004 202f
0072660  156a 0006 004f 7000 102a 0005 0280 0000
0072700  0080 1a00 522a 0005 7000 102a 0005 0280
0072720  ffff ff7f 7200 1205 8081 1540 0005 156a
0072740  0005 004e 156a 0006 004f 200a 724c d081
0072760  2200 2017 6100 036c 4a80 6606 157c 0003
0073000  0004 157c 0002 0001 602a 157c 0001 0004
0073020  7007 2f40 0004 6020 7000 102a 0004 5340
0073040  0c40 0003 6212 d040 303c 0006 4efb 0002
0073060  fd38 fd84 fde2 ff58 7001 b0af 0004 661e
0073100  7003 b02a 0004 6716 7004 b02a 0004 6608
0073120  7001 b02a 0001 6606 7010 2f40 0004 202f
0073140  0004 508f 4ced 0572 ffe8 4e5d 4e75 4e55
0073160  0000 48e7 c8a0 2440 7001 2540 0024 2800
0073200  422a 0028 42aa 0020 206a 001c 117c 0001
0073220  0004 206a 001c 117c 0002 0001 206a 001c
0073240  4210 7000 4ced 0510 fff4 4e5d 4e75 4e55
0073260  0000 48e7 c8a0 7810 2057 2468 001c 4a12
0073300  670e 200a 720c d081 206f 0004 2080 7805
0073320  2004 4ced 0510 fff4 4e5d 4e75 4e55 0000
0073340  48e7 80a0 2057 2068 001c 7000 1010 2440
0073360  157c 0001 0004 206a 001c 117c 0001 0001
0073400  4a80 6604 7000 6002 70ff 4ced 0500 fff8
0073420  4e5d 4e75 4e55 0000 48e7 80a0 2057 30bc
0073440  0040 2057 317c 008c 0002 7000 4ced 0100
0073460  fffc 4e5d 4e75 4e55 0000 48e7 ccb8 2440
0073500  2641 286f 0028 598f 7810 2eaa 001c 2057
0073520  4a28 0001 663c 2057 1154 004c 2057 116c
0073540  0001 004d 2057 7000 1028 004c 5980 5280
0073560  2a00 2017 7250 d081 2840 6002 18db 2005
0073600  5385 4a80 66f6 2057 117c 0001 0001 7003
0073620  6002 7010 588f 4ced 1d30 ffe8 4e5d 4e75
0073640  4e55 0000 48e7 c0b0 598f 267c 0002 0040
0073660  70fa 2e80 4aaf 6f00 00f4 202f 0004
0073700  b0ba 051e 6e00 0e8 202f 0004 5380 e588
0073720  41fa 04fe 2470 0800 202f 0004 5380 4233
0073740  0800 422a 0001 157c 00ff 0003 7000 102a
0073760  0005 72bc c081 1540 0005 7000 102a 0007
0073800  0280 ffff ff7f 1540 0007 7000 102a 04da
0074000  6610 7000 102a 0005 08c0 0006 1540 0005
0074020  601a 7001 b03a 04c2 6612 157c 00ff 001f
0074040  157c 00ff 0021 157c 00ff 0023 202f 0004
0074060  5380 41fa 04a6 1570 0800 000b 7000 102a
0074100  0005 08c0 0004 1540 0005 203a 0488 7218
0074120  e2a8 1540 000d 203a 047c 7210 e2a8 1540
0074140  000f 203a 0470 e088 1540 0011 157a 0469
0074160  0013 7000 102a 000d e188 7200 122a 000f
0074200  8081 e188 7200 122a 0011 8081 e188 7200
0074220  122a 0013 8081 b0ba 043c 6602 4297 2017
0074240  588f 4ced 0d02 fff0 4e5d 4e75 4e55 0000
0074260  48e7 80a0 598f 70fa 2e80 4aaf 0004 6f2a
0074300  202f 0004 b0ba 040a 6e20 202f 0004 5380
0074320  e588 41fa 03ec 2470 0800 700u 102a 0005
0074340  08c0 0007 1540 0005 4297 2017 588f 4ced
0074360  0500 fff8 4e5d 4e75 4e55 0000 48e7 80a0
0074400  598f 70fa 2e80 4aaf 0004 6f38 202f 0004
0074420  b0ba 03be 6e2e 202f 0004 5380 e588 41fa
0074440  03a0 2470 0800 7000 102a 0007 0800 0003
0074460  6612 7000 102a 0007 0280 ffff ff7f 1540
0074500  0007 4297 2017 588f 4ced 0500 fff8 4e5d
0074520  4e75 4e55 0000 48e7 c0b8 2441 598f 70ff
0074540  2e80 4aaf 0004 6300 0076 202f 0004 b0ba
0074560  0360 626a 202f 0004 5380 e588 41fa 0342
0074600  2670 0800 70fb 2e80 7000 102b 0007 0800
0074620  0003 664a 7000 102b 0007 08c0 0006 1740
0074640  0007 1012 4880 48c0 d08a 2840 7000 102b
0074660  0007 72b9 c081 1740 0007 70f3 2e80 703f
0074700  b012 6d1a 6004 175a 0015 b5cc 63f0 7000
0074720  102b 0007 08c0 0003 1740 0007 4297 2017
0074740  588f 4ced 1d00 fff0 4e5d 4e75 4e55 0000
0074760  48e7 c8b0 2441 598f 70ff 2e80 202f 0004
0075000  6100 0132 2e80 6f3c 202f 0004 5380 e588
0075020  41fa 02ae 2670 0800 2017 c800 0007 6720
0075040  182b 0017 7040 b004 6312 14c4 6006 14ab
```

```
0075060  0017 5304 4a04 62f6 4297 6008 70fd 6002
0075100  70fa 2e80 7000 102b 0007 7208 c081 7208
0075120  b280 67f0 7000 102b 0007 0280 ffff ff7f
0075140  1740 0007 223c 0000 0080 202f 0004 6100
0075160  01de 2017 588f 4ced 0d10 fff0 4e5d 4e75
0075200  4e55 0000 48e7 c8b0 7cff 4a97 6300 000a
0075220  2017 b0ba 023c 6200 0090 247c 0002 0040
0075240  2017 5380 d7c0 2017 5380 e588 41fa 0212
0075260  2470 0800 7cfa 7804 601c 1a2a 0009 7000
0075300  1005 8113 7000 1005 0800 0007 6606 7000
0075320  1013 2c00 5384 70fa b086 6604 4a84 6cda
0075340  7000 102a 0007 0280 0000 0080 e388 8c80
0075360  7000 102a 0005 0280 0000 0080 e588 8c80
0075400  7000 102a 0007 7208 c081 223c 0000 0080
0075420  e3a8 8c80 7000 102a 003b 7202 c081 223c
0075440  0000 0100 e3a8 8c80 2006 4ced 0d72 ffe4
0075460  4e5d 4e75 4e55 0000 48e7 c8a0 598f 78ff
0075500  4aaf 0004 637a 202f 0004 b0ba 0184 6270
0075520  2abc 0002 0040 202f 0004 5380 e588 41fa
0075540  0160 2470 0800 53af 0004 202f 0004 2057
0075560  7200 1230 0800 2801 7000 102a 0007 0280
0075600  0000 0080 e388 8880 7000 102a 0005 0280
0075620  0000 0080 e588 8880 7000 102a 0007 7208
0075640  c081 223c 0000 0080 e3a8 8880 7000 102a
0075660  003b 7202 c081 223c 0000 0100 e3a8 8880
0075700  2004 588f 4ced 0512 fff0 4e5d 4e75 4e55
0075720  0000 48e7 88a0 78ff 4a97 6326 2017 b0ba
0075740  00f0 621e 7802 2017 5380 e588 41fa 0042
0075760  2470 0800 7000 102a 003b 0800 0000 6702
0076000  7801 2004 4ced 0510 fff4 4e5d 4e75 4e55
0076020  0000 48e7 88a0 78ff 4a97 6326 2017 b0ba
0076040  00b0 621e 7804 2017 5380 e588 41fa 0092
0076060  2470 0800 7000 102a 003b 0800 0000 6702
0076100  7803 2004 4ced 0510 fff4 4e5d 4e75 4e55
0076120  0000 48e7 c820 78ff 247c 0002 0040 4a97
0076140  6318 2017 b0ba 006a 6210 202f 0004 4580
0076160  5397 2217 c132 1800 7800 2004 4ced 0410
0076200  fff4 4e5d 4e75 4e55 0000 48e7 88a0 78ff
0076220  4a97 6320 2017 b0ba 0038 6218 2017 5380
0076240  e588 41fa 001c 2470 0800 7000 102a 003d
0076260  2800 7800 2004 4ced 0510 fff4 4e5d 4e75
0076300  000e 0000 000e 0040 000e 0080 000e 00c0
0076320  0000 0004 083a bd:8 0200 020a 121a 0000
0076340  7d02 0000 7d2b 0000 7d2a 0000 7d5a 0000
0076360  7d71 0000 7d85 0000 7d99 0000 7dbe 0000
0076400  7dd5 0d0d 2a2a 2a2a 2053 5953 5445 4d20
0076420  494e 4954 4941 4c49 5a41 5449 4f4e 2045
0076440  5252 4f52 202a 2a2a 2a0d 000d 0054 726f
0076460  6772 6573 7320 6d65 7373 6167 6573 2063
0076500  6f6e 7472 6f6c 2076 616c 7565 2063 6f72
0076520  7275 7074 6564 2225 6400 5359 5354 454d
0076540  2052 4553 4554 2049 4e49 5449 4154 4544
0076560  0052 4553 4554 2053 4f55 5243 4520 3d20
0076600  2530 3478 4020 0052 4541 5320 524f 4d20
0076620  4e20 3d20 2530 3478 0050 524f 4345 5353
0076640  4f52 2046 4149 4c55 5245 2052 4541 5344
0076660  4e20 3d20 2530 3878 0050 4552 464f 524d
0076700  494e 4720 424f 4f54 5354 5241 5020 4c4f
0076720  4144 4552 0045 4e54 4552 494e 4720 424f
0076740  4f54 4649 4c45 2043 4f44 4520 4154 2025
0076760  3038 7800 4e55 0000 48e7 c080 4fef ff88
0077000  7022 b086 0740 664a 6100 de02 2f2f 00a4
0077020  2f2f 00a4 2f2f 00a4 2f2f 00a4 2f2f 00a4
0077040  2f2f 00a4 2f2f 00a4 2f2f 00a4 222f 0098
0077060  41ef 0020 2008 6100 0138 4fef 0020 41d7
0077100  2008 6100 9abe 203a fe9a 6100 9ab6 6100
0077120  ddbe 4fef 0078 4ced 0100 fffc 4e5d 4e75
0077140  4e55 0000 48e7 c080 4fef ff88 7022 b086
0077160  0740 6656 6100 dd96 203a fe64 6100 9a84
0077200  2f2f 00a4 2f2f 00a4 2f2f 00a4 2f2f 00a4
0077220  2f2f 00a4 2f2f 00a4 2f2f 00a4 2f2f 0098
0077240  222f 0098 41ef 0020 2008 6100 00c4 4fef
0077260  0020 41d7 2008 6100 9a4a 203a f426 6100
0077300  9a42 6100 dd1a 6100 d996 4fef 0078 4ced
0077320  0100 fffc 4e5d 4e75 4e55 0000 48e7 c0a0
0077340  4fef ff88 7022 b06e 0740 6676 2479 0000
0077360  0420 7003 b0aa 0280 6414 222a 0280 203a
0077400  fde6 6100 ff5c 257c 0000 0003 0280 202a
0077420  0280 b0af 0078 654a 6100 dcf2 2f2f 00ac
0077440  2f2f 00ac 2f2f 00ac 2f2f 00ac 2f2f 00ac
0077460  2f2f 00ac 2f2f 00ac 2f2f 00ac 222f 009c
0077500  41ef 0020 2008 6100 0028 4fef 0020 41d7
0077520  2008 6100 99ae 203a f46a 6100 99a6 6100
0077540  dc7e 4fef 0078 4ced 0500 fff8 4e5d 4e75
0077560  4e55 0000 48e7 c080 2d57 07f4 42ae 0814
0077600  486f 0014 42a7 222f 000c 41fa 051c 2008
0077620  6100 001e 508f 206e 07f4 4210 202e 0814
0077640  4ced 0004 4e75 4e55 0000 48e7 c0a0 2d57
0077660  07f4 42ae 0814 4a87 6712 2007 6100 001e
0077700  508f 206e 07f4 4210 202e 0814 4ced 0404
0077720  4e75 4e55 0000 48e7 c0a0 4fef ffac 41fa
0077740  0604 43fa 0608 45fa 060c 47fa 0610 2017
0077760  2057 7200 1230 0800 2a01 200a 6100 01c4
0100000  7000 2e00 2c00 702d b004 6600 0008 7001
0100020  6000 0004 7000 2e40 080c 4aae 080c 0700
0100040  0004 181a 7030 b004 6600 0008 7030 6000
0100060  0004 7020 2d40 0810 6000 001c 2006 720a
0100100  6100 0548 1204 4881 48c1 0481 0000 0030
0100120  d081 2c00 181a 1004 4880 48c0 6100 04c4
0100140  4a80 6600 ffd8 702e b004 6600 0008 7001
0100160  6000 0004 7000 2e80 4a97 6700 0032 181a
0100200  6000 001c 2007 720a 6100 0500 1204 4881
0100220  48c1 0481 0000 0030 d081 2e00 181a 1004
0100240  4880 48c0 6100 047c 4a80 6600 ffd8 706c
0100260  b004 6600 0004 181a 6000 0124 2f06 206f
0100300  0008 58af 0008 2010 6100 010e 2200 200b
0100320  6100 036a 588f 6000 0162 2f06 206f 0008
0100340  58af 0008 2010 6100 0224 2200 200b 6100
0100360  034c 588f 6000 0144 2f06 206f 0004 4880 48c0
0100400  6100 044e 2200 206f 0008 58af 0008 2010
0100420  6100 0246 2200 200b 6100 0322 588f 6000
0100440  011a 2f06 206f 0008 58af 0008 2210 41ee
0100460  07f8 2008 6100 0120 200b 6100 02fe
0100500  588f 6000 00f6 4a86 6700 0022 2f06 4878
0100520  0001 206f 030c 58af 000c 2008 5680 2200
0100540  200b 6100 026a 508f 6000 00ce 206f 0004
0100560  58af 0004 2010 4e93 6000 00b0 206f 0004
0100600  58af 0004 2850 4a97 6700 0038 2e8c 6000
0100620  000e 4a14 6600 0006 6000 00be 528c 2007
0100640  5387 4a80 6600 ffec 2f06 200c 90af 0004
0100660  2f00 222f 0008 200b 6100 0214 508f 6000
0100700  000a 2f06 220c 200b 6100 0272 588f 6000
0100720  006a 1004 4880 48c0 4e93 6000 f1fe 1004
0100740  4880 0440 0058 0c40 0020 6200 ffe6 d040
0100760  303b 0006 4efb 0002 ff00 ffda ffda ffda
0101000  ffda ffda ffda ffda ffda ffda ffda ff4e
0101020  fec4 ffda ffda ffda ffda ffda ffda ffda
0101040  ffda ffda ffda fee2 ffda ffda ffda ff84
0101060  ffda ff2a ffda ffda ff00 4a85 6600 000a
0101100  7ab1 2f6f 003c 0004 6000 f490 508f 4ced
0101120  1d20 ffe0 4e5d 4e75 4e55 0000 48e7 c8a0
0101140  2800 45ee 07f8 4a84 6c00 0024 2004 4480
0101160  2800 6c00 0016 41fa 0306 2208 41ee 07f8
0101200  2008 6100 0272 6000 001a 14fc 002d 2204
0101220  200a 6100 0018 41ee 07f8 2008 6000 0004
0101240  4e71 4ced 0512 fff0 4e5d 4e75 4e55 0000
0101260  48e7 c8b0 2801 47ee 0802 6000 001a 2004
0101300  720a 6100 0330 7230 d081 16c0 720a 2004
0101320  6100 032a 2800 7009 b086 6500 ffe2 2457
0101340  2004 7230 d081 16c0 6000 0004 14e3 41ee
0101360  0802 b7c8 6200 fff6 4212 2017 6000 0004
0101400  4e71 4ced 0d10 ffe8 4e5d 4e75 4e55 0000
0101420  48e7 c8b0 2800 45ee 07f8 47ee 0802 2004
0101440  7207 c081 7230 d081 16c0 e68c 6600 fff0
0101460  6000 0004 14e3 41ee 0802 b7c8 6200 fff6
0101500  4212 41ee 07f8 2008 6000 0004 4e71 4ced
0101520  0d12 ffec 4e5d 4e75 4e55 0000 48e7 c8b0
0101540  2800 2a01 4a85 6700 0008 7a41 6000 0004
0101560  7061 0480 0000 000a 2a00 47ee 0802 2004
0101600  720f c081 2c00 2200 7009 b086 6c00 0008
0101620  2005 6000 0004 7030 d280 16c1 e88c 6600
0101640  ffda 45ee 07f8 6000 0004 14e3 41ee 0802
0101660  b7c8 6200 fff6 4212 41ee 07f8 2008 6000
0101700  0004 4e71 4ced 0d70 ffe8 4e5d 4e75 4e55
0101720  0000 48e7 cc30 2640 2441 282f 0020 2a2f
0101740  0024 9a84 4aae 080c 6600 0016 6000 0008
0101760  202e 0810 4e93 2005 5385 4a80 6e00 fff2
0102000  6000 000a 101a 4880 48c0 4e93 2004 5384
0102020  4a80 6600 fff0 4aae 080c 6700 0016 6000
0102040  0008 202e 0810 4e93 2005 5385 4a80 6e00
0102060  fff2 4ced 0c30 fff0 4e5d 4e75 4e55 0000
0102100  48e7 c830 2640 2441 282f 001c 200a 6100
0102120  007a 9880 4aae 080c 6600 0016 6000 0008
0102140  202e 0810 4e93 2004 5384 4a80 6e00 fff2
0102160  6000 000a 101a 4880 48c0 4e93 4a12 6600
0102200  fff4 4aae 080c 6700 0016 6000 0008 202e
0102220  0810 4e93 2004 5384 4a80 6e00 fff2 4ced
0102240  0c10 fff4 4e5d 4e75 4e55 0000 48e7 8080
0102260  206e 07f4 52ae 07f4 100f 0003 52ae 0814
0102300  4ced 0100 fffc 4e5d 4e75 4e55 0000 48e7
0102320  8030 2440 264a 6000 0002 4a1b 6600 fffc
0102340  200b 908a 5380 6000 0004 4e71 4ced 0c00
0102360  fff8 4e5d 4e75 4e55 0000 48e7 c038 2440
0102400  264a 284a 6000 0002 101b 18c0 6600 fffa
0102420  200a 6000 0004 4e71 4ced 1c00 fff4 4e5d
0102440  4e75 4e55 0000 48e7 8000 7041 b02f 0003
0102460  6a00 0012 7039 b02f 0003 6d00 0008 7001
0102500  6000 0004 7000 6000 0004 4e71 4e5d 4e75
0102520  4e55 0000 48e7 8000 7041 b02f 0003 6a00
0102540  0012 705a b02f 0003 6d00 0008 7001 6000
0102560  0004 7000 6000 0004 4e71 4e5d 4e75 2d32
0102600  3134 3734 3833 3634 3800 48e7 3800 2400
0102620  2600 4863 2801 4844 c0c1 c2c3 c4c4 c4c4
0102640  4840 d041 7800 d784 d042 d784 4840 4241
0102660  4841 4242 4842 d282 d283 4a80 4cdf 001c
0102700  4e75 2f02 7400 6a04 4480 7403 4a81
0102720  6a06 4481 0a02 0001 1122 e20a 6402 4480
0102740  e20a 6402 4481 241f 4a80 4e75 61d4 c141
0102760  4880 4e75 6106 c141 4880 4e75 48e7 3800
0103000  2401 6606 81fc 0000 606e 5381 676a 2801
0103020  2200 b481 650c 6704 7000 605c 7001 9282
0103040  6056 2602 6bf6 c684 6612 e28a 76ff e28a
0103060  55cb fffc 4483 e668 c284 603c 7000 76ff
0103100  e382 6a06 b481 620a 600c b481 54cb fffc
0103120  6704 5283 e28a 4483 6004 e380 e28a 9282
0103140  6510 5280 51cb ffff 600e e380 e28a d282
0103160  65f0 51cb fff6 d282 4cdf 001c 4a80 4e75
0103200
```

APPENDIX A

Part 3

```
0000000  0000 0000 0000 0000 0000 0000 0000 0000
0000220  0000 0000 0008 0002 0000 0000 0000 0000
0000240  0000 0000 0000 0000 0000 0000 0000 0000
0000340  0000 0000 0000 0000 0000 0000 0001 0208
0000360  2f00 223c 0000 4c76 203c 0002 2000 4eb9
0000400  0002 22e4 221f 2e40 dffc 0000 1000 2c4f
0000420  2001 2f00 4eb9 0002 212c 201f 4eb9 0002
0000440  2adc 4e55 0000 48e7 cfa0 2800 4fef fff0
0000460  2f7c 0000 0420 000c 247c 0000 0440 7e00
0000500  7cff 2e1a 4297 7001 2217 e3a8 c087 6700
0000520  0004 5286 5285 7000 1004 ba80 6200 000c
0000540  5297 7020 b097 6e00 ffde 7000 1004 ba80
0000560  6500 ffd0 701f c197 70ff b086 6600 000c
0000600  70ff 4fef 0010 6000 004a 7001 2217 e3a8
0000620  c087 6600 000c 70ff 4fef 0010 6000 0034
0000640  2006 720a 6100 4990 206f 000c d090 5c80
0000660  2f40 0008 206f 0008 2f50 0004 206f 0008
0000700  20af 0014 202f 0004 4fef 0010 6000 0004
0000720  4e71 4ced 05f0 ffe8 4e5d 4e75 4e55 0000
0000740  48e7 c030 7008 6100 026c 7002 6100 20d4
0000760  267c 0006 0600 7800 6006 36fc 0001 5284
0001000  0c84 0000 0100 65f2 267c 0008 0600 7800
0001020  6004 425b 5284 0c84 0000 0100 65f4 267c
0001040  0006 0290 7800 6004 425b 5284 0c84 0000
0001060  0100 65f4 267c 0008 0200 7800 6004 425b
0001100  5284 0c84 0000 0100 65f4 700b 6100 0348
0001120  247c 0080 0000 6004 14fc 00ff f3f2 0080
0001140  1000 65f4 700a 6100 032e 6100 0f5a 6100
0001160  08c6 6100 155a 6100 2394 6100 2f20 2f3c
0001200  0080 0fff 223c 0080 0000 7001 6100 013a
0001220  588f 267c 000a 0140 7800 6004 425b 5284
0001240  7060 b084 62f6 267c 000a 0340 7800 60u6
0001260  36fc 0060 5284 7060 b084 62f4 6100 0e3a
0001300  6100 31da 7206 7004 6100 031c 7205 7004
0001320  6100 0314 7008 6100 0592 4ced 0c12 fff0
0001340  4e5d 4e75 4e55 0000 48e7 ce80 2800 2a01
0001360  4fef fff0 2004 d085 2f40 000c 4fef 0004
0001400  2208 7001 6100 0430 2f40 0008 4aaf 0008
0001420  6632 42a7 222f 0010 2004 6100 0d4e 588f
0001440  2f40 0008 4aaf 0008 661a 202f 000c 222f
0001460  0004 6100 4874 5280 222f 0004 6100 47f8
0001500  2c00 2006 4fef 0010 4ced 0170 fff0 4e5d
0001520  4e75 4e55 0000 48e7 6000 0c80 0000 0008
0001540  6a18 e188 40c1 3401 0241 f8ff 8041 4620
0001560  3002 0240 0700 e088 6002 70ff 4cdf 0006
0001600  4e5d 4e75 4e55 0000 48e7 8c20 2800 598f
0001620  4297 7001 b084 6e06 7060 b084 6c06 70ff
0001640  2e00 6016 2004 5380 e388 0680 000a 0340
0001660  2440 3a12 7040 8a40 3485 2017 588f 4ced
0001700  0430 fff4 4e5d 4e75 4e55 0000 48e7 cf20
0001720  2800 2a01 2c2f 0024 7e00 7001 b084 6e08
0001740  0c84 0000 0100 6f04 7eff 605c 0c85 0080
0001760  0000 6df4 baae 216c 6ee0 0c86 0080 0000
0002000  6de6 bcae 216c 6ee0 ba86 6cdc 2004 5380
0002020  e388 0680 0006 0600 2440 3485 d5fc 0002
0002040  0000 2005 7210 e2a0 3480 2004 5380 e388
0002060  0680 0006 0200 2440 3486 d5fc 0002 0000
0002100  2006 7210 e2a0 3480 2007 4ced 04f0 ffec
0002120  4e5d 4e75 4e55 0000 48e7 ce20 2800 7a00
0002140  600c 7c10 601a 7c00 6016 70ff 602c 0c84
0002160  0000 0008 67ec 0c84 0000 0009 67e8 60ea
0002200  247c 000e 0100 7000 3012 0280 0000 00cf
0002220  7200 3206 8081 3480 2005 4ced 0472 ffec
0002240  4e5d 4e75 4e55 0000 48e7 cf20 2800 2a01
0002260  2c2f 0024 2e2f 0028 508f 426f 0004 4297
0002300  7001 b084 6e06 7060 b084 6c06 70ff 2e80
0002320  605a 700e b085 6706 700f b085 66ee 7010
0002340  6086 6706 7011 b086 66e2 7012 b087 6706
0002360  7013 b087 66d6 700f b085 6606 006f 0080
0002400  0004 7011 b086 6606 7020 816f 0004 7012
0002420  b087 6606 7040 816f 0004 2004 5380 e388
0002440  0680 000a 0340 2440 34af 0004 2017 5c8f
0002460  4ced 04f0 ffec 4e5d 4e75 4e55 0000 48e7
0002500  8c20 2800 7a00 7001 b084 6e08 0c84 0000
0002520  0100 6f04 7aff 6032 2004 5380 e388 0680
0002540  0006 0600 2440 34bc 0001 d5fc 0002 0000
0002560  4252 2004 5380 e388 0680 0006 0200 2440
0002600  4252 d5fc 0002 0000 4252 2005 4ced 0420
0002620  fff4 4e5d 4e75 4e55 0000 48e7 ce20 2800
0002640  7a00 600e 7c00 601c 3c3c 0080 6016 70ff
0002660  602a 0c84 0000 000a 67ea 0c84 0000 0.0b
0002700  67e6 60ea 247c 000e 0100 700u 3012 725f
0002720  c081 7200 3206 8081 3480 2005 4ced 0472
0002740  ffec 4e5d 4e75 4e55 0000 48e7 cf20 2800
0002760  2a01 558f 7c00 7003 b084 4746 7004 b084
0003000  6740 7cff 6000 0070 7003 b084 4604 7a00
0003020  6002 7e04 3ebc 00db 6044 7003 b084 4604
0003040  7a00 6002 7e01 3ebc 00da 6032 7003 b084
0003060  6604 7a00 6002 7e02 3ebc 00dd 6020 70ff
0003100  6036 0c85 0000 00ff 62f4 0c05 0005 67b8
0003120  0c05 0006 67c4 0c05 0007 67d0 60a0 247c
0003140  000e 0100 7000 3017 7200 3212 c081 7200
0003160  3207 8081 3480 2006 548f 4ced 04f0 ffec
0003200  4e5d 4e75 4e55 0000 48e7 ce20 2800 2a01

0003220  598f 4297 7001 b084 6e06 7060 b084 6c06
0003240  70ff 2e80 6022 7001 b085 6ef4 0c85 0080
0003260  0100 6eec 2004 5380 e388 0680 000a 0140
0003300  2440 2005 5380 3480 2017 588f 4ced 0430
0003320  fff4 4e5d 4e75 4e55 0000 48e7 cf20 2800
0003340  7e01 0c84 0002 0000 6508 0c84 0002 ffff
0003360  6304 7aff 603c 2004 0280 0001 e000 720d
0003400  e2a8 3e00 7008 b047 6308 247c 000a 0102
0003420  6006 247c 000e 0104 5147 7c00 3007 e15e
0003440  7000 3012 7200 3206 c081 6u04 7a02 6002
0003460  7a01 2005 4ced 04f2 ffe8 4e5d 4e75 4e55
0003500  0000 48e7 ce30 2800 2441 7c00 7091 b084
0003520  6e06 7060 b084 6c04 7cff 6036 2004 5380
0003540  e388 0680 000a 0340 2640 3a13 7000 3005
0003560  0800 0000 6704 7001 6002 7000 1480 7000
0003600  3005 0800 0001 6704 7001 6002 7000 1540
0003620  0001 2006 4ced 0c70 ffec 4e5d 4e75 4e55
0003640  0000 48e7 8c30 2440 7a00 267c 000e 0100
0003660  3813 7000 3004 0800 0007 6704 700b 6002
0003700  700a 1540 0092 7000 3004 0800 0004 u704
0003720  7008 6002 7009 1480 7000 3004 0800 0006
0003740  6704 7008 6002 7009 1540 0001 7000 3004
0003760  0800 0005 6704 7008 6002 7009 1540 0003
0004000  2005 4ced 0c30 fff0 4e5d 4e75 4e55 0000
0004020  48e7 ce20 2800 2a01 598f 4297 7001 b085
0004040  6a06 7060 b085 6c06 70ff 2e80 602e 7011
0004060  b084 6706 7010 b084 66ee 2005 5380 e388
0004100  0680 000a 0340 2440 3c12 7010 b084 6606
0004120  70df cc40 6004 7020 8e40 3486 2017 588f
0004140  4ced 0470 fff0 4e5d 4e75 4e55 0000 48e7
0004160  ce20 2800 7a00 600c 7c40 601a 7e00 6016
0004200  70ff 602c 0c84 0000 0008 67ec 0c84 0000
0004220  0009 67e8 60ea 247c 000e 0100 7000 3012
0004240  0280 0000 009f 7200 3206 8081 3480 2005
0004260  4ced 0472 ffec 4e5d 4e75 4e55 0000 48e7
0004300  ce20 2800 7a00 600c 7c20 601a 7e00 6016
0004320  70ff 602c 0c84 0000 0008 67ec 0c84 0000
0004340  0009 67e8 60ea 247c 000e 0100 7000 3012
0004360  0280 0000 00df 7200 3206 8081 3480 2005
0004400  4ced 0472 ffec 4e5d 4e75 4e55 0000 48e7
0004420  ce20 2800 2a01 598f 4297 7001 b085 6e06
0004440  7060 b085 6c06 70ff 2e80 602e 70ae b084
0004460  6706 700f b084 66ee 2005 5380 e388 0680
0004500  000a 0340 2440 3c12 700f b084 6606 0045
0004520  0080 6004 0246 ff7f 3486 2017 588f 4ced
0004540  0470 fff0 4e5d 4e75 4e55 0000 48e7 cf20
0004560  2800 2a01 2c2f 0024 4fef ffee 426f 0008
0004600  4297 0c84 0002 0000 6500 0102 0c85 0002
0004620  ffff 6200 00f8 b885 6400 00f2 7002 b086
0004640  6708 7001 b086 6600 00ee 2004 0280 0001
0004660  e000 720d e2a8 2e00 2005 0280 0001 e000
0004700  720d e2a8 2f40 000e 3f7c 0001 0004 7008
0004720  b087 6f5c 247c 000e 0102 7000 302f 0004
0004740  efa8 816f 0008 5287 beaf 0004 6aon 7008
0004760  b087 6ee6 3f52 0006 7002 b086 6710 7000
0005000  302f 0008 7200 322f 0006 8081 6010 7000
0005020  302f 0008 4680 7200 322f 0006 c081 3f40
0005040  0006 34af 0006 426f 0008 3f7c 0001 0004
0005060  7007 b0af 000e 6c58 5187 51af 000e 7000
0005100  302f 0004 efa8 816f 0008 5287 beaf 000e
0005120  6fec 247c 000e 0104 3f52 0006 7002 b086
0005140  6710 7000 302f 0008 7200 322f 0006 8081
0005160  6010 7000 302f 0008 4680 7200 322f 0006
0005200  c081 3f40 0006 34af 0006 6004 70ff 2e80
0005220  2017 4fef 0012 4ced 04f0 ffec 4e5d 4e75
0005240  4e55 0000 48e7 c880 598f 7007 6100 f8a4
0005260  2800 2ebc 0000 0492 2057 2010 723c d081
0005300  2e80 7201 701e 2057 6e90 2004 6100 f884
0005320  588f 4ced 0112 fff4 4e5d 4e75 4e55 0000
0005340  243c 8000 0000 2d42 000c 41fa 034c 2d48
0005360  0010 6100 013e 206e 0010 242e 000c 5888
0005400  e39a 6404 41fa 0332 2602 c6ae 0000 67ee
0005420  2d42 000c 2d48 0010 2250 4e91 206e 0010
0005440  242e 000c 60d8 2e6e 0014 2a57 4fef fff8
0005460  2eaf 000c 4e75 4e55 0000 48e7 00c0 42ae
0005500  0098 701f 41ee 0018 43ee 009c 4298 4299
0005520  51c8 fffa 41ee 0004 20ba 03de 42ae 0008
0005540  42ae 0000 203a 03d6 c0ba 03ce 6100 000a
0005560  4cdf 0300 4e5d 4e75 4e55 0000 2f02 243a
0005600  03b8 c4ae 0004 c480 b082 6612 4682 c5ae
0005620  0004 81ae 0000 203e 0000 0000 6006 203c
0005640  ffff ffff 241f 4e5d 4e75 4e55 0000 2f02
0005660  4a80 6604 202e 000c 242e 0008 84ae 0000
0005700  c4ba 0376 c480 b082 6616 4682 c5ae 0008
0005720  c5ae 0000 81ae 0004 203c 0000 0000 6006
0005740  203c ffff ffff 241f 4e5d 4e75 4e55 0000
0005760  48e7 3000 4a80 6604 202e 000c 242e 0008
0006000  c4ba 0336 c480 b082 661a 40c3 007c 0700
0006020  85ae 0000 4682 c5ae 0008 46c3 203c 0000
0006040  0000 6006 203c ffff ffff 4cdf 000c 4e5d
0006060  4e75 2f0d 2d4f 0014 206f 0004 598f 4ed0
0006100  4e55 0000 48e7 2080 2041 243a 02ec c480
0006120  b082 6708 20bc 0000 0080 603c 242e 0000
0006140  c480 b082 6608 20bc 0000 0010 602a 242e
0006160  0004 c480 b082 6608 20bc 0000 0020 6018
0006200  242e 0008 c480 b082 6608 20bc 0000 0040
```

Company Proprietary Technical Information
© 1989 Rockwell International

```
0006220  6006 20bc 0000 0000 4cdf 0104 4e5d 4e75
0006240  4e55 0000 48e7 3880 4a80 6604 202e 000c
0006260  242e 0008 84ee 0000 c4ba 027e c480 b082
0006300  6636 41ee 0018 7401 4283 40c4 007c 0700
0006320  4a81 6602 7201 e298 6404 2081 8682 d1fc
0006340  0000 0004 e39a 64ee 87ae 0006 4683 c7ae
0006360  0000 46c4 7000 6002 70ff 4cdf 011c 4e5d
0006400  4e75 4e55 0000 4a80 6604 4e5d 4e75 48e7
0006420  3c80 40c5 007c 0700 242e 0008 41ee 0018
0006440  4284 263c 0000 0001 e29a 64c6 9190 6e02
0006460  8883 d1fc 0000 0004 e39a 64ee 4a84 6706
0006500  2004 6100 fee8 46c5 4cdf 013c 4e5d 4e75
0006520  4e55 0000 4a80 6604 4e5d 4e75 48e7 3ee0
0006540  2c00 242e 0098 6700 0040 41ee 009c 43fa
0006560  01d0 263c 0000 0001 e29a 641c 40c5 007c
0006600  0700 9d90 6e10 1203 4684 c9ae 0098 2451
0006620  46c5 4a92 6002 46c5 d1fc 0000 0004 d3fc
0006640  0000 0004 e39a 61d0 4cdf 077c 4e5d 4e75
0006660  4e55 0000 48e7 3880 40c4 007c 0700 2400
0006700  c4ba 01fe b480 6628 41ee 009c 7401 4283
0006720  4a81 6602 7201 e298 6404 2081 8682 d1fc
0006740  0000 0004 e39a 64ee 87ae 0098 7000 6002
0006760  70ff 46c4 4cdf 011c 4e5d 4e75 4e55 0000
0007000  48e7 2800 40c4 007c 0700 242e 0098 c4ba
0007020  01b0 c480 b082 660e 4682 c5ae 0098 203c
0007040  0000 0000 6006 203c ffff ffff 46c4 4cdf
0007060  0014 4e5d 4e75 4e55 000e 0002 2aa0 0002 4774
0007100  0002 49cc 0002 4566 0002 3900 0002 5bde
0007120  0002 5522 0002 68ac 0000 0000 0000 0000
0007140  0000 0000 0000 0000 0000 0000 0000 0000
*
0007260  0000 0000 0000 0000 0002 2fc6 0002 2fcf
0007300  0002 2fe0 0002 2ff1 0002 3002 0002 300d
0007320  0002 3019 0002 3026 0000 0000 0000 0000
0007340  0000 0000 0000 0000 0000 0000 0000 0000
*
0007460  0000 0000 0000 0000 0000 00ff 0000 001b
0007500  0000 0000 0000 0000 0000 0000 0000 0000
*
0007700  0000 0000 cccc 5472 7944 6562 7567 006d
0007720  5f64 6173 5f64 7367 5f6c 6f61 6465 7200
0007740  6d5f 6461 7265 6473 675f 756e 626c 6164
0007760  006d 5f64 6173 5f64 6169 6e74 5f61 626f
0010000  6d5f 646e 6485 6b65 7266 656c 0072 6571
0010020  5f68 6e64 646c 6572 0063 6861 6e6e 656c
0010040  5f73 6361 6e00 6461 735f 636b 7375 6d5f
0010060  6175 6469 7400 4e55 0000 48e7 c080 598f
0010100  4297 7001 b02f 0007 660c 206f 0008 20bc
0010120  0000 2000 6004 70ff 2e80 2017 588f 4ced
0010140  0100 fffc 4e5d 4e75 4e55 0000 48e7 cc00
0010160  2800 201f 598f 4a2f 001f 6610 4878 0002
0010200  2205 2004 6100 f8e2 588f 6010 700c b02f
0010220  001f 6606 4878 0001 60e6 70ff 2e80 2017
0010240  588f 4ced 0030 fff8 4e5d 4e75 4e55 0000
0010260  48e7 c080 2800 518f 42af 0004 2004 6100
0010300  f616 2e80 7002 b097 6608 206f 000c 4210
0010320  6016 7001 b097 660e 206f 000c 10bc 0002
0010340  6006 70ff 2f40 0004 202f 0004 508f 4ced
0010360  0110 fff8 4e5d 4e75 4e55 0000 48e7 c080
0010400  4fef ffe0 70ff 2f40 000a 42a7 42a7 486f
0010420  0016 7200 7008 6100 03da 4fef 000c 2f40
0010440  000a 4aaf 000a 6600 0088 42a7 42a7 42a7
0010460  42a7 42a7 42a7 42a7 4878 0005 7208 202f
0010500  002e 6100 05ce 4fef 0020 2f40 000a 4aaf
0010520  000a 6600 005c 206f 000e 30bc 0005 206f
0010540  0004 4268 0002 206f 000a 317c 4f28 0004
0010560  1f7a ef25 0001 7000 102f 0001 206f 000e
0010600  3140 0006 41ef 000e 2008 6100 04b4 2f40
0010620  000a 2f7c 0000 0420 0006 206f 0006 2f50
0010640  0002 7000 102f 0001 206f 0002 3140 03ac
0010660  202f 000a 4fef 0012 6000 0004 4e71 4ced
0010700  0102 fff8 4e5d 4e75 4e55 0000 48e7 e880
0010720  426e 011c 3d7c 0064 011e 7800 6038 41ee
0010740  0224 2008 2400 2400 5280 723e 6100 3948
0010760  d480 2004 723e 6100 393e 41ee 0224 2182
0011000  0800 2004 723e 6100 392e 41ee 0224 31bc
0011020  0024 0804 5284 7063 b084 6ec2 3d7c 0024
0011040  1a22 42ae 1a1e 4248 0224 2d48 0120 41ee
0011060  1a1e 2d48 0124 3d7c 0001 0128 3d7c 0006
0011100  012a 7800 6044 41ee 1a5c 2008 2400 2004
0011120  5280 223c 0000 0120 6100 38dc d480 2004
0011140  223c 0000 0120 6100 38ce 41ee 1a5c 2182
0011160  0800 2004 223c 0000 0120 6100 38be 41ee
0011200  1a5c 31bc 0106 0804 5284 7005 b084 6eb6
0011220  3d7c 0106 2000 42ae 1ffc 41ee 1a5c 2d48
0011240  012c 41ee 1ffc 2d48 0130 7802 6044 2004
0011260  720c 6100 3882 41ee 011c 31bc 00ff 0800
0011300  2004 720c 6100 3870 41ee 011c 4270 0802
0011320  2004 720c 6100 3860 41ee 011c 42b0 0804
0011340  2004 720c 6100 3850 41ee 011c 42b0 0808
0011360  5284 7016 b084 6eb6 4ced 0116 fff0 4e5d
0011400  4e75 4e55 0000 48e7 cc80 2800 2004 6128
0011420  2a00 72ff b280 6604 70ff 6012 2005 720c
0011440  6100 3814 41ee 011c 3030 0802 48c0 4ced
0011460  0132 fff0 4e5d 4e75 4e55 0000 48e7 8800
0011500  2800 7001 b084 6e16 700a b084 6c08 0c84
0011520  0000 2710 6d08 0c84 0000 2710 6f04 70ff
0011540  601c 0c84 0000 2710 6d12 0c84 0000 271a
0011560  6e0a 2004 0480 0000 2705 6002 2004 4ced
0011600  0010 fffc 4e5d 4e75 4e55 0000 48e7 c8b0
0011620  2800 2441 4a84 6d06 7016 b084 6e06 7001
0011640  6000 00a4 4a92 6706 2012 0480 0000
0011660  0014 5d80 2640 70ff b093 6706 7007 6000
0011700  0086 2004 720c 6100 376e 41ee 011c 4ab0
0011720  011c 218b 0804 2004 720c 6100 375c 41ee 011c
0011740  4ab0 0808 6624 2004 720c 6100 374a 41ee
0011760  011c 218b 0804 2004 720c 6100 373a 41ee
0012000  011c 31bc 0001 0802 6022 2004 720c 6100
0012020  3726 41ee 011c 2070 0808 208b 2004 720c
0012040  6100 3714 41ee 011c 5270 0802 2004 720c
0012060  6100 3704 41ee 011c 218b 0808 4293 4292
0012100  7000 6002 70ff 4ced 0d10 fff0 4e5d 4e75
0012120  4e55 0000 48e7 c8b0 2800 2441 4a84 6d06
0012140  7016 b084 6a06 7001 6000 007e 2004 720c
0012160  6100 36c4 41ee 011c 4a70 0802 6604 4292
0012200  70ff 6064 2004 720c 6100 36ac 41ee 011c
0012220  2670 0804 2004 720c 6100 369c 41ee 011c
0012240  5370 0802 6622 2004 720c 6100 368a 41ee
0012260  011c 42b0 0804 2004 720c 6100 367a 41ee
0012300  011c 42b0 0808 6010 2004 720c 6100 3668
0012320  41ee 011c 2193 0804 26bc ffff ffff 200b
0012340  721a 8081 2480 7000 4ced 0d10 fff0 4e5d
0012360  4e75 4e55 0000 48e7 c830 246f 001c 598f
0012400  0c6f 0106 0006 6f04 7003 6038 7024 b06f
0012420  0006 6d06 220a 7000 6004 220a 7001 6100
0012440  ff30 2e80 4a97 661a 2012 0480 0000 0014
0012460  2640 7800 6006 4213 5284 528b 7014 b084
0012500  6ef4 2017 598f 4ced 0c10 fff4 4e5d 4e75
0012520  4e55 0000 48e7 c030 2440 2012 0480 0000
0012540  0014 5d80 2640 7024 b06b 0004 6606 220a
0012560  7000 600c 0c6b 0106 0004 660a 220a 7001
0012600  6100 fe06 6002 7007 4ced 0c0c ffff 4e5d
0012620  4e75 4e55 0000 48e7 cc80 2800 3044 2008
0012640  6100 fd96 2a00 70ff b085 6604 7001 602e
0012660  2005 720c 6100 3580 41ee 011c 3030 0800
0012700  48c0 0800 0007 6714 2005 720c 6100 3558
0012720  41ee 011c 3184 0800 7000 6002 70ff 4ced
0012740  0130 fff4 4e5d 4e75 4e55 0000 48e7 cc80
0012760  2f00 2441 3044 2008 6100 fd36 2a00 70ff
0013000  b085 6604 7001 602e 2005 720c 6100 3528
0013020  41ee 011c 3030 0800 48c0 0800 0007 6704
0013040  70ff 6012 2005 720c 6100 350c 41ee 011c
0013060  34b0 0802 4ced 0530 fff0 4e5d 4e75
0013100  4e55 0000 48e7 c020 2440 220a 7002 6100
0013120  fd38 4ced 0402 fff8 4e5d 4e75 4e55 0000
0013140  48e7 c8b0 2440 598f 306f 000a 2005 6100
0013160  fcc8 2800 70ff 2e80 70ff b084 6604 7001
0013200  6048 2004 720c 6100 34ae 41ee 011c 4a70
0013220  0802 6f34 220a 2004 6100 fdb6 2e80 6624
0013240  2012 0480 0000 0014 2640 4aaf 002c 6706
0013260  206f 002c 3093 4aaf 002e 6708 206f 0028
0013300  30ab 0002 2017 6002 7009 588f 4ced 0d10
0013320  fff0 4e5d 4e75 4e55 0000 48e7 c8a0 2017
0013340  0480 0000 0014 2440 7000 302a 0004 6100
0013360  fc46 2800 70ff b084 6604 7001 600a 6147
0013400  2208 2004 6100 fc82 4ced 0510 fff4 4e5d
0013420  4e75 4e55 0000 48e7 c0b8 2440 266f 003c
0013440  598f 200a 6764 200a 0480 0000 0014 2840
0013460  38af 000a 196f 003f 000a 200b 6614 396f
0013500  0026 000a 396f 0006 196f 002f 0008
0013520  6022 200b 0480 0000 0014 2e80 2057 3968
0013540  000e 0004 2057 3968 0010 0006 2057 1968
0013560  0012 000e 196f 0032 000e 396f 0036 0010
0013600  196f 003b 0012 7000 6002 70ff 588f 4ced
0013620  1d00 fff0 4e5d 4e75 4e55 0000 48e7 c020
0013640  2440 7041 b02f 0007 6606 220a 7002 500c
0013660  7042 b02f 0007 660a 220a 7003 6100 fbca
0013700  6002 70ff 4ced 0c00 fff8 4e5d 4e75 4e55
0013720  0000 48e7 c0a0 4fef ffe8 42ae 211c 2ebc
0013740  0000 04a2 2057 2028 001c d0b9 0000 0420
0013760  2f40 0014 2e79 0000 04e6 0008 42af 000c
0014000  6000 00b4 202f 000c 7230 6100 332a d0af
0014020  0014 2440 42a7 4878 0001 7240 7000 302a
0014040  0006 6100 fd6e 508f 2f40 0010 4aaf 0010
0014060  6714 222f 0010 41fa 0098 2008 6100 0c60
0014100  357c 0001 0004 302a 0008 b06a 0006 6732
0014120  42a7 4878 0001 7240 7000 302a 0008 6100
0014140  fd32 508f 2f40 0010 4aaf 0010 6714 222f
0014160  0010 41fa 0074 2008 6100 0c24 357c 0001
0014200  0004 4aaf 0010 6610 7003 b0b9 0000 040c
0014220  6706 357c 0002 0004 2f6a 0016 0004 206f
0014240  0004 4290 41ee 3e06 2f48 0010 200a 6100
0014260  09c4 52af 000c 202f 000c b0af 0008 6d00
0014300  ff44 4fef 0018 4ced 0502 fff4 4e5d 4e75
0014320  4d61 696c 626f 7820 6372 6561 7465 2065
0014340  7272 6f72 2025 6400 4d51 696c 626f 7820
0014360  6372 6561 7465 2065 7272 6f72 2025 6400
0014400  4e55 0000 48e7 c8b0 4fef ffe8 2f7c 0000
0014420  04a2 000c 206f 000e 2028 001c d0b9 0000
0014440  0420 2f40 0014 2eb9 0000 04e6 42af 0004
0014460  6000 010a 202f 0004 7230 6100 31fa d0af
0014500  0014 2440 7001 b06a 0004 6700 00ec 2f6a
0014520  0014 000c 206f 000c 2f68 0010 0008 5028
0014540  7001 b084 6704 7005 b084 662e 222f 0010
0014560  200a 6100 00e0 7201 b280 662a 206a 001c
0014600  4210 7001 b084 661e 41ef 0010 2208 200a
0014620  206f 0008 4ee9 2800 600e 42a7 2204 200a
0014640  6100 07f6 588f 7810 7010 b084 66b2 206f
0014660  000c 2f68 000c 0008 200a 6100 0462 2800
0014700  6044 266a 0018 4b6b 000c 222b 0004 200a
0014720  266f 000c 4e90 588f 2800 7001 b084 6706
0014740  7003 b084 660c 422b 000a 7001 b084 6616
0014760  60c6 7010 b084 670a 42a7 2204 200a 6100
0015000  0798 588f 7810 7001 b084 67b6 206f 000c
0015020  2f68 0008 0008 200a 206f 0008 4e90 2800
0015040  7001 b084 6712 7010 b084 670a 42a7 2204
0015060  200a 6100 0764 588f 52af 0004 202f 0004
0015100  b097 6d00 fef6 4fef 0018 4ced 0d12 ffec
0015120  4e5d 4e75 4e55 0000 48e7 c8b0 2440 4fef
0015140  ffec 202e 211c 0800 0002 6716 41fa 0324
0015160  2208 7003 6100 0a1a 2208 200a 6100
0015200  075c 206f 0018 3f50 000c 7000 102f 000d
0015220  2a00 7000 102f 0002 5980 5280 2800 202f
0015240  0018 5880 2840 266a 0018 7003 b06a 0004
0015260  662c 4a2b 000b 6726 4a2b 000a 6620 3f52
0015300  0004 3f6a 0002 0006 3f7c 0002 0002 220a
0015320  41ef 0002 2008 6100 0744 422b 000b 2005
```

```
0015340 0800 0003 6608 2f2f 0018 7201 6064 2095
0015360 0800 0002 6726 7002 b06a 0004 666a 3f52
0015400 0004 3f6a 0002 0006 3f7c 0003 0002 220a
0015420 41ef 0002 2008 6100 0704 6050 7002 b06a
0015440 0004 6748 7003 b0b9 0000 040c 661e 3f52
0015460 0004 3f6a 0002 0006 3f7c 0002 0002 220a
0015500 41ef 0002 2008 6100 06d4 6020 2f2f 0018
0015520 7202 200a 6100 0642 588f 2f2f 0018 7203
0015540 200a 6100 0634 588f 6000 0218 2005 0800
0015560 0001 6700 010a 4a6b 0018 6730 2f2f 0018
0015600 7203 200a 6100 0612 588f 4aab 0010 6718
0015620 2f2b 0010 7203 200a 6100 05fe 588f 200b
0015640 7210 d081 0018 f9aa 426b 0018 42a7 4878
0015660 0001 486b 0010 7200 7000 3014 6100 f934
0015700 4fef 000c 2c00 4a86 670e 220a 2606 6100
0015720 0584 7010 6000 01ae 202e 211c 0800 0003
0015740 6718 2f2b 0010 7000 3014 2f00 41fa 01c4
0015760 2208 7003 6100 089a 588f 2005 0800 0002
0016000 6626 202b 0010 0480 0000 0014 2740 0014
0016020 7000 3014 7214 d081 3740 0018 206b 0014
0016040 1f68 000d 0001 6056 42a7 42a7 7000 3012
0016060 2f00 302a 0002 2f00 42a7 42a7 42a7
0016100 7000 302c 0002 2f00 7000 3014 2200 202b
0016120 0010 6100 fabe 4fef 0020 276b 0010 0014
0016140 3754 0018 5984 588c 202e 211c 0800 0003
0016160 670c 41fa 016a 2208 7003 6100 0814 7000
0016200 302b 0018 b880 630a 2f2f 0018 7204 6000
0016220 0080 2f04 222b 0014 200c 6100 055e 588f
0016240 2005 0800 0002 6612 2105 0800 0001 670a
0016260 206b 0014 116f 0001 090d d9ab 0014 996b
0016300 0018 2005 0800 0000 673a 4a6b 0018 6600
0016320 00b2 2f2f 0018 7205 200a 6100 94bc 588f
0016340 4aab 0010 6700 009c 2f2b 0010 7203 200a
0016360 6100 04a6 588f 200b 7210 d081 6190 f852
0016400 6000 0080 4a6b 0018 6732 2f2f 0018 7206
0016420 200a 6100 0484 588f 4aab 0010 6718 2f2b
0016440 0010 7203 200a 6100 0470 588f 200b 7210
0016460 d081 6100 f81c 426b 0018 6046 202b 0010
0016500 0480 0000 0014 2f40 0010 206f 0010 7000
0016520 3028 0002 2200 202b 0010 6100 f97a 2c00
0016540 4a86 6708 220a 2006 6100 03aa 202e 211c
0016560 0800 0003 670c 41fa 007c 2208 7003 6100
0016600 0710 7001 4fef 0018 4ced 1d70 ffe4 4e5d
0016620 4e75 0d0d 2d2d 2d2d 204b 6572 6e65 6c20
0016640 6173 7365 6d62 6c6e 6e67 2070 6163 6b65
0016660 7400 416c 6c6f 6361 7465 6420 6d61 696c
0016700 2062 7566 6665 723a 2020 7369 7a65 203d
0016720 2025 642c 2070 7472 203d 2025 7800 494d
0016740 5220 6d61 696c 2068 6561 6465 7220 6275
0016760 696c 6400 5375 6363 6573 7366 756c 6c79
0017000 2073 656e 6420 6173 7365 6d62 6c65 6420
0017020 6d61 696c 206d 6573 7361 6765 0000 4e55
0017040 7000 48e7 c878 2440 4fef ffe2 286a 0018
0017060 200c 720c d081 2640 4a2c 000a 671c 202e
0017100 211c 0800 0001 6710 2f14 41fa 021a 2208
0017120 7003 6100 063c 6000 01fe 4a6c 0008 671a
0017140 7000 1013 5980 5280 1800 7000 1004 916c
0017160 7000 1004 d1ac 0004 7003 b06a 0004
0017200 6626 4a2c 000b 6720 4a2c 000a 661a 3f52
0017220 0002 3f6a 0002 0004 3eb: 0002 41d7 2008
0017240 6100 037a 422c 000b 7002 b06a 0004 660a
0017260 7808 3f6a 0006 0018 6008 780c 3f6a 0008
0017300 0018 4a6c 0008 6600 010a 4a94 6736 202e
0017320 211c 0800 0001 6710 2f14 41fa 01a8 2208
0017340 7003 6100 05ac 588f 2000 6100 1064 f664 2f40
0017360 001a 4aaf 001a 670c 220a 202f 001a 6100
0017400 0254 4294 486f 0016 486f 0016 42a7 7000
0017420 302f 0024 2200 200c 6100 f742 4fef 000c
0017440 2f40 001a 4aaf 001a 6718 7009 b0af 001a
0017460 670a 220a 202f 001a 6100 021a 7010 6000
0017500 0118 202e 211c 0800 0001 6710 7000 302f
0017520 0016 2f00 2f14 41fa 0154 2208 7003 6100
0017540 0530 588f 7002 8800 396f 0016 0008 7002
0017560 b06a 0004 6614 2014 0480 0000 0014 2940
0017600 0004 7014 d16c 0008 6048 2014 5980 2940
0017620 0004 2014 0480 0000 0014 2f40 000e 2f6c
0017640 000a 206f 000a 226f 000a 54af 000a
0017660 3290 206f 000e 226f 000a 54af 000a 32a8
0017700 0004 586c 0008 486f 0016 6606 197c 0001
0017720 000b 7000 302a 000c 5980 7200 322c 0008
0017740 b081 6c36 7000 1004 08c0 0000 1740 0001
0017760 7000 302a 000c 5980 5280 1680 202e 211c
0020000 0800 0000 674a 7000 102b 0001 2f00 7000
0020020 1013 2f00 41fa 00e6 602c 1744 0001 7000
0020040 302c 0008 5980 5380 1680 202e 211c 0800
0020060 0000 671c 7000 102b 0001 2f00 7000 1013
0020100 2f00 41fa 00d2 2208 7003 6100 0444 588f
0020120 197c 00ff 000a 7001 4fef 001e 4ced 1f12
0020140 ffe4 4e5d 4e75 7265 7475 726e 696e 6720
0020160 7468 6520 7072 6576 696f 7573 2070 6163
0020200 6b65 7400 7265 6c65 6173 6564 2074 6865
0020220 206c 6173 7420 6d61 696c 2062 7566 6665
0020240 722c 7770 203d 2025 7800 7265 7265 6365
0020260 6976 6564 2061 206e 6577 206d 6169 6c20
0020300 6275 6666 6572 3a20 7074 7220 3d20 2578
0020320 2c20 7369 7a65 203d 2025 6400 6d61 696c
0020340 2061 6e6e 756e 6c20 7061 636b 6574 206f
0020360 6620 7369 7a65 2025 3032 7820 616e 6420
0020400 636f 6e74 726f 6c20 6669 656c 6420 6f66
0020420 2025 3032 7800 6d61 696c 2061 2070 6172
0020440 7469 616c 2070 6163 6b65 7420 6f66 2073
0020460 697a 6520 2530 3278 2061 6e64 2063 6f6e
0020500 7472 6f6c 2066 6965 6c64 206f 6620 2530
0020520 3278 0000 4e55 0000 48e7 c080 2f17 41fa
0020540 001c 2208 7003 6100 0328 588f 202f 0004
0020560 6100 0074 4ced 0103 fffc 4e5d 4e75 0d4d
0020600 6169 6c20 7365 7276 6963 6520 6572 726f
0020620 723a 2025 3038 7800 48e7 2080 7410 2f00
0020640 7007 6100 elae 2f00 202f 0004 2f0e 2c79
```

```
0020660 0000 0420 2f2f 0018 2079 0000 0492 e58a
0020700 41f0 2800 4e90 4fef 0004 2c5f 201f 6100
0020720 e182 4fef 0004 4cdf 0104 4e75 48e7 2080
0020740 7411 6000 ffba 48e7 2080 7412 6000 ffb0
0020760 48e7 2080 7413 6000 ffa6 48e7 2080 7414
0021000 2f2f 000c 2079 0000 0492 e58a 41f0 2800
0021020 4e90 4fef 0004 4cdf 0104 4e75 4e55 0000
0021040 48e7 c0a0 2440 7000 3012 2200 41fa 0012
0021060 2008 6100 026a 4ced 0502 fff4 4e5d 4e75
0021100 494c 4820 6c69 6e6b 206d 6f64 6f6c 6520
0021120 516a 6765 2072 6571 7565 7374 2069 676e
0021140 6f72 6564 3a20 636f 6d6d 616e 6420 3d20
0021160 2564 0000 4e55 0000 48e7 c020 2440 4ced
0021200 0400 fffc 4e5d 4e75 4e55 0000 48e7 88a0
0021220 78ff 4a97 4320 2017 b0ba 01a0 6218 2017
0021240 5380 e588 41fa 0184 2470 0800 7000 102a
0021260 003d 2800 7800 0004 4ced 0519 fff4 4e5d
0021300 4e75 4e55 0000 48e7 c0b0 598f 267c 0002
0021320 0040 70fa 2e80 4aaf 0004 6f00 00f4 202f
0021340 0004 b0ba 0156 6600 00e0 202f 0004 5380
0021360 e588 41fa 0136 2470 0800 202f 0004 5380
0021400 4233 0800 422a 0001 157c 00ff 0003 7000
0021420 102a 0005 72bc c081 1540 0005 7000 102a
0021440 0007 0280 ffff ff7f 1540 0007 7000 103a
0021460 0112 6610 7000 102a 0005 08c0 0004 1540
0021500 0005 401a 7001 b03a 00fa 6612 157c 00ff
0021520 001f 157c 00ff 0021 157c 00ff 0023 202f
0021540 0004 5380 41fa 00de 1570 0800 000b 7000
0021560 102a 0005 08c0 0004 1540 0005 203a 00c0
0021600 7218 e2a8 1540 000d 203a 00b4 7210 e2a8
0021620 1540 000f 203a 00a8 e088 1540 0011 157a
0021640 00a1 0013 7000 102a 000d e188 7200 122a
0021660 000f 8081 e188 7200 122a 0011 8081 e188
0021700 7000 122a 0013 8081 b0ba 0074 6602 4297
0021720 2017 588f 4ced 0d02 fff0 4e5d 4e75 4e55
0021740 0000 48e7 80a0 598f 70fa 2e80 4aaf 0004
0021760 6f2a 202f 0004 b0ba 0042 6e20 202f 0004
0022000 5380 e588 41fa 0024 2470 0800 7000 102a
0022020 0005 08c0 0007 1540 0005 4297 2017 588f
0022040 4ced 0500 fff8 4e5d 4e75 000e 0000 000e
0022060 0040 000e 0080 000e 00c0 0000 0004 08da
0022100 bdc8 0200 020a 121a 48e7 2082 243c 0000
0022120 000c 2c79 0000 0420 2f2f 002c 2f2f 002c
0022140 2f2f 002c 2f2f 002c 2f2f 002c 2f2f 002c
0022160 2f2f 002c 2f2f 002c 2079 0000 0492 e58a
0022200 41f0 2800 4e90 4fef 0020 4cdf 4104 4e75
0022220 48e7 2082 243c 0000 000d 6000 ffb6 48e7
0022240 2082 243c 0000 000e 6000 ffa8 4e55 0000
0022260 48e7 ccb0 7800 3a3c ffff 0c6e 00ff 2154
0022300 6e20 302e 2164 526e 2164 3a00 6028 7000
0022320 3004 e988 41ee 217c 7220 b230 0800 6602
0022340 3a04 3004 5244 0c40 00ff 620a 7000 3005
0022360 72ff b280 67d8 3005 4ced 0132 fff0 4e5d
0022400 4e75 4e55 0000 48e7 ccb0 2800 2441 265f
0022420 0024 598f 7a00 41d7 2208 2004 6100 0d98
0022440 2480 72ff b280 661e 202e 216c 90ee 2168
0022460 b880 620c 24ae 2168 d9ae 2168 2684 6008
0022500 3a3c ffff 6002 2697 7000 3005 588f 4ced
0022520 0d30 ffec 4e5d 4e75 4e55 0000 48e7 8000
0022540 7001 4e5d 4e75 4e55 0000 48e7 cea0 4fef
0022560 fff2 7800 42a7 42a7 42a7 223c 0000 2714
0022600 41af 0016 2008 6100 f0d4 4fef 000c 4a80
0022620 6600 01d4 6000 0156 206f 000a 3c28 0002
0022640 206f 000a 1f68 0006 0001 296f 000a 7002
0022660 b068 0004 4626 486f 0002 7000 3006 2200
0022700 7000 102f 0005 6100 099a 588f 3f40 0006
0022720 7269 b240 6600 00f6 6000 0082 206f 000a
0022740 7001 b068 0004 666e 486f 0002 7000 3006
0022760 2200 7000 102f 0005 6100 0968 588f 3f40
0023000 0006 7265 b240 6600 00c4 4a2e 2120 6600
0023020 00c2 41ee 217c 2008 7200 322f 0002 e989
0023040 d081 0154 24bc 0020 426a 0004 2d52 2124
0023060 2d6a 0004 212a 2d6a 0008 212c 2d6a 000c
0023100 2130 3d6f 0002 2122 2d6a 0008 2138 1d7c
0023120 0055 2120 6006 7019 6000 00b6 7002 6060
0023140 4a2e 2140 666c 206f 000a 3c28 0002 486f
0023160 0002 7000 3006 2200 7003 6100 08e6 588f
0023200 3f40 0006 7265 b240 6642 2f2f 000a 7000
0023220 302f 0006 e988 41ee 217c 2f30 080c 7000
0023240 3006 2200 7008 6100 07aa 588f 3800 6660
0023260 222f 000a 7000 302f 0016 4fef 0002 7004
0023300 6100 e4b6 4a80 6748 781b 6044 382f 0006
0023320 603e 383c 00cc 6038 7000 102e 2140 72ff
0023340 b280 662c 3d7c ffff 2162 6024 206f 000a
0023360 3010 3a00 0c40 00ff 6216 0c00 0001 6700
0023400 ff60 0c00 0002 67d0 0c00 0003 6700 feba
0023420 4a44 6742 7003 b045 660c 3f7c 0005 0004
0023440 3f66 0008 6010 3f7c 000b 0004 206f 000a
0023460 3f68 0002 0008 2f2f 000a 7000 3004 2f00
0023500 7000 302f 0010 2200 7000 302f 000c 6100
0023520 0702 508f 6006 7001 b045 670a 41ef 000e
0023540 2008 6100 edec 4fef 000e 4ced 0572 ffe8
0023560 4a5d 4e75 4e55 0000 48e7 c080 4fef ffec
0023600 426f 000e 42a7 42a7 42a7 223c 0000 2713
0023620 41af 0014 2008 6100 eec4 4fef 000c 4a80
0023640 6600 021c 2f40 0008 3828 0002 6000 0196
0023660 4a2e 2120 6600 00a6 206f 0008 1f68 0004
0023700 000d 486f 0010 7000 3004 2200 7000 102f
0023720 0011 6100 078e 588f 3f40 0012 7269 b240
0023740 6670 4857 41ef 0008 2208 206f 000c 2028
0023760 0006 6100 fd0e 588f 4a40 664c 6100 fcae
0024000 3f40 0010 7200 3200 70ff b081 6724 2f17
0024020 7000 302f 0010 2200 7000 3004 2f00 222f
0024040 0014 202f 0010 6100 043a 4fef 000c 6000
0024060 013a 2217 41ef 0004 2008 6100 03b8 3f7c
0024100 0013 000e 6000 0124 3f7c 0014 000e 6000
0024120 011a 3f6f 0012 000e 6000 0110 7055 b02e
0024140 2120 6700 0106 222c 213c 202e 212c 6100
0024160 0384 7000 302e 2122 6100 02a4 3f7c 00cc
```

```
0024200  000e 6000 00e6 4a2e 2120 6700 00de b86e
0024220  212a 6610 202f 0008 6100 047a 3f40 000e
0024240  6000 00c8 3f7c 00cb 000e 6000 00be 4a2e
0024260  2120 676c b86e 212a 6642 206f 0008 3028
0024300  0004 b06e 2128 6622 202e 2130 b9ae 2134
0024320  661a 6100 04bc 2f2f 0008 42a7 7000 3004
0024340  2200 7006 6100 056f 508f 6034 3f7c 00c9
0024360  000e 6000 3f7c 00cd 0024 3f7c 00cb
0024400  000e 601c 4a2e 2120 6716 222e 213c 202e
0024420  212c 6100 02e0 7000 302e 2122 6100 0200
0024440  6100 0144 6044 203c 0000 0080 6100 e24a
0024460  6100 01c4 7002 6100 e272 602e 3f7c 0019
0024500  0004 6026 206f 0008 3010 5340 0c40 000e
0024520  62ae d040 303b 0006 4efb 0002 fe54 ffca
0024540  ff52 ffa8 ffe0 ffe0 012a 4a6f 000e 6744
0024560  206f 0008 7001 b050 671c 4a2e 2120 6716
0024600  222e 213c 202e 212c 6100 026a 7000 302e
0024620  2122 6100 018a 6100 015e 2f2f 0008 7000
0024640  302f 0012 2f00 7000 3004 2200 7005 6100
0024660  04a2 508f 4fef 0008 2000 6100 eb94 4fef
0024700  0014 4ced 0112 fff4 4e5d 4e75 4e55 0000
0024720  48e7 ceb0 5d8f 4257 7000 302e 2162 72ff
0024740  b280 6700 00de 202e 2154 b0ae 2150 6400
0024760  000e 42a7 42a7 486f 000a 7200 203c 0000
0025000  0016 6100 eaee 4fef 000c 4a80 665c 426e
0025020  2158 2f2e 215e 42a7 42a7 42a7 42a7 42a7
0025040  42a7 42a7 223c 0000 0106 202f 0022 6100
0025060  eca2 4fef 0020 4a80 6620 202f 0002 6100
0025100  04ac 4fef 0002 2008 6100 ebf6 72ff b280
0025120  6600 007a 3abc 0017 4004 3abc 0016 4fef
0025140  0002 2008 6100 eaea 6062 7064 b06e 2158
0025160  6306 526e 2158 6054 3abc 0015 604e 2f2e
0025200  215e 7000 302e 2148 2f00 7000 302e 214a
0025220  2200 700a 6100 03bc 508f 3e80 662e 7000
0025240  302e 2142 e988 41ee 217c d1c0 20ae 2144
0025260  216e 2148 0004 216e 214c 0008 216e 2150
0025300  000c 6100 016c 7004 6100 e0e0 4a57 671a
0025320  2f2e 215e 306f 0004 2f08 7000 302e 214a
0025340  2200 700b 6100 036c 508f 5c8f 4ced 0d72
0025360  ffe4 4e5d 4e75 4e55 0000 48e7 8020 45ee
0025400  2120 7800 6004 421a 5284 7020 b084 6ef6
0025420  422e 2120 4ced 0410 fff8 4e5d 4e75 4e55
0025440  0000 48e7 cea0 2800 7a00 604c 7000 3004
0025460  e988 41ee 217c 7200 3230 0806 e389 41ee
0025500  317c 602e 7000 3004 e988 41ee 217c 7200
0025520  3230 0806 e389 41ee 319c 6016 7000 3004
0025540  41ee 217c 7200 3230 0806 e389 41ee
0025560  31bc 4270 1870 6026 7000 3004 e988 41ee
0025600  217c 3030 0802 0c40 00ff 4212 0c00 0001
0025620  679a 0c00 0002 67ac 0c00 0003 67be 41ee
0025640  217c 2008 7200 3204 e989 d081 2440 0c44
0025660  0100 6232 7c00 6004 421a 5284 7010 b046
0025700  6ef6 7000 3004 e988 41ee 217c 4230 0800
0025720  302e 2164 48c0 7200 3204 5281 b081 6608
0025740  536e 2164 6002 7aff 3005 4ced 0572 ffe8
0025760  4e5d 4e75 4e55 0000 48e7 c820 2440 2801
0026000  b5fc 0080 0000 6404 b5ee 216c 6418 202e
0026020  2168 9084 b08a 6606 2d4a 2168 6008 2204
0026040  200a 4100 074a 4ced 0410 fff8 4e5d 4e75
0026060  4e55 0000 48e7 88a0 45ee 2140 41ee 215e
0026100  2008 6100 e90c 7800 6004 421a 5284 7024
0026120  b084 6ef6 422e 2140 4ced 0510 fff4 4e5d
0026140  4e75 4e55 0000 48e7 ce30 2440 2641 282f
0026160  0024 2a2f 0028 2f2f 002c 1d7c 00ff 2120
0026200  3d44 212a 3d45 2122 7000 102b 0004 3d40
0026220  2126 2d4a 212c 2d64 213c 2d4a 2130 2d6b
0026240  0006 2130 4ced 0c70 ffec 4e5d 4e75 4e55
0026260  0000 48e7 c080 3d6f 0002 2142 7000 302f
0026300  0002 e988 41ee 217c d1c0 2d50 2144 2368
0026320  0004 2148 2d68 0008 214c 2d68 000c 2150
0026340  426e 2148 42ae 2154 7000 302f 0002 e988
0026360  41ee 217c 2d70 0808 215a 2d6f 0004 215e
0026400  426e 2162 1d7c 00ff 2140 4ced 0100 fffc
0026420  4e5d 4e75 4e55 0000 48e7 ceb0 558f 3c2e
0026440  2128 4257 202f 0002 5280 2440 206f 0002
0026460  3828 0004 7000 3004 d0ae 2134 b0ae 2130
0026500  623c 266e 2138 700b 6100 d84c 7a01 600a
0026520  7000 1012 dc40 16da 5245 3005 48c0 7200
0026540  3204 b081 6fea 700a e100 d82c 2d4b 2138
0026560  3d46 2128 7000 3004 d1ae 2134 6004 3abc
0026600  00ca 3017 548f 4ced 0d72 ffe4 4e5d 4e75
0026620  4e55 0000 48e7 ce80 3a2e 212c 3c2e 212a
0026640  6028 3d44 e388 41ee 317c 6016 7000
0026660  3006 e388 41ee 319c 600a 7000 3006 e388
0026700  41ee 31bc 6208 600c 302e 2126 0c40
0026720  00ff 6212 0c00 0001 67c8 0c00 0002 67ce
0026740  0c00 0003 67d4 202e 213c 90ae 2134 2800
0026760  4a84 630a 2204 202e 2138 6100 fdf8 53ae
0027000  2138 7000 3005 e988 41ee 217c d1c0 20ae
0027020  2124 216e 2128 0004 216e 212c 0908 216e
0027040  2130 000c 7000 3005 e988 41ee 217c 11bc
0027060  0010 0800 2f2e 2138 222e 212c 7000 3005
0027100  5280 6100 d584 508f 4ced 0172 ffec 4e5d
0027120  4e75 4e55 0000 48e7 c080 5d8f 426f 0004
0027140  42a7 42a7 486f 0008 7200 7006 6100 e684
0027160  4fef 000c 4a80 665e 2f2f 001e 42a7 42a7
0027200  42a7 42a7 42a7 42a7 42a7 7206 202f 0020
0027220  6100 e880 4fef 0020 4a80 662a 2057 30af
0027240  0008 2057 316f 000c 0002 2057 316f 001c
0027260  0004 41d7 2008 6100 e788 4a80 671e 3f7c
0027300  0017 0004 4096 3f7c 0016 0004 41d7 2008
0027320  0100 e67a 6006 3f7c 0015 0004 302f 0004
0027340  5c8f 4ced 0100 fffc 4e5d 4e75 4e55 0000
0027360  48e7 8ab0 3a2e 2148 202e 2150 90ae 2154
0027400  3c00 0c40 0100 6304 3c3c 0100 2057 30bc
0027420  0009 2057 316e 214e 0002 2057 3146 0004
0027440  2017 5c80 244a 0266 215a 700b 6100 d668
0027460  7800 600a 7000 1013 da40 14db 5244 b846
0027500  65f2 700a 6100 d650 2d4b 215a 3345 2148
0027520  7000 3006 d1ae 2154 4ced 0d70 ffa8 4e5d
```

```
0027540  4e75 4e55 0000 48e7 c080 518f 426f 0006
0027560  6036 3abc 000f 41ee 317c 6012 3abc 000f
0027600  41ee 319c 6008 3aee 2166 41ee 31bc 2008
0027620  7200 322f 000e e389 d081 2f40 0002 6028
0027640  3f7c 006a 0006 6020 7000 102f 000b 5340
0027660  0c40 0003 62ea d040 303b 0006 4efb 0002
0027700  ffb2 ffbc ffc6 ffc6 706a b06f 0006 672c
0027720  302f 000e b057 621e 206f 0002 3010 206f
0027740  001c 3080 6708 3f7c 0065 0006 600e 3f7c
0027760  0069 0006 6006 3f7c 0066 0006 302f 0006
0030000  5d8f 4ced 0100 fffc 4e5d 4e75 4e55 0000
0030020  48e7 ceb0 4fef ffec 7200 45ee 217c 42a7
0030040  4878 0001 7240 203c 0000 2713 6100 e554
0030060  508f 42a7 4878 0001 7240 203c 0000 2714
0030100  6100 e550 508f 7240 6020 7800 6004 421a
0030120  5244 7010 b044 6ef6 3005 48c0 e988 41ee
0030140  217c 11bc 0020 0800 5245 0c45 0100 6dda
0030160  1d7c 0010 217c 3d7c 0003 217c 267c 0080
0030200  0000 6006 0546 00ff 528b b7fc 0080 1000
0030220  65f2 3d46 2180 3d7c 0001 2182 2d7c 0080
0030240  0000 2184 2d7c 0000 1000 2188 2d6e 2184
0030260  3df2 202e 3df2 0680 0000 1000 2d40 3df6
0030300  426e 3dfa 426e 3dfc 45ee 2120 7800 6004
0030320  421a 5244 7020 b044 6ef6 422e 2120 45ee
0030340  2140 7800 6004 421a 5244 7024 b044 6ef6
0030360  422e 2140 45ee 317c 7800 6004 421a 5244
0030400  7020 b044 6ef6 45ee 319c 7800 6004 421a
0030420  5244 7020 b044 6ef6 45ee 31bc 7800 6004
0030440  421a 5244 0c44 04b2 6df6 426e 3dbe 3d7c
0030460  0326 2166 3d7c 0010 2164 6100 19c2 2d40
0030500  3dfe 206e 3dfe 7000 3028 0058 2d40 2170
0030520  2d7c 0080 1000 2168 206e 3dfe 7000 1028
0030540  005b 7214 e3a8 0680 0080 0000 0480 0000
0030560  0065 2d40 216c 202e 216c 5280 2d40 2170
0030600  7064 2d40 2178 206e 3dfe 7000 1028 005a
0030620  7218 6100 19a2 2d40 3dee 1abc 0015 422f
0030640  0001 42af 0002 0006 42af 0006 42af 0006
0030660  000e 7800 602e 3b04 48c0 7214 6100 1978
0030700  41ee 366e d1c0 2097 216f 0004 0004 216f
0030720  0008 0008 216f 000c 000c 216f 0010 0010
0030740  5244 3004 48c0 b0ae 3dee 65ca 7030 b0ae
0030760  3dee 663a 1ebc 0014 7830 602c 3004 48c0
0031000  7214 6100 1932 41ee 366e d1c0 2097 216f
0031020  0004 0004 216f 0008 0008 216f 000c 000c
0031040  216f 0010 0010 5244 7060 b044 6ece 4fef
0031060  0014 4ced 0d72 ffe4 4e5d 4e75 4e55 0000
0031100  48e7 ceb0 41ee 3e0e 203c 0002 ffff 9088
0031120  5280 2800 47ee 3e18 2d4b 3e02 4293 42ab
0031140  0004 42ab 0008 200b 7214 d081 2440 274a
0031160  000c 2004 0480 0000 000a 0480 0000 0014
0031200  720c 6100 1924 2c00 7a00 6018 42aa 0004
0031220  42aa 0008 200a 720c d081 2480 d5fc 0000
0031240  000c 5285 ba86 65ed 2746 0010 4ced 0d72
0031260  ffe4 4e5d 4e75 4e55 0000 48e7 ceb0 2800
0031300  598f 7a00 206e 3e02 2c28 0004 206e 3e02
0031320  baa8 0008 6306 70ff 6000 0088 266e 3e02
0031340  206e 3e02 2450 70ff 2e80 6064 b8ae 00c9
0031360  625e 2eaa 0004 206f 0008 20aa 0008 2692
0031400  206e 3e02 53a8 0008 206e 3e02 24a8 000c
0031420  206e 3e02 214a 000c 42aa 0004 42aa 0008
0031440  206e 3e02 52a8 0010 4a93 6630 206e 3e02
0031460  4aa8 0004 660a 206e 3e02 42a8 0008 601c
0031500  206e 3e02 216b 0008 0008 6019 264e 2453
0031520  2005 5285 b086 6414 202a 6690 70ff 6097
0031540  2017 508f 4ced 0d70 ffa8 4e5d 4e75 4e55
0031560  0000 48e7 cafa 2801 518f 7a00 206e
0031600  3e02 2c28 0004 70ff 2e80 0284 0000 1f40
0031620  6300 00fc 4a86 6608 286e 3e02 6000 0082
0031640  286e 3e02 206e 3e02 2650 6068 b8ab 0008
0031660  625e 206e 3e02 4aa8 0010 6608 70ff 2f40
0031700  0004 601e 206e 3e02 2f68 000c 206f
0031720  0004 226e 3e02 2350 000c 206e 3e02 53a8
0031740  0010 70ff b0af 0004 6736 264f 0004 200b
0031760  28af 0004 206f 0004 214a 0004 206f 0004
0032000  2144 0008 206e 3e02 52a8 0004 4297 6010
0032020  284e 2654 2005 5285 b086 6404 200b 660e
0032040  206e 3e02 b8a8 0008 6364 206e 3e02 4aa8
0032060  0010 6608 70ff 2f40 0000 6318 206e 3e02
0032100  2f68 000c 0004 206f 0004 226e 3e02 2350
0032120  000c 206e 3e02 53a8 0010 70ff b0af 0004
0032140  672c 28af 0004 206f 0004 4290 206f 0004
0032160  214a 0004 206f 0004 2144 0008 206e 3e02
0032200  52a8 0004 206e 3e02 2114 0008 4297 2017
0032220  508f 4ced 1f70 ffe0 4e5d 4e75 4e55 0000
0032240  48e7 c080 598f 4ced 42a7 486f 0008 7200
0032260  7004 6100 e03e 4fef 000c 4a80 6658 42a7
0032300  42a7 206e 3dfe 7000 3010 2f00 206e 3dfe
0032320  7000 3028 0002 42a7 42a7 42a7 42a7 4878
0032340  03fd 7204 202f 0020 6100 e228 4fef 0020
0032360  4a80 661a 2057 30bc 0010 2057 317c 0001
0032400  0002 41d7 2008 6100 e138 4a80 6708 41d7
0032420  2008 6100 e03c 588f 4ced 0102 fff8 4e5d
0032440  4e75 4e55 0000 48e7 ceb0 518f 45ee 366e
0032460  267c 000a 0340 7801 6000 0696 3b13 60c0
0032500  065a 7000 3006 6200 0000 00a2 7220 b280
0032520  6722 7200 2004 6100 d12c 4878 0012 4878
0032540  0011 720e 2004 6100 cf3c 508f 2f2a 0002
0032560  721a 606a 2004 5380 e388 2046 293c 000a
0032600  0740 7200 3230 0800 0281 0000 00ff 6756
0032620  2f2a 0002 721b 6045 7000 2004 6000 0260 0000
0032640  00a2 7220 b280 673a 4aaa 0002 670c 206a
0032660  0006 7000 3010 2200 6004 14bc 0014 7200
0032700  2004 6100 d0c0 4878 0012 4878 0011 720e
0032720  2004 6100 ced0 508f 2f2a 0002 721c 2004
0032740  6100 14ce 588f 6000 0548 7000 3006 0280
0032760  0000 00a2 0c80 0000 00a0 6700 00ba 2f2a
0033000  0002 42a7 7206 202a 0002 6100 e04e 4fef 0020
0033020  3dfe 7000 3028 0002 2f00 42a7 42a7 42a7
0033040  42a7 7224 202e 0002 6100 e0e4 4fef 0020
0033060  4a80 6644 7017 b012 6604 7010 6002 700f
```

```
0033100  206a 0002 3080 206a 0002 117c 001f 0019
0033120  206a 0002 7001 b050 660a 206a 0002 7000
0033140  3028 0006 6100 f4b8 200a 5480 6100 df42
0033160  4a80 6706 7a1d 6002 7a1e 14bc 0015 7200
0033200  2004 6100 d000 4878 0012 4878 0011 720e
0033220  2004 6100 ce10 508f 4a85 6716 2f2a 0002
0033240  2205 2004 6100 140a 588f 200a 5480 6100
0033260  deа0 6000 050c 7000 3006 7201 c081 7201
0033300  b280 6600 04fc 202a 0006 b0aa 000a 642c
0033320  7017 b012 660e 52aa 0006 206a 0006 7000
0033340  1010 600c 54aa 0006 206a 0006 7000 3010
0033360  2200 2004 6100 cf8e 6000 04c6 202a 0006
0033400  b0aa 000a 6600 0150 206a 0002 4aa8 0020
0033420  6610 7200 2004 6100 cf6c 52aa 0006 6000
0033440  04a0 2f6a 0002 0004 206a 0002 2568 0020
0033460  0002 7017 b012 6600 008e 202a 0002 5080
0033500  2540 0006 202a 0006 206a 0002 7200 1228
0033520  001a d081 2540 000a 206a 0006 7000 1010
0033540  2200 2004 6100 cf1e 2f2f 0004 42a7 206e
0033560  3dfe 7000 3010 2f00 206e 3dfe 7000 3028
0033600  2f00 2f00 42a7 42a7 42a7 42a7 7224 202f
0033620  0024 6100 df7e 4fef 0020 4a80 6600 02a0
0033640  206f 0004 30bc 0010 206f 0004 4228 0019
0033660  4f of 0004 2008 6100 de88 4a80 6700 0290
0033700  7a1d 6000 028a 202a 0002 5880 2540 0006
0033720  202a 0006 206a 0002 7200 122f 001a e389
0033740  d081 2540 000a 206a 0006 7a00 3010 2200
0033760  2004 6100 ce90 7a00 2f2f 0004 42a7 206e
0034000  3dfe 7000 3010 2f00 206e 3dfe 7000 3028
0034020  0002 2f00 42a7 42a7 42a7 42a7 7224 202f
0034040  0024 6100 dmae 4fef 0020 4a80 6600 021e
0034060  206f 0004 30bc 000f 206f 0004 4228 0019
0034100  4f00 0004 2008 6100 ddf8 4a80 6700 0200
0034120  7a1d 6000 01fa 206a 0002 4aa8 0020 6600
0034140  00bc 2f2a 0002 42a7 206e 3dfe 7000 3010
0034160  2f00 206e 3dfe 7000 3028 0002 2f00 42a7
0034200  42a7 42a7 42a7 7224 202a 0002 6100 de84
0034220  4fef 0020 4a80 6642 7017 b012 6604 7010
0034240  6002 700f 206a 0002 3080 206a 0002 4228
0034260  0019 206a 0002 7001 b050 660a 206a 0002
0034300  7000 3028 0006 6100 f256 200a 5480 6100
0034320  dd70 4a80 6706 7a1d 6002 7a1e 4a85 6716
0034340  2f2a 0002 2205 2004 6100 11c6 588f 200a
0034360  5480 6100 dc5c 14bc 0015 42aa 0002 42aa
0034400  0006 42aa 000a 4878 0012 4878 0011 720e
0034420  2004 6100 cb90 508f 6000 02a6 2f6a 0002
0034440  0004 206a 0002 2568 0020 0002 7017 b012
0034460  6600 0090 202a 0002 5880 2540 0006 202a
0034500  0006 206a 0002 7200 1228 001a d081 2540
0034520  000a 206a 0006 7000 1010 2200 2004 6100
0034540  cd24 7a00 2f2f 0004 42a7 206e 3dfe 7000
0034560  3010 2f00 206e 3dfe 7000 3028 0002 2f00
0034600  42a7 42a7 42a7 42a7 7224 202f 0024 6100
0034620  dd82 4fef 0020 4a80 6600 00b2 206f 0004
0034640  30bc 0010 206f 0004 4228 0019 4f ef 0004
0034660  2008 6100 dc8c 4a80 6700 0094 7a1d 6000
0034700  008a 202a 0002 5880 2540 0006 202a 0006
0034720  206a 0002 7200 1228 001a e389 d081 2540
0034740  000a 206a 0006 7000 3010 2200 2004 6100
0034760  cc94 7a00 2f2f 0004 42a7 206e 3dfe 7000
0035000  3010 2f00 206e 3dfe 7000 3028 0002 2f00
0035020  42a7 42a7 42a7 42a7 7224 202f 0024 6100
0035040  dcf2 4fef 0020 4a80 6622 206f 0004 30bc
0035060  000f 206f 0004 4228 0019 4f ef 0004 2008
0035100  6100 dbfe 4a80 6706 7a1d 6002 7a1e 4a85
0035120  6700 016e 2f2f 0004 2205 2004 6100 1052
0035140  588f 4f ef 0004 2008 6100 dae6 6000 0152
0035160  7000 3006 0280 0000 00a2 0c80 0000 0080
0035200  4f ef 6700 013e 7a00 2f2a 0002 42a7 206e 3dfe
0035220  7000 3010 2f00 206e 3dfe 7000 3028 0002
0035240  2f00 42a7 42a7 42a7 42a7 7224 202a 0002
0035260  dc60 4fef 0020 4a80 6620 206a 0002
0035300  30bc 000f 206a 0002 4228 0019 200a 5480
0035320  6100 dc6e 4a80 6706 7a1d 6002 7a1e 4a85
0035340  6716 2f2a 0002 2205 2004 6100 0fc4 588f
0035360  200a 5480 6100 da5a 14bc 0015 6000 0084
0035400  206a 0002 4aa8 0020 6774 7a00 2f2a 0002
0035420  42a7 206e 3dfe 7000 3010 2f00 206e 3dfe
0035440  7000 3028 0002 2f00 42a7 42a7 42a7 42a7
0035460  7224 202a 0002 6100 dbda 4fef 0020 4a80
0035500  6620 206a 0002 30bc 000f 206a 0002 4228
0035520  0019 200a 5480 6100 dae8 4a80 6706 7a1d
0035540  6002 7a1e 4a85 6716 2f2a 0002 2205 2004
0035560  6100 0f3e 588f 200a 5480 6100 d924 14bc
0035600  0014 42aa 0002 42aa 0006 42aa 000a 7200
0035620  2004 6100 caf0 6000 fd6e 7000 1012 0440
0035640  0014 0c40 0005 6200 ff58 d040 303b 0005
0035660  4efb 0002 f98e f98e f9e4 fa36 fa38 fabc
0035700  5284 d5fc 0000 0014 54bb 7060 b084 6c00
0035720  f96c 508f 4ced 0d72 ffa4 4e5d 4e75 4e55
0035740  0000 48e7 eeb8 4fef ffd2 7a00 45ee 366e
0035760  42a7 42a7 42a7 223c 0000 2711 4fef 0028
0036000  2008 6100 da58 4faf 000c 4a80 6500 0c90
0036020  6000 0c62 206f 001c 7000 3028 0002 90ae
0036040  2170 2800 4a84 6500 00b2 b8ae 3dee 6400
0036060  00aa 2004 7214 6100 0efe d5c0 5284 7015
0036100  b012 6600 0092 206f 001c 7000 3028 0004
0036120  e388 4f ee 31bc 3030 0800 3f40 0012 6772
0036140  7000 302f 0012 5280 2200 2004 6100 ca16
0036160  4878 0012 4878 0010 720f 2004 6100 c826
0036200  508f 14bc 0019 25fe 001c 0002 2f2f 001c
0036220  5880 2540 0006 256a 0006 000a 206f 001c
0036240  316f 0012 0004 267c 000a 0340 2004 5380
0036260  e388 d7c0 7000 3013 0800 0006 66f6 206a
0036300  000a 7000 3028 0002 2200 2004 6100 c9b6
0036320  600a 7a24 6006 7a25 6002 7a26 4a85 6700
0036340  0bbe 2f2f 001c 42a7 206e 3dfe 7000 3010
0036360  2f00 206e 3dfe 7000 3028 0002 2f00 42a7
0036400  42a7 42a7 42a7 7224 202f 003c 6100 da04
0036420  4fef 0020 4a80 6600 0380 206f 001c 30bc
0036440  000a 206f 001c 1145 0019 41ef 001c 2008
0036460  6100 d90e 4a80 6700 0362 7a1d 6000 035c
0036500  206f 001c 7000 3028 0002 90ae 2170 2800
0036520  4a84 6500 0140 b8ae 3dee 6400 0138 2004
0036540  7214 6100 0dd2 d5c0 5284 7019 b012 6600
0036560  0120 2004 5380 e388 2040 203c 0006 0140
0036600  7200 3230 0800 2004 5380 e388 2040 203c
0036620  0008 0140 7400 3430 0800 0282 0000 00ff
0036640  7010 e1aa 8282 2e81 2004 5380 e388 2040
0036660  203c 000a 0740 7200 3230 0800 0281 0000
0036700  00ff 3f41 0012 206a 0006 3010 b06f 0012
0036720  6668 4878 0012 4878 0010 720e 2004 6100
0036740  c6c4 508f 7000 302f 0012 e988 4fee c17c
0036760  2217 92b0 0808 2f41 0008 2057 4869 ffff
0037000  7000 302f 0016 e988 4fee 217c 2230 0808
0037020  2004 6100 c5b4 588f 202a 0010 90af 0008
0037040  2200 2017 6100 edce 7000 302f 0012 e988
0037060  4fee 217c 21af 000b 080c 206a 0006 7000
0037100  1010 2200 2004 6100 c83c 4878 0012 4878
0037120  0011 720f 2004 6100 c64c 508f 14bc 0018
0037140  267c 000a 0340 2004 5380 e388 d7c0 7000
0037160  3013 0800 0006 66f6 7200 2004 6100 c806
0037200  52aa 0006 4fee 001c 2008 6100 d6c4 6006
0037220  7a25 6002 7a26 4a85 6700 0a04 2f2f 001c
0037240  42a7 206e 3dfe 7000 3010 2f00 206e 3dfe
0037260  7000 3028 0002 2f00 42a7 42a7 42a7 42a7
0037300  7224 202f 003c 6100 d8aa 4fef 0020 4a80
0037320  6600 01c6 206f 001c 30bc 000a 206f 001c
0037340  1145 0019 7a00 41ef 001c 2008 6100 d752
0037360  4a80 6700 01a6 7a1d 6000 01a0 206f 001c
0037400  7000 3028 0002 90ae 2170 2800 4a84 6500
0037420  012c b8ae 3dee 6400 0124 2004 7214 6100
0037440  0c16 d5c0 5284 14bc 0015 7200 2004 6100
0037460  c754 4878 0012 4878 0011 720e 2004 6100
0037500  c564 508f 2f6a 0002 0018 6000 00e6 206f
0037520  0018 2f68 0020 0014 6036 206f 0018 30bc
0037540  000f 6056 206f 0018 30bc 0010 604c 706f
0037560  0018 30bc 000a 206a 0002 7000 3028 0006
0037600  6100 eb9c 6034 206f 0018 30bc 000a 602a
0037620  206f 0018 3010 5340 0c40 0008 62e8 d040
0037640  303b 0006 4efb 0002 ffc6 ffde ffde ff3a
0037660  ffde ffb2 ffbc ffde ffde 206f 0018 117c
0037700  0027 0019 7a00 2f2f 0018 42a7 206e 3dfe
0037720  7000 3010 2f00 206e 3dfe 7000 3028 0002
0037740  2f00 42a7 42a7 42a7 42a7 7224 202f 0038
0037760  6100 d720 4fef 0020 4a80 6612 41ef 0018
0040000  2008 6100 d63c 4a80 6706 7a1d 6002 7a1e
0040020  4a85 6718 2f2f 0018 2205 2004 6100 0a92
0040040  588f 41 ef 0018 2008 6100 d526 2f6f 0014
0040060  0018 4aaf 0018 6600 ff16 6002 7a26 2f2f
0040100  001c 42a7 206e 3dfe 7000 3010 2f00 206e
0040120  3dfe 7000 3028 0002 2f00 42a7 42a7 42a7
0040140  42a7 7224 202f 003c 6100 d6a8 4fef 0020
0040160  4a80 6624 206f 001c 30bc 000d 206f 001c
0040200  1145 0019 7a00 41ef 001c 2008 6100 d5b2
0040220  4a80 6706 7a1d 6002 7a1e 4a85 6700 0800
0040240  2f2f 001c 2205 2004 6000 07b8 206f 001c
0040260  7000 3028 0004 e388 4f ee 31bc 3030 0800
0040300  3f40 0012 6748 7000 302f 0012 e988 4fee
0040320  217c 2f70 0808 000c 7000 302f 0012 e988
0040340  4fee 217c 2f70 080c 0008 7000 302f 0012
0040360  5280 6100 c446 7000 302f 0012 6100 ea20
0040400  222f 0008 202f 000c 6100 eaea 6002 7a24
0040420  2f2f 001c 42a7 206e 3dfe 7000 3010 2f00
0040440  206e 3dfe 7000 3028 0002 2f00 42a7 42a7
0040460  42a7 42a7 7224 202f 003c 6100 d5d6 4fef
0040500  0020 4a80 6600 01c4 206f 001c 30bc 000c
0040520  206f 001c 1145 0019 7a00 41ef 001c 2008
0040540  6100 d4de 4a80 6700 01a4 7a1d 6000 019e
0040560  206f 001c 7000 3028 0002 90ae 2170 2800
0040600  4a84 6500 012a b8ae 3dee 6400 0122 2004
0040620  7214 6100 09a2 d5c0 5284 486a 0010 41ef
0040640  0010 2208 206f 0020 2028 001c 6100 e354
0040660  588f 4a80 6600 00f4 206f 001c 7000 3028
0040700  0004 e388 4f ee 31bc 4a70 0800 6600 00cc
0040720  6100 e2da 72ff b280 6704 7901 6002 7000
0040740  3f40 0012 6700 00a4 4f ee 217c 2008 7200
0040760  322f 0012 e989 d081 2f40 0020 3d7c 0003
0041000  217c 206f 001c 3468 0004 2182 117c 0019
0041020  217c 2d6f 000c 2184 206f 001c 2468 001c
0041040  2188 6100 e288 72ff b280 6704 7901 6002
0041060  7000 3f40 0010 6738 206f 001c 315f 0010
0041100  0006 4f ee 217c 2008 7200 322f 0010 e989
0041120  d081 2f40 0020 3d7c 0003 217e 1d7c 0010
0041140  217c 2d6e 2174 2184 2d6e 2178 2188 6040
0041160  7000 302f 0012 6100 e8a6 222a 0010 202f
0041200  000c 6100 e970 7a20 6026 222a 0010 202f
0041220  000c 6100 e960 7a21 6016 222a 0010 202f
0041240  000c 6100 e950 7a22 6006 7a23 6002 7a26
0041260  206f 001c 30bc 000b 206f 001c 1145 0019
0041300  7a00 2f2f 001c 42a7 206e 3dfe 7000 3010
0041320  2f00 206e 3dfe 7000 3028 0002 2f00 42a7
0041340  42a7 42a7 42a7 7224 202f 003c 6100 d4c4
0041360  4f ef 0020 4a80 6612 41ef 001c 2008 6100
0041400  d340 4a80 6706 7a1d 6002 7a1e 4a85 6700
0041420  058e 2f2f 001c 2205 7000 6000 0546 206f
0041440  001c 7000 3028 0002 90ae 2170 2800 4a84
0041460  6500 015a b8ae 3dee 6400 0152 206f 001c
0041500  7003 b028 0018 6600 0140 2004 7214 6100
0041520  07e6 d5c0 5284 49ee 31bc 7c00 6042 2006
0041540  e388 206f 001c 41e8 0004 0c70 0100 0800
0041560  6228 2006 e388 206f 001c 41e8 0004 7200
0041600  3230 0800 e389 2006 e388 206f 001c 41e8
0041620  0004 31b4 1800 0800 6004 7a24 4010 5286
0041640  206f 001c 7000 1028 001a bc80 6db0 4a85
0041660  6600 00dc 7015 b012 6600 009c 202a 0002
0041700  5880 2540 0006 202a 0006 206a 0002 7200
0041720  1228 001a e389 d081 2540 000a 206a 0006
```

We claim:

1. An apparatus for generation tone and announcement message codes for a telephonic switching network, comprising:
- a single message memory for storing a repertoire of PCM encoded tone and announcement messages respectively at a plurality of preselected addressable message memory locations of said message memory;
- a multichannel interface circuit for interconnecting said single message memory with said telephonic switching system;
- a share memory for storage of identification codes for selected ones of said plurality of message memory locations for each of a plurality of time slot channels;
- a controller for issuing command signals with respect to each of said time slot channels in response to a computer of the telephonic network; and
- a sequencer responsive to said controller for selectively causing said single message memory to successively write out, through the multichannel interface circuit, the plurality of selected tone and announcement messages at said selected ones of the plurality of addressable message locations for each of said time slot channels in accordance with a command signal directing it to do so.

2. The telephonic tone and announcement message code generating apparatus of claim 1 in which said controller includes means for reading into the share memory the identification codes of the selected ones of said plurality of message memory locations for each of said time slot channels.

3. The telephonic tone and announcement message code generating apparatus of claim 2 in which said identification codes are actual addresses of the selected ones of said plurality of message memory locations of the message memory.

4. The telephonic tone and announcement message code generating apparatus of claim 1 including a command share memory connected between the controller and the sequencer for conveying said command signal to the sequencer.

5. The telephonic tone and announcement message code generating apparatus of claim 4 in which
said sequencer includes means for producing processing status signals with respect to the status of the write out of the message memory for each of said time slot channels and said command share memory includes means for temporarily storing said processing status signals for each of said time slot channels for monitoring by said controller.

6. The telephonic tone and announcement message code generating apparatus of claim 1 in which said sequencer includes means for producing processing status signals with respect to the status of the write out of the message memory for each of said time slot channels, and including a command share memory connected between the controller and the sequencer for conveying said processing status signals to the sequence.

7. The telephonic tone and announcement message code generating apparatus of claim 1 in which said controller includes means for receiving PCM tones data from a higher order controller of the telephonic network, and means for controlling said message memory to store said received PCM tones data at selected ones of said addressable message memory locations.

8. The telephonic tone and announcement message code generating apparatus of claim 1 in which said controller includes means for receiving commands from a higher level controller of the telephonic network, and means for conveying said commands to the sequencer for controlling the message memory.

9. The telephonic tone and announcement message code generating apparatus of claim 8 in which said commands receiving means includes a serial interface circuit connected with a time slot interchanger of the telephonic network.

10. The telephonic tone and announcement message code generating apparatus of claim 1 in which said controller includes means for receiving message write out status from the sequencer, and means for conveying said message write out status to a higher level controller of the telephonic network.

11. The telephonic tone and announcement message code generating apparatus of claim 10 in which said message write out status conveying means includes a serial interface circuit connected with a time slot interchanger of the telephonic network.

12. The telephonic tone and announcement message code generating apparatus of claim 1 in which said sequencer comprises a hardware logic circuit exclusively dedicated to executing commands sent by said controller.

13. The telephonic tone and announcement message code generating apparatus of claim 1 including a command share memory for temporarily storing commands from the controller to the sequencer.

14. The telephonic tone and announcement message code generating apparatus of claim 1 in which said sequencer causes the plurality of selected ones of the identification codes for each of a plurality of time slot channels to be written out by the share memory incrementally in succession during each one of a succession of cycles of said sequencer until the message has been completed.

15. The telephonic tone and announcement message code generating apparatus of claim 1 in which said sequencer includes means for monitoring for message ending points, and
means responsive in part to said monitoring means for reporting a failure of message processing to said controller.

16. The telephonic tone and announcement message code generating apparatus of claim 1 in which said sequencer includes means for periodically monitoring requests from the controller concerning the status of the share memory.

17. The telephonic tone and announcement message code generating apparatus of claim 1 in which said sequencer includes means for updating tone requests.

18. The telephonic tone and announcement message code generating apparatus of claim 1 in which said share memory includes a pair of memory devices each with dual input-output ports respectively connected with said controller and said sequencer for asynchronous communication therewith.

19. The telephonic tone and announcement message code generating apparatus of claim 18 in which one of said pair of memory devices contains the status of message processing and commands from the controller at addresses of the channels to which tone and command requests are assigned.

20. The telephonic tone and announcement message code generating apparatus of claim 18 including an arbitration logic circuit to resolve contension between the controller and sequencer in asynchronously accessing the share memory.

21. The telephonic tone and announcement message code generating apparatus of claim 18 in which the other of said memory devices contains the addresses of the PCM incoded tone and announcement messages in the message memory addresses corresponding to said identification codes.

22. The telephonic tone and announcement message code generating apparatus of claim 1 in which said share memory has an address pointer table, and
said message memory has PCM encoded tone and announcement messages stored therein at locations designated by the address pointer table.

23. The telephonic tone and announcement message code generating apparatus of claim 1 in which said multichannel interface circuit is a serial interface with a time slot interchanger of the telephonic network.

24. The telephonic tone and announcement message code generating apparatus of claim 1 in which said multichannel interface circuit includes means for applying PCM encoded voice announcement messages from the telephonic network to the message memory, and said controller includes means for controlling said share memory in response to command signals from the telephonic network to record said PCM incoded voice announcement messages from any assigned channel at addresses selected by said share memory.

25. The telephonic tone and announcement message code generating apparatus of claim 1 in which said controller includes means responsive to command signals from the telephonic network for up loading tone and announcement messages from the message memory to a central memory of the network.

26. An apparatus for generating announcement message codes for a telephonic switching network, comprising:

a message memory for storing a plurality of PCM encoded announcement messages at a plurality of addressable memory locations;

a multichannel interface circuit for interconnecting said message memory with a plurality of channels of said telephonic network; and means for controlling said message memory to store a selected PCM encoded announcement received through said telephonic interface circuit from a selected channel of said telephonic switching network at selected ones of said plurality of memory locations associated with the selected channel.

27. The announcement message code apparatus of claim 26 in which said message controlling means includes means for storing addresses of the addressable memory locations of said message memory at which the PCM encoded announcement from the selected channels of the telephonic network are received.

28. The announcement code apparatus of claim 27 in which said address storing means includes a share memory for storing identification codes for said selected addresses, and said message controlling means includes a sequencer for causing said message memory to read in the PCM encoded messages from the selected telephonic panel at the memory addresses indicated by said identification codes.

29. The announcement message code apparatus of claim 28 in which said message controlling means generates command signals to said sequence, and said sequencer is responsive to said controlling means for selectively causing said message memory to successively write out through the interface circuit a plurality of messages at said selected ones of the plurality of addressable memory locations for each said time slot channels in accordance with said command signals directing it to do so.

30. An apparatus for generating tone message codes for a telephonic switching network, comprising:

a local tone message memory for storing a plurality of PCM encoded tone messages at a plurality of addressable memory locations;

a multichannel interface circuit for interconnecting said message memory with a central tone memory of said telephonic switching system; and means for controlling said tone message memory for downloading PCM encoded tone messages from said centro tone memory of the telephonic switching system at selected addressable memory locations of said tone message memory.

31. The tone message code generating apparatus of claim 30 in which said controlling means includes a controller for issuing command signals with respect to each to said time slot channels in response to a computer associated with said central tone memory of the telephonic switching network, and a sequencer responsive to said controller for selectively causing said message memory to successively read in through the interface circuit the PCM encoded tone messages at selected ones of the plurality of addressable memory locations for each of said time slot channels.

32. The tone message code generating apparatus of claim 31 in which said sequencer is responsive to said controller for selectively causing said message memory to write out through the interface circuit the PCM encoded tone messages down loaded to the message memory from the central tone memory of the telephonic network.

33. The tone message code generating apparatus of claim 30 in which said controlling means includes a share memory for storage of the address of the plurality of addressable memory locations at which the down loaded PCM encoded tone messages are stored.

34. A method of selectively providing PCM codes for a plurality of tones and announcements to a plurality of different time division multiplexing channels of a multichannel telephonic switching network having a central control computer, comprising the steps of:

storing the message codes for the plurality of tones and announcements in a message memory at addressable memory locations therein;

temporarily storing in a reprogrammable memory a representation of a sequence of addresses of selected ones of the addressable memory locations for each channel of said multichannel telephonic switching network in response to asynchronous command signals from said central control computer, different command signals causing temporary storage of representations of different tones and announcements; and selectively, sequentially writing out the message codes at the addressable memory locations of said sequence of addresses to each of the channels of the telephonic network during a succession of time slots of said channels, respectively.

35. The method of claim 34 in which said step of storing the message codes includes the step of downloading tone codes from a computer memory associated with the telephonic network into the message memory.

36. The method of claim 34 in which said step of storing the message codes includes the steps of receiving announcement message codes from a selected channel of the telephonic switching network, and selectively causing said received announcement message codes to be entered into storage at memory locations associated with said channel.

37. The method of claim 34 in which said step of storing a sequence of addresses of selected ones of the addressable memory location includes the step of entering those addresses into a share memory at locations therein associated with said channel.

38. The method of claim 34 in which the step of sequentially writing out the message code is performed in accordance with command signal received from the telephonic network by a microprocessor connected with the message memory.

39. A method of generating a periodic tone signal for a telephonic switching network, comprising the steps of:

storing in PCM code a plural number of cycles of a tone corresponding to a preselected time period of periodic tone generation of the periodic tone signal at a preselected periodic tone memory location of a memory;

storing a plural number of PCM codes representative of substantially zero amplitude corresponding to a preselected time period of periodic silence of the periodic tone signal adjacent to the PCM codes of the plural number of cycles of tone of the preselected periodic tone memory location, said PCM codes of plural cycles of tome together with the PCM codes of substantially zero amplitude forming at least one complete period of the periodic tone signal; and selectively reading the PCM codes of the periodic tone signal in response to a command signal from the telephonic switching network for producing an audible period tone signal.

40. The periodic tone signal generating method of claim 39 including the step of storing the PCM codes and PCM codes of substantial zero amplitude of at least a full cycle of another periodic tone signal.

41. The periodic tone signal generating method of claim 39 including the steps of storing PCM codes of other sounds which are not periodic tone signals, and selectively reading the PCM codes of both the periodic tone signal and the audible sounds which are not periodic tone signals by means of an identical method.

* * * * *